US009948951B2

(12) United States Patent
Ikai et al.

(10) Patent No.: US 9,948,951 B2
(45) Date of Patent: Apr. 17, 2018

(54) IMAGE DECODING DEVICE WHICH GENERATES A PREDICTED IMAGE OF A TARGET PREDICTION UNIT

(71) Applicant: Sharp Kabushiki Kaisha, Osaka-shi, Osaka (JP)

(72) Inventors: Tomohiro Ikai, Osaka (JP); Yoshiya Yamamoto, Osaka (JP); Takeshi Tsukuba, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 361 days.

(21) Appl. No.: 14/652,139

(22) PCT Filed: Nov. 28, 2013

(86) PCT No.: PCT/JP2013/082062
§ 371 (c)(1),
(2) Date: Jun. 15, 2015

(87) PCT Pub. No.: WO2014/103606
PCT Pub. Date: Jul. 3, 2014

(65) Prior Publication Data

US 2015/0326881 A1 Nov. 12, 2015

(30) Foreign Application Priority Data

Dec. 26, 2012 (JP) ................................ 2012-282385
Apr. 5, 2013 (JP) ................................ 2013-079644
Apr. 11, 2013 (JP) ................................ 2013-083047

(51) Int. Cl.
*H04N 19/82* (2014.01)
*H04N 19/59* (2014.01)
(Continued)

(52) U.S. Cl.
CPC ......... *H04N 19/597* (2014.11); *H04N 19/117* (2014.11); *H04N 19/176* (2014.11); *H04N 19/82* (2014.11)

(58) Field of Classification Search
None
See application file for complete search history.

(56) References Cited

U.S. PATENT DOCUMENTS

2007/0177672 A1* 8/2007 Yang .................... H04N 19/597 375/240.25
2012/0287988 A1* 11/2012 Chong ................. H04N 19/105 375/240.02
2015/0350642 A1* 12/2015 Park ..................... H04N 19/105 375/240.12

OTHER PUBLICATIONS

ISO/IEC 14496-10, Information Technology—Coding of Audio-Visual Objects—Part 10: Advanced Video Coding, International Standard, Seventh Edition, May 1, 2012, 720 pages.
(Continued)

*Primary Examiner* — Kevin McInnish
(74) *Attorney, Agent, or Firm* — Keating & Bennett, LLP

(57) ABSTRACT

An image decoding device includes an illumination compensation flag derivation section that derives an illumination compensation flag indicating whether illumination compensation is executed and an illumination compensation section (3093) that generates a predicted image of a target prediction unit using illumination change parameters derived from an image in a neighbor of the target prediction unit on a target image and a reference region image of a reference image corresponding to the target prediction unit in a case where the illumination compensation flag is a value indicating validity. In a case where a prediction unit which is a generation target of the predicted image is in a merge mode,
(Continued)

the illumination compensation flag derivation section decodes the illumination compensation flag from coded data.

3 Claims, 88 Drawing Sheets

(51) Int. Cl.
*H04N 19/597* (2014.01)
*H04N 19/176* (2014.01)
*H04N 19/117* (2014.01)

(56) References Cited

OTHER PUBLICATIONS

An, J. et al., "Removal of the Parsing Dependency of Inter-view Residual Prediction", Joint Collaborative Team on 3D Video Coding Extension Development of ITU-T SG 16 WP 3 and ISO/IEC JTC 1/SC 29/WG 11, JCT3V-B0093, 2nd Meeting, Oct. 13-19, 2012, pp. 1-5.
Liu, H. et al., "3D-CE2.h: Results of Illumination Compensation for Inter-view Prediction", Joint Collaborative Team on 3D Video Coding Extension Development of ITU-T SG 16 WP 3 and ISO/IEC JTC 1/SC 29/WG 11, JCT3V-B0045, 2nd Meeting, Oct. 13-19, 2012, pp. 1-5.

* cited by examiner

FIG. 15

| coding_unit( x0, y0, log2CbSize ) { | Descriptor |
|---|---|
| if( slice_type != I ) | |
| **skip_flag**[ x0 ][ y0 | ae(v) |
| nCbS = ( 1 << log2CbSize ) | |
| if( skip_flag[ x0 ][ y0 ] ) | |
| prediction_unit( x0, y0, nCbS, nCbS ) | |
| else { | |
| if( slice_type != I ) | |
| **pred_mode_flag** | ae(v) |
| if( PredMode[ x0 ][ y0 ] = = MODE_INTRA ) { | |
| ... | |
| } | |
| } else { | |
| **part_mode** | ae(v) |
| if( PartMode = = PART 2Nx2N ) | |
| prediction_unit( x0, y0, nCbS, nCbS ) | |
| else if( PartMode = = PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode = = PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else { /* PART_NxN */ | |
| prediction_unit( x0, y0, nCbS / 2, nCbS / 2) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if ( !depth_flag && ViewId && PredMode != MODE_INTRA && motion_pred_exits) | |
| **res_pred_flag** | ae(v) |
| if ( !depth_flag && ViewId && PredMode != MODE_INTRA && disparity_pred_exits) | |
| **ic_enable_flag** | ae(v) |
| if( PredMode[ x0 ][ y0 ] != MODE_INTRA && !(PartMode = = PART_2Nx2N && merge_flag[x0][y0]) ) | |
| **no_residual_syntax_flag** | ae(v) |
| if( !no_residual_syntax_flag ) { | |
| MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
| transform_tree( x0, y0 x0, y0, log2CbSize, 0, 0 ) | |
| } | |
| } | |
| } | |

```
motion_pred_exits = false;
If(
    ( PartMode == PART_2Nx2N &&
      // PU0 check
      ( (inter_pred_idc[ x0 ][ y0 ] != Pred_L1 && ref_viewid_l0[ x0 ][ y0 ] == ViewId) ||
(inter_pred_idc[ x0 ][ y0 ] != Pred_L0 && ref_viewid_l1[ x0 ][ y0 ] == ViewId)))
    || ( PartMode == PART_2NxN &&
      // PU0 check
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      // PU1 check
      || (inter_pred_idc[ x0 ][ y0+( nCbS / 2 ) ] != Pred_L1 && ref_viewid_l0[ x0 ][ y0+( nCbS / 2 ) ] == ViewId) ||
(inter_pred_idc[ x0 ][ y0+( nCbS / 2 ) ] != Pred_L0 && ref_viewid_l1[ x0 ][ y0+( nCbS / 2 ) ] == ViewId) )
    )
    || ( PartMode == PART_Nx2N &&
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      || (inter_pred_idc[ x0+( nCbS / 2 ) ][ y0 ] != Pred_L1 && ref_viewid_l0[ x0+( nCbS / 2 ) ][ y0 ] == ViewId) ||
(inter_pred_idc[ x0+( nCbS / 2 ) ][ y0 ] != Pred_L0 && ref_viewid_l1[ x0+( nCbS / 2 ) ][ y0 ] == ViewId) )
    )
    || ( PartMode == PART_2NxnU &&
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      || (inter_pred_idc[ x0 ][ y0+( nCbS / 4 ) ] != Pred_L1 && ref_viewid_l0[ x0 ][ y0+( nCbS / 4 ) ] == ViewId) ||
(inter_pred_idc[ x0 ][ y0+( nCbS / 4 ) ] != Pred_L0 && ref_viewid_l1[ x0 ][ y0+( nCbS / 4 ) ] == ViewId) )
    )
    || ( PartMode == PART_2NxnD &&
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      || (inter_pred_idc[ x0 ][ y0+( 3*nCbS / 4 ) ] != Pred_L1 && ref_viewid_l0[ x0 ][ y0+( 3*nCbS / 4 ) ] ==
ViewId) ||
(inter_pred_idc[ x0 ][ y0+( 3*nCbS / 4 ) ] != Pred_L0 && ref_viewid_l1[ x0 ][ y0+( 3*nCbS / 4 ) ] == ViewId) )
    )
    || ( PartMode == PART_nLx2N &&
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      || (inter_pred_idc[ x0+( nCbS / 4 ) ][ y0 ] != Pred_L1 && ref_viewid_l0[ x0+( nCbS / 4 ) ][ y0 ] == ViewId) ||
(inter_pred_idc[ x0+( nCbS / 4 ) ][ y0 ] != Pred_L0 && ref_viewid_l1[ x0+( nCbS / 4 ) ][ y0 ] == ViewId) )
    )
    || ( PartMode == PART_nRx2N &&
      ( (inter_pred_idc[ x0 ][ y0 ] != Pred_L1 && ref_viewid_l0[ x0 ][ y0 ] == ViewId)  ||
(inter_pred_idc[ x0 ][ y0 ] != Pred_L0 && ref_viewid_l1[ x0 ][ y0 ] == ViewId)
      || (inter_pred_idc[ x0+(3* nCbS / 4 ) ][ y0 ] != Pred_L1 && ref_viewid_l0[ x0+( 3*nCbS / 4 ) ][ y0 ] !=
ViewId) ||
(inter_pred_idc[ x0+(3* nCbS / 4 ) ][ y0 ] != Pred_L0 && ref_viewid_l1[ x0+( 3*nCbS / 4 ) ][ y0 ] != ViewId) )
    )
    || ( PartMode == PART_NxN &&
      ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
      || (inter_pred_idc[ x0+( nCbS / 2 ) ][ y0 ] != Pred_L1 && ref_viewid_l0[ x0+( nCbS /2 ) ][ y0 ] != ViewId) ||
(inter_pred_idc[ x0+( nCbS /2 ) ][ y0 ]  != Pred_L0 && ref_viewid_l1[ x0+( nCbS /2 ) ][ y0 ] != ViewId) )
      || (inter_pred_idc[ x0 ][ y0+( nCbS / 2 ) ] != Pred_L1 && ref_viewid_l0[ x0 ][ y0+( nCbS / 2 ) ] != ViewId) ||
(inter_pred_idc[ x0 ][ y0+( nCbS / 2 ) ] != Pred_L0 && ref_viewid_l1[ x0 ][ y0+( nCbS / 2 ) ] != ViewId)
      || (inter_pred_idc[ x0+( nCbS / 2 ) ][ y0+( nCbS / 2 ) ] != Pred_L1 && ref_viewid_l0[ x0+( nCbS /
2 ) ][ y0+( nCbS / 2 ) ] != ViewId) || (inter_pred_idc[ x0+( nCbS / 2 ) ][ y0+( nCbS / 2 ) ] != Pred_L0 &&
ref_viewid_l1[ x0+( nCbS / 2 ) ][ y0+( nCbS / 2 ) ] != ViewId)
    )
  )
motion_pred_exits = true;
```

FIG. 18

```
disparity_pred_exits = false;
If(
   ( PartMode == PART_2Nx2N &&
   // PU0 check
     ( (inter_pred_idc[ x0 ][ y0 ] != Pred_L1 && ref_viewid_l0[ x0 ][ y0 ] != ViewId) ||
(inter_pred_idc[ x0 ][ y0 ] != Pred_L0 && ref_viewid_l1[ x0 ][ y0 ] != ViewId)))
   || ( PartMode == PART_2NxN &&
   // PU0 check
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
   // PU1 check
     || (inter_pred_idc[ x0 ][ y0+( nCbS / 2 ) ] != Pred_L1 && ref_viewid_l0[ x0 ][ y0+( nCbS / 2 ) ] != ViewId) ||
(inter_pred_idc[ x0 ][ y0+( nCbS / 2 ) ] != Pred_L0 && ref_viewid_l1[ x0 ][ y0+( nCbS / 2 ) ] != ViewId) )
   )
   || ( PartMode == PART_Nx2N &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0+( nCbS / 2 ) ][ y0 ] != Pred_L1 && ref_viewid_l0[ x0+( nCbS / 2 ) ][ y0 ] != ViewId) ||
(inter_pred_idc[ x0+( nCbS / 2 ) ][ y0 ] != Pred_L0 && ref_viewid_l1[ x0+( nCbS / 2 ) ][ y0 ] != ViewId) )
   )
   || ( PartMode == PART_2NxnU &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0 ][ y0+( nCbS / 4 ) ] != Pred_L1 && ref_viewid_l0[ x0 ][ y0+( nCbS / 4 ) ] != ViewId) ||
(inter_pred_idc[ x0 ][ y0+( nCbS / 4 ) ] != Pred_L0 && ref_viewid_l1[ x0 ][ y0+( nCbS / 4 ) ] != ViewId) )
   )
   || ( PartMode == PART_2NxnD &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0 ][ y0+( 3*nCbS / 4 ) ] != Pred_L1 && ref_viewid_l0[ x0 ][ y0+( 3*nCbS / 4 ) ] !=
ViewId) ||
(inter_pred_idc[ x0 ][ y0+( 3*nCbS / 4 ) ] != Pred_L0 && ref_viewid_l1[ x0 ][ y0+( 3*nCbS / 4 ) ] != ViewId) )
   )
   || ( PartMode == PART_nLx2N &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0+( nCbS / 4 ) ][ y0 ] != Pred_L1 && ref_viewid_l0[ x0+( nCbS / 4 ) ][ y0 ] != ViewId) ||
(inter_pred_idc[ x0+( nCbS / 4 ) ][ y0 ] != Pred_L0 && ref_viewid_l1[ x0+( nCbS / 4 ) ][ y0 ] != ViewId) )
   )
   || ( PartMode == PART_nRx2N &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0+(3* nCbS / 4 ) ][ y0 ] != Pred_L1 && ref_viewid_l0[ x0+( 3*nCbS / 4 ) ][ y0 ] !=
ViewId) || (inter_pred_idc[ x0+(3* nCbS / 4 ) ][ y0 ] != Pred_L0 && ref_viewid_l1[ x0+( 3*nCbS / 4 ) ][ y0 ] !=
ViewId) )
   )
   || ( PartMode == PART_NxN &&
     ( (inter_pred_idc[ x0 ][ y0 ] != Pred_L1 && ref_viewid_l0[ x0 ][ y0 ] != ViewId)  ||
(inter_pred_idc[ x0 ][ y0 ] != Pred_L0 && ref_viewid_l1[ x0 ][ y0 ] != ViewId)
     || (inter_pred_idc[ x0+( nCbS / 2 ) ][ y0 ] != Pred_L1 && ref_viewid_l0[ x0+( nCbS /2 ) ][ y0 ] != ViewId) ||
(inter_pred_idc[ x0+( nCbS /2 ) ][ y0 ]  != Pred_L0 && ref_viewid_l1[ x0+( nCbS /2 ) ][ y0 ] != ViewId) )
     || (inter_pred_idc[ x0 ][ y0+( nCbS / 2 ) ] != Pred_L1 && ref_viewid_l0[ x0 ][ y0+( nCbS / 2 ) ] != ViewId) ||
(inter_pred_idc[ x0 ][ y0+( nCbS / 2 ) ] != Pred_L0 && ref_viewid_l1[ x0 ][ y0+( nCbS / 2 ) ] != ViewId)
     || (inter_pred_idc[ x0+( nCbS / 2 ) ][ y0+( nCbS / 2 ) ] != Pred_L1 && ref_viewid_l0[ x0+( nCbS /
2 ) ][ y0+( nCbS / 2 ) ] != ViewId) || (inter_pred_idc[ x0+( nCbS / 2 ) ][ y0+( nCbS / 2 ) ] != Pred_L0 &&
ref_viewid_l1[ x0+( nCbS / 2 ) ][ y0+( nCbS / 2 ) ] != ViewId)
   )
  )
disparity_pred_exits = true;
```

FIG. 19

| **coding_unit( x0, y0, log2CbSize ) {** | **Descriptor** |
|---|---|
| if( slice_type != I ) | |
| **skip_flag**[ x0 ][ y0 | ae(v) |
| nCbS = ( 1 << log2CbSize ) | |
| if( skip_flag[ x0 ][ y0 ] ) | |
| prediction_unit( x0, y0, nCbS, nCbS ) | |
| else { | |
| if( slice_type != I ) | |
| **pred_mode_flag** | ae(v) |
| if( PredMode[ x0 ][ y0 ] = = MODE_INTRA ) { | |
| ... | |
| } | |
| } else { | |
| **part_mode** | ae(v) |
| if( PartMode = = PART_2Nx2N ) | |
| prediction_unit( x0, y0, nCbS, nCbS ) | |
| else if( PartMode = = PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode = = PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else { /* PART_NxN */ | |
| prediction_unit( x0, y0, nCbS / 2, nCbS / 2) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if ( !depth_flag && ViewId && PredMode != MODE_INTRA && motion_pred_exits) | |
| **res_pred_flag** | ae(v) |
| if ( !depth_flag && ViewId && PredMode != MODE_INTRA && res_pred_flag == 0) | |
| **ic_enable_flag** | ae(v) |
| if( PredMode[ x0 ][ y0 ] != MODE_INTRA && !(PartMode = = PART_2Nx2N && merge_flag[x0][y0]) ) | |
| **no_residual_syntax_flag** | ae(v) |
| if( !no_residual_syntax_flag ) { | |
| MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
| transform_tree( x0, y0 x0, y0, log2CbSize, 0, 0 ) | |
| } | |
| } | |
| } | |

| coding_unit( x0, y0, log2CbSize ) { | Descriptor |
|---|---|
| if( slice_type != I ) | |
| **skip_flag**[ x0 ][ y0 | ae(v) |
| nCbS = ( 1 << log2CbSize ) | |
| if( skip_flag[ x0 ][ y0 ] ) | |
| prediction_unit( x0, y0, nCbS, nCbS ) | |
| else { | |
| if( slice_type != I ) | |
| **pred_mode_flag** | ae(v) |
| if( PredMode[ x0 ][ y0 ] = = MODE_INTRA ) { | |
| ... | |
| } | |
| } else { | |
| **part_mode** | ae(v) |
| if( PartMode = = PART_2Nx2N ) | |
| prediction_unit( x0, y0, nCbS, nCbS ) | |
| else if( PartMode = = PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode = = PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else { /* PART_NxN */ | |
| prediction_unit( x0, y0, nCbS / 2, nCbS / 2) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if ( !depth_flag && ViewId && PredMode != MODE_INTRA && motion_pred_exits) | |
| **res_pred_flag** | ae(v) |
| if ( !depth_flag && ViewId && PredMode != MODE_INTRA && motion_pred_exits == 0) | |
| **ic_enable_flag** | ae(v) |
| if( PredMode[ x0 ][ y0 ] != MODE_INTRA && !(PartMode = = PART_2Nx2N && merge_flag[x0][y0]) ) | |
| **no_residual_syntax_flag** | ae(v) |
| if( !no_residual_syntax_flag ) { | |
| MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
| transform_tree( x0, y0 x0, y0, log2CbSize, 0, 0 ) | |
| } | |
| } | |
| } | |

| coding_unit( x0, y0, log2CbSize ) { | Descriptor |
|---|---|
| if( slice_type != I ) | |
| **skip_flag**[ x0 ][ y0 | ae(v) |
| nCbS = ( 1 << log2CbSize ) | |
| if( skip_flag[ x0 ][ y0 ] ) | |
| prediction_unit( x0, y0, nCbS, nCbS ) | |
| else { | |
| if( slice_type != I ) | |
| **pred_mode_flag** | ae(v) |
| if( PredMode[ x0 ][ y0 ] = = MODE_INTRA ) { | |
| ... | |
| } | |
| } else { | |
| **part_mode** | ae(v) |
| if( PartMode = = PART_2Nx2N ) | |
| prediction_unit( x0, y0, nCbS, nCbS ) | |
| else if( PartMode = = PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode = = PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else { /* PART_NxN */ | |
| prediction_unit( x0, y0, nCbS / 2, nCbS / 2) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if ( !depth_flag && ViewId && PredMode != MODE_INTRA && pu0_is_motion_pred ) | |
| **res_pred_flag** | ae(v) |
| if ( !depth_flag && ViewId && PredMode != MODE_INTRA && pu0_is_disparity_pred ) | |
| **ic_enable_flag** | ae(v) |
| if( PredMode[ x0 ][ y0 ] != MODE_INTRA && !(PartMode = = PART_2Nx2N && merge_flag[x0][y0]) ) | |
| **no_residual_syntax_flag** | ae(v) |
| if( !no_residual_syntax_flag ) { | |
| MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
| transform_tree( x0, y0 x0, y0, log2CbSize, 0, 0 ) | |
| } | |
| } | |
| } | |

```
pu0_is_motion_pred s = false;
If(
( ( (inter_pred_idc[ x0 ][ y0 ] != Pred_L1 && ref_viewid_l0[ x0 ][ y0 ] == ViewId) ||
(inter_pred_idc[ x0 ][ y0 ] != Pred_L0 && ref_viewid_l1[ x0 ][ y0 ] == ViewId)))
   pu0_is_motion_pred = true;
}
```

(b)

```
pu0_is_motion_pred = false;
If(
( ( (inter_pred_idc[ x0 ][ y0 ] != Pred_L1 && ref_viewid_l0[ x0 ][ y0 ] != ViewId) ||
(inter_pred_idc[ x0 ][ y0 ] != Pred_L0 && ref_viewid_l1[ x0 ][ y0 ] != ViewId)))
 pu0_is_motion_pred s = true;
}
```

FIG. 24

| **coding_unit( x0, y0, log2CbSize ) {** | **Descriptor** |
|---|---|
| if( slice_type != I ) | |
| **skip_flag**[ x0 ][ y0 | ae(v) |
| nCbS = ( 1 << log2CbSize ) | |
| if( skip_flag[ x0 ][ y0 ] ) | |
| prediction_unit( x0, y0, nCbS, nCbS ) | |
| else { | |
| if( slice_type != I ) | |
| **pred_mode_flag** | ae(v) |
| if ( !depth_flag && ViewId && PredMode != MODE_INTRA && ) | |
| **res_pred_flag** | ae(v) |
| } else { | |
| **part_mode** | ae(v) |
| if( PartMode = = PART_2Nx2N ) | |
| prediction_unit( x0, y0, nCbS, nCbS ) | |
| else if( PartMode = = PART_2NxN ) { | |
| prediction_unit( x0, y0, nCbS, nCbS / 2 ) | |
| prediction_unit( x0, y0 + ( nCbS / 2 ), nCbS, nCbS / 2 ) | |
| } else if( PartMode = = PART_Nx2N ) { | |
| prediction_unit( x0, y0, nCbS / 2, nCbS ) | |
| prediction_unit( x0 + ( nCbS / 2 ), y0, nCbS / 2, nCbS ) | |
| } else { /* PART_NxN */ | |
| prediction_unit( x0, y0, nCbS / 2, nCbS / 2) | |
| prediction_unit( x0 + ( nCbS / 2 ), y0, nCbS / 2, nCbS / 2 ) | |
| prediction_unit( x0, y0 + ( nCbS / 2 ), nCbS / 2, nCbS / 2 ) | |
| prediction_unit( x0 + ( nCbS / 2 ), y0 + ( nCbS / 2 ), nCbS / 2, nCbS / 2 ) | |
| } | |
| } | |
| if ( !depth_flag && ViewId && PredMode != MODE_INTRA) | |
| **res_pred_and_ic_enable_flag** | ae(v) |
| if( PredMode[ x0 ][ y0 ] != MODE_INTRA && !(PartMode = = PART_2Nx2N && merge_flag[x0][y0]) ) | |
| **no_residual_syntax_flag** | ae(v) |
| if( !no_residual_syntax_flag ) { | |
| MaxTrafoDepth = ( PredMode[ x0 ][ y0 ] = = MODE_INTRA ? max_transform_hierarchy_depth_intra + IntraSplitFlag : max_transform_hierarchy_depth_inter ) | |
| transform_tree( x0, y0 x0, y0, log2CbSize, 0, 0 ) | |
| } | |
| } | |
| } | |

| **prediction_unit( x0, y0, nPbW, nPbH ) {** | **Descriptor** | |
|---|---|---|
| if( skip_flag[ x0 ][ y0 ] ) { | | |
| if( MaxNumMergeCand > 1 ) | | |
| **merge_idx**[ x0 ][ y0 ] | ae(v) | |
| if ( !depth_flag && ViewId && PredMode != MODE_INTRA) | | SE2701 |
| **res_pred_flag** | ae(v) | |
| if ( !depth_flag && ViewId && PredMode != MODE_INTRA) | | SE2702 |
| **ic_enable_flag** | ae(v) | |
| } else { /* MODE_INTER */ | | |
| **merge_flag**[ x0 ][ y0 ] | ae(v) | |
| if( merge_flag[ x0 ][ y0 ] ) { | | |
| if( MaxNumMergeCand > 1 ) | | |
| **merge_idx**[ x0 ][ y0 ] | ae(v) | |
| if ( !depth_flag && ViewId && PredMode != MODE_INTRA) | | SE2702 |
| **res_pred_flag** | ae(v) | |
| if ( !depth_flag && ViewId && PredMode != MODE_INTRA) | | SE2703 |
| **ic_enable_flag** | ae(v) | |
| } else { | | |
| if( slice_type == B ) | | |
| **inter_pred_idc**[ x0 ][ y0 ] | ae(v) | |
| if( inter_pred_idc[ x0 ][ y0 ] != Pred_L1 ) { | | |
| if( num_ref_idx_l0_active_minus1 > 0 ) | | |
| **ref_idx_l0**[ x0 ][ y0 ] | ae(v) | |
| mvd_coding( x0, y0, 0 ) | | |
| **mvp_l0_flag**[ x0 ][ y0 ] | ae(v) | |
| } | | |
| if( inter_pred_idc[ x0 ][ y0 ] != Pred_L0 ) { | | |
| if( num_ref_idx_l1_active_minus1 > 0 ) | | |
| **ref_idx_l1**[ x0 ][ y0 ] | ae(v) | |
| if( mvd_l1_zero_flag && inter_pred_idc[ x0 ][ y0 ] == Pred_BI) { | | |
| MvdL1[ x0 ][ y0 ][ 0 ] = 0 | | |
| MvdL1[ x0 ][ y0 ][ 1 ] = 0 | | |
| } else | | |
| mvd_coding( x0, y0, 1 ) | | |
| **mvp_l1_flag**[ x0 ][ y0 ] | ae(v) | |
| } | | |
| } | | |
| } | | |
| } | | |

FIG. 29

| **prediction_unit( x0, y0, nPbW, nPbH ) {** | **Descriptor** | |
|---|---|---|
| if( skip_flag[ x0 ][ y0 ] ) { | | |
| if( MaxNumMergeCand > 1 ) | | |
| **merge_idx**[ x0 ][ y0 ] | ae(v) | |
| if ( !depth_flag && ViewId && PredMode != MODE_INTRA && merge_idx == 0) | | SE2801 |
| **res_pred_flag** | ae(v) | |
| } else { /* MODE_INTER */ | | |
| **merge_flag**[ x0 ][ y0 ] | ae(v) | |
| if( merge_flag[ x0 ][ y0 ] ) { | | |
| if( MaxNumMergeCand > 1 ) | | |
| **merge_idx**[ x0 ][ y0 ] | ae(v) | |
| if ( !depth_flag && ViewId && PredMode != MODE_INTRA && merge_idx == 0) | | SE2802 |
| **res_pred_flag** | ae(v) | |
| } else { | | |
| if( slice_type = = B ) | | |
| **inter_pred_idc**[ x0 ][ y0 ] | ae(v) | |
| if( inter_pred_idc[ x0 ][ y0 ] != Pred_L1 ) { | | |
| if( num_ref_idx_l0_active_minus1 > 0 ) | | |
| **ref_idx_l0**[ x0 ][ y0 ] | ae(v) | |
| mvd_coding( x0, y0, 0 ) | | |
| **mvp_l0_flag**[ x0 ][ y0 ] | ae(v) | |
| } | | |
| if( inter_pred_idc[ x0 ][ y0 ] != Pred_L0 ) { | | |
| if( num_ref_idx_l1_active_minus1 > 0 ) | | |
| **ref_idx_l1**[ x0 ][ y0 ] | ae(v) | |
| if( mvd_l1_zero_flag && inter_pred_idc[ x0 ][ y0 ] = = Pred_BI) { | | |
| MvdL1[ x0 ][ y0 ][ 0 ] = 0 | | |
| MvdL1[ x0 ][ y0 ][ 1 ] = 0 | | |
| } else | | |
| mvd_coding( x0, y0, 1 ) | | |
| **mvp_l1_flag**[ x0 ][ y0 ] | ae(v) | |
| } | | |
| } | | |
| } | | |
| } | | |

FIG. 30

(a) STRUCTURE OF CODING UNIT

| | | | | | | | | | | |
|---|---|---|---|---|---|---|---|---|---|---|
| PredMode | skip_flag | part_mode | PU#0 | PU#1 | PU#2 | PU#3 | TU#0 | TU#1 | TU#2 | TU#3 |

(b) STRUCTURE OF PREDICTION UNIT

WHEN merge_mode=1: xpred_flag, merge_idx

WHEN merge_mode=0: inter_pred_idx, red_idx_l0, mvp_idx_l0, mvd_l0, red_idx_l1, mvp_idx_l1, mvd_l1

| | | | | | | | | | |
|---|---|---|---|---|---|---|---|---|---|
| merge_mode | xpred_flag | merge_idx | inter_pred_idx | red_idx_l0 | mvp_idx_l0 | mvd_l0 | red_idx_l1 | mvp_idx_l1 | mvd_l1 |

FIG. 31

| prediction_unit( x0, y0, nPbW, nPbH ) { | Descriptor |
|---|---|
| if( skip_flag[ x0 ][ y0 ] ) { | |
| if ( !depth_flag && ViewId && PredMode != MODE_INTRA) | |
| **res_pred_flag** | ae(v) |
| if( MaxNumMergeCand > 1 && res_pred_flag == 0) | |
| **merge_idx**[ x0 ][ y0 ] | ae(v) |
| } else { /* MODE_INTER */ | |
| **merge_flag**[ x0 ][ y0 ] | ae(v) |
| if( merge_flag[ x0 ][ y0 ] ) { | |
| if ( !depth_flag && ViewId && PredMode != MODE_INTRA) | |
| **res_pred_flag** | ae(v) |
| if( MaxNumMergeCand > 1 ) | |
| **merge_idx**[ x0 ][ y0 ] | ae(v) |
| if( MaxNumMergeCand > 1 && res_pred_flag == 0) | |
| **merge_idx**[ x0 ][ y0 ] | ae(v) |
| } else { | |
| if( slice_type == B ) | |
| **inter_pred_idc**[ x0 ][ y0 ] | ae(v) |
| if( inter_pred_idc[ x0 ][ y0 ] != Pred_L1 ) { | |
| if( num_ref_idx_l0_active_minus1 > 0 ) | |
| **ref_idx_l0**[ x0 ][ y0 ] | ae(v) |
| mvd_coding( x0, y0, 0 ) | |
| **mvp_l0_flag**[ x0 ][ y0 ] | ae(v) |
| } | |
| if( inter_pred_idc[ x0 ][ y0 ] != Pred_L0 ) { | |
| if( num_ref_idx_l1_active_minus1 > 0 ) | |
| **ref_idx_l1**[ x0 ][ y0 ] | ae(v) |
| if( mvd_l1_zero_flag && inter_pred_idc[ x0 ][ y0 ] == Pred_BI) { | |
| MvdL1[ x0 ][ y0 ][ 0 ] = 0 | |
| MvdL1[ x0 ][ y0 ][ 1 ] = 0 | |
| } else | |
| mvd_coding( x0, y0, 1 ) | |
| **mvp_l1_flag**[ x0 ][ y0 ] | ae(v) |
| } | |
| } | |
| } | |
| } | |

| **prediction_unit( x0, y0, nPbW, nPbH ) {** | **Descriptor** | |
|---|---|---|
| if( skip_flag[ x0 ][ y0 ] ) { | | |
| if ( !depth_flag && ViewId && PredMode != MODE_INTRA) | | SE3201 |
| **ic_enable_flag** | ae(v) | |
| if( MaxNumMergeCand > 1 && ic_enable_flag == 0) | | |
| **merge_idx**[ x0 ][ y0 ] | ae(v) | |
| } else { /* MODE_INTER */ | | |
| **merge_flag**[ x0 ][ y0 ] | ae(v) | |
| if( merge_flag[ x0 ][ y0 ] ) { | | |
| if ( !depth_flag && ViewId && PredMode != MODE_INTRA) | | SE3202 |
| **ic_enable_flag** | ae(v) | |
| if( MaxNumMergeCand > 1 ) | | |
| **merge_idx**[ x0 ][ y0 ] | ae(v) | |
| if( MaxNumMergeCand > 1 && ic_enable_flag == 0) | | |
| **merge_idx**[ x0 ][ y0 ] | ae(v) | |
| } else { | | |
| if( slice_type = = B ) | | |
| **inter_pred_idc**[ x0 ][ y0 ] | ae(v) | |
| if( inter_pred_idc[ x0 ][ y0 ] != Pred_L1 ) { | | |
| if( num_ref_idx_l0_active_minus1 > 0 ) | | |
| **ref_idx_l0**[ x0 ][ y0 ] | ae(v) | |
| mvd_coding( x0, y0, 0 ) | | |
| **mvp_l0_flag**[ x0 ][ y0 ] | ae(v) | |
| } | | |
| if( inter_pred_idc[ x0 ][ y0 ] != Pred_L0 ) { | | |
| if( num_ref_idx_l1_active_minus1 > 0 ) | | |
| **ref_idx_l1**[ x0 ][ y0 ] | ae(v) | |
| if( mvd_l1_zero_flag && inter_pred_idc[ x0 ][ y0 ] = = Pred_BI) { | | |
| MvdL1[ x0 ][ y0 ][ 0 ] = 0 | | |
| MvdL1[ x0 ][ y0 ][ 1 ] = 0 | | |
| } else | | |
| mvd_coding( x0, y0, 1 ) | | |
| **mvp_l1_flag**[ x0 ][ y0 ] | ae(v) | |
| } | | |
| } | | |
| } | | |
| } | | |

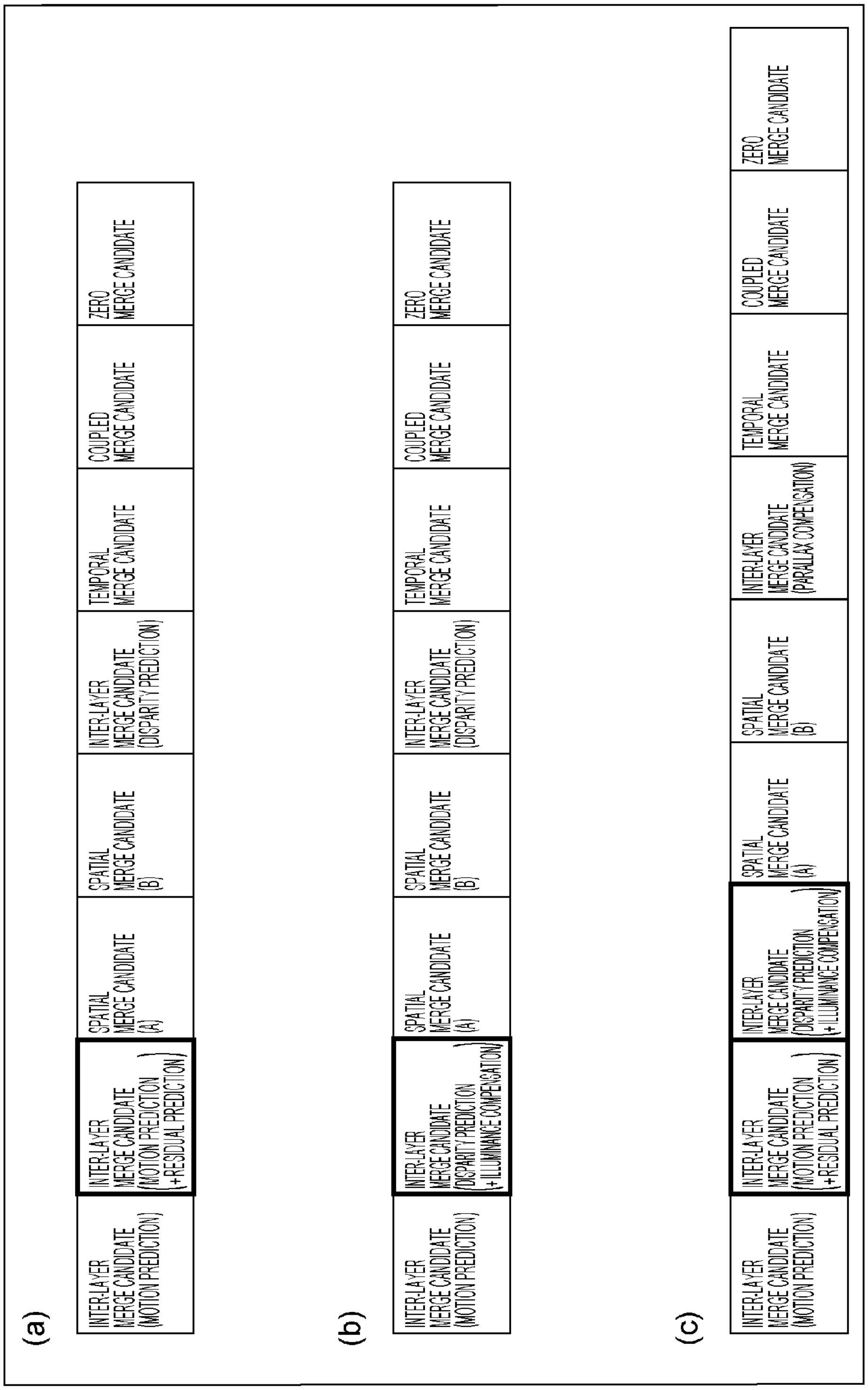

| INTERLAYER MERGE CANDIDATE (MOTION PREDICTION) | INTERLAYER MERGE CANDIDATE (MOTION PREDICTION +RESIDUAL PREDICTION) | SPATIAL MERGE CANDIDATE (A) | SPATIAL MERGE CANDIDATE (B) | INTERLAYER MERGE CANDIDATE (DISPARITY PREDICTION) | TEMPORAL MERGE CANDIDATE | COUPLED MERGE CANDIDATE | ZERO MERGE CANDIDATE |

(b)

| INTERLAYER MERGE CANDIDATE (MOTION PREDICTION) | INTERLAYER MERGE CANDIDATE (DISPARITY PREDICTION +ILLUMINANCE COMPENSATION) | SPATIAL MERGE CANDIDATE (A) | SPATIAL MERGE CANDIDATE (B) | INTERLAYER MERGE CANDIDATE (DISPARITY PREDICTION) | TEMPORAL MERGE CANDIDATE | COUPLED MERGE CANDIDATE | ZERO MERGE CANDIDATE |

(c)

| INTERLAYER MERGE CANDIDATE (MOTION PREDICTION) | INTERLAYER MERGE CANDIDATE (DISPARITY PREDICTION +ILLUMINANCE COMPENSATION) | SPATIAL MERGE CANDIDATE (A) | SPATIAL MERGE CANDIDATE (B) | INTERLAYER MERGE CANDIDATE (PARALLAX COMPENSATION) | TEMPORAL MERGE CANDIDATE | COUPLED MERGE CANDIDATE | ZERO MERGE CANDIDATE |

FIG. 42

| | | | | | | | | | | | | | |
|---|---|---|---|---|---|---|---|---|---|---|---|---|---|
| **a2s** | 1 | 2 | 3 | 4 | 5 | 6 | 7 | 8 | 9 | 10 | 11 | 12 | 13 |
| **icDivCoeff** | 32768 | 16384 | 10923 | 8192 | 6554 | 5461 | 4681 | 4096 | 3641 | 3277 | 2979 | 2731 | 2521 |
| **a2s** | 14 | 15 | 16 | 17 | 18 | 19 | 20 | 21 | 22 | 23 | 24 | 25 | 26 |
| **icDivCoeff** | 2341 | 2185 | 2048 | 1928 | 1820 | 1725 | 1638 | 1560 | 1489 | 1425 | 1365 | 1311 | 1260 |
| **a2s** | 27 | 28 | 29 | 30 | 31 | 32 | 33 | 34 | 35 | 36 | 37 | 38 | 39 |
| **icDivCoeff** | 1214 | 1170 | 1130 | 1092 | 1057 | 1024 | 993 | 964 | 936 | 910 | 886 | 862 | 840 |
| **a2s** | 40 | 41 | 42 | 43 | 44 | 45 | 46 | 47 | 48 | 49 | 50 | 51 | 52 |
| **icDivCoeff** | 819 | 799 | 780 | 762 | 745 | 728 | 712 | 697 | 683 | 669 | 655 | 643 | 630 |
| **a2s** | 53 | 54 | 55 | 56 | 57 | 58 | 59 | 60 | 61 | 62 | 63 | 64 | |
| **icDivCoeff** | 618 | 607 | 596 | 585 | 575 | 565 | 555 | 546 | 537 | 529 | 520 | 512 | |

FIG. 46

| coding_unit( x0, y0, log2CbSize, ctDepth) { | **Descriptor** | |
|---|---|---|
| ... | | |
| if( slice_type != I) | | |
| **skip_flag**[ x0 ][ y0 ] | ae(v) | |
| if( skip_flag[ x0 ][ y0 ] ) | | |
| prediction_unit( x0, y0, log2CbSize ) | | |
| else { | | |
| nCbS = ( 1 << log2CbSize ) | | |
| if( slice_type != I ) | | |
| **pred_mode_flag** | ae(v) | |
| if( PredMode[ x0 ][ y0 ] = = MODE_INTRA ) { | | |
| ... | | |
| } else { | | |
| if( PartMode = = PART_2Nx2N ) | | |
| prediction_unit( x0, y0, nCbS, nCbS ) | | |
| ... | | |
| else if( PartMode = = PART_2NxN ) { | | |
| } | | |
| } | | |
| } | | |
| } | | |
| if ( resPredEnableFlag ) | | |
| **res_pred_flag** | ae(v) | |
| if (slice_ic_enable_flag && | | SF1001 |
| // merge<br>(merge_flag[ x0 ][ y0 ] ) \|\|<br>// AMVP<br>(!merge_flag[ x0 ][ y0 ] && anyIvRefPicFlag)) | | SF1002<br>SF1003 |
| **ic_enable_flag** | ae(v) | |
| } | | |
| ... | | |

FIG. 49

| coding_unit( x0, y0, log2CbSize, ctDepth) { | Descriptor | |
|---|---|---|
| ... | | |
|   if( slice_type != I) | | |
|     **skip_flag[ x0 ][ y0 ]** | ae(v) | |
|   if( skip_flag[ x0 ][ y0 ] ) | | |
|     prediction_unit( x0, y0, log2CbSize ) | | |
|   else { | | |
|     nCbS = ( 1 << log2CbSize ) | | |
|     if( slice_type != I ) | | |
|       **pred_mode_flag** | ae(v) | |
|       if( PredMode[ x0 ][ y0 ] = = MODE_INTRA ) { | | |
|         ... | | |
|       } else { | | |
|         if( PartMode = = PART_2Nx2N ) | | |
|           prediction_unit( x0, y0, nCbS, nCbS ) | | |
|         ... | | |
|         else if( PartMode = = PART_2NxN ) { | | |
|         } | | |
|       } | | |
|     } | | |
|   } | | |
|   if ( resPredEnableFlag ) | | |
|     **res_pred_flag** | ae(v) | |
|   if (slice_ic_enable_flag &&PartMode = = PART_2Nx2N && | | } SF1101 |
| // merge | | } SF1102 |
| (merge_flag[ x0 ][ y0 ] && (merge_idx[ x0 ][ y0 ] != 0 ) \|\| | | |
| // AMVP | | |
| (!merge_flag[ x0 ][ y0 ] && anyIvRefPicFlag))) | | } SF1103 |
|     **ic_flag** | ae(v) | |
|   } | | |
| ... | | |

FIG. 52

| coding_unit( x0, y0, log2CbSize, ctDepth) { | **Descriptor** | |
|---|---|---|
| … | | |
| if( slice_type != I) | | |
| **skip_flag**[ x0 ][ y0 ] | ae(v) | |
| if( skip_flag[ x0 ][ y0 ] ) | | |
| prediction_unit( x0, y0, log2CbSize ) | | |
| else { | | |
| nCbS = ( 1 << log2CbSize ) | | |
| if( slice_type != I ) | | |
| **pred_mode_flag** | ae(v) | |
| if( PredMode[ x0 ][ y0 ] = = MODE_INTRA ) { | | |
| … | | |
| } else { | | |
| if( PartMode = = PART_2Nx2N ) | | |
| prediction_unit( x0, y0, nCbS, nCbS ) | | |
| … | | |
| else if( PartMode = = PART_2NxN ) { | | |
| } | | |
| } | | |
| } | | |
| } | | |
| if ( resPredEnableFlag ) | | |
| **res_pred_flag** | ae(v) | |
| if (slice_ic_enable_flag &&PartMode = = PART_2Nx2N && | | SF1101 |
| // merge<br>(merge_flag[ x0 ][ y0 ] && (merge_idx[ x0 ][ y0 ] != 0 \|\|<br>!ic_skip_mergeidx0_flag) \|\|<br>// AMVP<br>(!merge_flag[ x0 ][ y0 ] && anyIvRefPicFlag))) | | SF1202<br>SF10003 |
| **ic_flag** | ae(v) | |
| } | | |
| … | | |

| slice_segment_header( ) { | **Descriptor** |
|---|---|
| **first_slice_segment_in_pic_flag** | u(1) |
| .... | |
| if( slice_segment_header_extension_present_flag ) { | |
| **slice_segment_header_extension_length** | ue(v) |
| **ic_enable_flag** | u(1) |
| if( ic_enable_flag ) { | |
| **ic_skip_mergeidx0_flag** | u(1) |
| } | |
| } | |
| byte_alignment( ) | |
| } | |

<table>
<tr><th>coding_unit( x0, y0, log2CbSize , ctDepth) {</th><th>Descriptor</th></tr>
<tr><td>…</td><td></td></tr>
<tr><td>if( slice_type != I)</td><td></td></tr>
<tr><td>skip_flag[ x0 ][ y0 ]</td><td>ae(v)</td></tr>
<tr><td>if( skip_flag[ x0 ][ y0 ] )</td><td></td></tr>
<tr><td>prediction_unit( x0, y0, log2CbSize )</td><td></td></tr>
<tr><td>else {</td><td></td></tr>
<tr><td>nCbS = ( 1 << log2CbSize )</td><td></td></tr>
<tr><td>if( slice_type != I )</td><td></td></tr>
<tr><td>pred_mode_flag</td><td>ae(v)</td></tr>
<tr><td>if( PredMode[ x0 ][ y0 ] = = MODE_INTRA ) {</td><td></td></tr>
<tr><td>…</td><td></td></tr>
<tr><td>} else {</td><td></td></tr>
<tr><td>if( PartMode = = PART_2Nx2N )</td><td></td></tr>
<tr><td>prediction_unit( x0, y0, nCbS, nCbS )</td><td></td></tr>
<tr><td>…</td><td></td></tr>
<tr><td>else if( PartMode = = PART_2NxN ) {</td><td></td></tr>
<tr><td>}</td><td></td></tr>
<tr><td>}</td><td></td></tr>
<tr><td>}</td><td></td></tr>
<tr><td>}</td><td></td></tr>
<tr><td>if ( resPredEnableFlag )</td><td></td></tr>
<tr><td>res_pred_flag</td><td>ae(v)</td></tr>
<tr><td>if (slice_ic_enable_flag &&PartMode = = PART_2Nx2N &&<br>// merge<br>(merge_flag[ x0 ][ y0 ] && anyNeighIvRefPicFlag) ||<br>// AMVP<br>(!merge_flag[ x0 ][ y0 ] && anyIvRefPicFlag))</td><td></td></tr>
<tr><td>i c_enable_flag</td><td>ae(v)</td></tr>
<tr><td>}</td><td></td></tr>
<tr><td>…</td><td></td></tr>
</table>

| coding_unit( x0, y0, log2CbSize, ctDepth) { | **Descriptor** | |
|---|---|---|
| ... | | |
| if( slice_type != I) | | |
| **skip_flag**[ x0 ][ y0 ] | ae(v) | |
| if( skip_flag[ x0 ][ y0 ] ) | | |
| prediction_unit( x0, y0, log2CbSize ) | | |
| else { | | |
| nCbS = ( 1 << log2CbSize ) | | |
| if( slice_type != I ) | | |
| **pred_mode_flag** | ae(v) | |
| if( PredMode[ x0 ][ y0 ] = = MODE_INTRA ) { | | |
| ... | | |
| } else { | | |
| if( PartMode = = PART_2Nx2N ) | | |
| prediction_unit( x0, y0, nCbS, nCbS ) | | |
| ... | | |
| else if( PartMode = = PART_2NxN ) { | | |
| } | | |
| } | | |
| } | | |
| } | | |
| if ( resPredEnableFlag ) | | |
| **res_pred_flag** | ae(v) | |
| if (slice_ic_enable_flag | | SF1001 |
| anyIvRefL0PicFlag)) | | SF1502 |
| **ic_enable_flag** | ae(v) | |
| } | | |
| ... | | |

FIG. 66

| coding_unit( x0, y0, log2CbSize , ctDepth) { | **Descriptor** | |
|---|---|---|
| … | | |
| if( slice_type != I) | | |
| **skip_flag**[ x0 ][ y0 ] | ae(v) | |
| if( skip_flag[ x0 ][ y0 ] ) | | |
| prediction_unit( x0, y0, log2CbSize ) | | |
| else { | | |
| nCbS = ( 1 << log2CbSize ) | | |
| if( slice_type != I ) | | |
| **pred_mode_flag** | ae(v) | |
| if( PredMode[ x0 ][ y0 ] = = MODE_INTRA ) { | | |
| … | | |
| } else { | | |
| if( PartMode = = PART_2Nx2N ) | | |
| prediction_unit( x0, y0, nCbS, nCbS ) | | |
| … | | |
| else if( PartMode = = PART_2NxN ) { | | |
| } | | |
| } | | |
| } | | |
| } | | |
| if ( resPredEnableFlag ) | | |
| **res_pred_flag** | ae(v) | |
| if (slice_ic_enable_flag &&PartMode = = PART_2Nx2N && | | SF1101 |
| // merge<br>(merge_flag[ x0 ][ y0 ] && (merge_idx[ x0 ][ y0 ] != 0 \|\|<br>!ic_skip_mergeidx0_flag) \|\|<br>// AMVP<br>(!merge_flag[ x0 ][ y0 ] && anyIvRefPicInL0Flag))) | | SF1202<br>SF1603 |
| **ic_flag** | ae(v) | |
| } | | |
| … | | |

FIG. 84

| | | | | | | | | | | | | | |
|---|---|---|---|---|---|---|---|---|---|---|---|---|---|
| **a2s** | 0 | 1 | 2 | 3 | 4 | 5 | 6 | 7 | 8 | 9 | 10 | 11 | 12 |
| **invTable** | 0 | 32768 | 16384 | 10923 | 8192 | 6554 | 5461 | 4681 | 4096 | 3641 | 3277 | 2979 | 2731 |
| **a2s** | 13 | 14 | 15 | 16 | 17 | 18 | 19 | 20 | 21 | 22 | 23 | 24 | 25 |
| **invTable** | 2521 | 2341 | 2185 | 2048 | 1928 | 1820 | 1725 | 1638 | 1560 | 1489 | 1425 | 1365 | 1311 |
| **a2s** | 26 | 27 | 28 | 29 | 30 | 31 | 32 | 33 | 34 | 35 | 36 | 37 | 38 |
| **invTable** | 1260 | 1214 | 1170 | 1130 | 1092 | 1057 | 1024 | 993 | 964 | 936 | 910 | 886 | 862 |
| **a2s** | 39 | 40 | 41 | 42 | 43 | 44 | 45 | 46 | 47 | 48 | 49 | 50 | 51 |
| **invTable** | 840 | 819 | 799 | 780 | 762 | 745 | 728 | 712 | 697 | 683 | 669 | 655 | 643 |
| **a2s** | 52 | 53 | 54 | 55 | 56 | 57 | 58 | 59 | 60 | 61 | 62 | 63 | |
| **invTable** | 630 | 618 | 607 | 596 | 585 | 575 | 565 | 555 | 546 | 537 | 529 | 520 | |

IMAGE DECODING DEVICE WHICH GENERATES A PREDICTED IMAGE OF A TARGET PREDICTION UNIT

TECHNICAL FIELD

The present invention relates to an image decoding device.

BACKGROUND ART

In image coding technologies for a plurality of viewpoints, parallax prediction coding of reducing an information amount by predicting a parallax between images when images of a plurality of viewpoints are coded and decoding methods corresponding to the coding methods have been proposed (for example, see NPL 1). A vector indicating a parallax between viewpoint images is referred to as a disparity vector. The disparity vector is a 2-dimensional vector having a component value (x component) in the horizontal direction and a component value (y component) in the vertical direction and is calculated for each of the blocks which are regions divided from one image. When multi-viewpoint images are acquired, a camera disposed at each viewpoint is generally used. In the multi-viewpoint coding, viewpoint images are coded using as different layers in a plurality of layers. A method of coding a moving image including a plurality of layers is generally referred to as scalable coding or hierarchy coding. In the scalable coding, high coding efficiency is realized by executing prediction between layers. A layer serving as a reference point without executing the prediction between the layers is referred to as a base layer and the other layers are referred to as enhancement layers. The scalable coding when layers are configured from a viewpoint image is referred to as view scalable coding. At this time, the base layer is also referred to as a base view and the enhancement layer is also referred to a non-base view. Further, in addition to the view scalable coding, scalable coding when layers are configured from texture layers (image layers) and depth layers (distance image layers) is referred to as 3-dimensional scalable coding.

As the scalable coding, there are spatial scalable coding (a method of processing a picture with a low resolution as a base layer and processing a picture with a high resolution as an enhancement layer) and SNR scalable coding (a method of processing a picture with low quality as a base layer and processing a picture with high resolution as an enhancement layer) in addition to the view scalable coding. In the scalable coding, for example, a picture of a base layer is used as a reference picture in coding of a picture of an enhancement layer in some cases.

In NPL 1, an SVC which is a H.264/AVC-based scalable coding technology, a method of referring to a residual of a base layer as residual prediction used to predict an enhancement layer is known. In NPL 2, a technology for resolving parsing dependency in residual prediction in which a residual of a base view is used to predict a non-base view is known as an HEVC-based 3-dimensional scalable coding technology. In NPL 3, a technology called illumination compensation in which an illumination change of peripheral pixels of a prediction target block is used to predict the prediction target block is known as an HEVC-based 3-dimensional scalable coding technology. Further, in NPL 3, a technology of predicting parameters of an adaptive offset filter of a non-base view using parameters of an adaptive offset filter of a base view is known as an HEVC-based 3-dimensional scalable coding technology.

CITATION LIST

Non Patent Literature

NPL 1: ISO/IEC 14496-10, Information technology—Coding of audio-visual objects—Part 10: Advanced Video Coding, Annex G: Scalable video coding NPL 2: Removal of the parsing dependency of inter-view residual prediction, JCT3V-B0093, JCT-3V Shanghai, CN, 13-19 October 2012

NPL 3: 3D-CE2.h: Results of Illumination Compensation for Inter-View Prediction, JCT3V-B0045, JCT-3V Shanghai, CN, 13-19 Oct. 2012

SUMMARY OF INVENTION

Technical Problem

In the residual prediction in NPL 1 and NPL 2, however, since the residuals of the base layer and the base view are used as domains necessary from bit depths of pixels and are referred to in the residual prediction in an enhancement layer, it is necessary to record the residuals as broad domains, and thus there is a problem that a memory capacity for recording the residuals is very large.

In the illumination compensation of NPL 3, decoding (parsing) of an illumination flag indicating whether to execute the illumination compensation in a target region is executed only in the case of parallax compensation which is a case in which a decoded image of a base view is used to generate a predicted image of a target block (prediction unit). For this reason, there is dependency in which prediction parameters of the prediction unit have to be derived before the illumination flag is decoded. Since it is preferable to separate two processes, decoding (parsing) of the flag and the deriving of the prediction parameters, from each other in consideration of complexity of mounting and a parallel process, there is a problem that the dependency of the two may further add the complexity. In the residual prediction of NPL 2, the parsing dependency is resolved in the residual prediction by deleting a flag indicating whether to execute the residual prediction in a target region. However, there is a problem that control of whether to execute the residual prediction may not be executed even in a target region in which the residual prediction is not valid may not be executed.

In adaptive offset filter parameter prediction of NPL 4, since the parameters of the adaptive offset filter of a base view are preserved without change, there is a problem that a memory capacity for storing the parameters of the adaptive offset filter is very large.

The present invention has been devised in light of the foregoing circumstances and provides an image decoding device, an image decoding method, an image decoding program, an image coding device, an image coding method, an image coding program, an image display system, and an image transmission system capable of resolving the problem of a memory capacity and the problem of parsing dependency.

Solution to Problem

An image decoding device with a first configuration includes: an illumination compensation flag derivation section that derives an illumination compensation flag indicating whether illumination compensation is executed; and an illumination compensation section that generates a predicted image of a target prediction unit using illumination change parameters derived from an image in a neighbor of the target prediction unit on a target image and a reference region image of a reference image corresponding to the target prediction unit in a case where the illumination compensation flag is a value indicating validity. In a case where a prediction unit which is a generation target of the predicted image is in a merge mode, the illumination compensation flag derivation section decodes the illumination compensation flag from coded data.

An image decoding device with a sixth configuration includes: an illumination compensation flag derivation section that derives, in a coding unit, an illumination compensation flag indicating whether illumination compensation is executed; and an illumination compensation section that generates a predicted image of a target prediction unit using illumination change parameters derived from an image in a neighbor of the target prediction unit on a target image and a reference region image of a reference image corresponding to the target prediction unit in a case where the illumination compensation flag is a value indicating validity. In a case where a split mode of the coding unit is 2N×2N indicating non-splitting, the illumination compensation flag derivation section decodes the illumination compensation flag from coded data.

An image decoding device with a ninth configuration includes: an illumination compensation section that applies illumination compensation to a motion compensation image. The illumination compensation section includes an illumination parameter estimation section that derives parameters a and b as illumination change parameters from a reference image on a reference picture and a decoded image on a decoding target picture, and an illumination compensation filter that executes illumination compensation using the illumination change parameters. The illumination compensation filter executes the illumination compensation by executing right shift to a product of the motion compensation image obtained from the reference picture and the parameter a by a predetermined fixed shift integer and then adding the parameter b.

An image decoding device with a fourteenth configuration includes: an additional prediction flag decoding section that decodes two flags as additional prediction flags indicating whether additional prediction is executed from coded data; and an inter-predicted image generation section that executes the additional prediction on a motion compensation image according to the flags derived by the additional prediction flag decoding section. The additional prediction flag decoding section decodes the second flag only in a case where the first flag is 0.

Advantageous Effects of Invention

According to the invention, a memory necessary for residual prediction is reduced. Further, complexity in the case of decoding of the syntax of additional prediction is reduced.

BRIEF DESCRIPTION OF DRAWINGS

FIG. 15 is a syntax table illustrating the structure of coded data of an additional prediction flag according to the embodiment.

FIG. 17 is a diagram illustrating a process of determining a flag indicating whether a CU includes a PU by which motion prediction is executed in a whole-PU parameter determination section according to the embodiment.

FIG. 18 is a diagram illustrating a process of determining a flag indicating whether a CU includes a PU by which disparity prediction is executed in a whole-PU parameter determination section according to the embodiment.

FIG. 19 is a syntax table illustrating the structure of coded data decoded by an additional prediction flag decoding section included in a modification example A of an inter-prediction parameter decoding section according to the embodiment.

FIG. 20 is a syntax table illustrating the structure of coded data decoded by the additional prediction flag decoding section included in a modification example A2 of the inter-prediction parameter decoding section according to the embodiment.

FIG. 21 is a syntax table illustrating the structure of coded data decoded by a modification example B of the inter-prediction parameter decoding section according to the embodiment.

FIG. 23 is a diagram illustrating a process of determining a flag indicating whether the motion prediction or the disparity prediction is executed by a PU0 in the additional prediction flag determination section included in the modification example B of the inter-prediction parameter decoding section according to the embodiment.

FIG. 24 is a syntax table illustrating the structure of coded data decoded by a modification example C of the inter-prediction parameter decoding section according to the embodiment.

FIG. 27 is a syntax table illustrating the structure of coded data of the additional prediction flag in the modification example D of the inter-prediction parameter decoding section according to the embodiment.

FIG. 29 is a syntax table illustrating the structure of coded data of the additional prediction flag in the modification example D2 of the inter-prediction parameter decoding section according to the embodiment.

FIG. 30 is a schematic diagram illustrating the structure of coded data (a coding unit or a prediction unit) decoded by a modification example D3 of the inter-prediction parameter decoding section according to the embodiment.

FIG. 31 is a syntax table illustrating the structure of coded data when the additional prediction flag is a residual prediction flag in the modification example D3 of the inter-prediction parameter decoding section according to the embodiment.

FIG. 32 is a syntax table illustrating the structure of coded data when the additional prediction flag is an illumination compensation flag in the modification example D3 of the inter-prediction parameter decoding section according to the embodiment.

FIG. 37 is a conceptual diagram illustrating merge candidates derived by a merge candidate derivation section included in the modification example E of the inter-prediction parameter decoding section according to the embodiment.

FIG. 42 is a diagram illustrating a table used for illumination compensation according to the embodiment.

FIG. 46 is a diagram illustrating the structure of coded data of an illumination compensation flag ic_enable_flag decoded by an inter-prediction parameter decoding section 303F1.

FIG. 49 is a diagram illustrating the structure of coded data of an illumination compensation flag ic_enable_flag decoded by an inter-prediction parameter decoding section 303F2.

FIG. 52 is a diagram illustrating the structure of coded data of an illumination compensation flag ic_enable_flag decoded by an inter-prediction parameter decoding section 303F3.

FIG. 60 is a diagram illustrating the structure of coded data of an illumination compensation flag ic_enable_flag decoded by the inter-prediction parameter decoding section 303F4.

FIG. 63 is a diagram illustrating the structure of coded data of an illumination compensation flag ic_enable_flag decoded by the inter-prediction parameter decoding section 303F5.

FIG. 66 is a diagram illustrating the structure of coded data of an illumination compensation flag ic_enable_flag decoded by the inter-prediction parameter decoding section 303F6.

FIG. 84 is a diagram illustrating a table used for illumination compensation according to the embodiment.

DESCRIPTION OF EMBODIMENTS

First Embodiment

Hereinafter, an embodiment of the present invention will be described with reference to the drawings.

Figure 1:
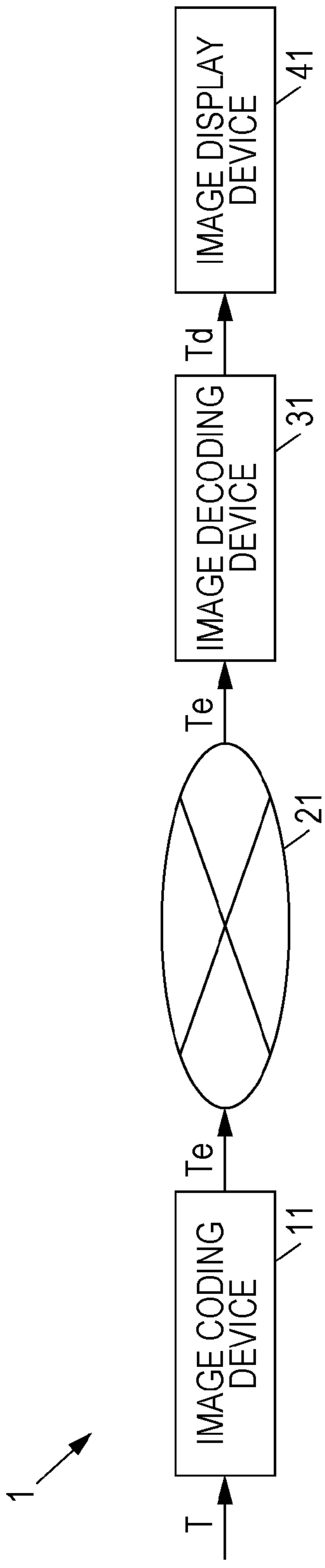
FIG. 1 is a schematic diagram illustrating the configuration of an image transmission system according to an embodiment of the invention.

FIG. 1 is a schematic diagram illustrating the configuration of an image transmission system 1 according to the embodiment.

The image transmission system 1 is a system in which codes obtained by coding a plurality of layer images are transmitted and images obtained by decoding the transmitted codes are displayed. The image transmission system 1 includes an image coding device 11, a network 21, an image decoding device 31, and an image display device 41.

Signals T indicating a plurality of layer images (texture images) are input to the image coding device 11. The layer image is an image that is recognized and photographed at a certain resolution and a certain viewpoint. When view scalable coding of coding 3-dimensional images using a plurality of layer images is executed, each of the plurality of layer images is referred to as a viewpoint image. Here, the viewpoint corresponds to the position or an observation point of a photographing device. For example, the plurality of viewpoint images are images obtained when right and left photographing devices photograph a subject. The image coding device 11 codes each of the signals to generate a coded stream Te (coded data). The details of the coded stream Te will be described below. The viewpoint image refers to a 2-dimensional image (planar image) observed at a certain viewpoint. The viewpoint image is denoted, for example, with a luminance value or a color signal value of each of the pixels arranged in a 2-dimensional plane. Hereinafter, one viewpoint image or a signal indicating the viewpoint image is referred to as a picture. When spatial scalable coding is executed using a plurality of layer images, the plurality of layer images include a base layer image with a low resolution and an enhancement layer image with a high resolution. When SNR scalable coding is executed using the plurality of layer images, the plurality of layer images include a base layer image with low image quality and an enhancement layer image with high image quality. The view scalable coding, the spatial scalable coding, and the SNR scalable coding may be arbitrarily combined. In the embodiment, coding and decoding of images including at least base layer images and images (enhancement layer images) other than the base layer images as the plurality of layer images will be treated. Of the plurality of layer images, images that are referred to are referred to as first layer images and images that refer are referred to as second layer images in regard to two layers having a reference relation (dependency) of image or coding parameters. For example, when an enhancement layer image (other than a base layer) coded with reference to the base layer is present, the base layer image is treated as a first layer image and the enhancement layer image is treated as a second layer image. Examples of the enhancement layer image include an image of a viewpoint other than a base view and an image of depth.

The network 21 transmits the coded stream Te generated by the image coding device 11 to the image decoding device 31. The network 21 is the Internet, a wide area network (WAN), a local area network (LAN), or a combination thereof. The network 21 is not necessarily restricted to a bi-directional communication network, but may be a uni-directional or bi-directional communication network that transmits broadcast waves of terrestrial wave digital broadcast, satellite broadcast, or the like. The network 21 may be substituted with a storage medium that records the coded stream Te, such as a Digital Versatile Disc (DVD) or a Blue-ray Disc (BD).

The image decoding device 31 decodes each of the coded streams Te transmitted by the network 21 and generates each of a plurality of decoded layer images Td (decoded viewpoint images Td) obtained through the decoding.

The image display device 41 displays some or all of the plurality of decoded layer images Td generated by the image decoding device 31. For example, in the view scalable coding, 3-dimensional images (stereoscopic images) or free viewpoint images are displayed in the case of all of the images and 2-dimensional images are displayed in the case of some of the images. The image display device 41 includes, for example, a display device such as a liquid crystal display or an organic electro-luminescence (EL) display. In the spatial scalable coding or the SNR scalable coding, when the image decoding device 31 and the image display device 41 have high processing capabilities, enhancement layer images with high image quality are displayed. When the image decoding device 31 and the image display device 41 have lower processing capabilities, base layer images for which the high processing capability and display capability of the enhancement layer images are not necessary are displayed.

<Structure of Coded Stream Te>

A data structure of the coded stream Te generated by the image coding device 11 and decoded by the image decoding device 31 will be described before the image coding device 11 and the image decoding device 31 according to the embodiment are described in detail.

Figure 2:
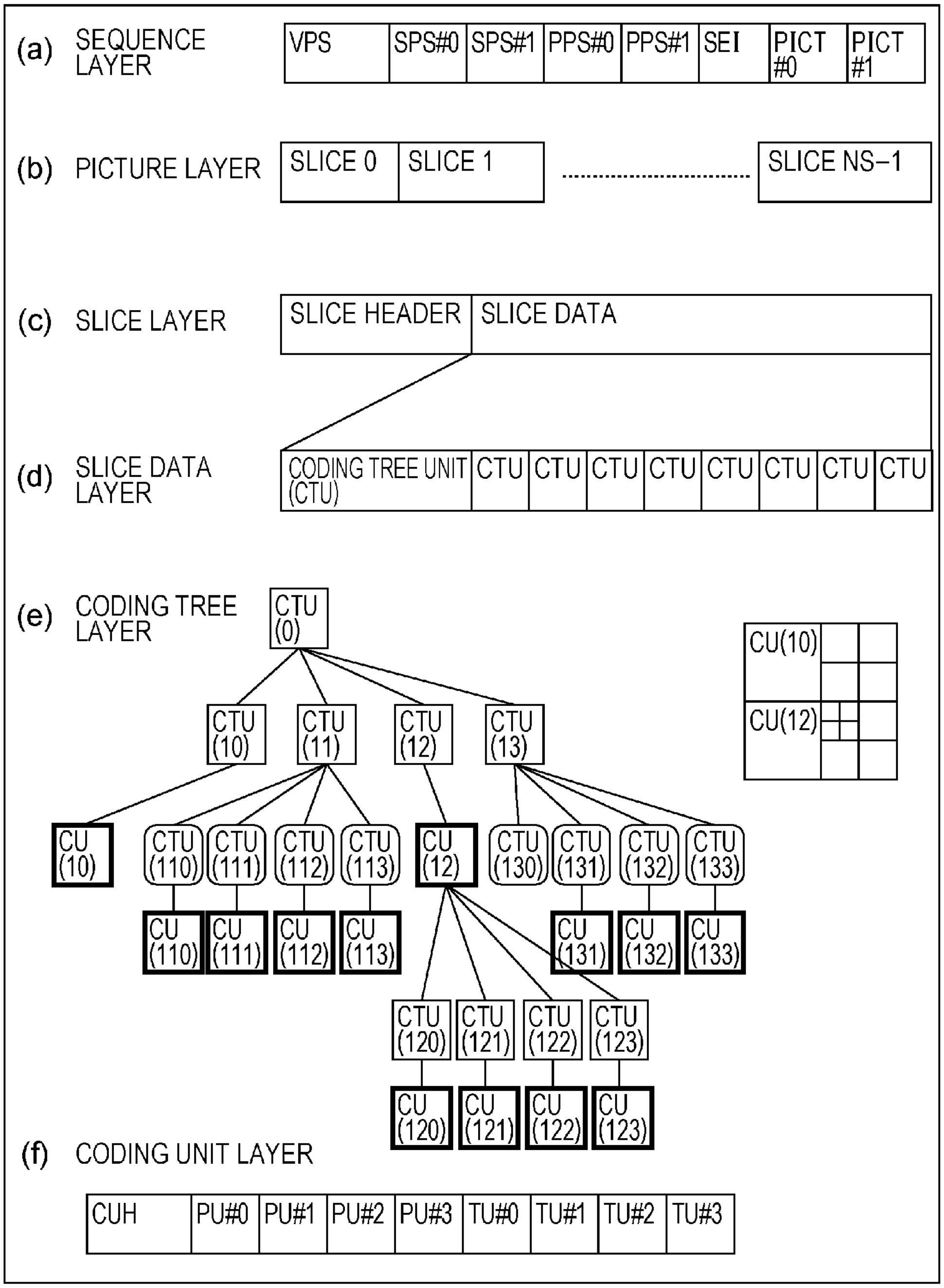
FIG. 2 is a diagram illustrating a hierarchy structure of data in a coded stream according to the embodiment.

FIG. 2 is a diagram illustrating a hierarchy structure of data in the coded stream Te according to the embodiment. The coded stream Te includes, for example, a sequence and a plurality of pictures included in the sequence. (a) to (f) of FIG. 2 are diagrams illustrating a sequence layer prescribing a sequence SEQ, a picture layer defining a picture PICT, a slice layer defining a slice S, a slice data layer defining slice data, a coded tree layer defining a coded tree unit included in the slice data, and a coding unit layer defining a coding unit (CU) included in the coding tree.

(Sequence Layer)

In the sequence layer, a set of data referred to by the image decoding device 31 is defined to decode the sequence SEQ of a processing target (hereinafter also referred to as a target sequence). As illustrated in (a) of FIG. 2, the sequence SEQ includes a video parameter set (VPS), a sequence parameter set (SPS), a picture parameter set (PPS), pictures PICT, and supplemental enhancement information (SEI). Here, a numeral shown after # indicates a layer ID. In FIG. 2, an example in which coded data of #0 and #1, that is, layer 0 and layer 1, are present is illustrated, but the kinds and number of layer are not restricted thereto.

In the video parameter set VPS, a set of coded parameters common to a plurality of moving images and a set of coding parameters related to a plurality of layers and an individual layer included in a moving image are defined in a moving image formed by a plurality of layers.

In the sequence parameter set SPS, a set of coding parameters referred to by the image decoding device 31 is defined to decode a target sequence. For example, the width and height of a picture are defined.

In the picture parameter set PPS, a set of coding parameters referred to by the image decoding device 31 is defined to decode each picture in the target sequence. For example, a reference point value (pic_init_qp_minus26) of a quantization width used to decode the picture and a flag (weighted_pred_flag) indicating application of weighting prediction are included. The plurality of PPSs may be present. In this case, one of the plurality of PPSs from each picture in the target sequence is selected.

(Picture Layer)

In the picture layer, a set of data referred to by the image decoding device 31 is defined to decode the picture PICT of a processing target (hereafter also referred to as a target picture). As illustrated in (b) of FIG. 2, the picture PICT includes a plurality of slices S0 to SNS−1 (where NS is a total number of slices included in the picture PICT).

When it is not necessary to distinguish the slices S0 to SNS−1 from each other, the slices are described below in some cases by omitting the subscripts of the codes. The same also applies to data which is data included in the coded stream Te to be described below and is other data to which subscripts are appended.

(Slice Layer)

In the slice layer, a set of data referred to by the image decoding device 31 is defined to decode the slice S of a processing target (also referred to as a target slice). As illustrated in (c) of FIG. 2, the slice S includes a slice header SH and slice data SDATA.

The slice header SH includes a coding parameter group referred to by the image decoding device 31 to decide a method of decoding the target slice. Slice type designation information (slice_type) designating the types of slices is an example of a coding parameter included in the slice header SH.

As the types of slices which can be designated by the slice type designation information, for example, (1) an I slice using only intra-prediction at the time of coding, (2) a P slice using uni-directional prediction or intra-prediction at the time of coding, and (3) a B slice using uni-directional prediction, bi-directional prediction, or intra-prediction at the time of coding can be exemplified.

The slice header SH may include a reference (pic_parameter_set_id) in the picture parameter set PPS included in the sequence layer.

(Slice Data Layer)

In the slice data layer, a set of data referred to by the image decoding device 31 is defined to decode the slice data SDATA of a processing target. As illustrated in (d) of FIG. 2, the slice data SDATA includes coded tree blocks (CTB). The CTB is a block with a fixed size (for example, 64×64) included in the slice and is also sometimes referred to as a largest cording unit (LCU).

(Coded Tree Layer)

In the coded tree layer, as illustrated in (e) of FIG. 2, a set of data referred to by the image decoding device 31 is defined to decode the coded tree block of a processing target. The coded tree unit is segmented through recursive quadtree splitting. A node of a tree structure obtained through the recursive quadtree splitting is referred to as a coding tree. An immediate node of a quadtree is defined as a coded tree unit (CTU) and the coded tree block is also defined as a highest CTU. The CTU includes a split flag (split_flag). When split_flag is 1, the coded tree unit is split to four coded tree units CTU. When split_flag is 0, the coded tree unit CTU is split into four coded units (CU). The coded unit CU is an end node of the coding tree and no further splitting is not executed in this layer. The coded unit CU is a basic unit of a coding process.

When the coded tree block CTB has a size of 64×64 pixels, the size of the coded unit can be one of 64×64 pixels, 32×32 pixels, 16×16 pixels, and 8×8 pixels.

(Coding Unit Layer)

In the coding unit layer, as illustrated in (f) of FIG. 2, a set of data referred to by the image decoding device 31 is defined to decode the coding unit of a processing target. Specifically, the coding unit is configured to include a CU header CUH, a prediction tree, a transform tree, a CU header CUF. In the CU header CUH, for example, whether the coding unit is a unit used for intra-prediction or a unit used for inter-prediction is defined. The coding unit is a root of a prediction tree (PT) and a transform tree (TT). The CU header CUF is included between the prediction tree and the transform tree or after the transform tree.

In the prediction tree, the coding unit is split into one prediction block or a plurality of prediction blocks and the position and size of each prediction block are defined. In other words, the prediction block is a region included in the coding unit and one or plurality of regions which do not overlap with each other. The prediction tree includes one prediction block or a plurality of prediction blocks obtained through the above-described splitting.

The prediction process is executed for each prediction block. Hereinafter, the prediction block which is a unit of prediction is referred to as a prediction unit (PU).

Roughly speaking, there are two types of splitting in the prediction tree in the case of intra-prediction and the case of inter-prediction. The intra-prediction refers to prediction in the same picture and the inter-prediction refers to a prediction process executed between mutually different pictures (for example, between display times or between layer images).

In the case of intra-prediction, there are 2N×2N (which is the same size of the coding unit) and N×N splitting methods.

In the case of inter-prediction, coding is executed by part_mode of the coded data in a splitting method and there are 2N×2N (which is the same size of the coding unit), 2N×N, 2N×nU, 2N×nD, N×2N, nL×2N, nR×2N, and N×N. Further, 2N×nU indicates that the coding unit of 2N×2N is split into two regions of 2N×0.5N and 2N×1.5N in order from the top. Further, 2N×nD indicates that the coding unit of 2N×2N is split into two regions of 2N×1.5N and 2N×0.5N in order from the top. Further, nL×2N indicates that the coding unit of 2N×2N is split into two regions of 0.5N×2N and 1.5N×2N in order from the left. Further, nR×2N indicates that the coding unit of 2N×2N is split into two regions of 1.5N×2N and 0.5N×1.5N in order from the top. Since the number of splits is one of 1, 2, and 4, the number of PUs included in the CU is 1 to 4. The PUs are denoted as PU0, PU1, PU2, and PU3 in order.

In the transform tree, the coding unit is split into one transform block or a plurality of transform blocks and the position and size of each transform block are defined. In other words, the transform block is a region included in the coding unit and one or plurality of regions which do not overlap with each other. The transform tree includes one transform block or a plurality of transform blocks obtained through the above-described splitting.

As the splitting of the transform tree, there is splitting in which a region with the same size as the coding unit is allocated as the transform block and splitting by recursive quadtree splitting, as in the splitting of the above-described tree block.

A transform process is executed for each transform block. Hereinafter, the transform block which is a unit of transform is referred to as a transform unit (TU).

(Prediction Parameter)

A predicted image of the prediction unit is derived by a prediction parameter subordinate to the prediction unit. As the prediction parameter, there is a prediction parameter of intra-prediction or a prediction parameter of inter-prediction. Hereinafter, the prediction parameter of inter-prediction (inter-prediction parameter) will be described. The inter-prediction parameter is configured to include prediction list use flags predFlagL0 and predFlagL1, reference picture indexes refIdxL0 and refIdxL1, and vectors mvL0 and mvL1. The prediction list use flags predFlagL0 and predFlagL1 are flags indicating whether to use reference picture lists respectively called an L0 list and an L1 list and the reference picture list corresponding to the case of a value of 1 is used. When "a flag indicating whether XX is indicated" is described in the present specification, 1 is set to a case in which XX is indicated and 0 is set to a case of XX is not indicated. Then, 1 is treated to be true and 0 is treated to be false in logical NOT, logical AND, or the like (the same applies below). However, in actual devices or methods, other values can also be used as a true value or a false value. A case in which two reference picture lists are used, that is, a case of predFlagL0=1 and predFlagL1=1, corresponds to bi-prediction. A case in which one reference picture list is used, that is, a case of (predFlagL0, predFlagL1)=(1, 0), or (predFlagL0, predFlagL1)=(0, 1), corresponds to uni-prediction. Information regarding the prediction list use flag can also be denoted as an inter-prediction flag inter_pred_idx to be described below. Normally, the prediction list use flag is used in a predicted image generation section and a prediction parameter memory to be described below. When information indicating which reference picture list is used or not is decoded from the coded data, the inter prediction flag inter_pred_idx is used.

Examples of syntax components used to derive the inter-prediction parameter included in the coded data include a split mode part_mode, a merge flag merge_flag, a merge index merge_idx, an inter-prediction flag inter_pred_idx, a reference picture index refIdxLX, a prediction vector index mvp_LX_idx, and a difference vector mvdLX.

(Example of Reference Picture List)

Figure 3:
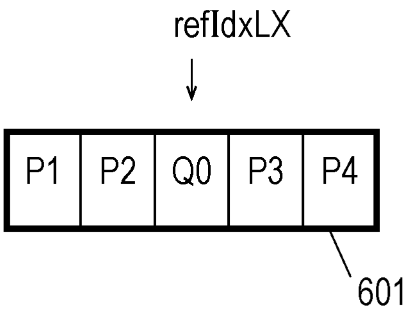
FIG. 3 is a conceptual diagram illustrating an example of a reference picture list.

Next, an example of the reference picture list will be described. The reference picture list is a line formed by reference pictures stored in a reference picture memory 306 (see FIG. 5). FIG. 3 is a conceptual diagram illustrating an example of the reference picture list. In a reference picture list 601, five rectangles arranged horizontally in a line indicate reference pictures. Codes P1, P2, Q0, P3, and P4 shown in order from the left end to the right are codes indicating reference pictures. P of P1 and the like indicates a viewpoint P and Q of Q0 and the like indicates a different viewpoint Q from the viewpoint P. The suffixes of P and Q indicate picture order numbers POC. A downward arrow immediately below refIdxLX indicates that the reference picture index refIdxLX is an index referring to the reference picture Q0 in the reference picture memory 306.

(Example of Reference Picture)

Figure 4:
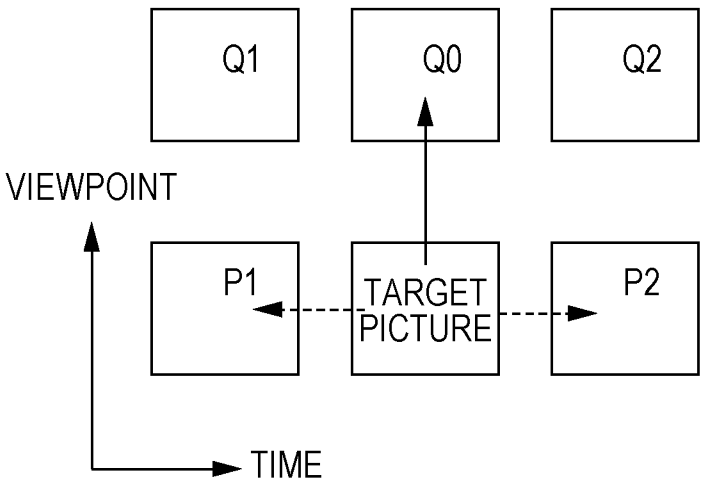
FIG. 4 is a conceptual diagram illustrating an example of a reference picture.

Next, an example of the reference picture used at the time of derivation of a vector will be described. FIG. 4 is a conceptual diagram illustrating an example of the reference picture. In FIG. 4, the horizontal axis represents a display time and the vertical axis represents a viewpoint. As illustrated in FIG. 4, rectangles of two vertical rows and three horizontal columns (a total of six rectangles) indicate pictures. Of the six rectangles, the second rectangle from the left in the low row indicates a picture of a decoding target (target picture). The remaining five rectangles indicate reference pictures. A reference picture Q0 indicated by an upward arrow from the target picture is a picture of which a display time is the same as the target picture and a viewpoint is different from the target picture. In disparity prediction in which a target picture serves as a reference point, the reference picture Q0 is used. A reference picture P1 indicated by a leftward arrow from the target picture is a past picture of which the viewpoint is the same as the target picture. A reference picture P2 indicated by a rightward arrow from the target picture is a future picture of which the viewpoint is the same as the target picture. In motion prediction in which a target picture serves as a reference point, the reference picture P1 or P2 is used.

(Inter-Prediction Flag and Prediction List Use Flag)

A relation between the inter-prediction flag and the prediction list use flags predFlagL0 and predFlagL1 can be mutually converted as follows. Therefore, as the inter-prediction parameter, the prediction list use flag may be used or the inter-prediction flag may be used. Hereinafter, in determination using the prediction list use flag, the flag can also be substituted with the inter-prediction flag. In contrast, in determination using the inter-prediction flag, the flag can also be substituted with the prediction list use flag.

Inter-prediction flag=(predFlagL1<<1)+predFlagL0 predFlagL0=inter-prediction flag & 1 predFlagL1=inter-prediction flag>>1

Here, >> is right shift and << is left shift.

(Merge Prediction and AMVP Prediction)

In a method of decoding (coding) the prediction parameter, there are a merge prediction (merge) mode and an Adaptive Motion Vector Prediction (AMVP) mode. The merge flag merge_flag is a flag used to identify these modes. In either the merge prediction mode or the AMVP mode, a prediction parameter of a target PU is derived using the prediction parameter of the block which has already been processed. The merge prediction mode is a mode in which the prediction list use flag predFlagLX (the inter-prediction flag inter_pred_idx), the reference picture index refIdxLX, and the vector mvLX are not included in coded data and is a mode in which the already derived prediction parameters are used without change. The AMVP mode is a mode in which the inter-prediction flag inter_pred_idx, the reference picture index refIdxLX, and the vector mvLX are included in coded data. The vector mvLX is coded as a difference vector (mvdLX) and a prediction vector index mvp_LX_idx indicating a prediction vector.

The inter-prediction flag inter_pred_idc is data indicating the kinds and numbers of reference pictures and is the value of one of Pred_L0, Pred_L1, and Pred_Bi. Pred_L0 and Pred_L1 each indicate that reference pictures stored in the reference picture lists referred to as the L0 list and the L1 list are used and both indicate that one reference picture is used (uni-prediction). The prediction using the L0 list and the L1 list are referred to as L0 prediction and L1 prediction, respectively. Pred_Bi indicates that two reference pictures are used (bi-prediction) and indicates that two reference pictures stored in the L0 list and the L1 list are used. The prediction vector index mvp_LX_idx is an index indicating a prediction vector and the reference picture index refIdxLX is an index indicating the reference picture stored in the reference picture list. LX is a description method used when the L0 prediction and the L1 prediction are not distinguished from each other and distinguish the parameter in regard to the L0 list from the parameter with regard to the L1 list by substituting the LX with L0 or L1. For example, refIdxL0 is a reference picture index used for the L0 prediction, refIdxL1 is a reference picture index used for the L1 prediction, and refIdx (refIdxLX) is notation used when refIdxL0 and refIdxL1 are not distinguished from each other.

The merge index merge_idx is an index indicating that one prediction parameter among prediction parameter candidates (merge candidates) derived from the completely processed block is used as a prediction parameter of the decoding target block.

(Motion Vector and Disparity Vector)

As the vector mvLX, there are a motion vector and a disparity vector (parallax vector). The motion vector is a vector that indicates a position deviation between the position of a block in a picture of a certain layer at a certain display time and the position of a corresponding block in the picture of the same layer at a different display time (for example, an adjacent discrete time). The disparity vector is a vector that indicates a position deviation between the position of a block in a picture of a certain layer at a certain display time and the position of a corresponding block in a picture of a different layer at the same display time. The picture of the different layer is a picture with a different viewpoint in some cases or is a picture with a different resolution in some cases. In particular, the disparity vector corresponding to the picture with the different viewpoint is referred to as a disparity vector. In the following description, when the motion vector and the disparity vector are not distinguished from each other, the motion vector and the disparity vector are simply referred to as vectors mvLX. A prediction vector and a difference vector in regard to the vector mvLX are referred to as a prediction vector mvpLX and a difference vector mvdLX, respectively. Whether the vector mvLX and the difference vector mvdLX are the motion vectors or the disparity vectors is executed using the reference picture index refIdxLX subordinate to the vector.

(Configuration of Image Decoding Device)

Figure 5:
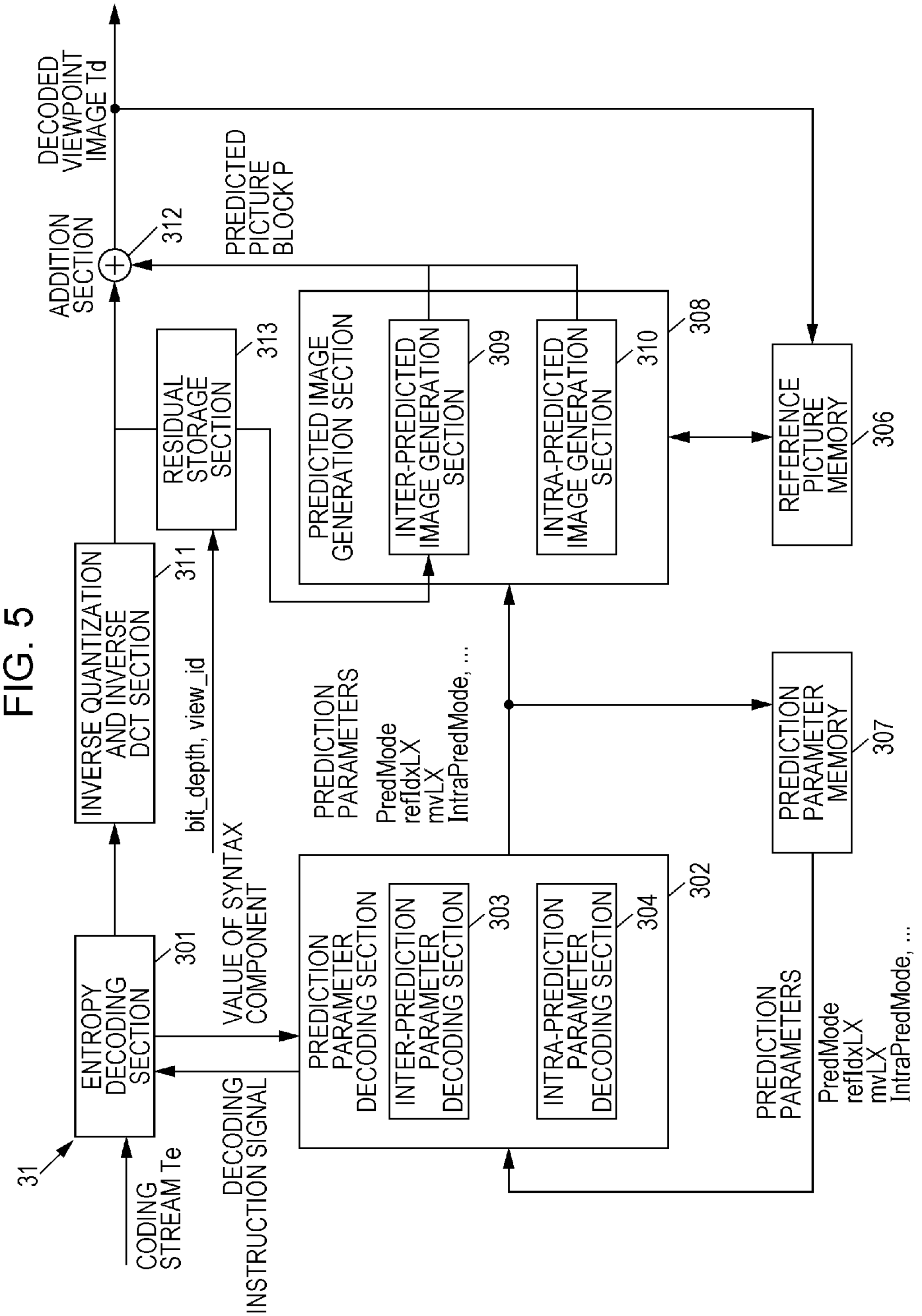
FIG. 5 is a schematic diagram illustrating the configuration of an image decoding device according to the embodiment.

Next, the configuration of the image decoding device 31 according to the embodiment will be described. FIG. 5 is a schematic diagram illustrating the configuration of the image decoding device 31 according to the embodiment. The image decoding device 31 is configured to include an entropy decoding section 301, a prediction parameter decoding section 302, a reference picture memory (a reference image storage section or a frame memory) 306, a prediction parameter memory (a prediction parameter storage section or a frame memory) 307, a predicted image generation section 308, an inverse quantization and inverse DCT section 311, an addition section 312, and a residual storage section 313 (residual recording section).

The prediction parameter decoding section 302 is configured to include an inter-prediction parameter decoding section 303 and an intra-prediction parameter decoding section 304. The predicted image generation section 308 is configured to include an inter-predicted image generation section 309 and an intra-predicted image generation section 310.

The entropy decoding section 301 executes entropy decoding on the coded stream Te input from the outside, and separates and decodes individual codes (syntax components). As the separated code, there are, for example, prediction information used to generate a predicted image and residual information used to generate a difference image.

The entropy decoding section 301 outputs some of the separated codes to the prediction parameter decoding section 302. Some of the separated codes are, for example, a prediction mode PredMode, the split mode part_mode, the merge flag merge_flag, the merge index merge_idx, the inter-prediction flag inter_pred_idx, the reference picture index refIdxLX, the prediction vector index mvp_LX_idx, and the difference vector mvdLX. Whether a certain code is decoded is controlled based on an instruction of the prediction parameter decoding section 302. The entropy decoding section 301 outputs a quantization coefficient to the inverse quantization and inverse DCT section 311. The quantization coefficient is a coefficient obtained by executing Discrete Cosine Transform (DCT) and quantizing a residual signal in the coding process.

The inter-prediction parameter decoding section 303 decodes an inter-prediction parameter with reference to the prediction parameters stored in the prediction parameter memory 307 based on the codes input from the entropy decoding section 301.

The inter-prediction parameter decoding section 303 outputs the decoded inter-prediction parameters to the predicted image generation section 308 and stores the decoded inter-prediction parameters in the prediction parameter memory 307. The details of the inter-prediction parameter decoding section 303 will be described below.

The intra-prediction parameter decoding section 304 decodes the intra-prediction parameter with reference to the prediction parameter stored in the prediction parameter memory 307 based on the codes input from the entropy decoding section 301. The intra-prediction parameter refers to a parameter used for a process of predicting a picture block in one picture and is, for example, an intra-prediction mode intraPredMode. The intra-prediction parameter decoding section 304 outputs the decoded intra-prediction parameter to the predicted image generation section 308 and stores the decoded intra-prediction parameter in the prediction parameter memory 307.

The intra-prediction parameter decoding section 304 may derive the different intra-prediction mode between luminance and chrominance. In this case, the intra-prediction parameter decoding section 304 decodes a luminance prediction mode IntraPredModeY as a prediction parameter of the luminance and decodes a chrominance prediction mode IntraPredModeC as a prediction parameter of the chrominance. The luminance prediction mode IntraPredModeY is a 35 mode and corresponds to planar prediction (0), DC prediction (1), and direction prediction (2 to 34). In the chrominance prediction mode IntraPredModeC, any one of the planar prediction (0), the DC prediction (1), the direction prediction (2, 3, 4), and LM mode (5) is used.

The reference picture memory 306 stores a block (reference picture block) of the reference picture generated by the addition section 312 at a position decided in advance for each decoding target picture and block.

The prediction parameter memory 307 stores the prediction parameter in a position decided in advance for each decoding target picture and block. Specifically, the prediction parameter memory 307 stores the inter-prediction parameter decoded by the inter-prediction parameter decoding section 303, the intra-prediction parameter decoded by the intra-prediction parameter decoding section 304, and the prediction mode predMode separated by the entropy decoding section 301. As the stored inter-prediction parameter, for example, there are the prediction list use flag predFlagLX (the inter-prediction flag inter_pred_idx), the reference picture index refIdxLX, and the vector mvLX.

The prediction mode predMode input from the entropy decoding section 301 is input and the prediction parameter from the prediction parameter decoding section 302 are input to the predicted image generation section 308. The predicted image generation section 308 reads the reference picture from the reference picture memory 306. The predicted image generation section 308 generates a predicted picture block P (predicted image) using the input prediction parameter and the read reference picture in a prediction mode indicated by the prediction mode predMode.

Here, when the prediction mode predMode indicates an inter-prediction mode, the inter-predicted image generation section 309 generates the predicted picture block P by the inter-prediction using the inter-prediction parameter input from the inter-prediction parameter decoding section 303 and the read reference picture. The predicted picture block P corresponds to the prediction unit PU. The PU corresponds to a part of a picture formed by a plurality of pixels which is a unit in which the prediction process is executed, as described above, that is, a decoding target block subjected to a prediction process once.

The inter-predicted image generation section 309 reads, from the reference picture memory 306, the reference picture block located at the position indicated by the vector mvLX using the decoding target block as a reference point from the reference picture indicated by the reference picture index refIdxLX in regard to the reference picture list (the L0 list or the L1 list) in which the prediction list use flag predFlagLX is 1. The inter-predicted image generation section 309 executes prediction on the read reference picture block to generate the predicted picture block P. The inter-predicted image generation section 309 outputs the generated predicted picture block P to the addition section 312.

When the prediction mode predMode indicates the intra-prediction mode, the intra-predicted image generation section 310 executes the intra-prediction using the intra-prediction parameter input from the intra-prediction parameter decoding section 304 and the read reference picture. Specifically, the intra-predicted image generation section 310 reads, from the reference picture memory 306, the reference picture block which is the decoding target picture and is within a pre-decided range from a decoding target block among the already decoded blocks. The pre-decided range is, for example, one of the left, upper left, upper, and upper right adjacent blocks when the decoding target blocks are sequentially moved in order of so-called raster scan and is different according to the intra-prediction mode. The order of the raster scan is an order in which the decoding target block is moved sequentially from the left end to the right end in respective rows from the upper end to the lower end of each picture.

The intra-predicted image generation section 310 executes the prediction on the read reference picture block in the prediction mode indicated by the intra-prediction mode IntraPredMode to generate the predicted picture block. The intra-predicted image generation section 310 outputs the generated predicted picture block P to the addition section 312.

When a different intra-prediction mode is derived with the luminance and the chrominance in the intra-prediction parameter decoding section 304, the intra-predicted image generation section 310 generates a predicted picture block of the luminance by, for example, one of the planar prediction (0), the DC prediction (1), the direction prediction (2 to 34) according to the luminance prediction mode IntraPredModeY and generates a predicted picture block of the chrominance by, for example, one of the planar prediction (0), the DC prediction (1), the direction prediction (2, 3, 4), and the LM mode (5) according to the chrominance prediction mode IntraPredModeC. Here, the LM mode using a regularization term will be described. The regularization term is a term added as a parameter cost to an objective function in derivation of the prediction parameter according to the least square method. In the LM mode, a prediction parameter for predicting a pixel value of the chrominance is derived from a pixel value of the luminance using a processed image adjacent to a target block, and a picture block of the chrominance is generated from the processed block of the luminance based on the prediction parameter. Such prediction is referred to as LM prediction. A prediction method is substantially the same as that of an illumination compensation section 3093 to be described below. Hereinafter, the intra-predicted image generation section 310 using the regularization term in the derivation of the prediction parameter is assumed to be an intra-predicted image generation section 310E. The intra-predicted image generation section 310E is configured to include a DC prediction section 3101, a planar prediction section 3102, a direction prediction section 3103, and an LM prediction section 3104E (none of which is illustrated).

Figure 80:
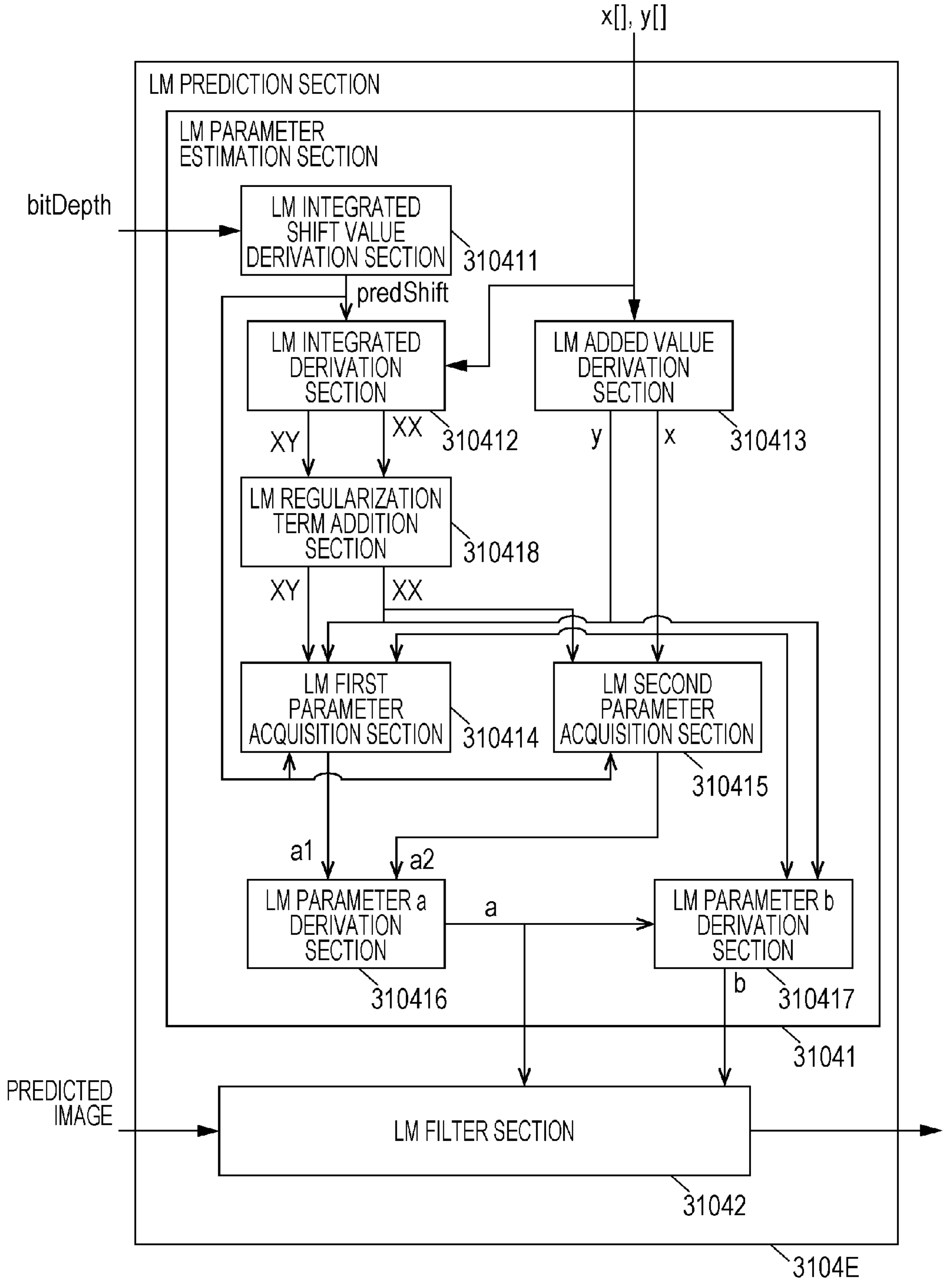
FIG. 80 is a block diagram illustrating the configuration of an LM prediction section 3104E according to the embodiment.

FIG. 80 is a block diagram illustrating the configuration of the LM prediction section 3104E. The LM prediction section 3104E is configured to include an LM parameter estimation section 31041 and an LM filter section 31042. The LM parameter estimation section 31041 is configured to include an LM integrated shift value derivation section 310411, an LM integrated value derivation section 310412, an LM added value derivation section 310413, an LM first parameter derivation section 310414, an LM second parameter derivation section 310415, an LM parameter a derivation section 310416, an LM parameter b derivation section 310417, and an LM regularization term addition section 310418E. When a bit depth bitDepth of a pixel is greater than an integrated shift value precShift by a predetermined integer (here, 13) as in expression (LM-1) below, the LM integrated shift value derivation section 310411 derives an integrated shift value precShift by the greater value. When the bit depth bitDepth of the pixel is not greater than the integrated shift value precShift, the integrated shift value precShift is set to 0.

$$\text{precShift}=\text{Max}(0,\text{bitDepth}-13) \quad \text{expression (LM-1)}$$

The derived integrated shift value precShift is output to the LM integrated value derivation section 310412, the LM first parameter derivation section 310414, and the LM second parameter derivation section 310415.

The LM parameter estimation section 31041 denotes a luminance image adjacent to the target block as an adjacent luminance image x[ ], denotes a chrominance image adjacent to the target block as an adjacent chrominance image y[ ], and derives parameters a and b from the adjacent luminance image x[ ] and the adjacent chrominance image y[ ].

The LM added value derivation section 310413 derives a sum Y of the pixel values of the adjacent chrominance image and a sum X of the pixel values of the adjacent luminance image by expression (LM-2) and expression (LM-3) below.

The LM integrated value derivation section 310412 derives a sum XY of products of pixel values y of the adjacent chrominance image and pixel values x of the adjacent luminance image and a sum XX of squares of the pixel values x of the adjacent luminance image by expression (LM-4) and expression (LM-5). At this time, the LM integrated value derivation section 310412 executes right shift by the integrated shift value precShift and then executes addition at the time of the derivation of the sum XY of products of the pixel values y of the adjacent chrominance image and the pixel values x of the adjacent luminance image and the time of the derivation of the sum XY of squares of the pixel values x of the adjacent luminance image. Initialization is set to "X=Y=XY=XX=0."

$$X=\Sigma x[i] \quad \text{expression (LM-2)}$$

$$Y=\Sigma y[i] \quad \text{expression (LM-3)}$$

$$XX+=\Sigma(x[i]*x[i])>>\text{precShift} \quad \text{expression (LM-4)}$$

$$XY+=\Sigma(x[i]*y[i])>>\text{precShift} \quad \text{expression (LM-5)}$$

Here, Σ is a sum in regard to a reference region and a sum for an index i specifying a pixel of the reference region are derived. Before the sum, X, Y, XY, and XX are initialized to 0. Here, x[i] is a pixel value at the index i of the adjacent luminance image and y[i] is a pixel value at the index i of the adjacent chrominance image. The count shift value iCountShift is a logarithm 2 with the size (the number of pixels) of the reference region.

$$i\text{CountShift}=\log 2(\text{the number of pixels of reference region}) \quad \text{expression (LM-6)}$$

In the related art, the integrated values XX and XY are derived by the following operation.

$$XX+=\Sigma(x[i]*x[i]) \quad \text{expression (LM-4')}$$

$$XY+=E(x[i]*y[i]) \quad \text{expression (LM-5')}$$

In this case, the number of bits necessary for an operation is a double of the bit depth bitDepth of the pixels and a logarithm 2 (the maximum value of the count shift iCountShift) of the maximum value of the size of a reference region. When the maximum value of a luminance block size is 64, the maximum value of the size of a chrominance block is 32, and thus the maximum value of the size of a reference region is 64. From logarithm 2 of 64, the maximum value of the count shift iCountShift is 6. Accordingly, the necessary number of bits is bitDepth*2+6. Here, the following expression can be obtained in consideration of a range in which the number of bits can be calculated for 32 bits.

$$bitDepth*2+6<=32$$

When this expression is solved, "bitDepth<=13" can be obtained. That is, when bitDepth is equal to or less than 13, the number of bits is not greater than 32 bits. In contrast, when bitDepth is greater 13, the number of bits is greater the range of 32 bits. Expression (LM-1) can be obtained from this result. When bitDepth is greater 13, "bitDepth−13" corresponding to the greater value is derived as the integrated shift value precShift. Further, in expression (LM-4) and expression (LM-5), by executing shift by the integrated shift value precShift in advance and then executing addition, it is possible to obtain the advantageous effect of preventing the number of bits from being greater than the range of 32 bits.

The LM first parameter derivation section 310414 derives a first parameter a1 by the following expression from a difference between the sum XY of the products of the pixel values y of the adjacent chrominance image and the pixel values x of the adjacent luminance image and the product of the sum Y of the pixel values of the adjacent chrominance image and the sum X of the pixel values of the adjacent luminance image.

$$a1=(XY<<i\text{CountShift})-(y*x)>>\text{precShift} \qquad \text{expression (LM-7)}$$

As expressed in expression (LM-7), the difference is derived by left shifting XY by the count shift value iCountShift and right shifting the product of y and x by the integrated shift value precShift.

The LM second parameter derivation section 310415 derives a second parameter a2 by the following expression from a difference between the sum XX of the squares of the pixel values of the adjacent luminance image and the squares of the sum X of the pixel values of the adjacent luminance image.

$$a2=(XX<<i\text{CountShift})-(X*X)>>\text{precShift} \qquad \text{expression (LM-8)}$$

As expressed in expression (LM-8), the difference is derived by left shifting XX by the count shift value iCountShift and right shifting the product of x and x by the integrated shift value precShift.

The LM first parameter derivation section 310414 and the LM second parameter derivation section 310415 right shift the parameters a1 and a2 by a predetermined fixed parameter shift value (here, 4) when a sum of the count shift value iCountShift and double of the bit depth bitDepth is equal to or greater than a predetermined value (here, 27). That is, the following step is executed.

```
if (iCountShift + bitDepth * 2 >= 27) expression (LM-9)
{
a1 >>= 4        expression (LM-10)
a2 >>= 4        expression (LM-11)
}
```

The derived first parameter a1 and second parameter a2 are output to the LM parameter a derivation section 310416.

Figure 81:
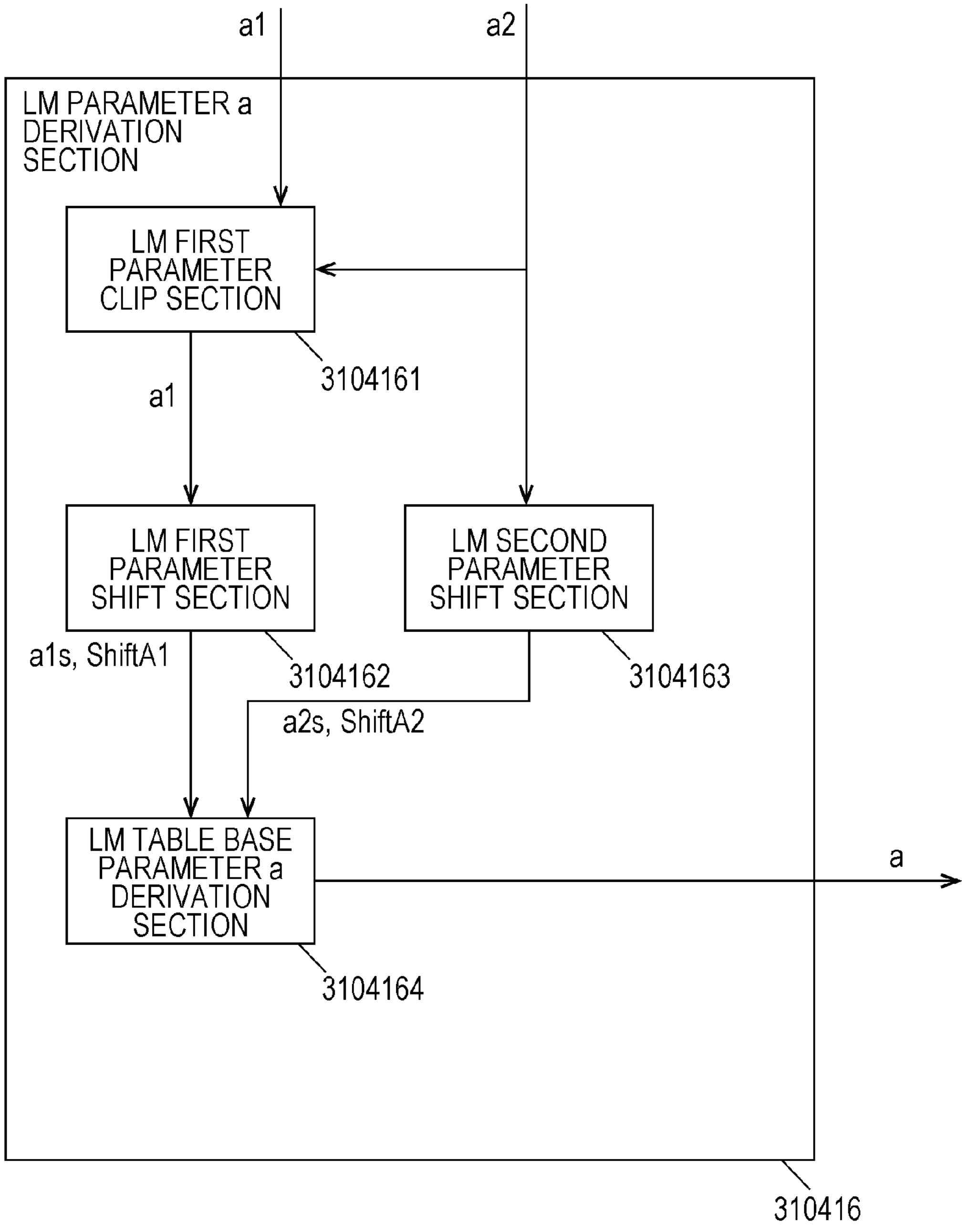
FIG. 81 is a block diagram illustrating the configuration of an LM parameter a derivation section 310416 according to the embodiment.

FIG. 81 is a block diagram illustrating the configuration of the LM parameter a derivation section 310416. The LM parameter a derivation section 310416 is configured to include an LM first parameter clip section 3104161, an LM first parameter shift section 3104162, an LM second parameter shift section 3104163, and an LM table base parameter a derivation section 3104164.

The LM first parameter clip section 3104161 restricts the first parameter a1 according to the size of the second parameter a2. For example, a1 is clipped to a value equal to or greater than "−3 a2" and equal to or less than "a2*3" as in the following expression.

$$a1=\text{Clip3}(-3*a2,3*a2,a1) \qquad \text{expression (LM-12)}$$

A value of a1/a2 is clipped to a value from −3 to 3 by the LM first parameter clip section 3104161. Accordingly, the value of "a1/a2<<iShift" which is the value of the parameter a is also clipped to a value from (3<<iShift) to (3<<iShift). That is, when iShift=5, the parameter a becomes−96 to 96 and enters a range of an 8-bit integer.

The LM first parameter shift section 3104162 derives a first normalized shift value iScaleShiftA1 by the following expression according to the size of the first parameter a1. The derived first normalized shift value iScaleShiftA1 is output to the LM table base parameter a derivation section 3104164.

$$i\text{ScaleShift}A1=\text{Max}(0,\text{Get}MSB(\text{abs}(a1))-15) \qquad \text{expression (LM-13)}$$

The LM second parameter shift section 3104163 derives a second normalized shift value iScaleShiftA2 by the following expression according to the size of the second parameter a2. The derived second normalized shift value iScaleShiftA2 is output to the LM table base parameter a derivation section 3104164.

$$i\text{ScaleShift}A2=\text{Max}(0,\text{Get}MSB(\text{abs}(a2))-6) \qquad \text{expression (LM-14)}$$

The LM first parameter shift section 3104162 and the LM second parameter shift section 3104163 derive a normalized first parameter a1*s* and a normalized second parameter a2*s* by right shifting the first parameter a1 by the first normalized shift value iScaleShiftA1 and right shifting the second parameter a2 by the second normalized shift value iScaleShiftA2.

$$a1s=a1>>i\text{ScaleShift}A1 \qquad \text{expression (LM-15)}$$

$$a2s=a2>>i\text{ScaleShift}A2 \qquad \text{expression (LM-16)}$$

The LM table base parameter a derivation section 3104164 derives a parameter a shift value iScaleShiftA by the following expression based on a difference between the first normalized shift value iScaleShiftA1 and the second normalized shift value iScaleShiftA2.

$$\text{ScaleShift}A=i\text{ScaleShift}A2-i\text{ScaleShift}A1+15-i\text{Shift} \qquad \text{expression (LM-18)}$$

The LM table base parameter a derivation section 3104164 derives the parameter a by the following expression by obtaining a product of the first parameter a1*s* and right shifting the product by a table shift value (ScaleShiftA) with reference to an inverse table value invTable decided according to the normalized second parameter a2*s*.

$$a=(a1s*\text{invTable}[a2s])>>(\text{ScaleShift}A) \qquad \text{expression (LM-19)}$$

When the table shift value iScaleShiftA is negative, the following expression is derived by executing left shift by the absolute value of the table shift value.

$a=(a1s*\mathrm{invTable}[a2s])<<(-\mathrm{ScaleShift}A)$ expression (LM-19')

The value of the parameter a is a ratio of the first parameter a1 to the second parameter a2 (corresponds to a value shifted left by iShift from a1/a2).

FIG. 84 is a diagram illustrating an inverse table value invTable[ ] used in the embodiment. The inverse invTable[x] of FIG. 84 is 0 when the index x is 0. When the index x is a value other than 0, the inverse invTable[x] is derived from a value obtained as an integer by dividing a predetermined integer (here, 15th power of 2) M by x. That is, $\mathrm{invTable}[x]=0$(when $x$ is 0) expression (T-1); and $\mathrm{invTable}[x]=\mathrm{Floor}((M/x/2)/x)$(when $x$ is value other than 0) expression (T-2).

Floor(x) is a function of obtaining a value as an integer by truncating a number after the decimal point. Instead of expression (T-1), expression (T-2') below may be used. That is, rounding adjustment of adding ½ of a divisor x may not be executed.

$\mathrm{invTable}[x]=\mathrm{Floor}(M/x)$(when $x$ is value other than 0) expression (T-2')

By using the inverse table values invTable[ ], an operation corresponding to division with a2$s$ can be realized by a product of the inverse table value invTable[a2$s$] corresponding to the reciprocal of a2$s$ and right shift corresponding to log 2(M). In the inverse table invTable[x], since invTable[x] at x=0 is 0, a result becomes 0 in a case corresponding to division by 0 which is not defined in a normal operation. Since a2$s$ corresponds to variance of a pixel value x[ ], a2$s$ is 0 when a pixel value is very small or there is no activity, that is, when all are flat. In this case, when the parameter a is set to 0 and calculation is executed by only addition of the parameter b, a result with no problem can be obtained. Thus, when the inverse table invTable[x] is not defined, it is necessary either to use a different operation that the parameter a is set to 0 in a case in which x is 0 or to set the parameter a to 1<<iShift in the case in which x is 0. A parameter a clip section may be provided instead of the LM first parameter clip section 3104161 and the range of the parameter a may be clipped to a value equal to or greater than −128 or equal to or less than 127, which is an 8-bit integer, by the following operation.

$a=\mathrm{Clip3}(-128,127,a1)$ expression (LM-12')

When the maximum value of the clip is equal to or less than 127 and the minimum value of the clip is equal to or greater than −128, an 8-bit integer is obtained. Therefore, another value may be used. For example, the following value may be used:

$a=\mathrm{Clip3}(-64,64,a1)$ expression (LM-12").

The derived parameter a is output from the LM parameter b derivation section 310417 and the LM filter section 31042.

The LM parameter b derivation section 310417 derives the parameter b by the following expression by dividing a value, which is obtained by multiplying the sum X of the pixel values of the adjacent luminance image by the parameter a and subtracting a value shifted right by the fixed shift value iShift from the sum Y of the pixel values of the adjacent chrominance image, by the number of pixels of the reference region.

$b=(Y-((a*X)>>i\mathrm{Shift})+(1<<(i\mathrm{CountShift}-1)))>>i\mathrm{CountShift}$ expression (LM-20)

The right shift of iCountShift corresponds to the dividing by the number of pixels of the reference region.

The LM filter section 31042 derives a chrominance predicted image predSamplesC[ ] after the LM prediction from a luminance decoded image predSamplesY[ ] using an estimation parameter derived by the LM parameter estimation section 31041. For example, when the parameter b is derived by expression (LM-20), the following expression is used.

$\mathrm{predSamples}C[x][y]=(a*\mathrm{predSamples}Y[x/2][y/2]>>i\mathrm{Shift})+b$ expression (LM-21)

Instead of the LM parameter b derivation section 310417, an LM parameter b derivation section 310417' with a different configuration from the LM parameter b derivation section 310417 may be used. In this case, the LM parameter b derivation section 310417' derives the parameter b by the following expression by dividing a value, which is obtained by subtracting a value obtained through multiplication of the parameter a by the sum X of the pixel values of the adjacent luminance image from a value shifted left by the fixed shift value iShift from the sum Y of the pixel values of the adjacent chrominance image, by the number of pixels of the reference region.

$b=((Y<<i\mathrm{Shift})-((a*X))+(1<<(i\mathrm{CountShift}-1)))>>i\mathrm{CountShift}$ expression (LM-20')

Figure 82:
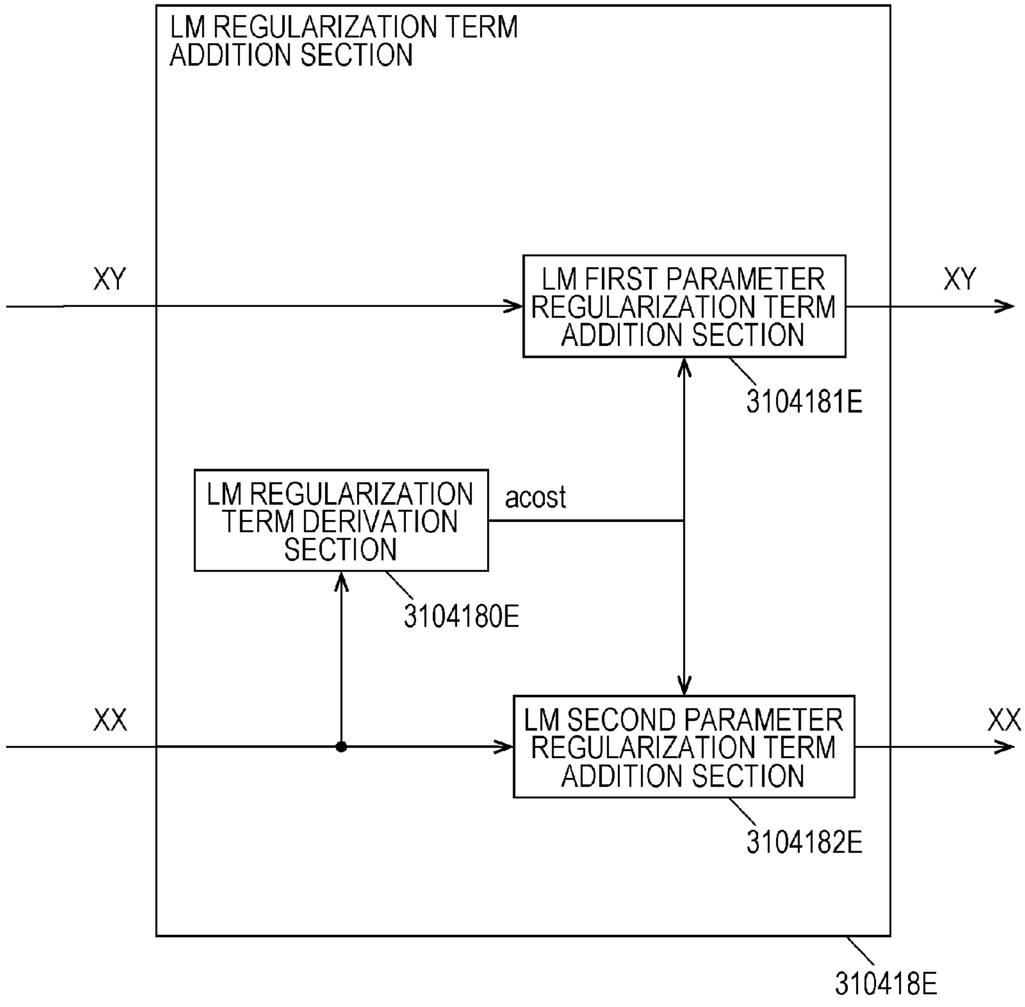
FIG. 82 is a block diagram illustrating the configuration of an LM regularization term addition section 310418E according to the embodiment.

FIG. 82 is a block diagram illustrating the configuration of the LM regularization term addition section 310418E according to the embodiment. The LM regularization term addition section 310418E is configured to include an LM regularization term derivation section 3104180E, an LM first parameter regularization term addition section 3104181E, and an LM second parameter regularization term addition section 3104182E.

The LM regularization term derivation section 3104180E derives a regularization term acost.

$\mathrm{acost}=XX>>\mathrm{ashift}$ expression (E-1)

The LM first parameter regularization term addition section 3104181E adds a regularization term to a parameter (for example, XY) used to derive the first parameter.

$XY=XY+\mathrm{acost}$ expression (E-2)

This addition is executed as follows.

The LM second parameter regularization term addition section 3104182E adds a regularization term to a parameter (for example, XX) used to derive the second parameter.

$XX=XX+\mathrm{acost}$ expression (E-3)

The regularization term may also be added by the LM first parameter derivation section 310414 and the LM second parameter derivation section 310415. In this case, the first and second parameters are derived by the following expressions instead of expression (LM-7) and expression (LM-8).

$a1=((XY+\mathrm{acost})<<i\mathrm{CountShift})-(Y*Y)>>\mathrm{precShift};$ expression (E-2')

$a2=((XX+\mathrm{acost})<<i\mathrm{CountShift})-(X*X)>>\mathrm{precShift};$ expression (E-3')

In the configuration of the LM parameter estimation section 31041E, as illustrated in FIG. 84, the appropriate parameter a can be obtained by defining the inverse table invTable[x] so that the inverse table invTable[x] is 0 when the index x is 0 and by deriving the parameter a based on a value obtained by subtracting the inverse table invTable[x] defined in this way from the second parameter (the normalized second parameter) derived from a difference between the sum XX of the squares of the pixel values of the adjacent luminance image and the square of the sum x of the pixel values of the adjacent luminance image, even when an operation method is not changed according to whether the normalized second parameter (second parameter) is 0. Therefore, it is possible to obtain the advantageous effect of reducing a processing amount. When the index x is a value other than 0, a predetermined value and a value obtained as an integer through division by x can be appropriately used for the inverse table invTable[x].

In the configuration of the LM parameter estimation section 31041, the regularization term acost is added at the time of the derivation of the first parameter a1 derived from a difference between the sum XY of the products of the pixel values y of the adjacent chrominance image and the pixel values x of the adjacent luminance image and the product of the sum Y of the pixel values of the adjacent chrominance image and the sum X of the pixel values of the adjacent luminance image. The same regularization term acost is added at the time of the derivation of the second parameter a2 derived from a difference between the sum XX of the squares of the pixel values of the adjacent luminance image and the squares of the sum X of the pixel values of the adjacent luminance image. The parameter a is derived from the first parameter a1 and the second parameter a2 to which the regularization term is added. Thus, an estimated parameter becomes robust when there is a deviated value or the like due to the fact that the parameter a is substantially near 1 (actually, the parameter a is near 1<<iShift using the fixed shift value iShift). When the predicted parameter becomes robust, it is possible to obtain the advantageous effects of improving estimation accuracy of the LM prediction and improving coding efficiency.

(LM Prediction Section 3104H)

Hereinafter, an LM prediction section 3104H which is a modification example of the LM prediction section 3104E will be described.

Figure 88:
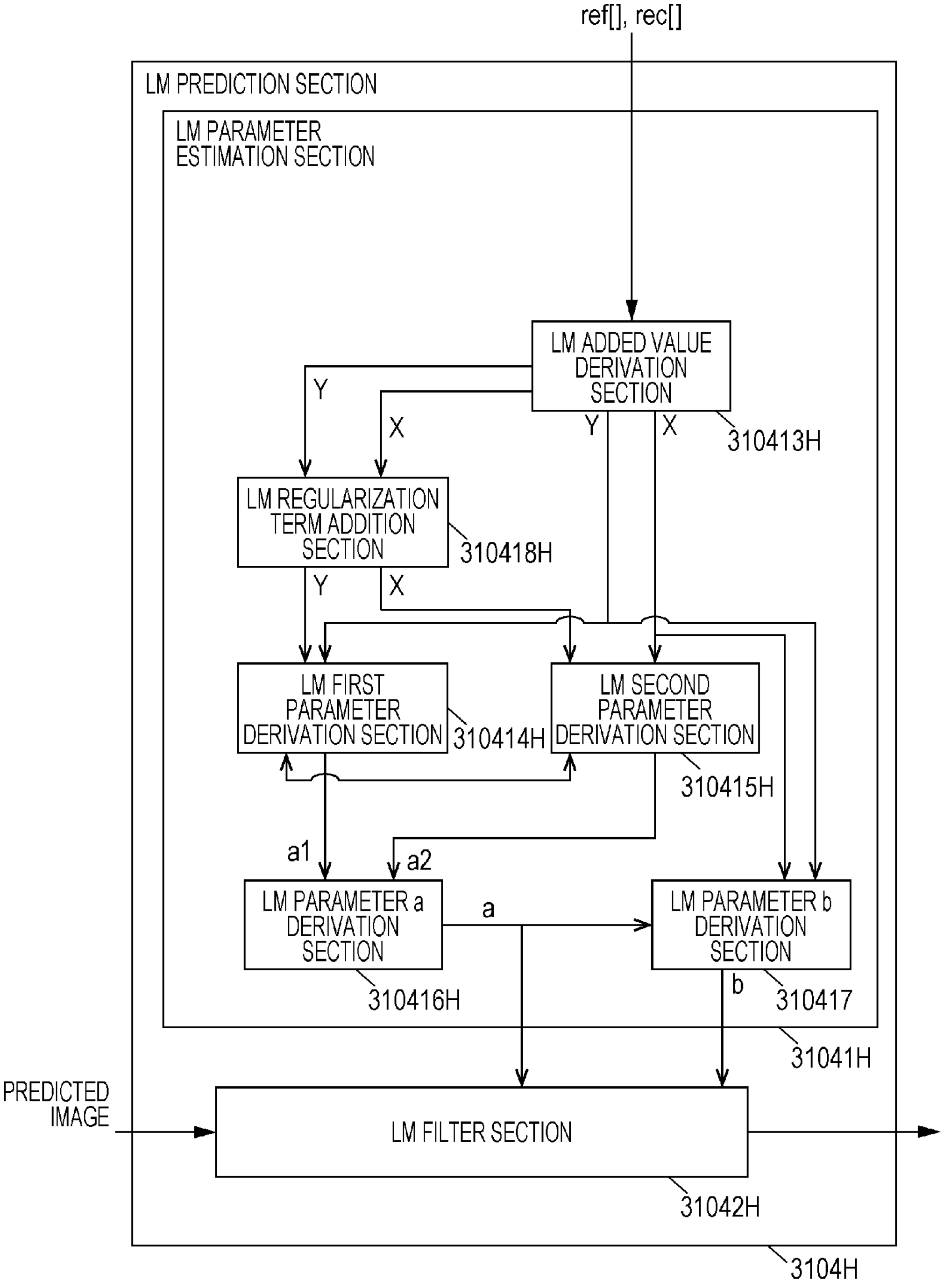
FIG. 88 is a block diagram illustrating the configuration of an LM prediction section 3104H according to the embodiment.

FIG. 88 is a block diagram illustrating the configuration of the LM prediction section 3104H. The LM prediction section 3104H is configured to include an LM parameter estimation section 31041H and an LM prediction filter section 31042H. The LM parameter estimation section 31041H is configured to include an LM added value derivation section 310413H, an LM first parameter derivation section 310414H, an LM second parameter derivation section 310415H, an LM parameter a derivation section 310416H, an LM parameter b derivation section 310417H, and an LM regularization term addition section 310418H.

The LM parameter estimation section 31041H denotes a luminance image adjacent to a target block as an adjacent luminance image x[ ], denotes a chrominance image adjacent to the target block as an adjacent chrominance image y[ ], and derives parameters a and b from the adjacent luminance image x[ ] and the adjacent chrominance image y[ ].

The LM added value derivation section 310413H derives a sum Y of the pixel values of the adjacent chrominance image and a sum X of the pixel values of an adjacent luminance image by expression (LM-2) and expression (LM-3) below.

$X=\Sigma x[i]$ expression (LM-2)

$Y=\Sigma Y[i]$ expression (LM-3)

Here, Σ is a sum in regard to a reference region and a sum for an index i specifying a pixel of the reference region is derived. Here, y[i] is a pixel value in the index i of a decoded image and x[i] is a pixel value in the index i of the reference image. The count shift value iCountShift is a logarithm 2 with the size (the number of pixels) of the reference region.

$i$CountShift=log 2(the number of pixels of reference region) expression (LM-6)

The LM first parameter derivation section 310414H derives a first parameter a1 from the sum Y of the pixel values of the adjacent chrominance image by the following expression.

$a1=Y$ expression (LM-7')

The LM second parameter derivation section 310415H derives a second parameter a2 from the sum X of the pixel values x of the adjacent luminance image by the following expression.

$a2=X$ expression (LM-8')

The derived first parameter a1 and second parameter a2 are output to the LM parameter a derivation section 310416H.

Figure 89:
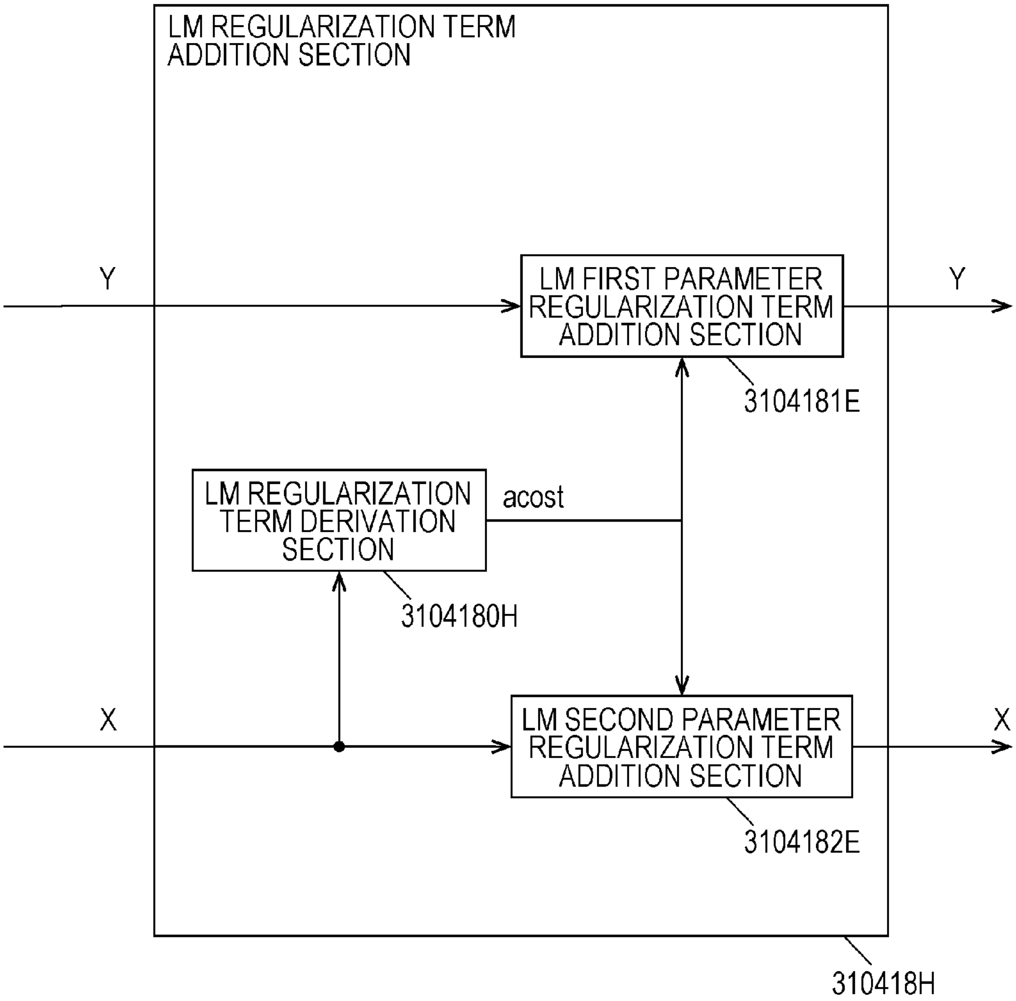
FIG. 89 is a block diagram illustrating the configuration of an LM regularization term addition section 310418H according to the embodiment.

FIG. 89 is a block diagram illustrating the configuration of the LM regularization term addition section 310418H. The LM regularization term addition section 310418H is configured to include an LM regularization term derivation section 3104180H, an LM first parameter regularization term addition section 3104181H, and an LM second parameter regularization term addition section 3104182H.

The LM regularization term derivation section 3104180H derives a regularization term acost from the sum X of the pixel values of the adjacent luminance image.

acost=$X$>>ashift expression (LM-1')

Here, ashift is a predetermined integer and is used to adjust the size of the regularization term acost by right shift.

In a normal image, the sum X of the pixel values of the adjacent luminance image is substantially the same as the sum Y of the pixel values of the adjacent chrominance image. Therefore, the regularization term acost may be derived from the sum Y of the pixel values of the adjacent chrominance image.

acost=$Y$>>ashift expression (LM-1")

The LM first parameter regularization term addition section 3104181E adds the regularization term to a parameter (for example, Y) used to derive the first parameter.

$Y=Y$+acost expression (LM-2')

The LM second parameter regularization term addition section 3104182E adds the regularization term to a parameter (for example, X) used to derive the second parameter.

$X=X$+acost expression (LM-3')

The regularization term may also be added by the LM first parameter derivation section 310414H and the LM second parameter derivation section 310415H. In this case, the first and second parameters are derived by the following expressions instead of expression (LM-7") and expression (LM-8").

$a1=Y$+acost expression (LM-7")

$a2=X$+acost expression (LM-8")

Figure 90:
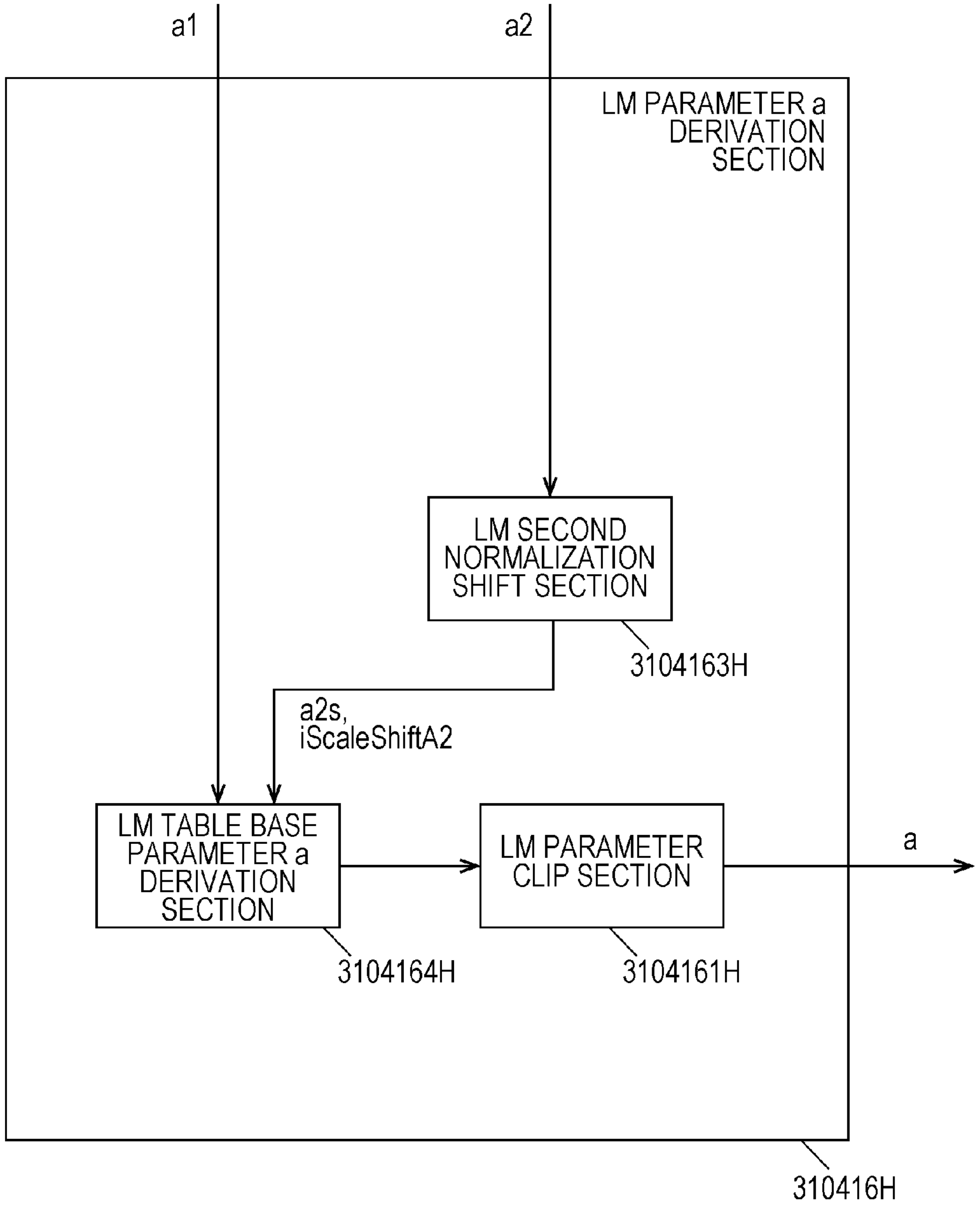
FIG. 90 is a block diagram illustrating the configuration of an LM parameter a derivation section 310416H according to the embodiment.

FIG. 90 is a block diagram illustrating the configuration of the LM parameter a derivation section 310416H. The LM parameter a derivation section 310416H is configured to include an LM parameter clip section 3104161H, an LM second normalization shift section 3104163H, and an LM table base parameter a derivation section 3104164H.

The LM second normalization shift section 3104163H derives a second normalized shift value iScaleShiftA2 according the size of the second parameter a2 by the following expression. The derived LM second normalized shift value iScaleShiftA2 is output to the LM table base parameter a derivation section 3104164H.

$$i\text{ScaleShift}A2=\text{Max}(0,\text{Get}MSB(\text{abs}(a2))-6) \qquad \text{expression (B-14)}$$

The LM second normalization shift section 3104163H derives a normalized second parameter a2*s* by right shifting the second parameter a2 by the second normalized shift value iScaleShiftA2.

$$a2s=a2>>i\text{ScaleShift}A2 \qquad \text{expression (B-16)}$$

The LM table base parameter a derivation section 3104164H derives a parameter a shift value ScaleShiftA by the following expression.

$$\text{ScaleShift}A=i\text{ScaleShift}A2+15-i\text{Shift} \qquad \text{expression (B-18')}$$

The LM table base parameter a derivation section 3104164H derives the parameter a by obtaining a product of the normalized first parameter a1 and executing right shift by the table shift value ScaleShiftA with reference to the inverse table value invTable decided according to the normalized second parameter a2*s*, as in the following expression.

$$a=(a1*\text{invTable}[a2s])>>(\text{ScaleShift}A) \qquad \text{expression (LM-19)}$$

FIG. 84 is a diagram illustrating the inverse table value invTable[ ] used in the embodiment. As described above, the inverse invTable[x] of FIG. 84 is 0 when the index x is 0. When the index x is a value other than 0, the inverse invTable[x] is derived from a value obtained as an integer by dividing the predetermined integer M (here, 15th power of 2) by x.

The value of the parameter a corresponds to a ratio of the first parameter a1 to the second parameter a2 (a value shifted left by iShift from a1/a2).

The LM parameter clip section 3104161H clips the range of the parameter a to a value equal to or greater than −128 and equal to or less than 127 which is an 8-bit integer variable through the following operation.

$$a=\text{Clip3}(-128,127,a) \qquad \text{expression (LM-12')}$$

Another value may be used as long as the minimum value of the range of the clip is equal to or greater than −128 and the maximum value is equal to or less than 127. For example, the following range may be set.

$$a=\text{Clip3}(-64,63,a)$$

The LM parameter b derivation section 310417 derives the parameter b by expression (LM-20), as described above.

The LM filter section 31042H derives a chrominance predicted image predSamplesC[ ] after the LM prediction from the luminance decoded image predSamplesY[ ] using the estimation parameters a and b derived by the LM parameter estimation section 31041H. For example, when the bit depth of the pixel is assumed to be bitDepth, the LM filter section 31042 derives the chrominance predicted image predSamplesC[ ] by multiplying a value obtained through subtraction of (1<<(bitDepth−1)) from the luminance decoded image predSamplesY[ ] by the parameter a, executing the right shift by the shift value iShift, and then adding the parameter b and (1<<(bitDepth−1)), as in expression (LM-21') below.

$$\text{predSamples}C[x][y]=(a*(\text{predSamples}Y[x/2][y/2]-(1<<(\text{bitDepth}-1)))>>i\text{Shift})+b+(1<<(\text{bitDepth}-1)) \qquad \text{expression (LM-21')}$$

When bitDepth is 8 bits, the range of predSamplesY is 0 to 255 and (1<<(bitDepth−1)) is 128. Therefore, "predSamplesY[x/2][y/2]−(1<<(bitDepth−1))" has a range from −128 to 127 of an 8-bit integer. When the parameter a is clipped so that the range is −128 to 127, a product of a value obtained by subtracting a predetermined value from the pixel value and the parameter a can be processed through an operation between 8-bit integers.

In the configuration of the LM parameter estimation section 31041H, by adding the same regularization term to the first parameter a1 and the second parameter a2 and calculating the parameter a of the value corresponding to the ratio of the first parameter a1 to the second parameter a2, an estimated parameter becomes robust when there is a deviated value or the like, and thus it is possible to obtain the advantageous effect of improving coding efficiency. The regularization term may be generated from the sum X of the pixel values x of the adjacent luminance image or may be generated from the sum Y of the pixel values y of the adjacent chrominance image.

In the configuration of the LM parameter estimation section 31041H, since only the second parameter derived from the sum X of the pixel values of the adjacent luminance image is normalized and the first parameter derived from the sum Y of the pixel values of the adjacent chrominance image is not normalized, the table shift value ScaleShiftA is necessarily equal to or greater than 0. Therefore, depending on whether the table shift value ScaleShiftA is equal to or greater than 0 (whether the table shift value ScaleShiftA is positive), the parameter can be derived with only right shift without switching between expression (LM-19) which is the right shift and expression (LM-19') which is the left shift.

In the configuration of the LM parameter estimation section 31041H, as illustrated in FIG. 84, the appropriate parameter a can be obtained even by defining the inverse table invTable[x] so that inverse table invTable[x] is 0 when the index x is 0 and deriving the parameter a based on the value obtained by subtracting the second parameter (the normalized second parameter) derived from the sum Y of the pixel values Y of the decoded image from the inverse table invTable[x] defined in this way, even when the operation method is not changed according to whether the second parameter (the normalized second parameter) is 0. Therefore, it is possible to obtain the advantageous effect of reducing a processing amount.

In the configuration of the LM parameter estimation section 31041H, when the LM parameter clip section 3104161H clips the parameter a to the range of an 8-bit nonnegative integer and the bit depth of the pixel values is 8 bits, the product of the parameter a and the pixel value can be processed as a product of 8-bit nonnegative integers. Therefore, it is possible to obtain the advantageous effect of easily executing the process by an SIMD operation or the like.

In the configuration of the LM parameter estimation section 31041H, when the LM parameter clip section 3104161H clips the parameter a to the range of an 8-bit integer and the bit depth of the pixel values is 8 bits, the product of the parameter a and the pixel value can be processed as a product of 8-bit integers. Therefore, it is possible to obtain the advantageous effect of easily executing the process by an SIMD operation or the like.

In the configuration of the LM parameter estimation section 31041H, the sum XY of the products of the pixel values y of the adjacent chrominance image and the pixel values x of the adjacent luminance image and the sum XX of the squares of the pixel values of the adjacent luminance image are not derived in the derivation of the parameter a. Therefore, it is possible to obtain the advantageous effect of reducing a processing amount.

As a different configuration from the LM prediction section 3104H, in the LM parameter estimation section 31041H of the LM prediction section 3104H, an LM parameter a derivation section 310416H2 can also be used instead of the LM parameter a derivation section 310416H.

Figure 91:
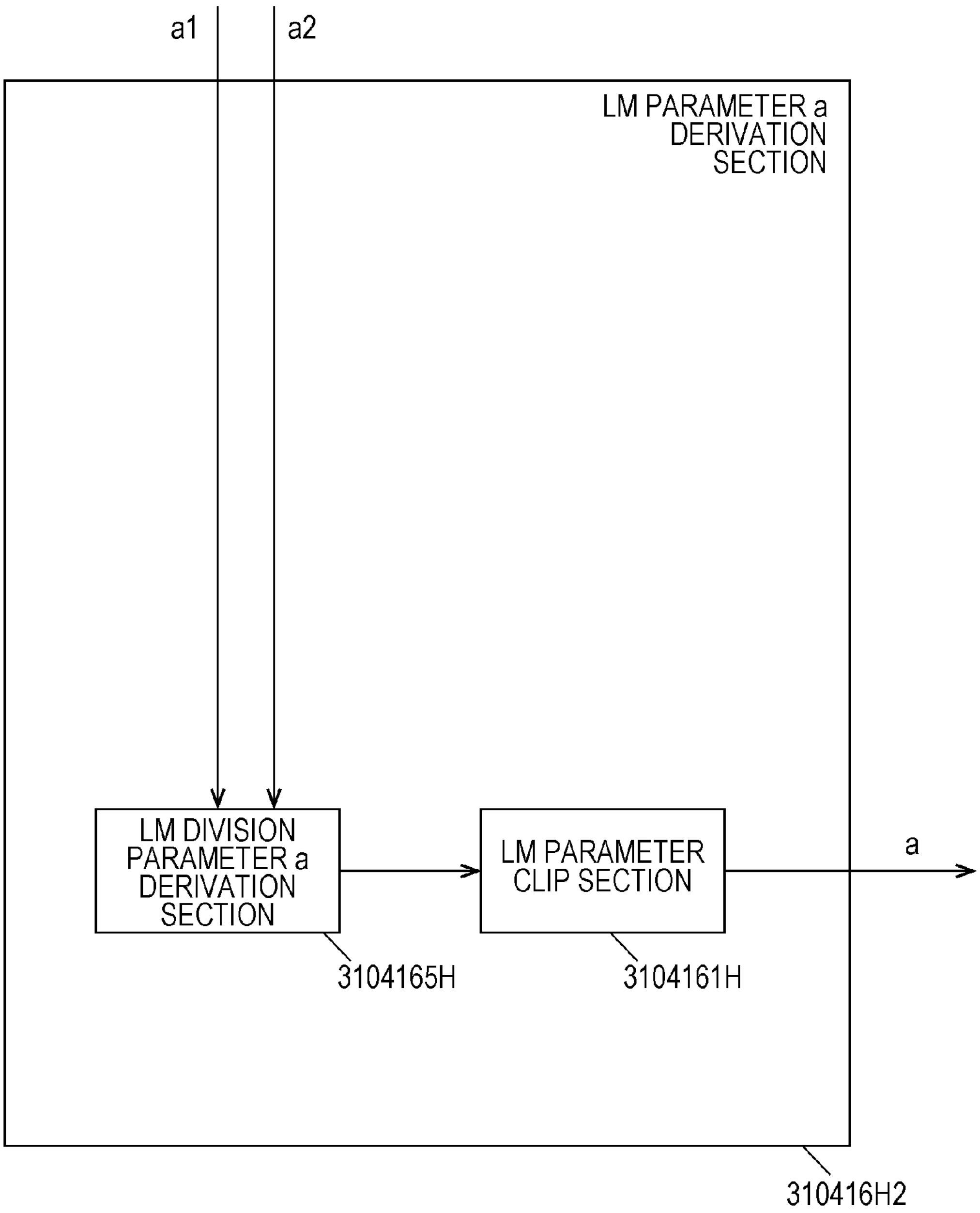
FIG. 91 is a block diagram illustrating the configuration of an LM parameter a derivation section 310416H2 according to the embodiment.

FIG. 91 is a block diagram illustrating the configuration of the LM parameter a derivation section 310416H2 according to the embodiment. The LM parameter a derivation section 310416H2 is configured to include an LM parameter clip section 3104161H and an LM division parameter a derivation section 3104165H.

The LM division parameter a derivation section 3104165H derives the parameter a using a ratio of the first parameter to the second parameter by the following expression.

$$a=(a1+a2/2)/a2 \qquad \text{expression (B-19')}$$

The LM parameter clip section 3104161H clips the range of the parameter a to the range of an 8-bit nonnegative variable, as described above.

In the configuration of the LM parameter estimation section 31041H2, by adding the same regularization term to the first parameter a1 and the second parameter a2 and calculating the parameter a of the value corresponding to the ratio of the first parameter a1 to the second parameter a2, an estimated parameter becomes robust when there is a deviated value or the like, and thus it is possible to obtain the advantageous effect of improving coding efficiency.

In the configuration of the LM parameter estimation section 31041H, when the LM parameter clip section 3104161H clips the parameter a to the range of an 8-bit integer and the bit depth of the pixel values is 8 bits, the product of the parameter a and the pixel value can be processed as a product of 8-bit integers. Therefore, it is possible to obtain the advantageous effect of easily executing the process by an SIMD operation or the like.

The LM parameter a derivation section 310416H2 uses division to derive the parameter a, unlike the LM parameter a derivation section 310416H. The division is an operation of which a process is relatively complex, but accuracy of the parameter a is improved to that extent. Therefore, it is possible to obtain the advantageous effect of improving coding efficiency.

The inverse quantization and inverse DCT section 311 executes inverse quantization on the quantization coefficient input from the entropy decoding section 301 to obtain a DCT coefficient. The inverse quantization and inverse DCT section 311 executes inverse discrete cosine transform (DCT) on the obtained DCT coefficient to calculate a decoded residual signal. The inverse quantization and inverse DCT section 311 outputs the calculated decoded residual signal to the addition section 312 and the residual storage section 313.

The addition section 312 adds the predicted picture block P input from the inter-predicted image generation section 309 and the intra-predicted image generation section 310 and the signal value of the decoded residual signal input from the inverse quantization and inverse DCT section 311 for each pixel to generate a reference picture block. The addition section 312 stores the generated reference picture block in the reference picture memory 306 and outputs the decoded layer image Td in which the generated reference picture blocks are integrated for each picture to the outside.

(Configuration of Inter-Prediction Parameter Decoding Section)

Next, the configuration of the inter-prediction parameter decoding section 303 will be described.

Figure 6:
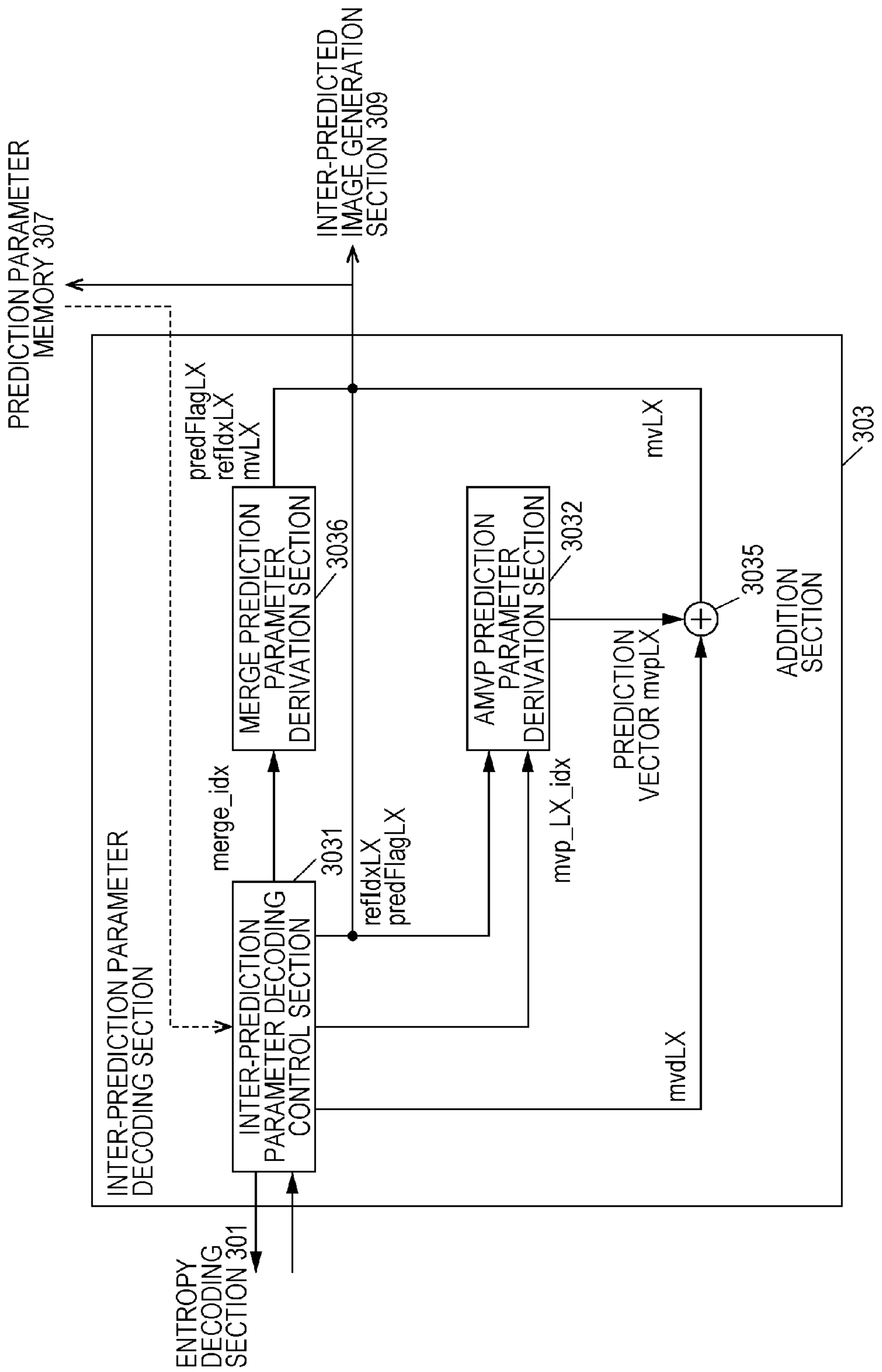
FIG. 6 is a schematic diagram illustrating the configuration of an inter-prediction parameter decoding section according to the embodiment.

FIG. 6 is a schematic diagram illustrating the configuration of the inter-prediction parameter decoding section 303 according to the embodiment. The inter-prediction parameter decoding section 303 is configured to include an inter-prediction parameter decoding control section 3031, an AMVP prediction parameter derivation section 3032, an addition section 3035, and a merge prediction parameter derivation section 3036.

The inter-prediction parameter decoding control section 3031 instructs the entropy decoding section 301 to decode the code (syntax component) related to the inter-prediction and extracts codes (syntax components) included in the coded data, for example, the split mode part_mode, the merge flag merge_flag, the merge index merge_idx, the inter-prediction flag inter_pred_idx, the reference picture index refIdxLX, the prediction vector index mvp_LX_idx, and the difference vector mvdLX.

The inter-prediction parameter decoding control section 3031 first extracts the merge flag. When the inter-prediction parameter decoding control section 3031 denotes extractions of a certain syntax component, it is meant that the inter-prediction parameter decoding control section 3031 instructs the entropy decoding section 301 to decode the certain syntax component and reads the corresponding syntax component from the coded data. Here, when a value indicated by the merge flag is 1, that is, indicates the merge prediction mode, the inter-prediction parameter decoding control section 3031 extracts, for example, a merge index merge_idx as the prediction parameter related to the merge prediction. The inter-prediction parameter decoding control section 3031 outputs the extracted merge index merge_idx to the merge prediction parameter derivation section 3036.

When the merge flag merge_flag is 0, that is, indicates the AMVP prediction mode, the inter-prediction parameter decoding control section 3031 extracts the AMVP prediction parameter from the coded data using the entropy decoding section 301. As the AMVP prediction parameters, for example, there are the inter-prediction flag inter_pred_idc, the reference picture index refIdxLX, the vector index mvp_LX_idx, and the difference vector mvdLX. The inter-prediction parameter decoding control section 3031 outputs the predicted list use flag predFlagLX and the reference picture index refIdxLX derived from the extracted inter-prediction flag inter_pred_idx to the AMVP prediction parameter derivation section 3032 and the predicted image generation section 308 (see FIG. 5) and stores the predicted list use flag predFlagLX and the reference picture index refIdxLX in the prediction parameter memory 307 (see FIG. 5). The inter-prediction parameter decoding control section 3031 outputs the extracted vector index mvp_LX_idx to the AMVP prediction parameter derivation section 3032. The inter-prediction parameter decoding control section 3031 outputs the extracted difference vector mvdLX to the addition section 3035.

Figure 7:
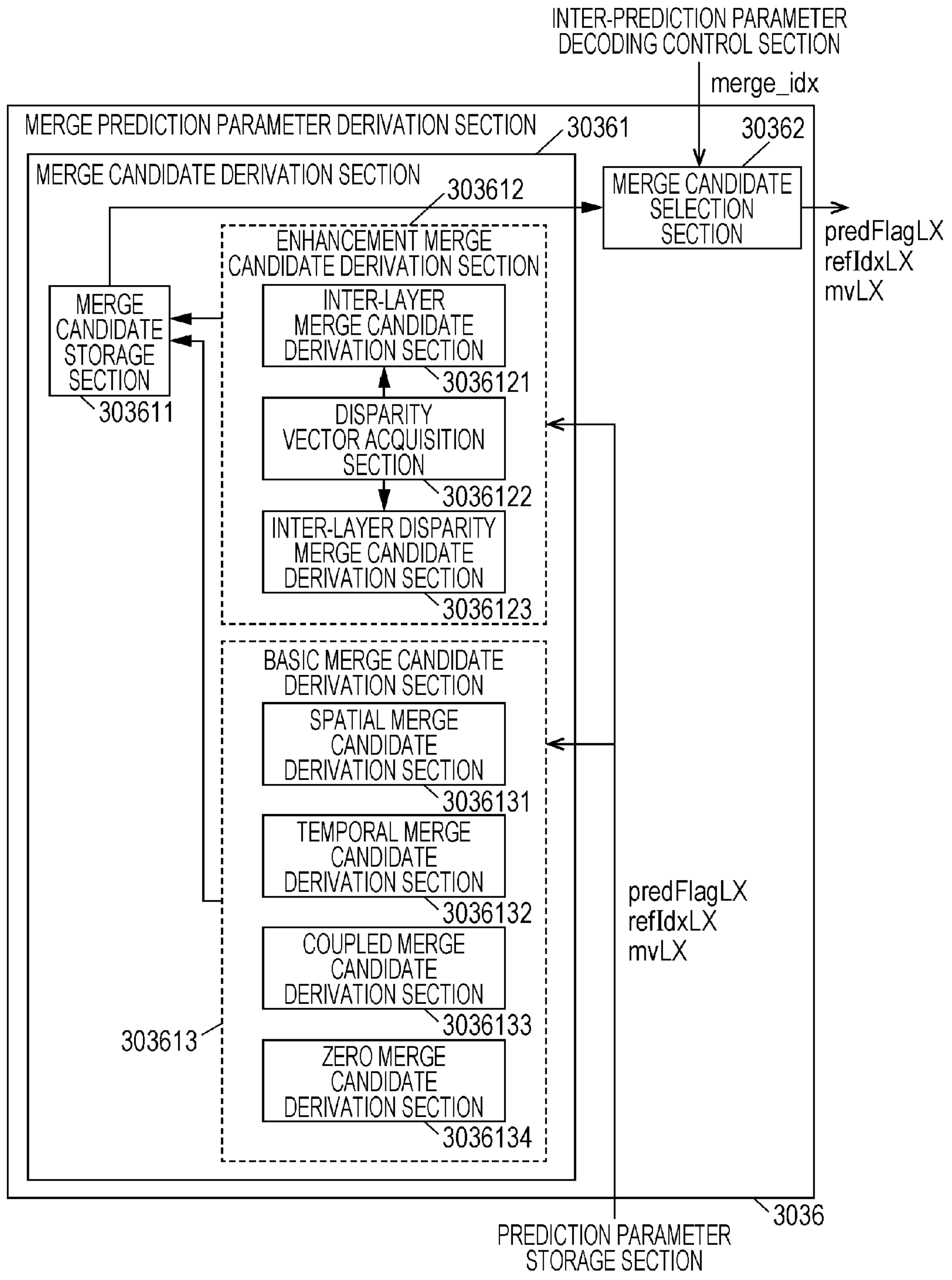
FIG. 7 is a schematic diagram illustrating the configuration of a merge prediction parameter derivation section according to the embodiment.

FIG. 7 is a schematic diagram illustrating the configuration of the merge prediction parameter derivation section 3036 according to the embodiment. The merge prediction parameter derivation section 3036 includes a merge candidate derivation section 30361 and a merge candidate selection section 30362. The merge candidate derivation section 30361 is configured to include a merge candidate storage section 303611, an enhancement merge candidate derivation section 303612, and a basic merge candidate derivation section 303613.

The merge candidate storage section 303611 stores merge candidates input from the enhancement merge candidate derivation section 303612 and the basic merge candidate derivation section 303613. The merge candidates are configured to include the prediction list use flag predFlagLX, the vector mvLX, and the reference picture index refIdxLX. In the merge candidate storage section 303611, indexes can be allocated to the stored merge candidates according to a predetermined rule. For example, "0" is allocated as an index to the merge candidate input from the enhancement merge candidate derivation section 303612.

The enhancement merge candidate derivation section 303612 is configured to include a disparity vector acquisition section 3036122, an inter-layer merge candidate derivation section 3036121, and an inter-layer disparity merge candidate derivation section 3036123.

The disparity vector acquisition section 3036122 first acquires disparity vectors in order from a plurality of candidate blocks adjacent to a decoding target block (for example, blocks adjacent to the left, upper, and upper right sides). Specifically, one of the candidate blocks is selected and a reference layer determination section 303111 (which will be described below) is used to determine whether the vector of the selected candidate block is a disparity vector or a motion vector using the reference picture index refIdxLX of the candidate block. When there is the disparity vector, this disparity vector is set as a disparity vector. When there is no disparity vector in the candidate block, a subsequent candidate block is scanned in order. When there is no disparity vector in an adjacent block, the disparity vector acquisition section 3036122 attempts to acquire the disparity vector of a block located at a position corresponding to the target block of the block included in a reference picture of a temporarily different display order. When the disparity vector may not be acquired, the disparity vector acquisition section 3036122 sets a zero vector as the disparity vector. The disparity vector acquisition section 3036122 outputs the disparity vector to the inter-layer merge candidate derivation section 3036121 and the inter-layer disparity merge candidate derivation section.

The disparity vector is input from the disparity vector acquisition section 3036122 to the inter-layer merge candidate derivation section 3036121. The inter-layer merge candidate derivation section 3036121 selects a block indicated by only the disparity vector input from the disparity vector acquisition section 3036122 from the picture having the same POC as the decoding target picture of a different layer (for example, a base layer or a base view) and reads the prediction parameter which is a motion vector which the block has from the prediction parameter memory 307. More specifically, the prediction parameter read by the inter-layer merge candidate derivation section 3036121 is a prediction parameter of a block including coordinates for which the disparity vector is added to the coordinates of a starting point when a central point of the target block is set as the starting point.

The coordinates (xRef, yRef) of the reference block are derived by the following expressions when the coordinates of the target block are (xP, yP), the disparity vector is (mvDisp[0], mvDisp[1]), and the width and height of the target block are nPSW and nPSH.

$$x\mathrm{Ref}=\mathrm{Clip3}(0,\mathrm{PicWidthInSamples}_L-1,xP+((nPSW-1)>>1)+((\mathrm{mvDisp}[0]+2)>>2))$$

$$y\mathrm{Ref}=\mathrm{Clip3}(0,\mathrm{PicHeightInSamples}_L-1,yP+((nPSH-1)>>1)+((\mathrm{mvDisp}[1]+2)>>2))$$

The inter-layer merge candidate derivation section 3036121 determines whether the prediction parameter is the motion vector by a method in which a determination result is false (not the disparity vector) in a determination method of the reference layer determination section 303111 to be described below included the inter-prediction parameter decoding control section 3031. The inter-layer merge candidate derivation section 3036121 outputs the read prediction parameter as the merge candidate to the merge candidate storage section 303611. When the prediction parameter may not be derived, the inter-layer merge candidate derivation section 3036121 outputs the non-derivation of the prediction parameter to the inter-layer disparity merge candidate derivation section. The merge candidate is an inter-layer candidate (interview candidate) of the motion prediction and is also stated as an inter-layer merge candidate (motion prediction).

The disparity vector is input from the disparity vector acquisition section 3036122 to the inter-layer disparity merge candidate derivation section 3036123. The inter-layer disparity merge candidate derivation section 3036123 outputs the input disparity vector and the reference picture index refIdxLX (for example, the index of the base layer image having the same POC as the decoding target picture) of the previous layer image indicated by the disparity vector as merge candidates to the merge candidate storage section 303611. These merge candidates are inter-layer candidates (interview candidates) of the disparity prediction and are also stated as inter-layer merge candidates (disparity prediction).

The basic merge candidate derivation section 303613 is configured to include a spatial merge candidate derivation section 3036131, a temporal merge candidate derivation section 3036132, a combined merge candidate derivation section 3036133, and a zero merge candidate derivation section 3036134.

The spatial merge candidate derivation section 3036131 reads the prediction parameters (the prediction list use flag predFlagLX, the vector mvLX, and the reference picture index refIdxLX) stored by the prediction parameter memory 307 according to a predetermined rule and derives the read prediction parameters as merge candidates. The read prediction parameters are prediction parameters related to blocks present within a pre-decided range from the decoding target block (for example, some or all of the blocks adjacent to the lower left end, the upper left end, and the upper right end of the decoding target block). The derived merge candidates are stored in the merge candidate storage section 303611.

The temporal merge candidate derivation section 3036132 reads the prediction parameter of a block inside the reference image including the coordinates of the lower right of the decoding target block from the prediction parameter memory 307 and sets the read prediction parameter as a merge candidate. As a method of designating the reference image, for example, the reference image may be designated with the reference picture index refIdxLX put and designated in the slice header or may be designated with the minimum index among the reference picture indexes refIdxLX of the blocks adjacent to the decoding target block. The derived merge candidate is stored in the merge candidate storage section 303611.

The combined merge candidate derivation section 3036133 derives combined merge candidates by combining the vectors of two different derived merge candidates already derived and stored in the merge candidate storage section 303611 with the reference picture indexes and setting the combined vectors as vectors of L0 and L1. The derived merge candidates are stored in the merge candidate storage section 303611.

The zero merge candidate derivation section 3036134 derives a merge candidate of which the reference picture index refIdxLX is 0 and both of the X and Y components of the vector mvLX are 0. The derived merge candidate is stored in the merge candidate storage section 303611.

The merge candidate selection section 30362 selects, an inter-prediction parameter of the target PU, as the merge candidate to which the index corresponding to the merge index merge_idx input from the inter-prediction parameter decoding control section 3031 among the merge candidates stored in the merge candidate storage section 303611 is allocated. The merge candidate selection section 30362 stores the selected merge candidate in the prediction parameter memory 307 (see FIG. 5) and outputs the selected merge candidate to the predicted image generation section 308 (see FIG. 5).

Figure 8:
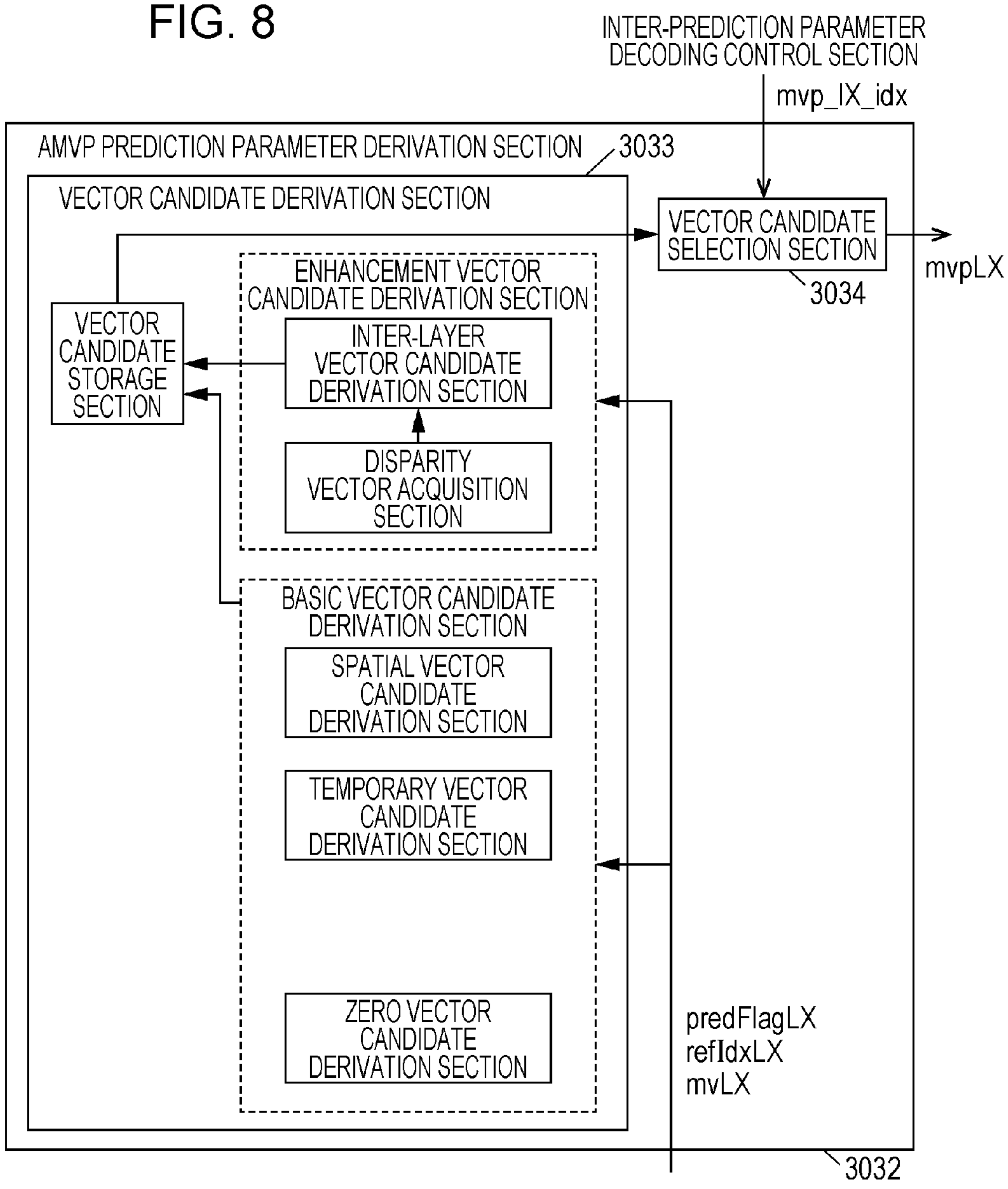
FIG. 8 is a schematic diagram illustrating the configuration of an AMVP prediction parameter derivation section according to the embodiment.

FIG. 8 is a schematic diagram illustrating the configuration of the AMVP prediction parameter derivation section 3032 according to the embodiment. The AMVP prediction parameter derivation section 3032 includes a vector candidate derivation section 3033 and a prediction vector selection section 3034. The vector candidate derivation section 3033 reads the vectors (the motion vectors or the disparity vectors) stored by the prediction parameter memory 307 (see FIG. 5) as the vector candidates mvpLX based on the reference picture indexes refIdx. The read vectors are vectors related to the block present within a pre-decided range from the decoding target block (for example, some or all of the blocks adjacent to the lower left end, the upper left end, and the upper right end of the decoding target block).

The prediction vector selection section 3034 selects, as the prediction vector mvpLX, the vector candidate indicated by the vector index mvp_LX_idx input from the inter-prediction parameter decoding control section 3031 among the vector candidates read by the vector candidate derivation section 3033. The prediction vector selection section 3034 outputs the selected prediction vector mvpLX to the addition section 3035.

Figure 9:
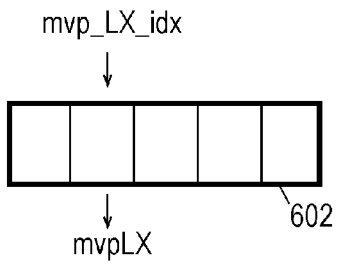
FIG. 9 is a conceptual diagram illustrating an example of a vector candidate.

FIG. 9 is a conceptual diagram illustrating an example of a vector candidate. A prediction vector list 602 illustrated in FIG. 9 is a list formed by the plurality of vector candidates derived by the vector candidate derivation section 3033. In the prediction vector list 602, five rectangles arranged horizontally in one line indicate regions indicating prediction vectors. A downward arrow immediately below the second mvp_LX_idx from the left end and mvPLX below the arrow indicate an index by which the vector index mvp_LX_idx refers to the vector mvpLX in the prediction parameter memory 307.

The candidate vector is generated based on a vector related to a referred block with reference to a block (for example, an adjacent block) on which a decoding process is completed and which is within a pre-decided range from a decoding target block. The adjacent blocks include not only blocks spatially adjacent to a target block, for example, a left block and an upper block, but also blocks temporarily adjacent to a target block, for example, blocks obtained at the same position as the target block from a block of which a display time is different.

The addition section 3035 adds the prediction vector mvpLX input from the prediction vector selection section 3034 and the difference vector mvdLX input from the inter-prediction parameter decoding control section to calculate a vector mvLX. The addition section 3035 outputs the calculated vector mvLX to the predicted image generation section 308 (see FIG. 5).

(Configuration of Inter-Prediction Parameter Decoding Control Section)

Figure 10:
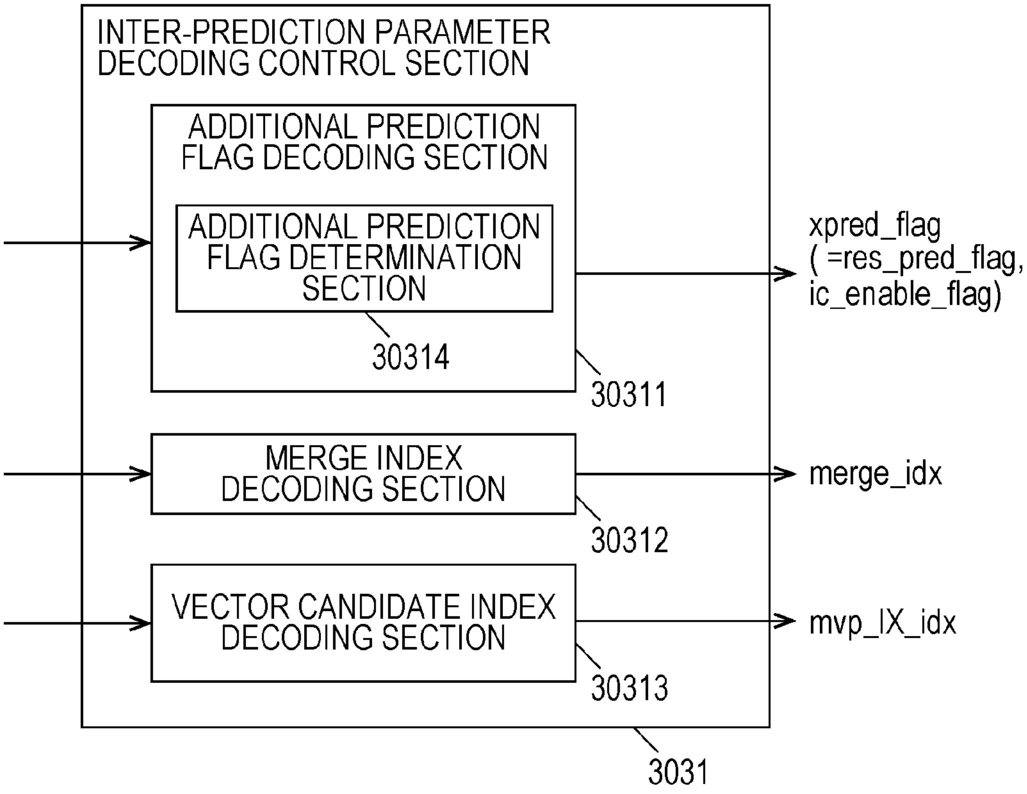
FIG. 10 is a schematic diagram illustrating the configuration of an inter-prediction parameter decoding control section according to the embodiment.

Next, the configuration of the inter-prediction parameter decoding control section 3031 will be described. As illustrated in FIG. 10, the inter-prediction parameter decoding control section 3031 is configured to include an additional prediction flag decoding section 30311, a merge index decoding section 30312, and a vector candidate index decoding section 30313 and include a split mode decoding section, a merge flag decoding section, an inter-prediction flag decoding section, a reference picture index decoding section, and a vector difference decoding section (none of which is illustrated). The split mode decoding section, the merge flag decoding section, the merge index decoding section, the inter-prediction flag decoding section, the reference picture index decoding section, the vector candidate index decoding section 30313, and the vector difference decoding section respectively decode the split mode part_mode, the merge flag merge_flag, the merge index merge_idx, the inter-prediction flag inter_pred_idx, the reference picture index refIdxLX, the prediction vector index mvp_LX_idx, and the difference vector mvdLX.

The additional prediction flag decoding section 30311 decodes a flag xpred_flag indicating whether additional prediction is executed. Here, the additional prediction means residual prediction, illumination compensation, or the like to be described below and refers to prediction which is additionally executed on top of normal motion compensation or disparity compensation. A flag indicating whether the residual prediction is executed is denoted as res_pred_flag and a flag indicating whether the illumination compensation is executed is denoted as ic_enable_flag. The decoded additional prediction flags xpred_flag (res_pred_flag and ic_enable_flag) are output to the inter-predicted image generation section 309. When the additional prediction flag xpred_flag is the residual prediction flag res_pred_flag and the residual prediction flag res_pred_flag is 1 indicating that the residual prediction is executed, the inter-prediction parameter decoding control section 3031 extracts a disparity vector mvDisp of a target PU using a disparity vector acquisition section included therein, as will be described, and outputs the disparity vector mvDisp to the inter-predicted image generation section 309. Instead of the residual prediction flag res_pred_flag which is a flag indicating whether the residual prediction is executed, a residual prediction weight res_pred_weight which is a flag indicating the weight of the residual prediction may be used. When res_pred_weight is 0, the residual prediction is not executed. When res_pred_weight is 1, the residual prediction is executed with weight 1. When res_pred_weight is 2, the residual prediction is executed with weight ½. Instead of the residual prediction flag res_pred_flag which is the flag indicating whether the residual prediction is executed, a residual prediction mode res_pred_mode which is a flag indicating a kind of residual prediction may be used. When res_pred_mode is 0, the residual prediction is not executed. When res_pred_mode is 1, first residual prediction is executed. When res_pred_mode is 2, the residual prediction is executed as second residual prediction. The first residual prediction and the second residual prediction are assumed to be different in a residual derivation method.

The additional prediction flag decoding section 30311 includes an additional prediction flag determination section 30314 therein. The additional prediction flag determination section 30314 determines whether the additional prediction flag xpred_flag is included in coded data (whether the additional prediction flag xpred_flag is read and decoded from the coded data). A determination result is derived as xpred_flag_exists assuming that a case in which the additional prediction flag is included in the coded data is 1 and a case in which the additional prediction flag is not included is 0. When the additional prediction flag determination section 30314 determines that the additional prediction flag is included in the coded data (xpred_flag_exists is 1), the additional prediction flag decoding section 30311 notifies the entropy decoding section 301 of decoding of the additional prediction flag and extracts a syntax component corresponding to the additional prediction flag from the coded data via the entropy decoding section 301. In contrast, when the additional prediction flag determination section 30314 determines that the additional prediction flag is not included in the coded data (xpred_flag_exists is 0), a value (here, 1) indicating the additional prediction is derived (inferred) to the additional prediction flag. The additional prediction flag determination section 30314 will be described below.

(Disparity Vector Acquisition Section)

When the block adjacent to the target PU has a disparity vector, the disparity vector acquisition section extracts the disparity vector from the prediction parameter memory 307 and reads the prediction flag predFlagLX, the reference picture index refIdxLX, and the vector mvLX of the block adjacent to the target PU with reference to the prediction parameter memory 307. The disparity vector acquisition section includes a reference layer determination section 303111 therein. The disparity vector acquisition section reads the prediction parameters of the block adjacent to the target PU in order and determines whether the adjacent block has a disparity vector from the reference picture index of the adjacent block using the reference layer determination section 303111. When the adjacent block has the disparity vector, the disparity vector is output. When there is no disparity vector in the prediction parameter of the adjacent block, a zero vector is output as the disparity vector.

(Reference Layer Determination Section 303111)

The reference layer determination section 303111 decides a reference picture indicated by the reference picture index refIdxLX and reference layer information reference_layer_info indicating a relation of the target picture based on the input reference picture index refIdxLX. The reference layer information reference_layer_info is information indicating whether the vector mvLX to the reference picture is a disparity vector or a motion vector.

Prediction in a case in which the layer of the target picture is the same layer as the layer of the reference picture is referred to as same-layer prediction and a vector obtained in this case is a motion vector. Prediction in a case in which the layer of the target picture is a different layer from the layer of the reference picture is referred to as inter-layer prediction and a vector obtained in this case is a disparity vector.

Here, first to third determination methods will be described as examples of a determination process of the reference layer determination section 303111. The reference layer determination section 303111 may use one of the first to third determination methods or any combination of these methods.

<First Determination Method>

When a display time (picture order number: Picture Order Count (POC)) related to the reference picture indicated by the reference picture index refIdxLX is the same as a display time (POC) related to a decoding target picture, the reference layer determination section 303111 determines that the vector mvLX is the disparity vector. The POC is a number indicating an order in which a picture is displayed and is an integer (discrete time) indicating a display time at which the picture is acquired. When the vector mvLX is determined not to be the disparity vector, the reference layer determination section 303111 determines that the vector mvLX is the motion vector.

Specifically, when the picture order number POC of the reference picture indicated by the reference picture index refIdxLX is the same as the POC of the decoding target picture, the reference layer determination section 303111 determines that the vector mvLX is the disparity vector and executes the determination, for example, by the following expression.

$$POC==\text{Reflayer}POC(\text{refIdx}LX,\text{List}X)$$

Here, the POC is the POC of the decoding target picture and RefPOC (X, Y) is the POC of the reference picture designated by the reference picture index X and the reference picture list Y.

The fact that the reference picture of the same POC as the POC of the decoding target picture can be referred to means that the layer of the reference picture is different from the layer of the decoding target picture. Accordingly, when the POC of the decoding target picture is the same as the POC of the reference picture, the inter-layer prediction is determined to be executed (disparity vector). Otherwise, the same-layer prediction is determined to be executed (motion vector).

<Second Determination Method>

When a viewpoint related to the reference picture indicated by the reference picture index refIdxLX is different from a viewpoint related to the decoding target picture, the reference layer determination section 303111 may determine that the vector mvLX is the disparity vector. Specifically, when a view IDview_id of the reference picture indicated by the reference picture index refIdxLX is different from a view IDview_id of the decoding target picture, the reference layer determination section 303111 determines that the vector mvLX is the disparity vector by, for example, the following expression.

$$\text{ViewID}==\text{ReflayerViewID}(\text{refIdx}LX,\text{List}X)$$

Here, ViewID is a view ID of the decoding target picture and RefViewID (X, Y) is a view ID of the reference picture designated by the reference picture index X and the reference picture list Y.

The view IDview_id is information used to identify each viewpoint image. The difference vector dvdLX related to the disparity vector is based on the fact that the difference vector is obtained between pictures with different viewpoints and is not obtained between pictures with the same viewpoint. When the vector mvLX is determined not to be the disparity vector, the reference layer determination section 303111 determines that the vector mvLX is a motion vector.

An individual viewpoint image is a kind of layer. Therefore, when the view IDview_id is determined to be different, the reference layer determination section 303111 determines that the vector mvLX is the disparity vector (the inter-layer prediction is executed). Otherwise, the reference layer determination section 303111 determines that the vector mvLX is the motion vector (the same-layer prediction is executed).

<Third Determination Method>

When a layer IDlayer_id related to the reference picture indicated by the reference picture index refIdxLX is different from a layer IDlayer_id related to the decoding target picture, the reference layer determination section 303111 may determine that the vector mvLX is the disparity vector by, for example, the following expression.

$$layerID!=ReflayerViewID(refIdxLX,ListX)$$

Here, layerID is a layer ID of the decoding target picture and ReflayerID (X, Y) is a layer ID of the reference picture designated by the reference picture index X and the reference picture list Y. The layer IDlayer_id is data identifying each layer when one picture is configured to include data of a plurality of hierarchies (layers). In coded data obtained by coding a picture with a different viewpoint, the layer ID is based on the fact that the layer ID has a different value depending on a viewpoint. That is, the difference vector dvdLX related to the disparity vector is a vector obtained between a target picture and a picture related to a different layer. When the vector mvLX is determined not to be the disparity vector, the reference layer determination section 303111 determines that the vector mvLX is the motion vector.

When the layer IDlayer_id is different, the reference layer determination section 303111 determines that the vector mvLX is the disparity vector (the inter-layer prediction is executed). Otherwise, the reference layer determination section 303111 determines that the vector mvLX is the motion vector (the same-layer prediction is executed).

(Inter-Predicted Image Generation Section 309)

Figure 11:
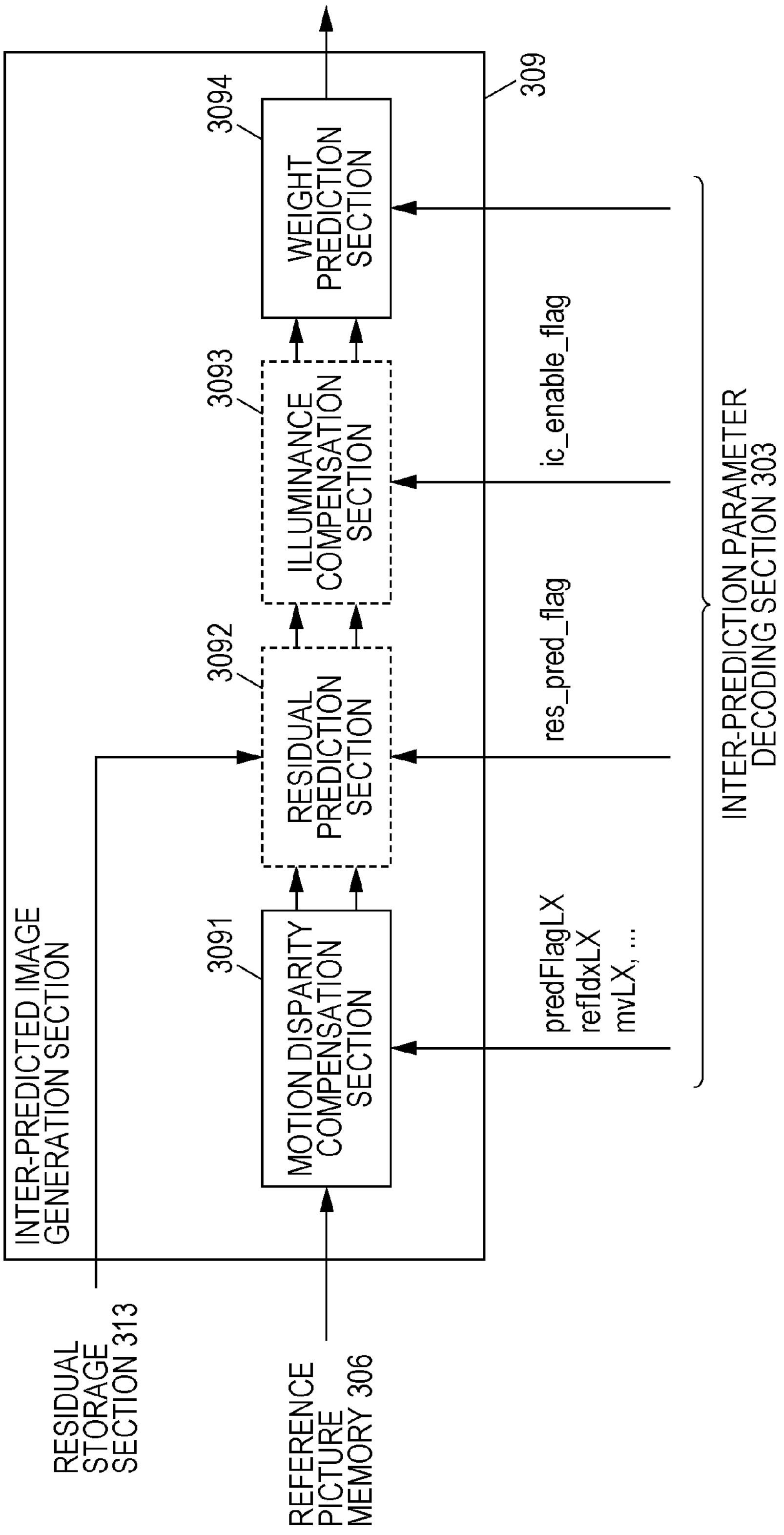
FIG. 11 is a schematic diagram illustrating the configuration of an inter-predicted image generation section according to the embodiment.

FIG. 11 is a schematic diagram illustrating the configuration of the inter-predicted image generation section 309 according to the embodiment. The inter-predicted image generation section 309 is configured to include a motion disparity compensation section 3091, a residual prediction section 3092, an illumination compensation section 3093, and a weight prediction section 3094.

(Motion Disparity Compensation)

The motion disparity compensation section 3091 generates a motion disparity compensated image by reading a block located at a position deviated by the vector mvLX using the position of the target block of the reference picture designated by the reference picture index refIdxLX as a starting point from the reference picture memory 306 based on the prediction list use flag predFlagLX, the reference picture index refIdxLX, and the motion vector mvLX input from the inter-prediction parameter decoding section 303. Here, when the vector mvLX is not an integer vector, the motion disparity compensated image is generated by applying a filter called a motion compensation filter (or a disparity compensation filter) and used to generate a pixel at a predetermined position. In general, when the vector mvLX is the motion vector, the foregoing process is referred to as motion compensation. When the vector mvLX is the disparity vector, the foregoing process is referred to as disparity compensation. Here, the process is collectively denoted as motion disparity compensation. Hereinafter, a motion disparity compensated image of the L0 prediction is referred to as predSamplesL0 and a motion disparity compensation image of the L1 prediction is referred to as predSamplesL1. When both of the motion disparity compensated images are not distinguished from each other, the motion disparity compensated images are referred to as predSamplesLX. Hereinafter, an example in which a motion disparity compensated image predSamplesLX obtained by the motion disparity compensation section 3091 is further subjected to the residual prediction and the illumination compensation will be described. Such an output image is also referred to as the motion disparity compensated image predSamplesLX. When an input image and an output image are distinguished from each other in the residual prediction and the illumination compensation to be described below, the input image is denoted as predSamplesLX and the output image is denoted as predSamplesLX'.

(Residual Prediction)

When the residual prediction flag res_pred_flag is 1, the residual prediction section 3092 executes the residual prediction on the input motion disparity compensated image predSamplesLX. When the residual prediction flag res_pred_flag is 0, the input motion disparity compensated image predSamplesLX is output without change. The residual prediction section 3092 executes the residual prediction on the motion disparity compensated image predSamplesLX obtained by the motion disparity compensation section 3091 using the disparity vector mvDisp input from the inter-prediction parameter decoding section 303 and a residual refResSamples stored in the residual storage section 313. The residual prediction is executed by adding a residual of a reference layer (the first layer image) different from a target layer (the second layer image) which is a prediction image generation target to the motion disparity compensated image predSamesLX which is a predicted image of the target layer. That is, on the assumption that the same residual as that of the reference layer also occurs in the target layer, the residual of the already derived reference layer is used as a predicted value of the residual of the target layer. Only an image of the same layer becomes the reference image in the base layer (base view). Accordingly, when the reference layer (the first layer image) is the base layer (the base view), a predicted image of the reference layer is a predicted image by the motion compensation. Therefore, in the prediction by the target layer (the second layer image), the residual prediction is also valid when the predicted image is the predicted image by the motion compensation. That is, there are characteristics in which the residual prediction is valid when the target block is for the motion compensation.

Figure 12:
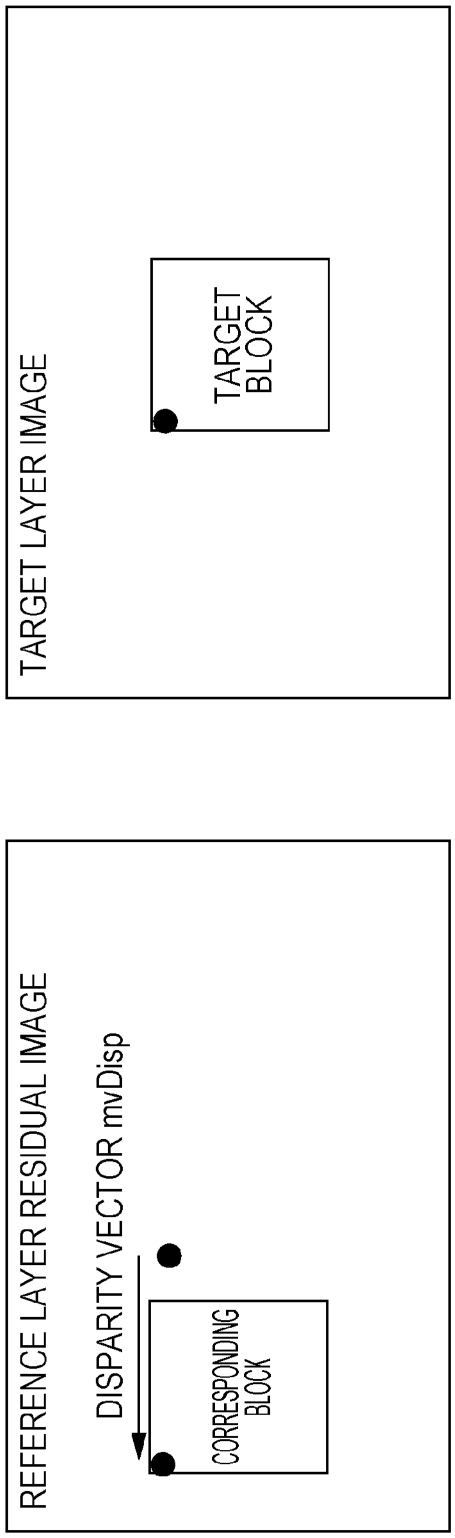
FIG. 12 is a conceptual diagram illustrating residual prediction according to the embodiment.

The residual prediction section 3092 is configured to include a residual acquisition section 30921 and a residual filter section 30922 (none of which is illustrated). FIG. 12 is a conceptual diagram illustrating the residual prediction. A correspondence block corresponding to the target block on the target layer is located in a block present at a position deviated by the disparity vector mvDisp which is a vector indicating a positional relation between the reference layer and the target layer using the position of the target block of the image on the reference layer as a starting point. Accordingly, a residual located at the position deviated by the disparity vector mvDisp is used as the residual used for the residual prediction. Specifically, the residual acquisition section 30921 derives a pixel present at a position at which the coordinates (x, y) of a pixel of the target block is deviated by an integer pixel component of the disparity vector mvDisp of the target block. In consideration that the disparity vector mvDisp has decimal precision, the residual acquisition section 30921 derives an X coordinate xR0 of a corresponding pixel R0 and an X coordinate xR1 of an adjacent pixel R1 of the pixel R0 when the coordinates of the pixel of the target block are (xP, yP), by the following expression.

$$xR0=Clip3(0,PicWidthInSamples_L-1,xP+x+(mvDisp[0]>>2))$$

$$xR1=Clip3(0,PicWidthInSamples_L-1,xP+x+(mvDisp[0]>>2)+1)$$

Here, Clip3 (x, y, z) is a function of restricting (clipping) z to a value equal to or greater than x and equal to or less than y. Further, mvDisp[0]>>2 is an expression by which an integer component is derived in a vector of quarter-pel precision.

The residual acquisition section 30921 derives a weight coefficient w0 of the pixel R0 and a weight coefficient w1 of the pixel R1 according to a decimal pixel position (mvDisp[0]−((mvDisp[0]>>2)<<2)) of the coordinates designated by the disparity vector mvDisp by the following expressions.

$$w0=4-\text{mvDisp}[0]+((\text{mvDisp}[0]>>2)<<2)$$

$$w1=\text{mvDisp}[0]-((\text{mvDisp}[0]>>2)<<2)$$

Subsequently, the residual acquisition section 30921 acquires the residuals of the pixels R0 and R1 by refResSamples$_L$[xR0, y] and refResSamples$_L$[xR1, y] from the residual storage section 313. The residual filter section 30922 derives a predicted residual delta$_L$ by the following expression.

$$\text{delta}_L=(w0*\text{clip3}(x\text{min},x\text{max},\text{refResSamples}_L[xR0,y])+w1*\text{clip3}(x\text{min},x\text{max},\text{refResSamples}_L[xR1,y]+2))>>2$$

Here, xmin=−(1<<(BitDepthY−1)) and xmax=(1<<(BitDepthY−1))−1. The residual acquisition section 30921 clips the residual of the reference layer to a range entering a predetermined bit width and reads the residual of the reference layer when reading the residual of the reference layer. For example, when the bit depth is set to BitDepthY, refResSamples$_L$[xR0, y] and refResSamples$_L$[xR1, y] are restricted to −(1<<(BitDepthY−1)) to +(1<<BitDepthY−1)−1 and the residual is read. In the foregoing description, the bit depth bitDepthY of luminance has been used for the bit depth. However, even when a residual of the chrominance is read, the same clip process is executed. In this case, the bit depth is substituted with a bit depth bitDepthC of chrominance and the process is executed (the same applies below).

In the foregoing process, the pixel is derived through the linear interpolation when the disparity vector mvDisp has the decimal precision. However, a neighborhood integer pixel may be used without using the linear interpolation. Specifically, the residual acquisition section 30921 may acquire only a pixel xR0 as a pixel corresponding to the pixel of the target block and derive the predicted residual delta$_L$ using the following expression.

$$\text{delta}_L=\text{clip3}(x\text{min},x\text{max},\text{refResSamples}_L[xR0,y])$$

After the predicted residual delta$_L$ is derived, the residual filter section 30922 adds the predicted residual delta$_L$ to the motion disparity image predSamplesLX input to the residual prediction section 3092 and outputs the result as a motion disparity image predSamplesLX'.

$$\text{predSamples}LX'[x,y]=\text{predSamples}LX[x,y]+\text{delta}_L$$

In the foregoing configuration, the range of the value of the residual obtained with the reference layer is restricted and read in the estimation of the residual of the target layer. Thus, since only the value of restricted the range may be stored as the residual in the residual storage section 313 to be described below, it is possible to obtain the advantageous effect of reducing a memory amount for recording the residual.

More specifically, the residual is a difference signal. Therefore, when the bit depth of the pixel is bitDepthY (the range of the pixel is 0 to +(1<<BitDepthY)−1), bitDepthY+1 bits are necessary (the range of the residual is −(1<<BitDepthY) to +(1<<BitDepthY)−1). In the technology of the related art, it is necessary to record the value of the foregoing range.

However, in the restriction of −(1<<(BitDepthY−1)) to +(1<<BitDepthY−1)−1 according to the embodiment, the bit width of the residual can be restricted to BitDepthY when the number of bits of the pixel is BitDepthY. Experimentally, the inventors have confirmed that coding efficiency does not deteriorate even in restriction of the range of the residual to 8 bits (−128 to 127) when the bit depth of the pixel is 8 bits (the range of the pixel is 0 to 255). In general, a memory called a RAM (an SRAM, a DRAM, or a DDRAM) stores information in units of 8 bits. Therefore, when a pixel bit width is 8 bits, that is, the pixel bit width is used most efficiently, the fact that the range of the residual to be stored can be restricted to 8 bits results in the advantageous effect of reducing a memory amount. The restriction and reading of the range of the residual contributes to reduction in a bandwidth necessary to execute memory transmission at the time of the reading from the residual storage section 313 and also improvement in a reading speed.

The range of the residual may be restricted not when the residual is read by the residual acquisition section 30921 but when the residual is stored by the residual storage section 313.

Hereinafter, the residual prediction section 3092A which is a modification example of the residual prediction section 3092 will be described. The residual prediction section 3092A is configured to include a residual acquisition section 30921A and a residual filter section 30922. In the modification example of the residual prediction section 3092, only differences from the above-described residual prediction section 3092 will be described. The description of the same operation will be omitted. When the residual of the reference layer is read, the residual acquisition section 30921A according to the modification example refers to only the pixels located at positions at which the resolution in the horizontal direction or/and the vertical direction is decimated to 1/N (here, N is a predetermined magnification). More specifically, the lower bits are neglected by right shifting the coordinates at which the residual is read by predetermined bits (here, K) and left shifting the coordinates by the predetermined bits K. The residual at the position at which the lower bits are neglected is not read. Here, a relation between the predetermined magnification N and K is N=(1<<K). For example, when the magnification N is double, K=1 is used.

The residual acquisition section 30921A derives the coordinates xR0 and xR1 by the shift operation in which the lower K bits of the coordinates are neglected, derives weight coefficients w0 and w1 from the coordinates xx before the neglect of the lower K bits and the coordinates xxx after the neglect of the lower K bits, and obtains a predicted residual delta$_L$ through linear prediction by the following expression.

$$xx=(xP<<2)+(x<<2)+\text{mvDisp}[0]$$

$$xxx=(xx>>(K+2))<<(K+2)$$

$$xR0=\text{Clip3}(0,\text{PicWidthInSamples}_L-1,xxx)$$

$$xR1=\text{Clip3}(0,\text{PicWidthInSamples}_L-1,xxx+1)$$

$$w0=(1<<(K+2))-(xx-xxx)$$

$$w1=xx-xxx$$

$$\text{delta}_L=(w0*\text{clip3}(x\text{min},x\text{max},\text{refResSamples}_L[xR0,(y>>K)<<K])+w1*\text{clip3}(x\text{min},x\text{max},\text{refResSamples}_L[xR1,(y>>K)<<K]+(1<<(K+1)))))>>(K+2)$$

When a function neglecting the foregoing lower bits is assumed to be f(x)=(x>>K)<<K, f(x)=x &~(1<<(K−1)) can be denoted (the same applies below). Here, indicates a bit NOT operation and & indicates a logical AND operation.

As another simpler configuration, the residual prediction section 3092A may derive the coordinates xR0 and xR1 through the foregoing shift operation of neglecting the lower K bits of the coordinates, derive the weight coefficients w0 and w1 from the coordinates xx before the neglect of the lower bits and the coordinates xxx after the neglect of the lower K bits, and obtain the predicted residual $\text{delta}_L$ through linear prediction by the following expressions.

$$xx=xP+x+(\text{mvDisp}[0]>>2)$$

$$xxx=(xx>>K)<<K$$

$$w0=(1<<(K)-(xx-xxx)$$

$$w1=xx-xxx$$

$$\text{delta}_L=(w0*\text{clip3}(x\text{min},x\text{max},\text{refResSamples}_L[xR0,y>>K)<<K])+w1*\text{clip3}(x\text{min},x\text{max},\text{refResSamples}_L[xR1,(y>>K)<<K]+(1<<(K-1)))))>>K$$

As another simpler configuration, the residual prediction section 3092A may derive the coordinate xR0 through the foregoing shift operation of neglecting the lower K bits of the coordinates and obtain the predicted residual $\text{delta}_L$ by the following expressions.

$$xR0=\text{Clip3}(0,\text{PicWidthInSamples}_L-1,(xP+x+(\text{mvDisp}[0]>>2))>>K)<<K)$$

$$\text{delta}_L=\text{clip3}(x\text{min},x\text{max},\text{refResSamples}_L[xR0,(y>>K)<<K])$$

In the foregoing configuration, only the residual at the position to be referred to may be stored in the residual storage section 313 to be described below by restricting and reading the reference position of the residual. Therefore, it is possible to obtain the advantageous effect of reducing a memory amount for recording the residual.

Hereinafter, a different modification example of the residual prediction section 3092 will be described. When the disparity vector mvDisp has the decimal precision in regard to the luminance component, a residual prediction section 3092B according to the modification example derives a pixel through the linear interpolation and uses neighborhood integer pixel without using the linear interpolation in regard to a chrominance component. Here, the disparity vector mvDisp has not only a horizontal component mvDisp[0] but also a vertical component mvDisp[1].

Figure 67:
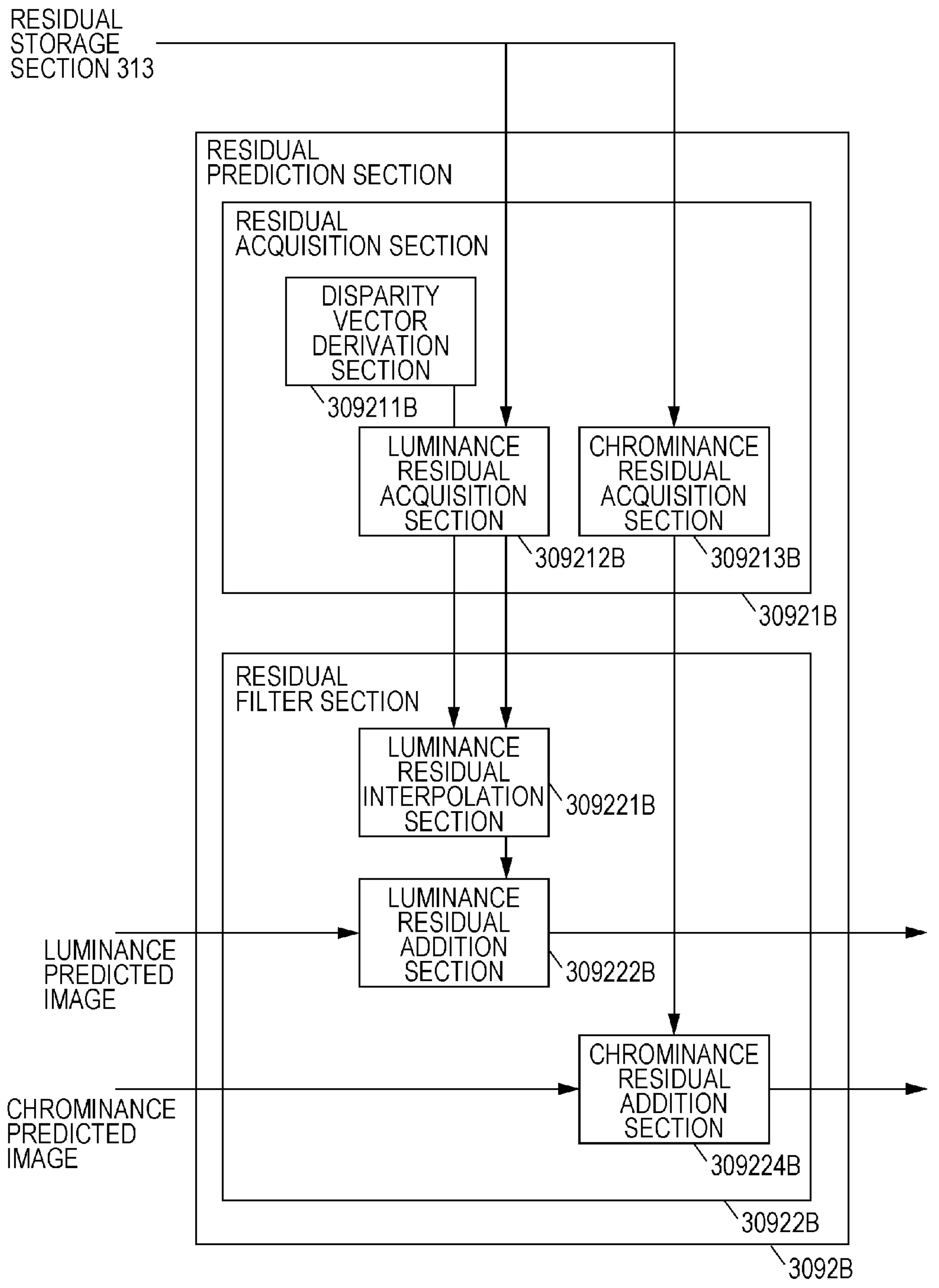
FIG. 67 is a diagram illustrating the configuration of a residual prediction section 3092B according to the embodiment.

FIG. 67 is a diagram illustrating the configuration of a residual prediction section 3092B according to the embodiment. The residual prediction section 3092B includes a residual acquisition section 30921B and a residual filter section 30922B. The residual acquisition section 30921B includes a disparity derivation section 309211B, a luminance residual acquisition section 309212B, and a chrominance residual acquisition section 309213B. The residual filter section 30922B includes a luminance residual interpolation section 309221B, a luminance residual addition section 309222B, and a chrominance residual addition section 309224B.

The disparity derivation section 309211B derives the disparity vector mvDisp with reference to a vector of a block adjacent to the target block and outputs the disparity vector mvDisp to the luminance residual acquisition section 309212B, the chrominance residual acquisition section 309213B, and the luminance residual interpolation section 309221B.

The luminance residual interpolation section 309221B derives weight coefficients w0 and w1 in the horizontal direction of the luminance component and weight coefficients w2 and w3 in the vertical direction thereof based on the decimal precision of the disparity vector mvDisp by the following expressions.

$$w0=\text{mvDisp}[0]\&\ 3$$

$$w1=4-w0$$

$$w2=\text{mvDisp}[1]\&\ 3$$

$$w3=4-w2$$

When the disparity vector mvDisp has quarter-pel precision, a decimal component of the vector is derived through an operation of &3 (which is the same as an operation of %4) of acquiring two lower bits. An integer component of the vector is derived through an operation of >>2 (which is the same as an operation of/4) of removing two lower bits.

The luminance residual interpolation section 309221B derives a predicted residual delta through the linear interpolation in the horizontal and vertical directions by the following expression.

$$\text{delta}=(w2*(w0*\text{refResSample}[xR0,yR0]+w1*\text{refResSample}[xR0+1,yR0]+2)>>2)+w3*(w0*\text{refResSample}[xR0,yR1]+w1*\text{refResSample}[xR0+1,yR1]+2)>>2)+2)>>2$$

Here, refResSample[ ] is a residual stored in the residual storage section 313 and is acquired y the luminance residual acquisition section 309212B. Here, xR0, xR1, yR0, and yR1 indicate coordinates of a reference destination and are derived based on the integer component of the disparity vector mvDisp by the following expressions.

$$xR0=\text{Clip3}(0,\text{PicWidthInSample}L-1,xP+x+(\text{mvDisp}[0]>>2))$$

$$xR1=\text{Clip3}(0,\text{PicWidthInSample}L-1,xR0+1)$$

$$yR0=\text{Clip3}(0,\text{PicHeightInSample}L-1,yP+y+(\text{mvDisp}[1]>>2))$$

$$yR1=\text{Clip3}(0,\text{PicHeightInSample}L-1,yR0+1)$$

The luminance residual addition section 309222B adds the derived predicted residual delta to the predicted image predSampleLX[ ] before the residual prediction and acquires a predicted image predSampleLX'[ ] after the residual prediction.

$$\text{predSample}LX'[x,y]=\text{predSample}LX[x,y]+\text{delta}$$

The linear interpolation is not used for the chrominance component and the chrominance residual acquisition section 309213B derives a predicted residual deltaC directly from the residual stored in the residual storage section 313 by the following expression.

$$\text{delta}C=\text{refResSample}C[xRC0,yRC0]$$

Here, xRC0 and yRC0 are coordinates derived by the following expressions.

$$xRC0=\text{Clip3}(0,\text{PicWidthInSample}L/4-1,xP+x+((\text{mvDisp}[0]+4)>>3))$$

$$yRC0=\text{Clip3}(0,\text{PicWidthInSample}L/4-1,yP+y+((\text{mvDisp}[1]+4)>>3))$$

The chrominance residual addition section 309224B adds the derived predicted residual deltaC to the predicted image predSampleLX[ ] before the residual prediction and acquires a predicted image predSampleLX'[ ] after the residual prediction.

$$predSampleLX'[x,y]=predSampleLX[x,y]+deltaC$$

The residual prediction section 3092B having the foregoing configuration executes the linear interpolation of the residual for only the luminance component in the derivation of the predicted residual and does not execute the linear interpolation of the residual for the chrominance component, and thus it is possible to obtain the advantageous effect of reducing a processing amount used to derive the predicted residual. When the linear interpolation is not executed, a preliminary region necessary for the interpolation is not necessary and a reference range is reduced. Therefore, it is possible to obtain the advantageous effect of reducing a transmission amount of the residual.

In the foregoing description, when the predicted residual of the luminance component is obtained, the linear interpolation in the horizontal and vertical directions is executed. However, as will be described below, only the linear interpolation in the horizontal direction may be configured to be executed. In this case, the weight coefficients w0 and w1 in the horizontal direction are derived from the decimal component of the disparity vector mvDisp in the horizontal direction.

$$w0=mvDisp[0]\&\ 3$$

$$w1=4-w0$$

Subsequently, the predicted residual delta is derived through the linear interpolation in the horizontal direction by the following expression.

$$delta=(w0*refResSample[xR0,yR0]+w1*refResSample[xR0+1,yR0]+2)>>2$$

Here, xR0, xR1, and yR0 are coordinates of the residual derived by the following expression.

$$xR0=Clip3(0,PicWidthInSampleL-1,xP+x+(mvDisp[0]>>2))$$

$$xR1=Clip3(0,PicWidthInSampleL-1,xR0+1)$$

$$yR0=Clip3(0,PicHeightInSampleL-1,yP+y+((mvDisp[1]+2)>>2))$$

Figure 68:
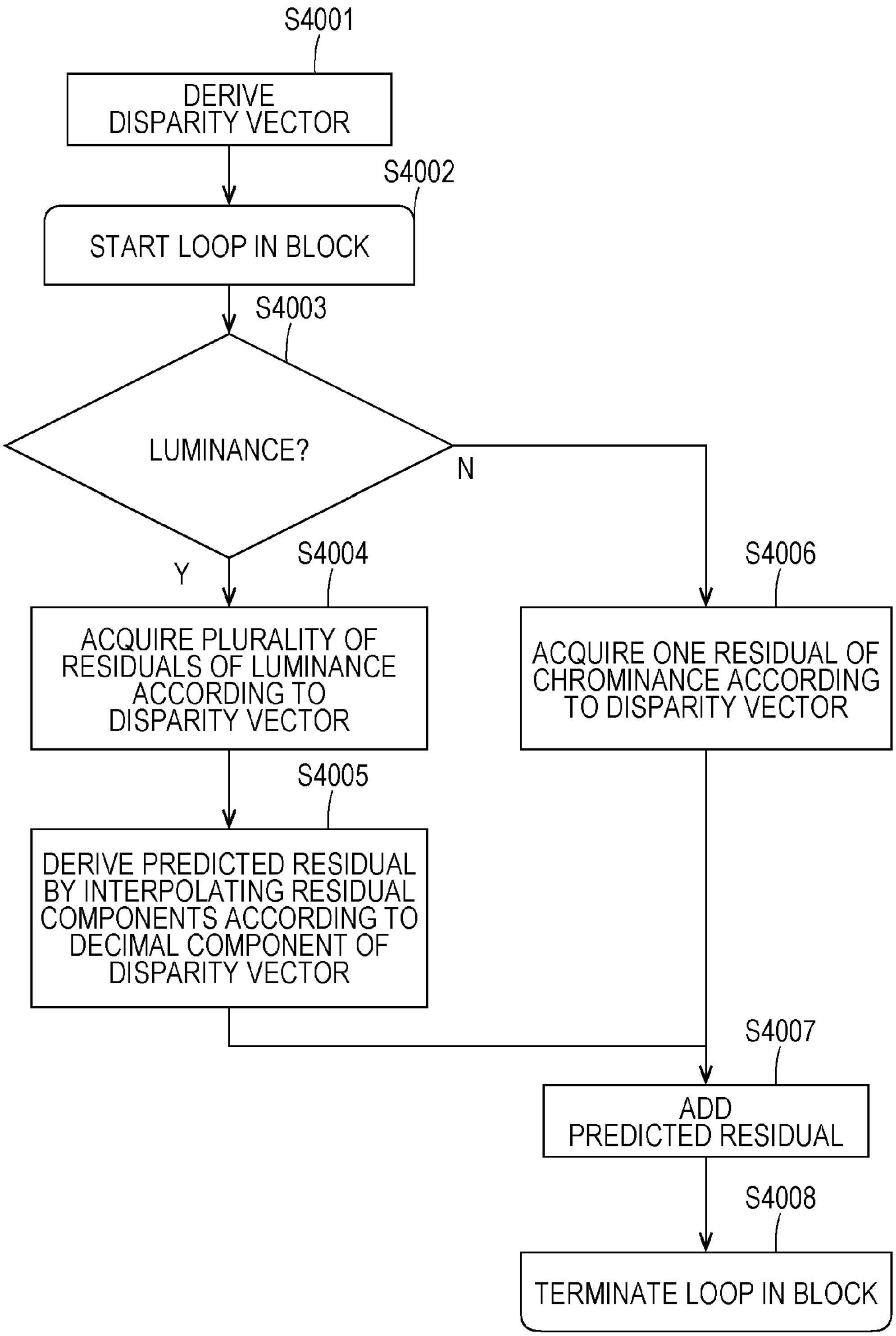
FIG. 68 is a flowchart illustrating an operation of the residual prediction section 3092B according to the embodiment.

FIG. 68 is a flowchart illustrating an operation of the residual prediction section 3092B according to the embodiment.

S4001: The disparity derivation section 309211B derives the disparity vector mvDisp.

S4002: Loop for the pixels in the prediction block starts. When the prediction block is present as a block of nW×nH, the loop is executed nW×nH times.

S4003: It is determined whether the prediction block has a luminance component or a chrominance component. In the case of the luminance component, the operation transitions to S4004. In the case of the chrominance component, the operation transitions to S4005.

S4004: The luminance residual acquisition section 309212B acquires a plurality of residuals of the luminance.

S4005: The luminance residual interpolation section 309221B derives the predicted residual by interpolating the plurality of acquired residuals based on the decimal component of the disparity vector mvDisp.

S4006: The chrominance residual acquisition section 309213B acquires one residual of the chrominance and derives the predicted residual.

S4007: The luminance residual addition section 309222B or the chrominance residual addition section 309224B adds the predicted residual derived in S4005 or S4006 to the predicted image.

S4008: The loop for the pixels in the prediction block ends.

The residual prediction section 3092B having the foregoing configuration executes the linear interpolation of the residual on the horizontal component in regard to the luminance component and does not execute the linear interpolation of the residual on the vertical component in the derivation of the predicted residual. It is possible to obtain the advantageous effect of reducing a processing amount used to derive the predicted residual. A preliminary region necessary for the linear interpolation in the vertical direction is not necessary and a reference range is reduced. Therefore, it is possible to obtain the advantageous effect of reducing a transmission amount of the residual.

Hereinafter, a different modification example of the residual prediction section 3092 will be described. When the residual prediction is executed on the luminance component and the chrominance component, a residual prediction section 3092C according to the modification example refers the residual component using (clipping) different restriction according to the luminance component and the chrominance component.

Figure 69:
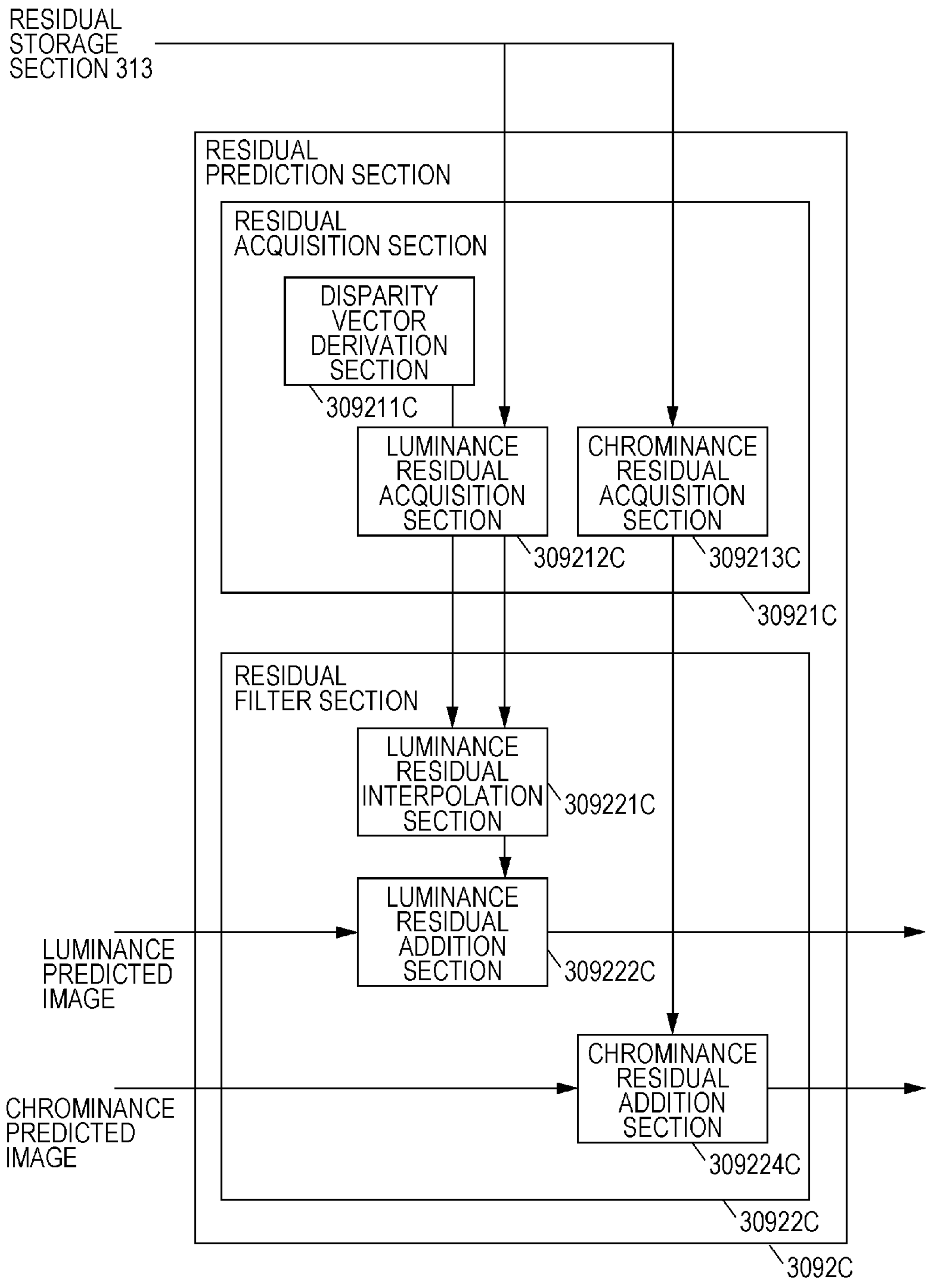
FIG. 69 is a diagram illustrating the configuration of a residual prediction section 3092C according to the embodiment.

FIG. 69 is a diagram illustrating the configuration of the residual prediction section 3092C according to the embodiment. The residual prediction section 3092C includes a residual acquisition section 30921C and a residual filter section 30922C. The residual acquisition section 30921C includes a disparity derivation section 309211C, a luminance residual acquisition section 309212C, and a chrominance residual acquisition section 309213C. The residual filter section 30922C includes a luminance residual interpolation section 309221C, a luminance residual addition section 309222C, and a chrominance residual addition section 309224C.

The disparity derivation section 309211C derives the disparity vector mvDisp with reference to a vector of a block adjacent to the target block and outputs the disparity vector mvDisp to the luminance residual acquisition section 309212C, the chrominance residual acquisition section 309213C, and the luminance residual interpolation section 309221C.

The luminance residual interpolation section 309221C derives weight coefficients w0 and w1 in the horizontal direction of the luminance component and weight coefficients w2 and w3 in the vertical direction thereof based on the decimal precision of the disparity vector mvDisp by the following expressions.

$$w0=mvDisp[0]\&\ 3$$

$$w1=4-w0$$

$$w2=mvDisp[1]\&\ 3$$

$$w3=4-w2$$

The luminance residual interpolation section 309221C derives the predicted residual delta through the linear interpolation in the horizontal and vertical directions by the following expression.

$$\text{delta}=(w2*(w0*\text{refResSample}X[xR0,yR0]+w1*\text{refResSample}X[xR0+1,yR0]+2)>>2)+w3*(w0*\text{refResSample}X[xR0,yR1]+w1*\text{refResSample}X[xR0+1,yR1]+2)>>2)+2)>>2$$

Here, refResSample[ ] is a residual acquired by the luminance residual acquisition section 309212C. Here, xR0, xR1, yR0, and yR1 indicate coordinates of the residual which is assumed to be a reference destination derived based on the integer component of the disparity vector mvDisp.

The luminance residual acquisition section 309212C restricts (clips) the range of the residual by the following expression when the residual is referred to from the residual storage section 313.

$$\text{refResSample}X[x,y]=\text{Clip3}(l\text{min},l\text{max},\text{refResSample}[x,y])$$

Here, for xmin and xmax, the following expressions are used.

$$l\text{min}=-(1<<(\text{bitDepth}Y-KY))$$

$$l\text{max}=1<<(\text{bitDepth}Y-KY)$$

Here, KY is an integer and is one of 1, 2, 3, and 4.

For the chrominance component, the chrominance residual acquisition section 309213C derives the predicted residual deltaC by the following expression.

$$\text{delta}C=\text{refResSample}CX[xRC0,yRC0]$$

Here, xRC0 and xRC1 are coordinates of the residual derived by the above-described expressions. Further, refResSampleXC is a residual after the clipping by the following expression.

The chrominance residual acquisition section 309213C derives the predicted residual deltaC by the residual obtained in a different clip range different from the luminance by the following expression when the residual is referred to from the residual storage section 313.

$$\text{refResSample}XC[x,y]=\text{Clip3}(c\text{min},c\text{max},\text{refResSample}C[x,y])$$

Here, for cmin and cmax, the following expressions are used.

$$c\text{min}=-(1<<(\text{bitDepth}C-KC))$$

$$c\text{max}=1<<(\text{bitDepth}C-KC)$$

Here, KC is an integer satisfying KC>KY.

Figure 70:
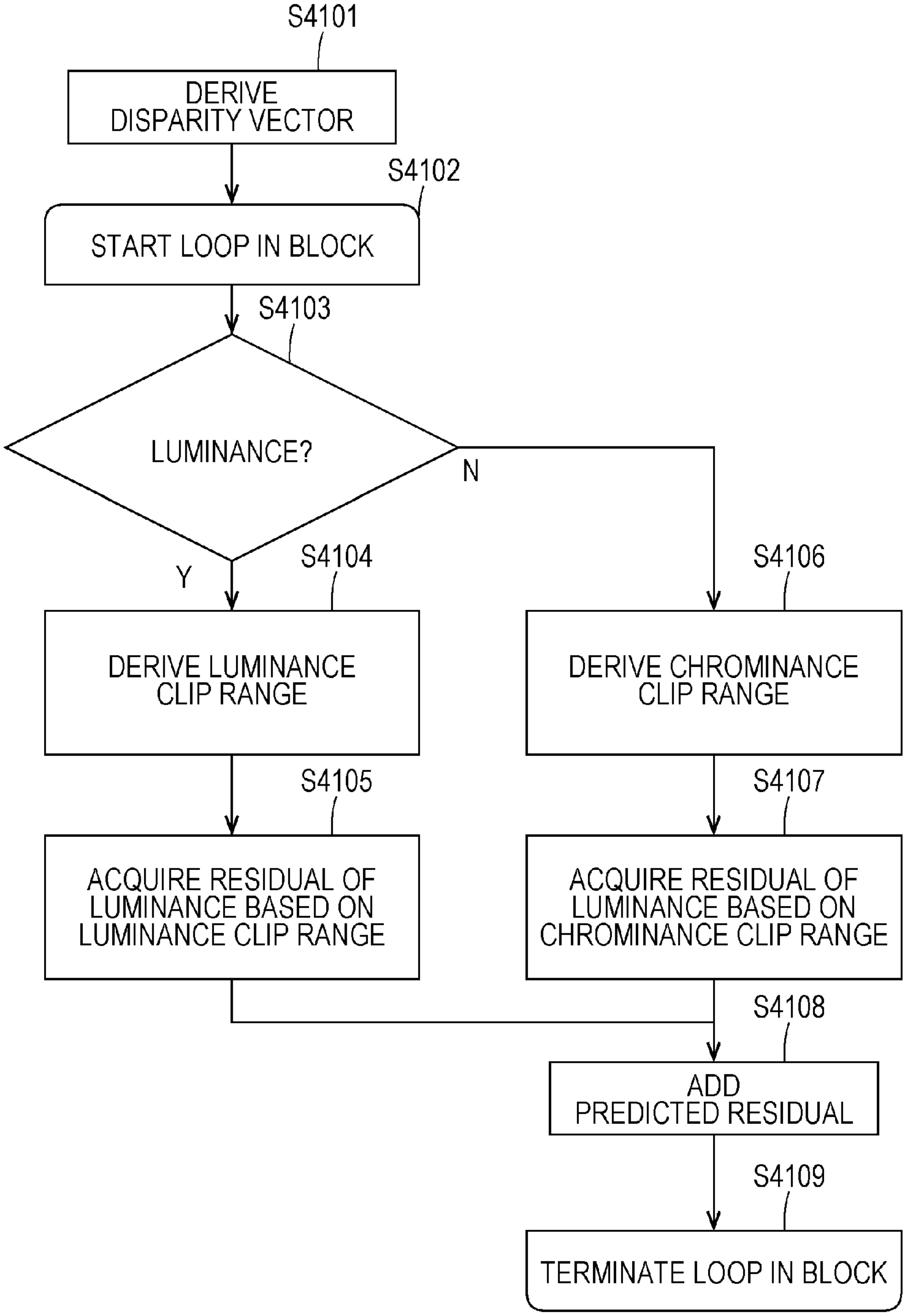
FIG. 70 is a flowchart illustrating an operation of the residual prediction section 3092C according to the embodiment.

FIG. 70 is a flowchart illustrating an operation of the residual prediction section 3092C.

S4101: The disparity derivation section 309211C derives the disparity vector mvDisp.

S4102: Loop for the pixels in the prediction block starts. When the prediction block is present as a block of nW×nH, the loop is executed nW×nH times.

S4103: It is determined whether the prediction block has a luminance component or a chrominance component. In the case of the luminance component, the operation transitions to S4104. In the case of the chrominance component, the operation transitions to S4105.

S4104: The luminance residual acquisition section 309212C derives the clip range of the luminance residual.

S4105: The luminance residual acquisition section 309212C restricts the derived clip range and the residual of the luminance is referred to from the residual storage section 313. The predicted residual is derived from the referred residual.

S4106: The luminance residual acquisition section 309212C derives the clip range of the chrominance residual.

S4107: The luminance residual acquisition section 309212C restricts the derived clip range and the residual of the chrominance is referred to from the residual storage section 313. The predicted residual is derived from the referred residual.

S4108: The luminance residual addition section 309222C or the chrominance residual addition section 309224C adds the predicted residual derived in S4105 or S4107 to the predicted image.

S4109: The loop for the pixels in the prediction block ends.

The residual prediction section 3092C having the foregoing configuration can reduce the number of bits necessary for the residual of the chrominance component in the derivation of the predicted residual. Therefore, it is possible to obtain the advantageous effect of reducing a memory size for storing the residual of the chrominance component.

Further, in particular, when KC=5, the residual can be stored with 4 bits in decoding of the chrominance component in which a bit depth is 8 bits. In this case, two pieces of chrominance can be packed in the range of 8 bits. Therefore, when the residual is stored in a general RAM in which access is executed in units of 8 bits, it is possible to obtain the advantageous effect of reducing a memory size.

Hereinafter, a further different modification example of the residual prediction section 3092 will be described. The residual prediction section 3092D according to the modification example executes the residual prediction on only the luminance component and does not execute the residual prediction on the chrominance component.

Figure 71:
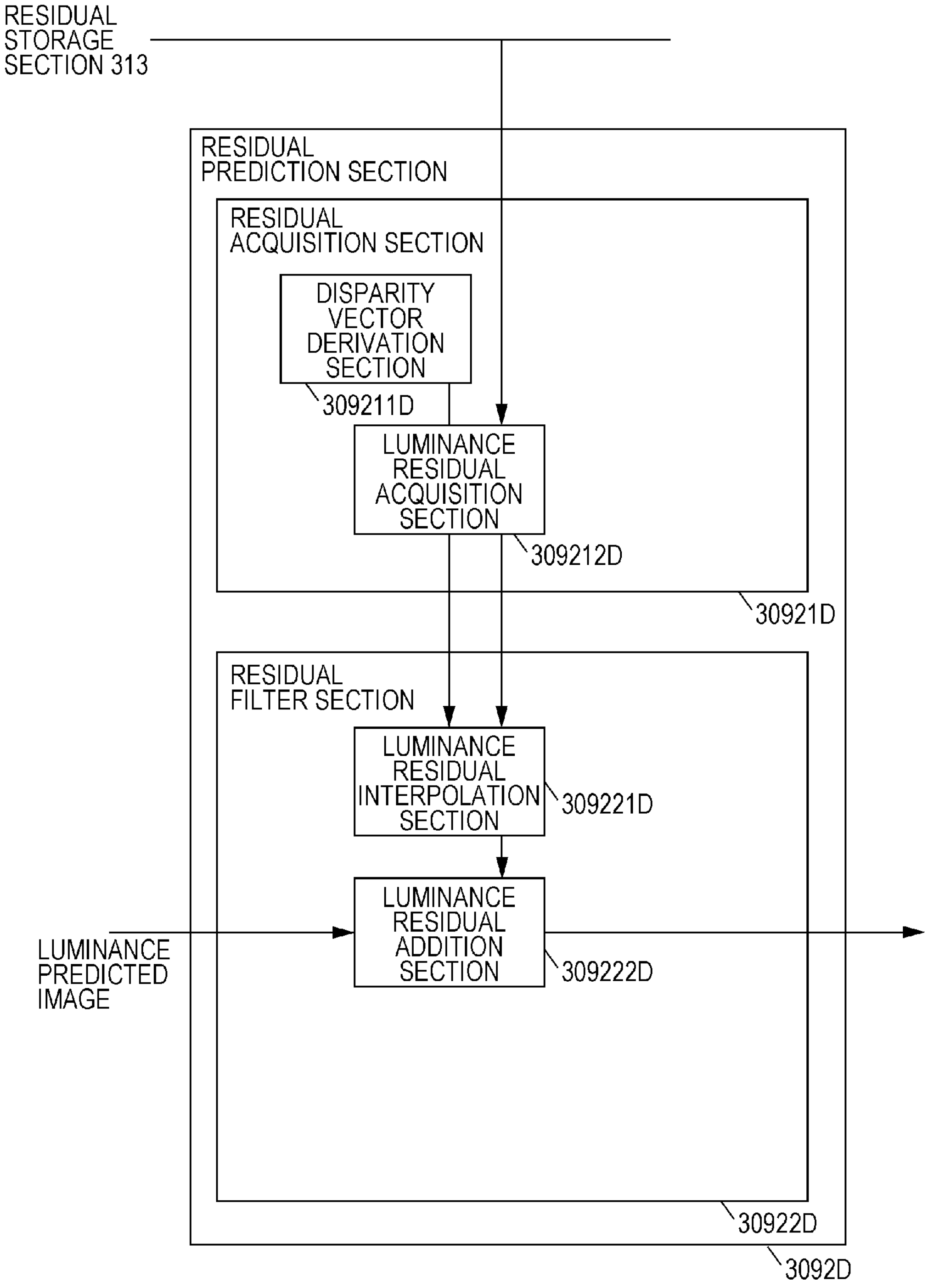
FIG. 71 is a diagram illustrating the configuration of a residual prediction section 3092D according to the embodiment.

FIG. 71 is a diagram illustrating the configuration of the residual prediction section 3092D according to the embodiment. The residual prediction section 3092D includes a residual acquisition section 30921D and a residual filter section 30922D. The residual acquisition section 30921D includes a disparity derivation section 309211D and the luminance residual acquisition section 309212D. The residual filter section 30922D includes a luminance residual interpolation section 309221D and the luminance residual addition section 309222D.

The disparity derivation section 309211D derives the disparity vector mvDisp with reference to a vector of a block adjacent to the target block and outputs the disparity vector mvDisp to the luminance residual acquisition section 309212D and the luminance residual interpolation section 309221D.

The luminance residual interpolation section 309221D derives weight coefficients w0 and w1 in the horizontal direction of the luminance component and weight coefficients w2 and w3 in the vertical direction thereof based on the decimal precision of the disparity vector mvDisp by the following expressions.

$$w0=\text{mvDisp}[0]\&\ 3$$

$$w1=4-w0$$

$$w2=\text{mvDisp}[1]\&\ 3$$

$$w3=4-w2$$

The luminance residual interpolation section 309221D derives the predicted residual delta through the linear interpolation in the horizontal and vertical directions by the following expression.

$$\text{delta}=(w2*(w0*\text{refResSample}X[xR0,yR0]+w1*\text{refResSample}X[xR0+1,yR0]+2)>>2)+w3*(w0*\text{refResSample}X[xR0,yR1]+w1*\text{refResSample}X[xR0+1,yR1]+2)>>2)+2)<<2$$

Here, refResSample[ ] is a residual acquired by the luminance residual acquisition section 309212D. Here, xR0, xR1, yR0, and yR1 indicate coordinates of the residual derived based on the integer component of the disparity vector mvDisp.

The luminance residual acquisition section 309212D restricts (clips) the range of the residual by the following expression when the residual is referred to from the residual storage section 313.

$$refResSampleX[x,y]=\text{Clip3}(l\min,l\max,refResSample[x,y])$$

Here, for xmin and xmax, the following expressions are used.

$$l\min=-(1<<(\text{bitDepth}Y-KY))$$

$$l\max=1<<(\text{bitDepth}Y-KY)$$

Here, KY is an integer and is one of 1, 2, 3, and 4.

The luminance residual addition section 309222D adds the predicted residual delta to the predicted image predSampleLX[ ] before the residual prediction and acquires a predicted image predSampleLX'[ ] after the residual prediction.

$$\text{predSample}LX'[x,y]=\text{predSample}LX[x,y]+\text{delta}$$

The residual prediction is not executed on the chrominance component unlike the luminance.

Figure 72:
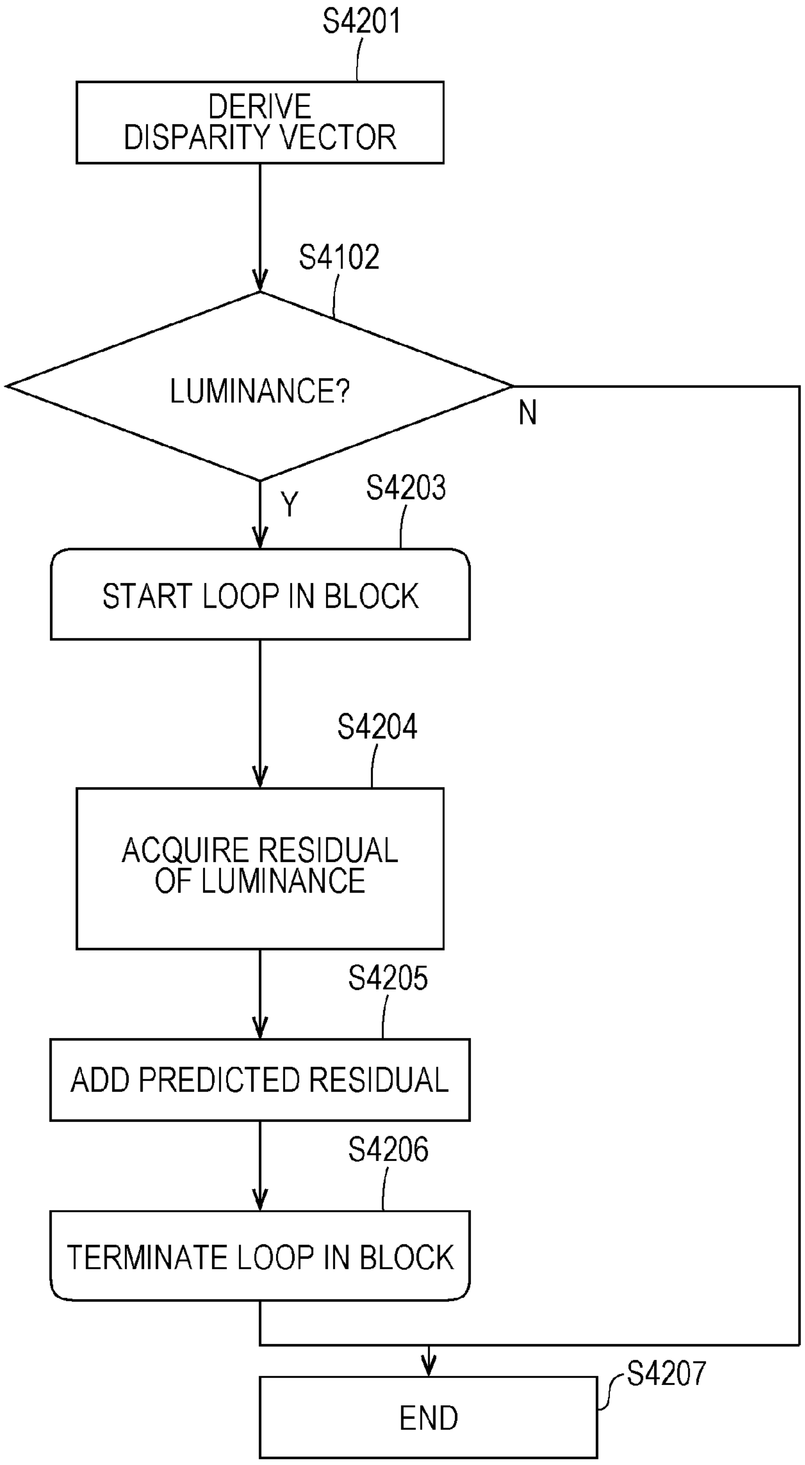
FIG. 72 is a flowchart illustrating an operation of the residual prediction section 3092D according to the embodiment.

FIG. 72 is a flowchart illustrating an operation of the residual prediction section 3092D according to the embodiment.

S4201: The disparity derivation section 309211D derives the disparity vector mvDisp.

S4202: It is determined whether the prediction block has a luminance component or a chrominance component. In the case of the luminance component, the operation transitions to S4203 and the residual prediction is executed. In the case of the chrominance component, the residual prediction is not executed and the operation transitions to S4207.

S4203: Loop for the pixels in the prediction block starts. When the prediction block is present as a block of nW×nH, the loop is executed nW×nH times.

S4204: The predicted residual is derived with reference to the residual of the luminance from the residual storage section 313.

S4205: The luminance residual addition section 309222C adds the predicted residual derived in S4103 to the predicted image.

S4206: The loop for the pixels in the prediction block ends.

S4207: The operation of the residual prediction section 3092D ends.

In the residual prediction section 3092D having the foregoing configuration, it is possible to obtain the advantageous effect of omitting a memory size for storing the residual of the chrominance component in the derivation of the prediction residual.

(Illumination Compensation)

When the illumination compensation flag ic_enable_flag is 1, the illumination compensation section 3093 executes illumination compensation on the input motion disparity compensated image predSamplesLX. When the illumination compensation flag ic_enable_flag is 0, the input motion disparity compensated image predSamplesLX is output without change. The motion disparity compensated image predSamplesLX input to the illumination compensation section 3093 is an output image of the motion disparity compensation section 3091 when the residual prediction is turned off. The motion disparity compensated image predSamplesLX is an output image of the residual prediction section 3092 when the residual prediction is turned on. The illumination compensation is executed based on the assumption that a change in a pixel value of a motion disparity image of an adjacent region adjacent to a target block which is a predicted image generation target with respect to a decoded image of the adjacent region is similar to a change in the pixel value in the target block with respect to the original image of the target block.

The illumination compensation section 3093 is configured to include an illumination parameter estimation section 30931 and an illumination compensation filter section 30932 (none of which is illustrated).

Figure 13:
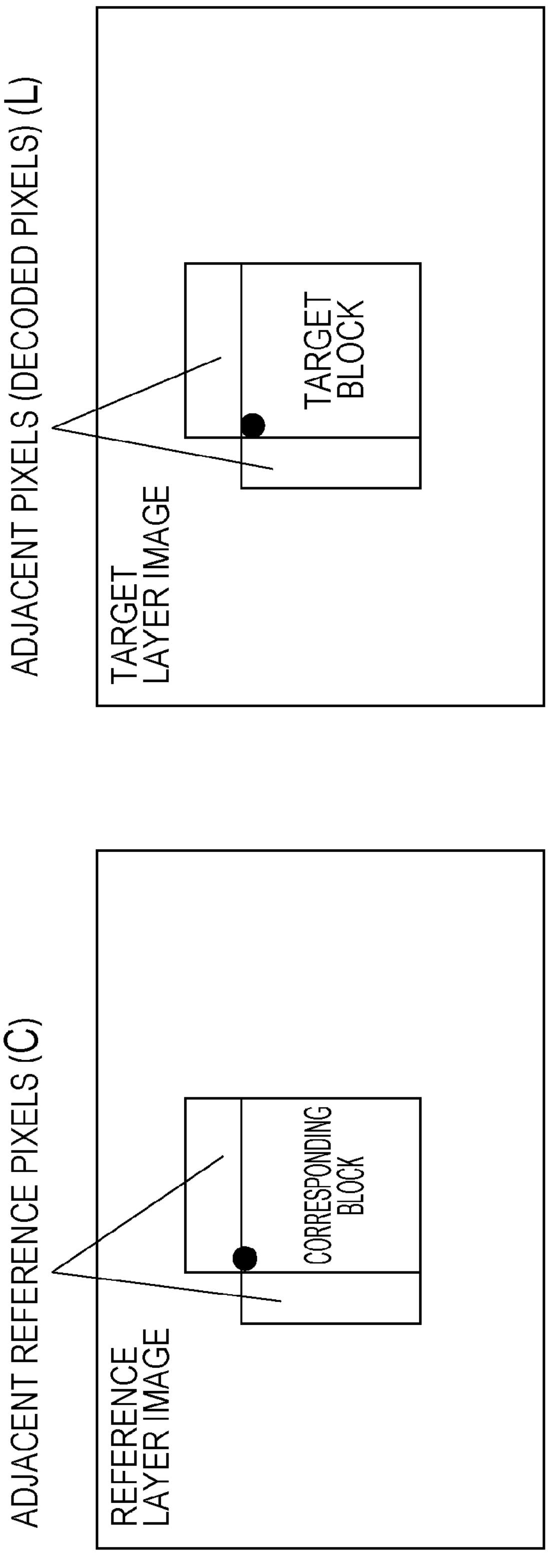
FIG. 13 is a conceptual diagram illustrating illumination compensation according to the embodiment.

The illumination parameter estimation section 30931 obtains the estimation parameters to estimate the pixels of a target block (target prediction unit) from the pixels of a reference block. FIG. 13 is a diagram illustrating the illumination compensation. In FIG. 13, the positions of pixels C which are in the neighbor of the reference block on the reference layer image and are located at positions deviated by the disparity vector from the target block from pixels L in the neighbor of the target block are illustrated.

The illumination parameter estimation section 30931 obtains the estimation parameters (illumination change parameters) a and b from the pixels L (L0 to LN−1) in the neighbor of the target block and the pixels C (C0 to CN−1) in the neighbor of the reference block using the least-squares method by the following expressions.

$$LL=\Sigma Li\times Li$$

$$LC=\Sigma Li\times Ci$$

$$L=\Sigma Li$$

$$C=\Sigma Ci$$

$$a=(N*LC-L*C)/(N*CC-C*C)$$

$$b=(LL*C-LC*L)/(N*CC-C*C)$$

Here, Σ is a function for addition for i. Here, i is a variable from 0 to N−1.

When the foregoing estimation parameters are decimal, it is necessary to execute a decimal operation in the foregoing expressions. As for a device, the estimation parameters and derivations of the parameters are preferably integers.

Hereinafter, a case in which the estimation parameters are integers will be described. The illumination compensation section 3093 derives estimation parameters (illumination change parameters) icaidx, ickidx, and icbidx by the following expressions.

$$k3=\text{Max}(0,\text{bitDepth}+\text{Log }2(nCbW>>nSidx)-14)$$

$$k2=\text{Log }2((2*(nCbW>>nSidx))>>k3)$$

$$a1=(LC<<k2)-L*C$$

$$a2=(LL<<k2)-L*L$$

$$k1=\text{Max}(0,\text{Log }2(\text{abs}(a2))-5)-\text{Max}(0,\text{Log }2(\text{abs}(a1))-14)+2$$

$$a1s=a1>>\text{Max}(0,\text{Log }2(\text{abs}(a1))-14)a2s=\text{abs}(a2>>\text{Max}(0,\text{Log }2(\text{abs}(a2))-5))$$

$$a3=a2s<1?0:\text{Clip3}(-215,215-1,(a1s*\text{icDivCoeff}+(1<<(k1-1)))>>k1)$$

icaidx=$a3$>>Max(0,Log 2(abs($a3$))−6)

ickidx=13−Max(0,Log 2(abs(icaidx))−6)

icbidx=($L$−((icaidx*$C$)>>$k1$)+(1<<($k2$−1)))>>$k2$

Here, bitDepth is a bit width (normally, 8 to 12) of the pixels, nCbW is the width of the target block, Max (x, y) is a function obtaining the maximum values of x and y, Log 2 (x) is a function obtaining a logarithm 2 of x, abs(x) is a function that obtains the absolute value of x. Further, icDivCoeff is a table illustrated in FIG. 42 for deriving a predetermined integer when a2$s$ is an input.

The illumination compensation filter 30932 included in the illumination compensation section 3093 derives pixels for which illumination change is compensated from target pixels using the estimation parameters derived by the illumination parameter estimation section 30931. For example, when the estimation parameters are decimals a and b, the pixels are obtained by the following expressions.

predSamples[$x$][$y$]=$a$*predSamples[$x$][$y$]+$b$

Here, predSamples is a pixel at coordinates (x, y) in the target block.

When the estimation parameters are the above-described integers icaidx, ickidx, and icbidx, the pixels are obtained by the following expression.

predSamples[$x$][$y$]=Clip3(0,(1<<bitDepth)−1,((((predSamples$L$0[$x$][$y$]+offset1)>>shift1)*$ica$0)>>$ick$0)+$icb$0)

Hereinafter, an illumination compensation section 3093B which is a modification example of the illumination compensation section 3093 will be described.

Figure 73:
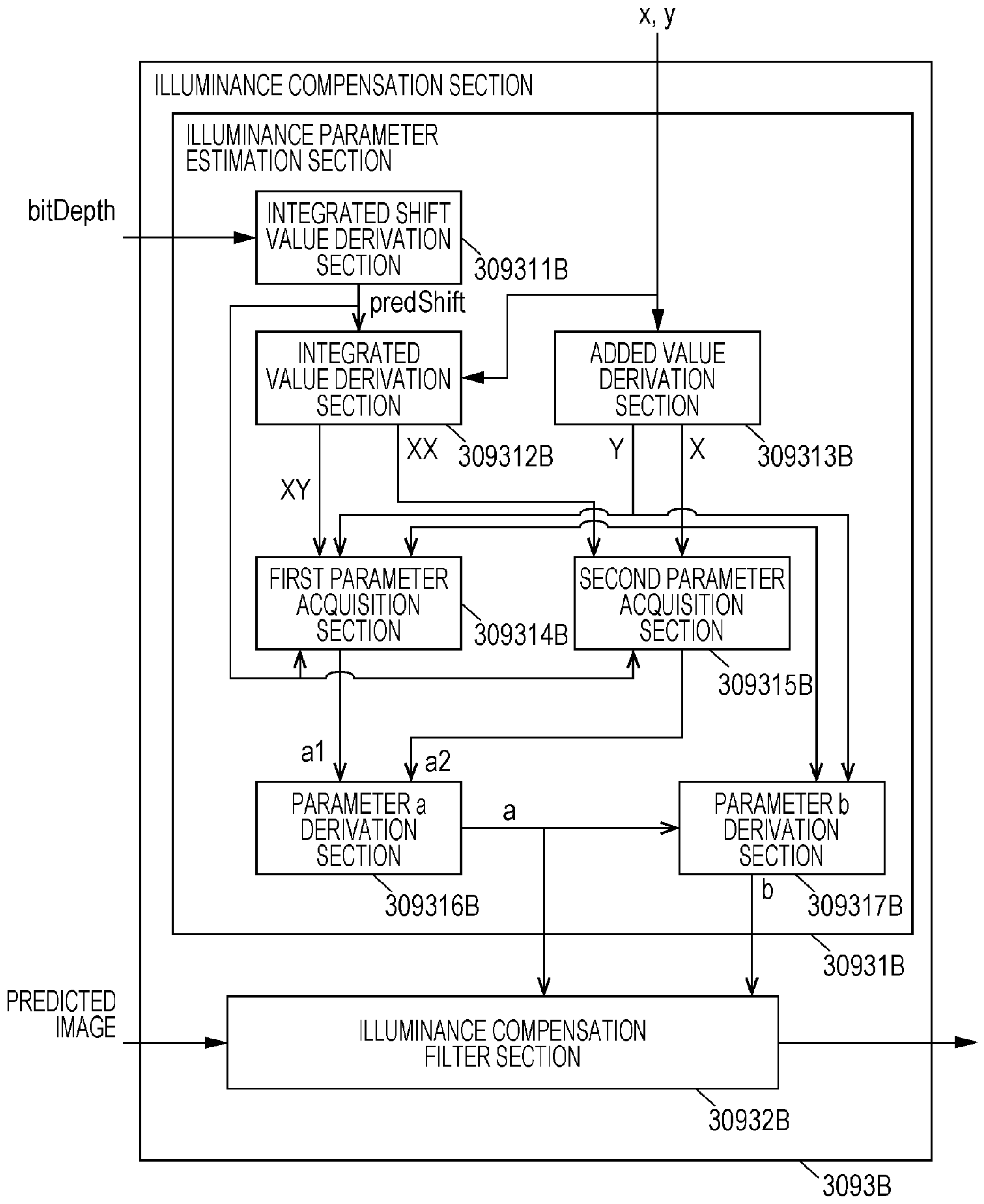
FIG. 73 is a block diagram illustrating the configuration of an illumination compensation section 3093B according to the embodiment.

FIG. 73 is a block diagram illustrating the configuration of the illumination compensation section 3093B according to the embodiment. The illumination compensation section 3093B is configured to include an illumination parameter estimation section 30931B and an illumination compensation filter section 30932B. The illumination parameter estimation section 30931B is configured to include an integrated shift value derivation section 309311B, an integrated value derivation section 309312B, an added value derivation section 309313B, a first parameter derivation section 309314B, a second parameter derivation section 309315B, a parameter a derivation section 309316B, and a parameter b derivation section 309317B.

The illumination parameter estimation section 30931B denotes the pixels C in the neighbor of the reference block on the reference layer image illustrated in FIG. 13 as pixel values x[ ] of the reference image, denotes the pixels L in the neighbor of the target block as pixel values y[ ] of the decoded image, and derives the parameters a and b which are parameters when the pixel values y[ ] of the decoded image are linearly predicted from the pixel values x of the reference image, based on the pixel values x[ ] of the reference image and the pixel values y[ ] of the decoded image.

When the bit depth bitDepth of a pixel is greater than a predetermined integer (here, 12) as in expression (B-1) below, the integrated shift value derivation section 309311B derives an integrated shift value precShift by the greater value as an integrated shift value precShift. When the bit depth bitDepth is not greater than the predetermined integer, the integrated shift value precShift is set to 0.

precShift=Max(0,bitDepth−12) expression (B-1)

The derived integrated shift value precShift is output to the integrated value derivation section 309312B, the first parameter derivation section 309314B, and the second parameter derivation section 309315B.

The added value derivation section 309313B derives a sum Y of the pixel values y of the decoded image and a sum X of the pixel values x of the reference image by expression (B-2) and expression (B-3) below.

The integrated value derivation section 309312B derives a sum XY of the products of the pixel values y of the decoded image and the pixel values x of the reference image and a sum XX of the squares of the pixel values of the reference image by expression (B-4) to expression (B-5) below. At this time, the integrated value derivation section 309312B executes right shift by the integrated shift value precShift and then executes addition at the time of the derivation of the sum XY of the products of the pixel values y of the decoded image and the pixel values x of the reference image and the time of the derivation of the sum XX of the squares of the pixel values x of the reference image. Before the following sum, X, Y, XY, and XX are initialized to 0.

$X=\Sigma x[i]$ expression (B-2)

$Y=\Sigma y[i]$ expression (B-3)

$XX$+=$E$($x$[$i$]*$x$[$i$])>>precShift expression (B-4)

$XY$+=$E$($y$[$i$]*$y$[$i$])>>precShift expression (B-5)

Here, Σ is a sum in regard to a reference region and a sum for an index i specifying a pixel of the reference region is derived. Here, y[i] is a pixel value at the index i of the decoded image and x[i] is a pixel value at the index i of the reference image. The count shift value iCountShift is a logarithm 2 with the size (the number of pixels) of the reference region.

$i$CountShift=log 2(the number of pixels of reference region) expression (B-6)

In the related art, the integrated values XX and XY are derived by the following operation.

$XX$+=$E$($x$[$i$]*$x$[$i$]) expression (B-4')

$XY$+=$E$($x$[$i$]*$y$[$i$]) expression (B-5')

In this case, the number of bits necessary for an operation is a double of the bit depth bitDepth of the pixels and a logarithm 2 (the maximum value of the count shift iCountShift) of the size of a reference region. When the maximum value of a luminance block size is 64, the maximum value of the size of the reference region is 128. From logarithm 2 of 128, the maximum value of the count shift iCountShift is 7. Accordingly, the necessary number of bits is bitDepth*2+7. Here, the following expression can be obtained in consideration of a range in which the number of bits can be calculated for 32 bits.

bitDepth*2+7<=32

When this expression is solved, "bitDepth<=12" can be obtained. That is, when bitDepth is equal to or less than 12, the number of bits is not greater than 32 bits. In contrast, when bitDepth is greater 12, the number of bits is greater the range of 32 bits. Expression (B-1) can be obtained from this result. When bitDepth is greater 12, "bitDepth−12" corresponding to the greater value is derived as the integrated shift value precShift. Further, in expression (B-4) and expression (B-5), by executing shift by the integrated shift value precShift in advance and then executing addition, it is possible to obtain the advantageous effect of preventing the number of bits from being greater than the range of 32 bits.

The first parameter derivation section 309314B derives a first parameter a1 by the following expression from a difference between the sum XY of the products of the pixel values y of the decoded image and the pixel values x of the reference image and the product of the sum Y of the pixel values of the decoded image and the sum X of the pixel values of the reference image.

$$a1=(XY<<iCountShift)-(Y*X)>>precShift \quad \text{expression (B-7)}$$

As denoted in expression (B-7), the difference is calculated by left shifting XY by the count shift value iCountShift and right shifting the product of Y and X by the integrated shift value precShift.

The second parameter derivation section 309315B derives a second parameter a2 by the following expression from a difference between the sum XX of the squares of the pixel values of the reference image and the squares of the sum X of the pixel values of the reference image.

$$a2=(XX<<iCountShift)-(X*X)>>precShift \quad \text{expression (B-8)}$$

As denoted in expression (B-8), the difference is calculated by left shifting XX by the count shift value iCountShift and right shifting the product of X and X by the integrated shift value precShift.

The first parameter derivation section 309314B and the second parameter derivation section 309315B right shifts the parameters a1 and a2 by a predetermined fixed parameter shift value (here, 4) when a sum of the count shift value iCountShift and double of the bit depth bitDepth is equal to or greater than a predetermined value (here, 27). That is, the following step is executed.

```
if (iCountShift + bitDepth * 2 >= 27) expression (B-9)
{
a1 >>= 4        expression (B-10)
a2 >>= 4        expression (B-11)
}
```

The derived first parameter a1 and second parameter a2 are output to the parameter a derivation section 309316B.

Figure 74:
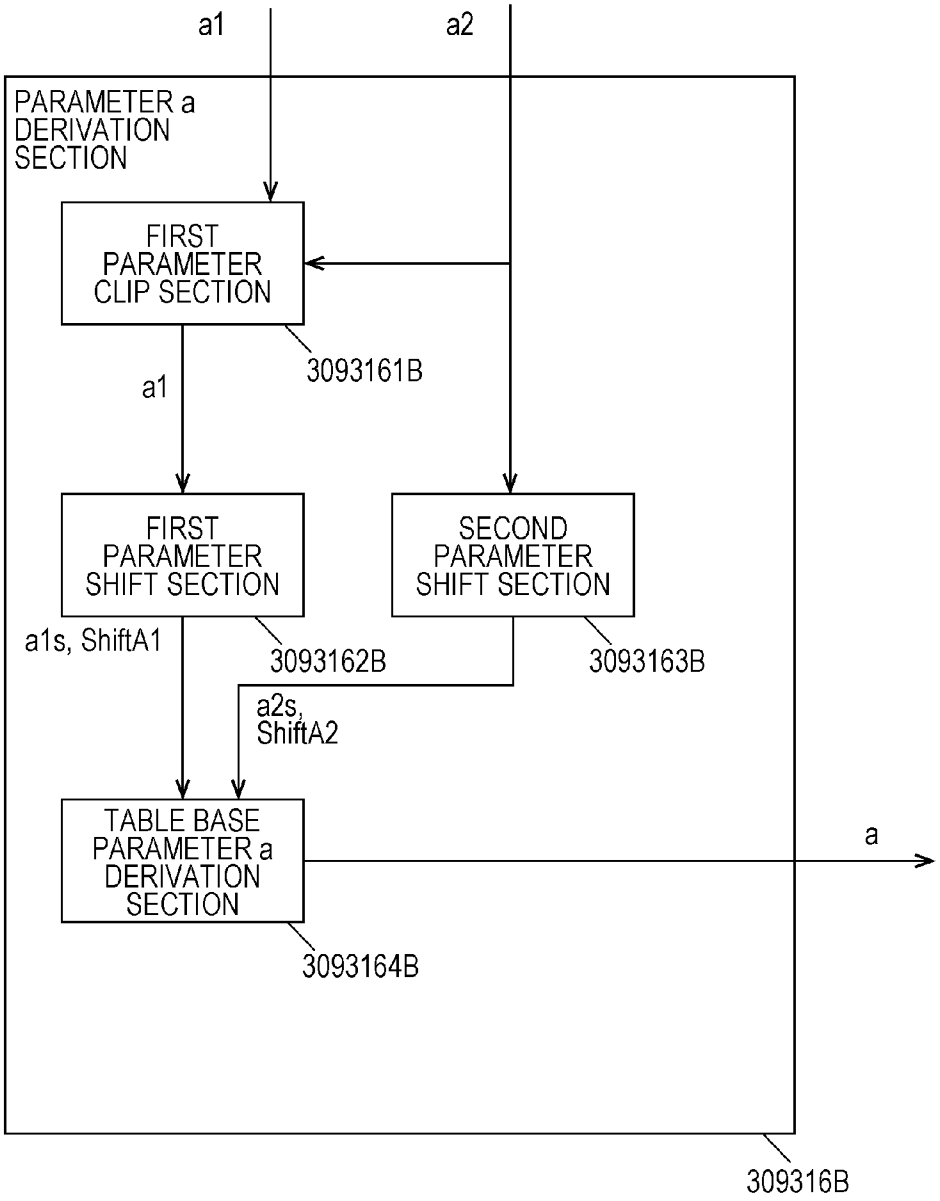
FIG. 74 is a block diagram illustrating the configuration of a parameter a derivation section 309316B according to the embodiment.

FIG. 74 is a block diagram illustrating the configuration of a parameter a derivation section 309316B according to the embodiment. The parameter a derivation section 309316B is configured to include a first parameter clip section 3093161B, a first parameter shift section 3093162B, a second parameter shift section 3093163B, and a table base parameter a derivation section 3093164B.

The first parameter clip section 3093161B restricts the first parameter a1 to the size of the second parameter a2. For example, a1 is clipped to a value equal to or greater than 0 and equal to or less than double of a2 as in the following expression.

$$a1=\mathrm{Clip3}(0,2*a2,a1) \quad \text{expression (B-12)}$$

A value of a1/a2 is clipped to a value from 0 to 2 by the first parameter clip section 3093161B. Accordingly, the value of "a1/a2<<iShift" which is the value of the parameter a is also clipped to a value from 0 to 2<<iShift. That is, when iShift=6, the parameter a becomes 0 to 128 and enters a range of an 8-bit nonnegative integer.

The first parameter shift section 3093162B derives a first normalized shift value iScaleShiftA1 by the following expression according to the size of the first parameter a1. The derived first normalized shift value iScaleShiftA1 is output to the table base parameter a derivation section 3093164B.

$$iScaleShiftA1=\mathrm{Max}(0,\mathrm{Get}MSB(\mathrm{abs}(a1))-15) \quad \text{expression (B-13)}$$

The second parameter shift section 3093163B derives a second normalized shift value iScaleShiftA2 by the following expression according to the size of the second parameter a2. The derived second normalized shift value iScaleShiftA2 is output to the table base parameter a derivation section 3093164B.

$$iScaleShiftA2=\mathrm{Max}(0,\mathrm{Get}MSB(\mathrm{abs}(a2))-6) \quad \text{expression (B-14)}$$

The first parameter shift section 3093162B and the second parameter shift section 3093163B derive a normalized first parameter a1*s* and a normalized second parameter a2*s* by right shifting the first parameter a1 by the first normalized shift value iScaleShiftA1 and right shifting the second parameter a2 by the second normalized shift value iScaleShiftA2.

$$a1s=a1>>iScaleShiftA1 \quad \text{expression (B-15)}$$

$$a2s=a2>>iScaleShiftA2 \quad \text{expression (B-16)}$$

The table base parameter a derivation section 3093164B derives a parameter a shift value iScaleShiftA by the following expression based on a difference between the first normalized shift value iScaleShiftA1 and the second normalized shift value iScaleShiftA2.

$$ScaleShiftA=iScaleShiftA2-iScaleShiftA1+15-iShift \quad \text{expression (B-18)}$$

The table base parameter a derivation section 3093164B derives the parameter a by the following expression by obtaining a product with the normalized first parameter a1*s* and right shifting the product by a table shift value (ScaleShiftA) with reference to an inverse table value invTable decided according to the normalized second parameter a2*s*.

$$a=(a1s*invTable[a2s])>>(ScaleShiftA) \quad \text{expression (B-19)}$$

When the table shift value iScaleShiftA is negative, the following expression is derived by executing left shift by the absolute value of the table shift value.

$$a=(a1s*invTable[a2s])<<(-ScaleShiftA) \quad \text{expression (B-19')}$$

FIG. 84 is a diagram illustrating the inverse table value invTable[ ] used in the embodiment. As described above, the inverse invTable[x] of FIG. 84 is 0 when the index x is 0. When the index x is a value other than 0, the inverse invTable[x] is derived from a value obtained as an integer by dividing a predetermined integer (here, 15th power of 2) M by x.

The value of the parameter a is a ratio of the first parameter a1 to the second parameter a2 (which corresponds to a value shifted left a1/a2 by iShift).

A parameter a clip section may be provided instead of the first parameter clip section 3093161B and may clip the range of the parameter a to a value equal to or greater than 0 or equal to or less than 255, which is an 8-bit nonnegative integer, by the following operation.

$$a=\mathrm{Clip3}(0,255,a) \quad \text{expression (B-12')}$$

When the maximum value of the clip is equal to or less than 255 and the minimum value of the clip is equal to or greater than 0, an 8-bit nonnegative integer is obtained. Therefore, another value may be used. For example, the following value may be used:

$$a=\mathrm{Clip3}(64,128,a) \quad \text{expression (B-12''); or}$$

$a$=Clip3(0,128,$a$) expression (B-12''').

Here, the maximum value of the clip is assumed to be equal to or greater than 1<<iShift.

The derived parameter a is output from the parameter b derivation section 309317B and the illumination compensation filter section 30932B.

The parameter b derivation section 309317B derives the parameter b by the following expression by dividing a value, which is obtained by multiplying the sum X of the pixel values of the reference image by the parameter a and subtracting a value shifted right by the fixed shift value iShift from the sum Y of the pixel values of the decoded image, by the number of pixels of the reference region.

$b$=($Y$−(($a$*$X$)>>$i$Shift)+(1<<($i$CountShift−1)))>>$i$CountShift expression (B-20)

The right shift of iCountShift corresponds to the dividing by the number of pixels of the reference region.

The illumination compensation filter section 30932B derives a predicted image predSamples'[ ] after the illumination compensation from a predicted image predSamples[ ] before the illumination compensation using the estimation parameters derived by the illumination parameter estimation section 30931B. For example, when the parameter b is derived by expression (B-20), the following expression is used.

predSamples'[$x$][$y$]=(($a$*predSamples[$x$][$y$])>>$i$Shift)+$b$ expression (B-21)

Instead of the parameter b derivation section 309317B, a parameter b derivation section 309317B' with a different configuration from the parameter b derivation section 309317B may be used. In this case, the parameter b derivation section 309317B' derives the parameter b by the following expression by dividing a value, which is obtained by subtracting a value obtained through multiplication of the parameter a by the sum X of the pixel values of the reference image from a value shifted left by the fixed shift value iShift from the sum Y of the pixel values of the decoded image, by the number of pixels of the reference region.

$b$=(($Y$<<$i$Shift)−(($a$*$X$))+(1<<($i$CountShift−1)))>>$i$CountShift expression (B-20')

When the bit depth of the pixels is 8 bits, the range of the pixel value x can be calculated as a range of an 8-bit nonnegative variable and the range of the parameter a can be calculated as a range of the 8-bit nonnegative variable, and thus these ranges can be calculated through an operation by mutual 8-bit nonnegative variables (unsigned char in the C language) which are the minimum number of bits in software. The 8-bit nonnegative variable can be stored simultaneously in 16 registers and calculated, for example, in an SIMD operation using 128-bit registers. That is, since 16 pixels can be simultaneously processed, it is possible to obtain the advantageous effect of high-speed.

When a parameter b derivation section 309317B' having a different configuration from the parameter b derivation section 309317B is used instead of the parameter b derivation section 309317B, an illumination compensation filter section 30932B' having a different configuration from the illumination compensation filter section 30932B is used instead of the illumination compensation filter section 30932B. The illumination compensation filter section 30932B' having the different configuration from the illumination compensation filter section 30932B derives the predicted image predSamples'[ ] after the illumination compensation from the predicted image predSamples[ ] before the illumination compensation by the following expression.

predSamples'[$x$][$y$]=(($a$*predSamples[$x$][$y$]+$b$)>>$i$Shift) expression (B-21')

Hereinafter, the characteristics of the foregoing configuration will be described.

The illumination parameter estimation section 30931B can obtain the appropriate parameter a by defining the inverse table invTable[x] so that the inverse table invTable[x] is 0 when the index x is 0, as shown in FIG. 84, and by deriving the parameter a based on the value obtained by subtracting, from the inverse table invTable[x] defined in this way, the second parameter (the normalized second parameter) derived from a value shifted right by the foregoing integrated shift value from a square of the sum XX of the values shifted right by the integrated shift value from the squares of the pixel values of the reference image and the sum X of the pixel values of the reference image, as indicated by expression (B-19) and expression (B-19'), even when an operation method is not changed according to whether the normalized second parameter (the normalized second parameter) is 0. Therefore, it is possible to obtain the advantageous effect of reducing a processing amount. When the index x is a value other than 0, a value obtained as an integer by dividing a predetermined value by x can be appropriately used for the inverse table invTable[x].

As denoted in (B-1), (B-4), (B-5), (B-7), and (B-8), the illumination parameter estimation section 30931B derives the integrated shift value precShift according to the pixel bit depth and derives the parameter a from the first parameter a1 derived from the sum XY of the values shifted right by the integrated shift value precShift from the products of the pixel values of the decoded image and the pixel values of the reference image and a value shifted right by the integrated shift value from the product of the sum X of the pixel values of the reference image and the sum Y of the pixel values of the decoded image and the second parameter a2 derived from the sum XX of the values shifted right by the integrated shift value from the squares of the pixel values of the reference image and the value shifted right y the integrated shift value from the square of the sum X of the pixel values of the reference image. When XY and XX which are the sums of the products of the pixels, the illumination parameter estimation section 30931B can derive the first and second parameters within a predetermined range, for example, a 32-bit range, by right shifting the product of the pixels by the integrated shift value decided according to the pixel bit depth before obtaining the sum in regard to the product of the pixels. Therefore, it is possible to obtain the advantageous effect of executing the process easily.

When the sum of the double of the pixel bit depth and the number corresponding to the logarithm 2 of the number of pixels is greater than a predetermined integer N in the first parameter derivation section 309314B and the second parameter derivation section 309315B, as denoted in (B-9), (B-10), and (B-11), the illumination parameter estimation section 30931B normalizes the first parameter a1 and the second parameter a2 by executing the right shift to predetermined fixed parameter shift values. In the illumination parameter estimation section 30931B, the first parameter a1 and the second parameter a2 are denoted with a number equal to or less than the number of bits N. Therefore, for example, when an operation is executed with 32-bit precision and even when a number less than 32-N-th power of 2 is multiplied, it can be ensured that the number of bits is not greater than the range of 32 bits. It is possible to obtain the advantageous effect of executing the shift operation easily because of the right shift of the fixed shift value.

The foregoing illumination compensation filter section 30932B executes the right shift using the predetermined fixed shift integer iShift which is a fixed value, as denoted in expression (B-21) and expression (B-21'). Therefore, it is possible to obtain the advantageous effect of executing a process by the SIMD operation or the like more easily than when the right shift is executed using a variable.

The foregoing illumination compensation filter section 30932B' adds the parameter b, which is an offset component, to the product of the parameter a, which is an inclination component, and the pixel value predSamples[x][y] before the right shift by the fixed shift integer iShift, as denoted in expression (B-21'). Therefore, it is possible to obtain the advantageous effect of improving an operation performance with higher precision than when the offset component is added after the right shift. In this case, it is suitable that the parameter b derivation section 309317B' derives the parameter b based on the value obtained by reducing the product of the parameter a and the sum X of the pixel values of the decoded image, from the value shifted left by the fixed shift value iShift from the sum Y of the pixel values of the reference image, as denoted in expression (B-20').

Hereinafter, an illumination compensation section 3093C which is a modification example of the illumination compensation section 3093 will be described. The illumination compensation section 3093C according to the modification example is configured to include an illumination parameter estimation section 30931C and the illumination compensation filter section 30932B. Since the illumination compensation filter section 30932B has been described above, the description thereof will be described. The illumination parameter estimation section 30931C is configured to include the integrated shift value derivation section 309311B, the integrated value derivation section 309312B, the added value derivation section 309313B, a first parameter derivation section 309314C, the second parameter derivation section 309315B, the parameter a derivation section 309316B, and the parameter b derivation section 309317B. The constituent elements other than the first parameter derivation section 309314C have been described above and thus the description thereof will be omitted.

Figure 75:
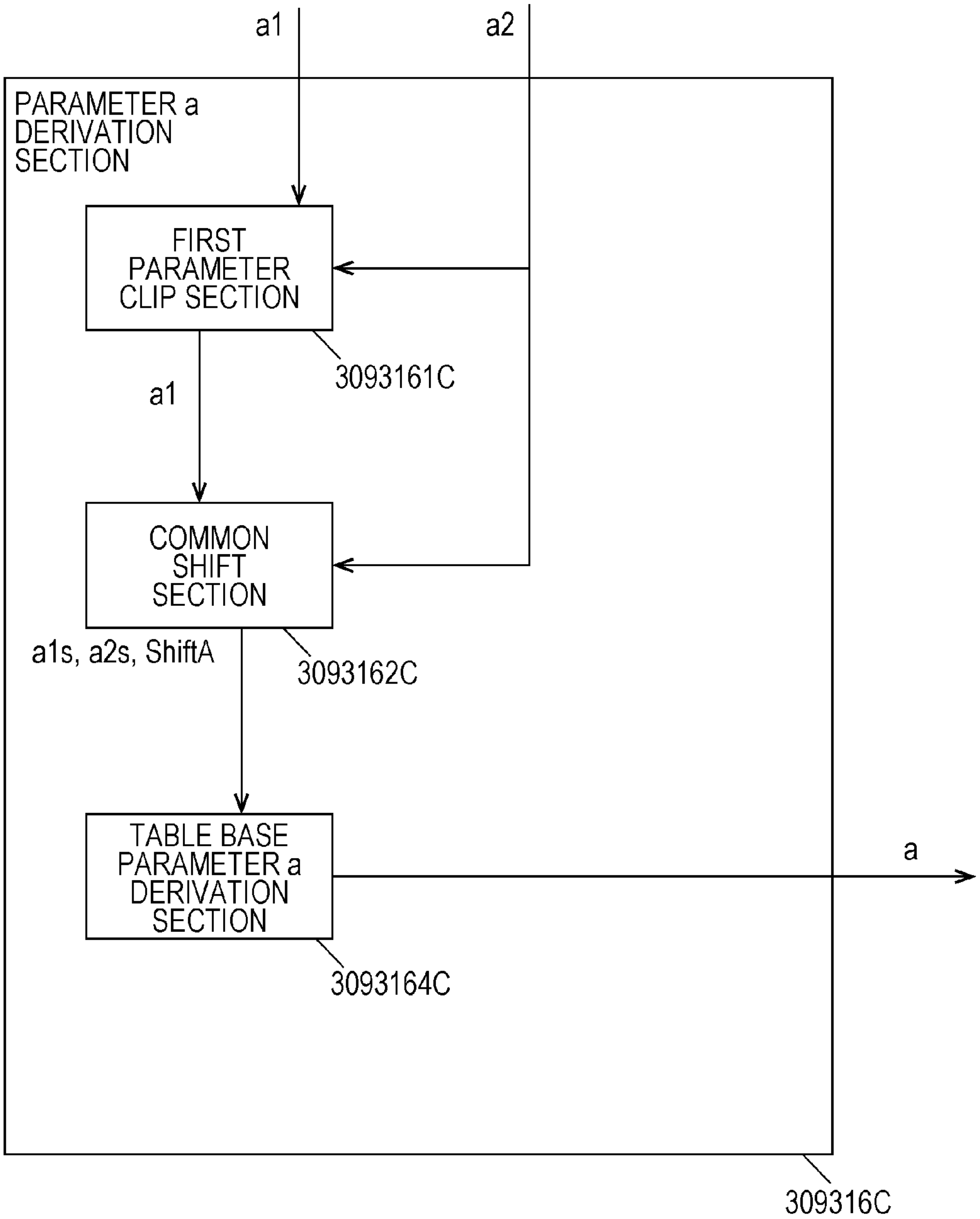
FIG. 75 is a block diagram illustrating the configuration of a parameter a derivation section 309316C according to the embodiment.

FIG. 75 is a block diagram illustrating the configuration of the parameter a derivation section 309316C according to the embodiment. The parameter a derivation section 309316C is configured to include a first parameter clip section 3093161C, a common shift section 3093162C, and a table base parameter a derivation section 3093164C.

The first parameter clip section 3093161C restricts the first parameter a1 according to the size of the second parameter a2. For example, as in the following expression, a1 is clipped to a value equal to or greater than a2 and equal to or less than 18/16 multiple of a2.

$$a1=\text{Clip3}(a2,a2*18/16,a1) \quad \text{expression (B-12)}$$

The common shift section 3093162C derives a common normalized shift value iScaleShiftA2 according to the size of the second parameter a2 by the following expression.

$$i\text{ScaleShift}A2=\text{Max}(0,\text{Get}MSB(\text{abs}(a2))-6) \quad \text{expression (B-14')}$$

The common shift section 3093162C right shifts the first parameter a1 and the second parameter a2 similarly by the common normalized shift value iScaleShiftA2 and derives the normalized first parameter a1*s* and the normalized second parameter a2*s*.

$$a1s=a1>>i\text{ScaleShift}A2 \quad \text{expression (B-15')}$$

$$a2s=a2>>i\text{ScaleShift}A2 \quad \text{expression (B-16)}$$

Here, in the normalization of the first parameter a1, the first parameter a1 may be shifted left in advance by an a1 shift value ShiftA1 (here, 4) which is a fixed value, as in the following expression.

$$a1s=(a1<<\text{Shift}A1)>>i\text{ScaleShift}A2 \quad \text{expression (B-14')}$$

The table base parameter a derivation section 3093164C derives the parameter a by the following expression by obtaining a product with the normalized first parameter a1*s* with reference to the inverse table value invTable decided according to the normalized second parameter a2*s* and right shifting the product by the table shift value (here, 15−iShift)

$$a=(a1s*\text{invTable}[a2s])>>(15-i\text{Shift}) \quad \text{expression (B-19'')}$$

Here, iShift is assumed to be a fixed shift value (here, 7). The value of a is a ratio of the first parameter a1 to the second parameter a2 (which corresponds to a value shifted left by iShift from a1/a2).

When the first parameter a1 is shifted left by the fixed value ShiftA1 in advance as in expression (B-14'), the following expression is used instead of expression (B-19'').

$$a=(a1s*\text{invTable}[a2s])>>(15+\text{Shift}A1-i\text{Shift}) \quad \text{expression (B-19'')}$$

Hereinafter, the characteristics of the foregoing configuration will be summarized.

In the configuration of the illumination parameter estimation section 30931C, as denoted in (B-14'), (B-15'), and (B-19''), the normalized first parameter a1*s* and the normalized second parameter a2*s* are derived by deriving the common normalized shift value iScaleShiftA2 decided according to the size of the second parameter a2 and right shifting the first parameter a1 and the second parameter a2 by the common normalized shift value iScaleShiftA2. The parameter a is derived by right shifting the product of the normalized first parameter a1*s* or a value, which is obtained by multiplying the normalized first parameter a1*s* by a predetermined integer and the table value invTable[a2*s*] decided from the normalized second parameter a2*s* with reference to the table invTable[ ], by the fixed shift value. In the foregoing configuration, the values of both of the first and second parameters are normalized using the same normalized shift value in the common shift section 3093162C. Therefore, it is possible to obtain the advantageous effect of executing the process more easily than when different normalized parameters are used for the first and second parameters described in the first parameter shift section 3093162B and the second parameter shift section 3093163B. Further, the table shift value after the multiplication of the table value can be set to be a fixed value using the same normalized parameter for the first and second parameters. Thus, it is possible to obtain the advantageous effect of executing the right shift process easily when the parameter a is derived by the table base parameter a derivation section 3093164C.

Hereinafter, an illumination compensation section 3093D which is a modification example of the illumination compensation section 3093 will be described. The illumination compensation section 3093D according to the modification example is configured to include an illumination parameter estimation section 30931D and the illumination compensation filter section 30932B. Since the illumination compensation filter section 30932B has been described above, the description thereof will be described.

The illumination parameter estimation section 30931D is configured to include the integrated shift value derivation section 309311B, the integrated value derivation section 309312B, the added value derivation section 309313B, a first parameter derivation section 309314D, the second parameter derivation section 309315B, the parameter a derivation section 309316B, and the parameter b derivation section 309317B. The constituent elements other than the first parameter derivation section 309314D have been described above and thus the description thereof will be omitted.

Figure 76:
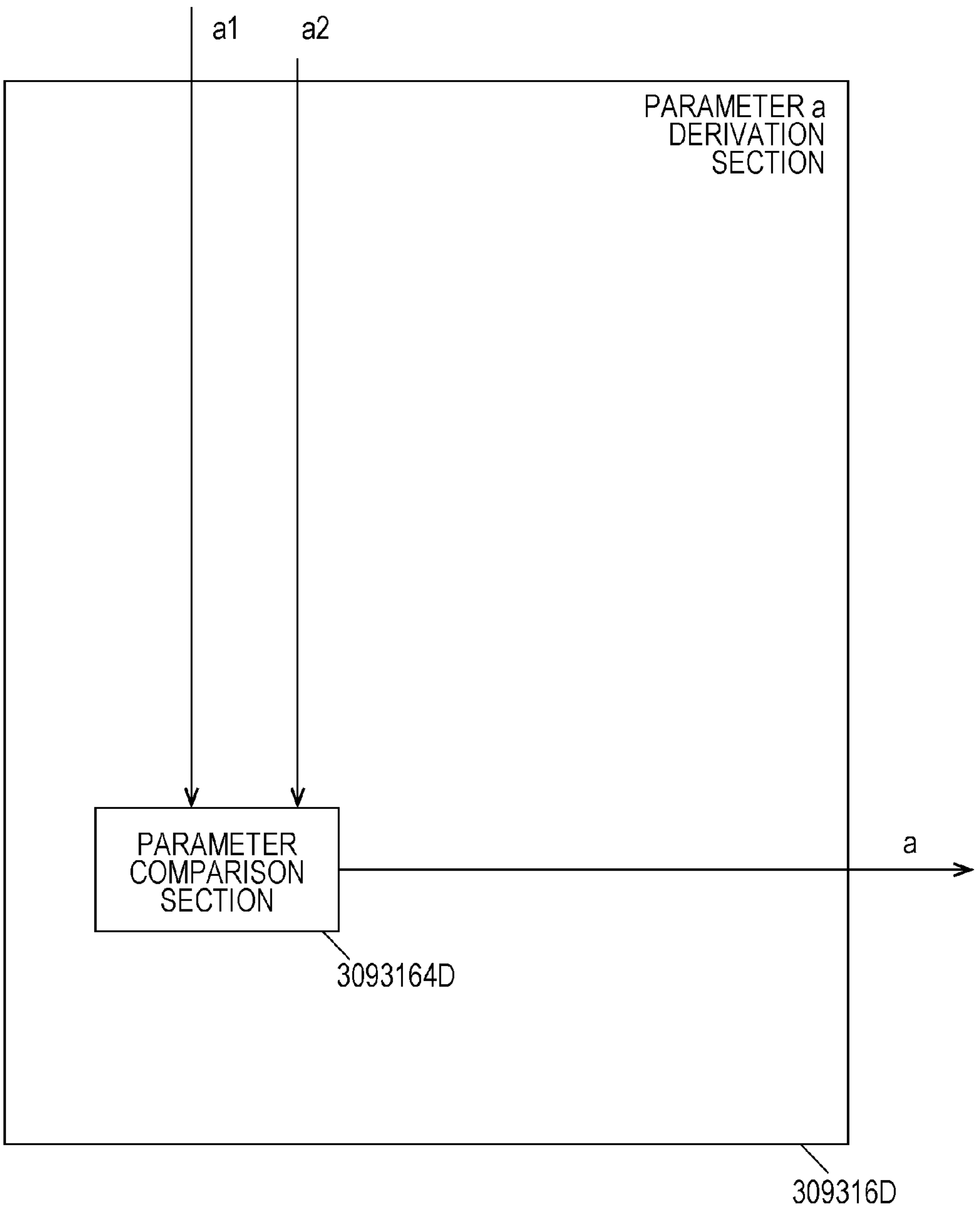
FIG. 76 is a block diagram illustrating the configuration of a parameter a derivation section 309316D according to the embodiment.

FIG. 76 is a block diagram illustrating the configuration of a parameter a derivation section 309316D according to the embodiment. The parameter a derivation section 309316D is configured to include a parameter comparison section 3093164D. The parameter comparison section 3093164D derives the value of the parameter a by comparing a value obtained by multiplying the first parameter a1 by a predetermined value to a value obtained by multiplying the second parameter a2 by a predetermined value. For example, the value of the parameter a is derived by the following expression.

$$a=(16*a1>=17*a2)?17:16; \quad \text{expression (B-19''')}$$

In this expression, (x)?y: z is a function of deriving y when the expression x is true and deriving z when the expression x is false.

The parameter comparison section 3093164D may compare the value obtained by multiplying the first parameter a1 by the predetermined value to the value obtained by multiplying the second parameter a2 by the predetermined value a plurality of times. For example, the parameter a may be derived by the following expression.

$$a=(16*a1>=18*a2)?18:(16*a1>=17*a2)?17:16 \quad \text{expression (B-19''')}$$

In the configuration of the illumination parameter estimation section 30931D, the parameter a is derived by comparing the value derived from the first parameter a1 derived from the sum XY of the products of the pixel values of the decoded image and the pixel values of the reference image and the product of the sum Y of the pixel values of the decoded image and the sum X of the pixel values of the reference image to the value derived from the second parameter a2 derived from the sum XX of the squares of the pixel values of the reference image and the square of the sum X of the pixel values of the reference image. In the parameter a derivation section 309316D, when the parameter a corresponding to a quotient of the second parameter by the first parameter is derived, it is not necessary to derive the reciprocal of the second parameter, denoted in expression (B-19), expression (B-19'), and expression (B-19'') described in the table base parameter a derivation section 3093164B and the table base parameter a derivation section 3093164C, using the table invTable[ ]. Therefore, it is possible to obtain the advantageous effect of executing the process easily. In order to derive the reciprocal of the second parameter a2 using a table with a predetermined size, it is generally necessary to execute normalization for suppressing the second parameter denoted in expression (B-16) to a predetermined range, as described in the second parameter shift section 3093163B and the common shift section 3093162C. However, in the method by the comparison, it is possible to obtain the advantageous effect in which the normalization process is not necessary. In order for the product of the reciprocals of the first and second parameters not to be greater than a predetermined value, as described in the first parameter shift section 3093162B and the common shift section 3093162C, it is generally necessary to execute the normalization process of the first parameter denoted in expression (B-15) and expression (B-15'). However, in the method by the comparison, it is possible to obtain the advantageous effect in which the normalization process is not necessary.

(Illumination Compensation Section 3093E)

Hereinafter, an illumination compensation section 3093E which is a modification example of the illumination compensation section 3093 will be described.

Figure 77:
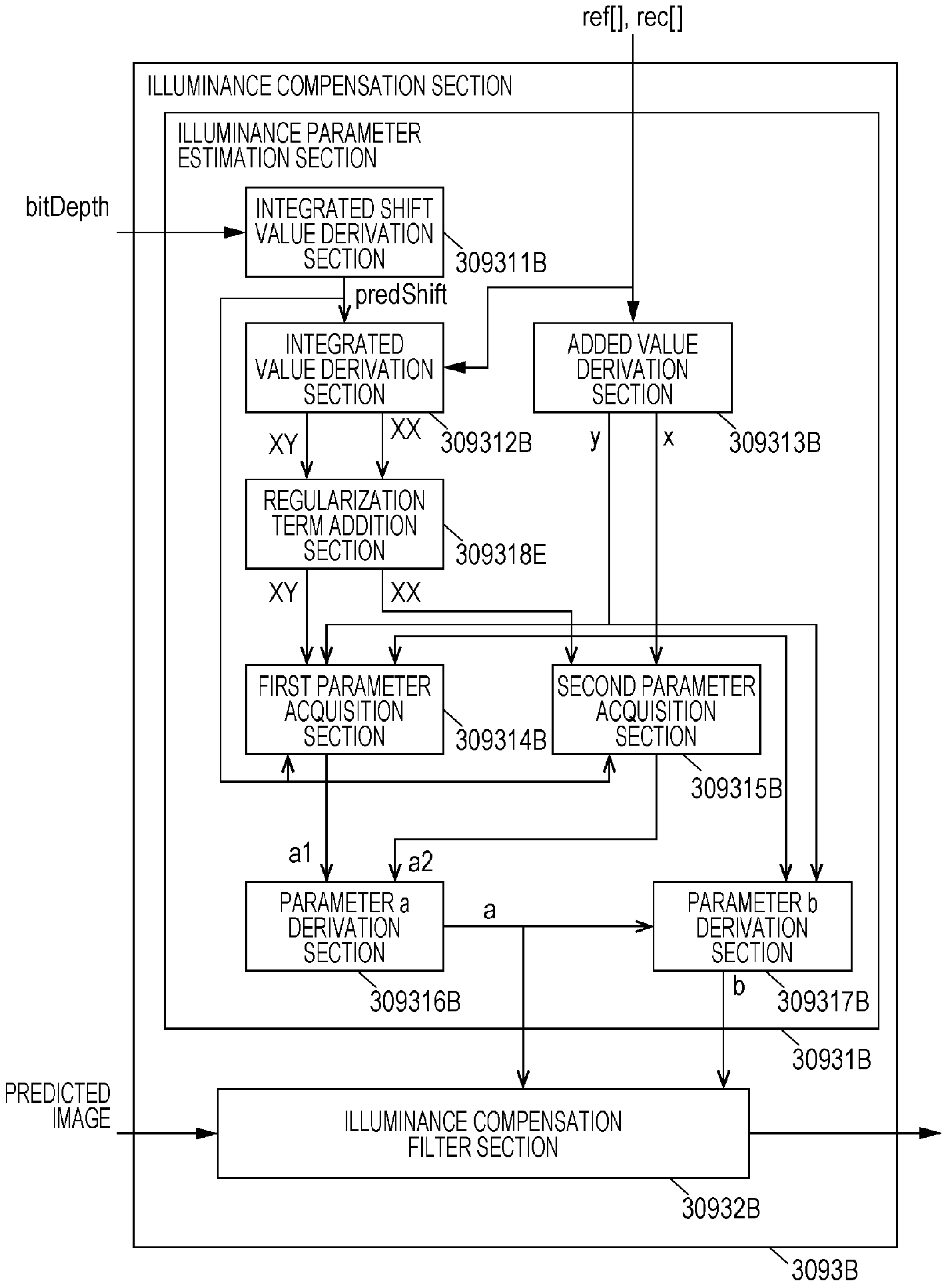
FIG. 77 is a block diagram illustrating the configuration of an illumination compensation section 3093E according to the embodiment.

FIG. 77 is a block diagram illustrating the configuration of the illumination compensation section 3093E according to the embodiment. The illumination compensation section 3093 is configured to include an illumination parameter estimation section 30931E and an illumination compensation filter section 30932B. The illumination parameter estimation section 30931E is configured to include the integrated shift value derivation section 309311B, the integrated value derivation section 309312B, the added value derivation section 309313B, the first parameter derivation section 309314B, the second parameter derivation section 309315B, the parameter a derivation section 309316B, the parameter b derivation section 309317B, and a regularization term addition section 309318E.

Since the constituent elements other than the regularization term addition section 309318E have been described above, the description thereof will be omitted. Instead of the parameter a derivation section 309316B, the parameter a derivation section 309316C or the parameter a derivation section 309316D may be used. The method of deriving the parameters a and b is not limited to the above-described method.

Figure 78:
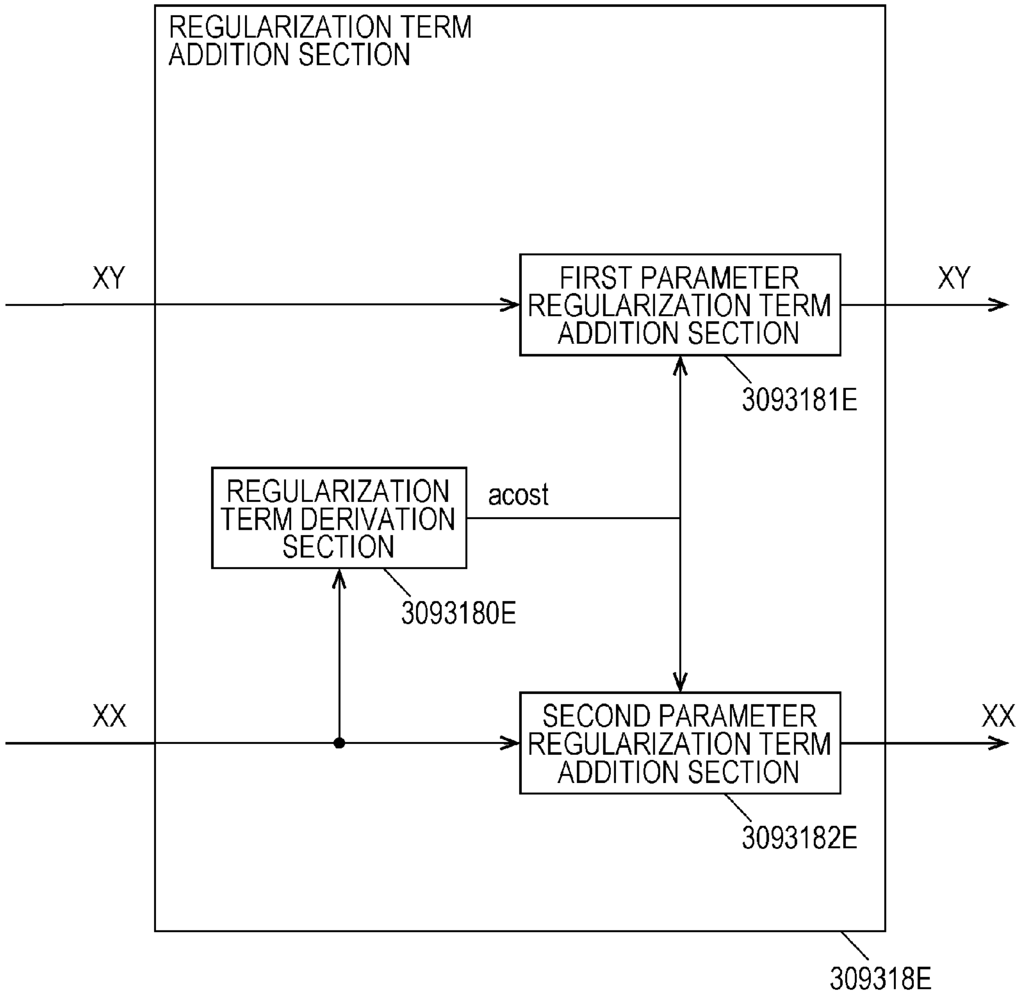
FIG. 78 is a block diagram illustrating the configuration of a regularization term addition section 309318E according to the embodiment.

FIG. 78 is a block diagram illustrating the configuration of a regularization term addition section 309318E according to the embodiment. The regularization term addition section 309318E is configured to include a regularization term derivation section 3093180E, a first parameter regularization term addition section 3093181E, and a second parameter regularization term addition section 3093182E.

The regularization term derivation section 3093180E derives a regularization term acost.

$$\text{acost}=XX>>\text{ashift} \quad \text{expression (E-1)}$$

Further, in experiments of the inventors and the like, for example, it is confirmed that a fixed value of 4 to 8 is suitable as ashift.

The first parameter regularization term addition section 3093181E adds a regularization term to a parameter (for example, XY) used to derive the first parameter.

$$XY=XY+\text{acost} \quad \text{expression (E-2)}$$

In this addition, the second parameter regularization term addition section 3093182E adds a regularization term to a parameter (for example, XX) used to derive the second parameter.

$$XX=XX+\text{acost} \quad \text{expression (E-3)}$$

The addition of the regularization term may be executed by the first parameter derivation section 309314B and the second parameter derivation section 309315B. In this case, the first and second parameters are derived by the following expressions instead of expression (B-7) and expression (B-8).

$$a1=((XY+\text{acost})<<i\text{CountShift})-(Y*X)>>\text{precShift} \quad \text{expression (E-2')}$$

$$a2=((XX+\text{acost})<<i\text{CountShift})-(X*X)>>\text{precShift} \quad \text{expression (E-3')}$$

In the configuration of the illumination parameter estimation section 30931E, when the first parameter a1 derived from a difference between the sum XY of the products of the pixel values y of the decoded image and the pixel values x of the reference image and the product of the sum Y of the pixel values of the decoded image and the sum X of the pixel values of the reference image, the regularization term acost is added. Further, when the second parameter a2 derived from a difference between the sum XX of squares of the pixel values of the reference image and a square of the sum X of the pixel values of the reference image, the same regularization term acost is added. The parameter a is derived from the first parameter a1 and the second parameter a2 to which the regularization term is added. Thus, the parameter a corresponding to an inclination component of linear prediction is actually near 1 (actually, near 1<<iShift using the fixed shift value iShift), and accordingly an estimated parameter becomes robust when there is a deviated value or the like. Since the estimated parameter is robust, estimation accuracy of the illumination compensation is improved, and thus it is possible to obtain the advantageous effect of improving coding efficiency.

(Description of Regularization Term)

Hereinafter, mathematical meaning of the regularization term will be supplemented. When an input data string (xi, yi) is given, yi is considered to be subjected to primary prediction from xi by the following expression.

$$yi=xi+b \quad \text{expression (E-4)}$$

At this time, the parameters a and b for minimizing a prediction error E (objective function E) below are generally obtained by the least-squares method.

$$E=\Sigma(yi-xi-b)\hat{}2 \quad \text{expression (E-5)}$$

When an expression obtained by executing partial differentiation on the foregoing expression for each of the parameters a and b is set to be 0, a normal equation which is an expression for the parameters a and b minimizing the prediction error E is obtained. When this normal equation is solved, the following expression deriving the parameter a is obtained.

$$\text{parameter } a=(\Sigma xiyi-\Sigma xi\Sigma yi)/(\Sigma xixi-\Sigma xi\Sigma xi) \quad \text{expression (E-6)}$$

In general, when there is a variation in the input data string (xi, yi), a regularization term for which the parameters a and b, which are derivation targets, can be prevented from unnecessarily increasing is introduced. In this case, an error E' is minimized instead of the prediction error E.

$$E=\Sigma(yi-a*xi-b)\hat{}2+\lambda 1*a\hat{}2+\lambda 2*a\hat{}2 \quad \text{expression (E-5')}$$

In this case, the parameter a is obtained by the following expression.

$$\text{parameter } a=(\Sigma xiyi-\Sigma xi\Sigma yi)/(\Sigma xixi-\Sigma xi\Sigma xi+\lambda 1) \quad \text{expression (E-6'')}$$

Incidentally, in the case of the illumination prediction, xi and yi are pixel values of the same object together, and thus the parameter a is expected to be close to 1. Accordingly, instead of the prediction error E' using the regularization term (λ1*a^2) for which the size of the parameter a simply approaches 0, the following prediction error E" using the regularization term (λ1*(a−1)^2) for which the size of the parameter a approaches 1 is considered to be minimized.

$$E=\Sigma(yi-a*xi-b)\hat{}2+\lambda 1*(a-1)\hat{}2+\lambda 2*b\hat{}2 \quad \text{expression (E-5'')}$$

When an expression obtained by executing partial differentiation on the foregoing expression for each of the parameters a and b is set to be 0, a normal equation is obtained. When this normal equation is solved, the following expression deriving the parameter a is obtained.

$$\text{parameter } a=(\Sigma xiyi-\Sigma xi\Sigma yi+\lambda 1)/(\Sigma xixi-\Sigma xi\Sigma xi+\lambda 1) \quad \text{expression (E-6'')}$$

On the right side of the foregoing expression, Σxiyi−ΣxiΣyi of the numerator corresponds to the first parameter and Σxixi−ΣxiΣxi of the denominator corresponds to the second parameter. Accordingly, by adding the same regularization term λ1 to the first and second parameters, it is possible to obtain the advantageous effect in which the parameter a approaches 1. The advantageous effect of the regularization term is proportional to a square of a−1, and thus the influence of the regularization term becomes stronger as a is considerably distant from 1. When a is close to 1, the influence of the regularization term almost disappears.

(Illumination Compensation Section 3093F)

Hereinafter, an illumination compensation section 3093F which is a modification example of the illumination compensation section 3093 will be described.

Figure 79:
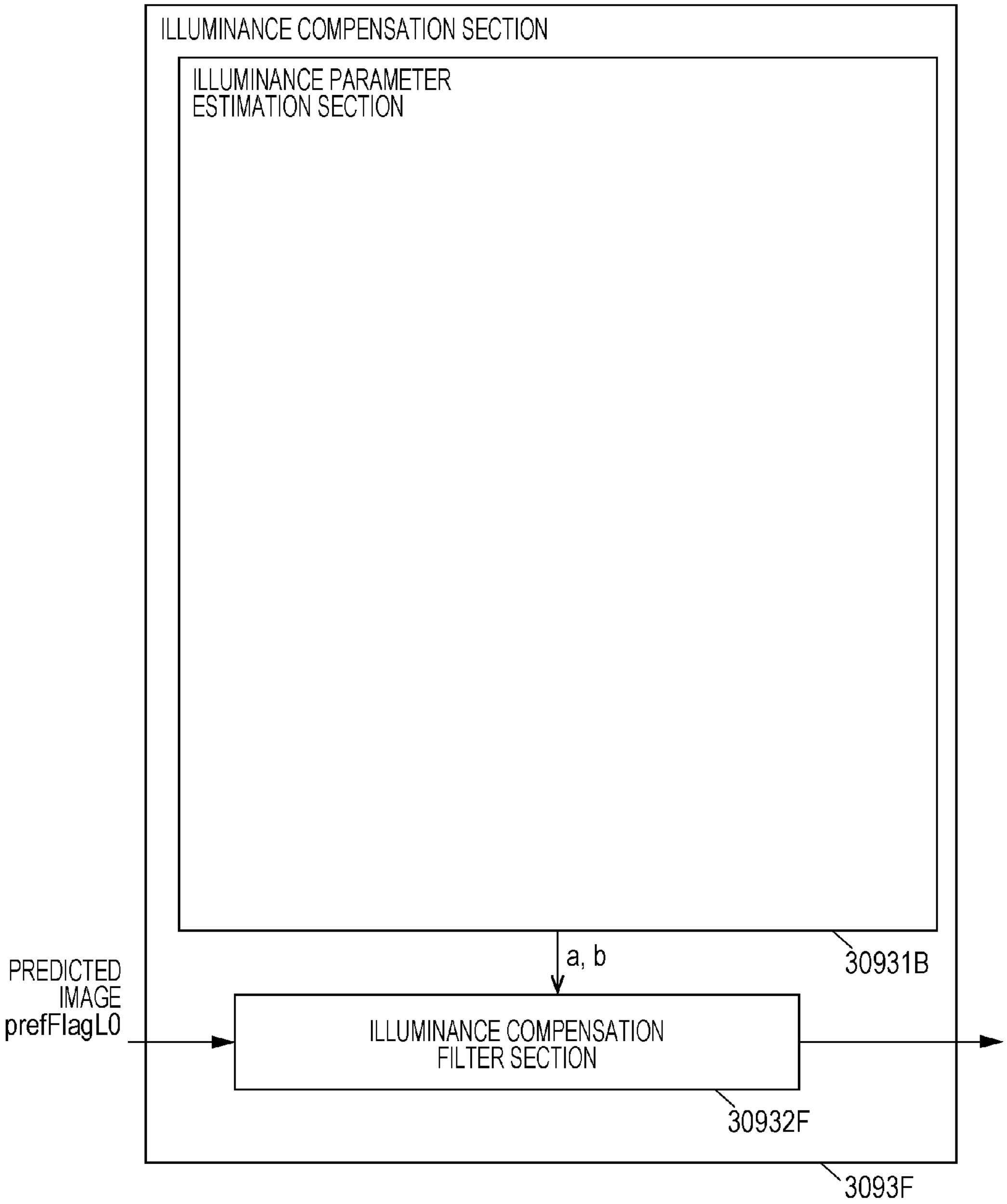
FIG. 79 is a block diagram illustrating the configuration of an illumination compensation section 3093F according to the embodiment.

FIG. 79 is a block diagram illustrating the configuration of the illumination compensation section 3093F according to the embodiment. The illumination compensation section 3093 is configured to include the illumination parameter estimation section 30931E and an illumination compensation filter section 30932F. Since the illumination parameter estimation section 30931E has been described above, the description thereof will be omitted. The invention is not limited to the illumination parameter estimation section 30931E, and an illumination parameter estimation section using another estimation method may be used.

The illumination compensation filter section 30932F executes illumination compensation using the estimation parameters derived by the illumination parameter estimation section 30931E only when the input predicted image is a motion compensation image derived using the reference list of the L0 list. Specifically, the following operation is executed according to the values of predFlagL0 and predFlagL1.

When predFlagL0 is 1 and predFlagL1 is 0, the predicted image predSamples'[ ] after the illumination compensation is derived from the predicted image predSamples[ ] before the illumination compensation by the following expression.

$$\text{predSamples'}[x][y]=((a*\text{predSamples}[x][y])>>i\text{Shift})+b$$

When predFlagL0 is 0 and predFlagL1 is 1, the illumination compensation is not applied. That is, the predicted image predSamples[ ] which is an input of the illumination compensation filter section 30932F is identical to the predicted image predSamples'[ ] of an output, as in the following expression.

$$\text{predSamples'}[x][y]=\text{predSamples}[x][y] \quad \text{expression (B-21)}$$

When predFlagL0 is 1 and predFlagL1 is 1 and when the reference picture of the L0 list is assumed to be a predicted image, the predicted image predSamplesL0'[ ] after the illumination compensation of L0 is derived from the predicted image predSamplesL0[ ] before the illumination compensation of L0 by the following expression.

$$\text{predSamples}L0'[x][y]=((a*\text{predSamples}[x][y])>>i\text{Shift})+b$$

The weight prediction section 3094 to be described below generates a predicted image, for example, by the following expression using the predicted image of L0 to which the illumination prediction is applied, predSamplesL0'[x][y], and a predicted image predSamplesL1[x][y] of L1 to which the illumination prediction is not applied.

$$\text{predSamples'}[x][y]=(\text{predSamples}L0'[x][y]+\text{predSamples}L1[x][y]+\text{offset2})>>\text{shift2})$$

Here, shift2 and offset2 are respectively derived by shift2=15−bitDepth and offset2=1<<(shift2−1).

In the illumination compensation section 3093F, a case in which the illumination prediction is used is restricted to the motion compensation image in which the reference picture using the L0 list is used (L0 restriction). Therefore, it is possible to obtain the advantageous effect of reducing a processing amount (advantageous effect F5b). That is, it is possible to obtain the advantageous effect of avoiding a situation in which a processing amount necessary to execute the illumination prediction on two reference images is large. Merely in the case of bi-prediction, unlike a case in which the illumination compensation is forbidden, the fact that performance deterioration is small due to the restriction (advantageous effect F5c) can be obtained by experiments of the inventors since the illumination compensation is executed on the reference picture using the L0 list even in the case of the bi-prediction.

In the case (illumination compensation section 3093F') of a configuration in which the illumination compensation is forbidden in the case of the bi-prediction, the following process is executed.

When predFlagL0 is 1 and predFlagL1 is 0, the predicted image predsamples'[ ] after the illumination compensation is derived from the predicted image predSamples[ ] before the illumination compensation by the following expression.

$$predSamples'[x][y]=((a*predSamples[x][y])>>iShift)+b$$

Further, to clearly denote the predicted image predSamplesL0[x][y] of L0, the following expression is also possible.

$$predSamplesL0'[x][y]=(a*predSamplesL0[x][y]>>iShift)+b$$

When predFlagL0 is 0 and predFlagL1 is 1, the predicted image predSamples'[ ] after the illumination compensation is derived from the predicted image predSamples[ ] before the illumination compensation by the following expression.

$$predSamples'[x][y]=((a*predSamples[x][y])>>iShift)+b$$

Further, to clearly denote the predicted image predSamplesL1[x][y] of L1, the following expression is also possible.

$$predSamplesL1'[x][y]=(a*predSamplesL1[x][y]>>iShift)+b$$

When predFlagL0 is 1 and predFlagL1 is 1, the weight prediction section 3094 to be described below generates a predicted image, for example, by the following expression using the predicted image predSamplesL0[x][y] of L0 to which the illumination prediction is not applied and the predicted image predSamplesL1[x][y] of L1 to which the illumination prediction is not applied.

$$predSamples[x][y]=(predSamplesL0[x][y]+predSamplesL1[x][y]+offset2)>>shift2$$

In this case, the illumination prediction is not executed in the case of the bi-prediction. However, it is possible to obtain the advantageous effect of avoiding a situation in which a processing amount necessary to execute the illumination prediction on two reference images is large (advantageous effect F5b).

(Illumination Compensation Section 3093G)

Hereinafter, an illumination compensation section 3093G which is a modification example of the illumination compensation section 3093 will be described. The illumination compensation section 3093G executes the L0 restriction as in the illumination compensation section 3093F, but is different from the illumination compensation section 3093F in that a prediction expression of the illumination compensation has only an offset component (only the parameter b).

Figure 83:
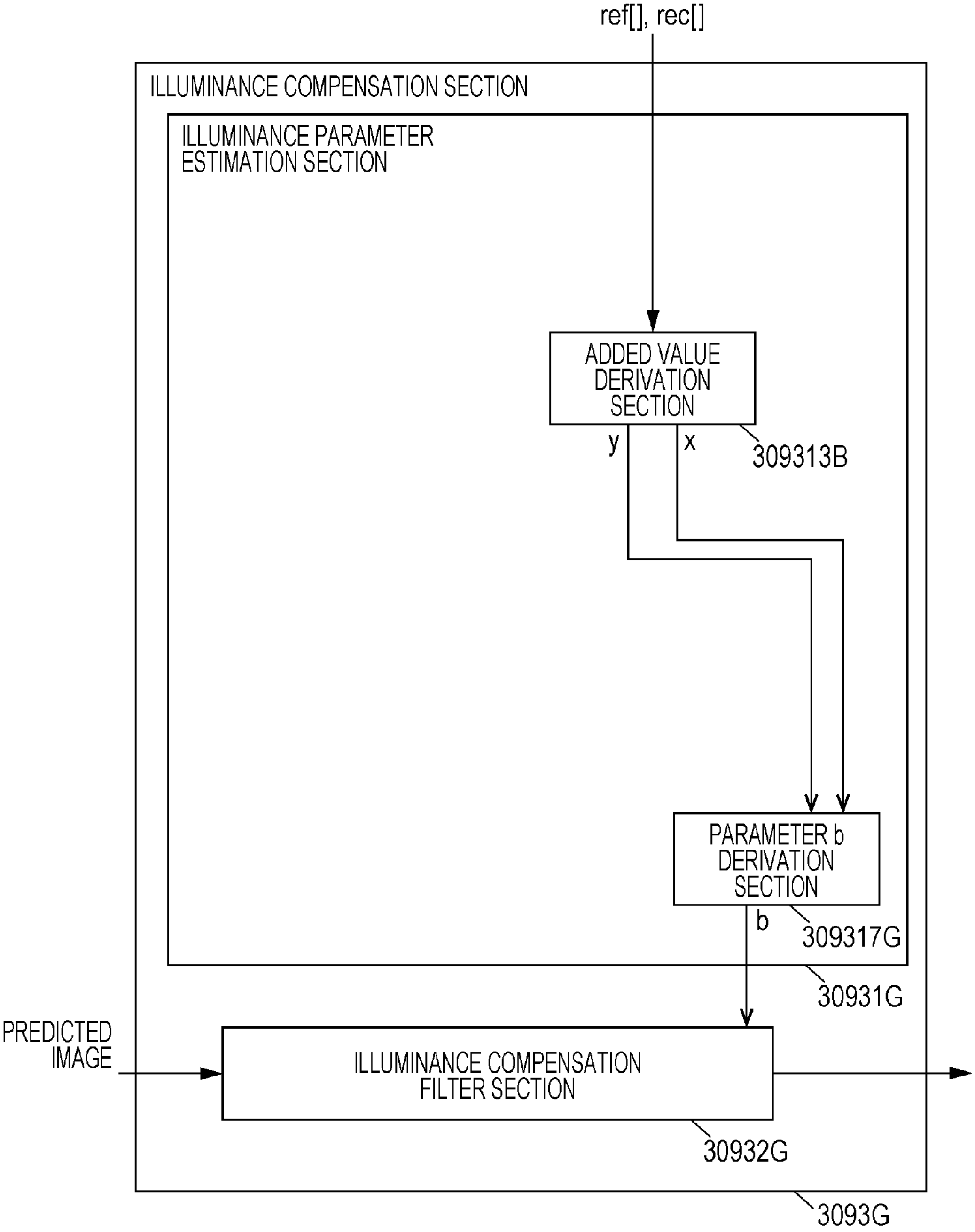
FIG. 83 is a block diagram illustrating the configuration of an illumination compensation section 3093G according to the embodiment.

FIG. 83 is a block diagram illustrating the illumination compensation section 3093G. The illumination compensation section 3093 is configured to include the illumination parameter estimation section 30931G and the illumination compensation filter section 30932G. The illumination parameter estimation section 30931G is configured to include the added value derivation section 309313B and the parameter b derivation section 309317G.

The illumination parameter estimation section 30931G denotes the pixels C in the neighbor of the reference block on the reference layer image illustrated in FIG. 13 as pixel values x[ ] of the reference image, denotes the pixels L in the neighbor of the target block as pixel values y[ ] of the decoded image, and derives the parameter b which is a parameter when the pixel values y[ ] of the decoded image are subjected to offset addition to be predicted from the pixel values x of the reference image, based on the pixel values x[ ] of the reference image and the pixel values y[ ] of the decoded image.

The added value derivation section 309313B derives the sum Y of the pixel values of the decoded image and the sum X of the pixel values of the reference image by the above-described expression (B-2) and expression (B-3).

The parameter b derivation section 309317G derives the parameter b by the following expression by dividing a value obtained by subtracting the sum X of the pixel values of the reference image from the sum Y of the pixel values of the decoded image, by the number of pixels of the reference region.

$$b=(Y-X)+(1<<(iCountShift-1)))>>iCountShift$$

The right shift of iCountShift corresponds to division by the number of pixels of the reference region.

The illumination compensation filter section 30932G executes illumination compensation using the estimation parameters derived by the illumination parameter estimation section 30931G only when the input predicted image is a motion compensation image derived using the reference list of the L0 list. Specifically, the following operation is executed according to the values of predFlagL0 and predFlagL1.

When predFlagL0 is 1 and predFlagL1 is 0, the predicted image predsamples'[ ] after the illumination compensation is derived from the predicted image predSamples[ ] before the illumination compensation by the following expression.

$$predSamples'[x][y]=predSamples[x][y]+b$$

When predFlagL0 is 0 and predFlagL1 is 1, the illumination compensation is not applied. That is, the predicted image predSamples[ ] which is an input of the illumination compensation filter section 30932G is identical to the predicted image predSamples'[ ] of an output, as in the following expression.

$$predSamples'[x][y]=predSamples[x][y]$$

When predFlagL0 is 1 and predFlagL1 is 1 and when the reference picture of the L0 list is assumed to be a predicted image, the predicted image predSamplesL0'[ ] after the illumination compensation of L0 is derived from the predicted image predSamplesL0[ ] before the illumination compensation of L0 by the following expression.

$$predSamplesL0'[x][y]=predSamples[x][y]+b$$

The weight prediction section 3094 to be described below generates a predicted image, for example, by the following expression using the predicted image of L0 to which the illumination prediction is applied, predSamplesL0'[x][y], and a predicted image predSamplesL1[x][y] of L1 to which the illumination prediction is not applied.

predSamples'[x][y]=(predSamples*L0*'[x][y]+predSamples*L1*[x][y]+offset2)>>shift2    expression (B-21BI)

Here, shift2 and offset2 are respectively derived by shift2=15−bitDepth and offset2=1<<(shift2−1).

In the illumination compensation section 3093G, a case in which the illumination prediction is used is restricted to the motion compensation image in which the reference picture using the L0 list is used (L0 restriction). Therefore, it is possible to obtain the advantageous effect of reducing a processing amount (advantageous effect F5b). That is, it is possible to obtain the advantageous effect of avoiding a situation in which a processing amount necessary to execute the illumination prediction on two reference images is large. Only in the case of bi-prediction, unlike a case in which the illumination compensation is forbidden, the fact that performance deterioration is small due to the restriction (advantageous effect F5c) can be obtained by experiments of the inventors since the illumination compensation is executed on the reference picture using the L0 list even in the bi-prediction.

In the case (illumination compensation section 3093G') of a configuration in which the illumination compensation is forbidden in the case of the bi-prediction, the following process is executed.

When predFlagL0 is 1 and predFlagL1 is 0, the predicted image predsamples'[ ] after the illumination compensation is derived from the predicted image predSamples[ ] before the illumination compensation by the following expression.

predSamples'[x][y]=predSamples[x][y]+b

Further, to clearly denote the predicted image predSamplesL0[x][y] of L0, the following expression is also possible.

predSamples*L0*'[x][y]=predSamples*L0*[x][y]+b

When predFlagL0 is 0 and predFlagL1 is 1, the predicted image predsamples'[ ] after the illumination compensation is derived from the predicted image predSamples[ ] before the illumination compensation by the following expression.

predSamples'[x][y]=predSamples[x][y]+b

Further, to clearly denote the predicted image predSamplesL1[x][y] of L1, the following expression is also possible.

predSamples*L1*'[x][y]=predSamples*L1*[x][y]+b

When predFlagL0 is 1 and predFlagL1 is 1, the weight prediction section 3094 to be described below generates a predicted image, for example, by the following expression using predSamplesL0[x][y] of L0 to which the illumination prediction is not applied and the predicted image predSamplesL1[x][y] of L1 to which the illumination prediction is not applied.

predSamples[x][y]=(predSamples*L0*[x][y]+predSamples*L1*[x][y]+offset2)>>shift2

In this case, the illumination prediction is not executed in the case of the bi-prediction. However, it is possible to obtain the advantageous effect of avoiding a situation in which a processing amount necessary to execute the illumination prediction on two reference images is large (advantageous effect F5c).

(Illumination Compensation Section 3093H)

Hereinafter, an illumination compensation section 3093H which is a modification example of the illumination compensation section 3093 will be described.

Figure 85:
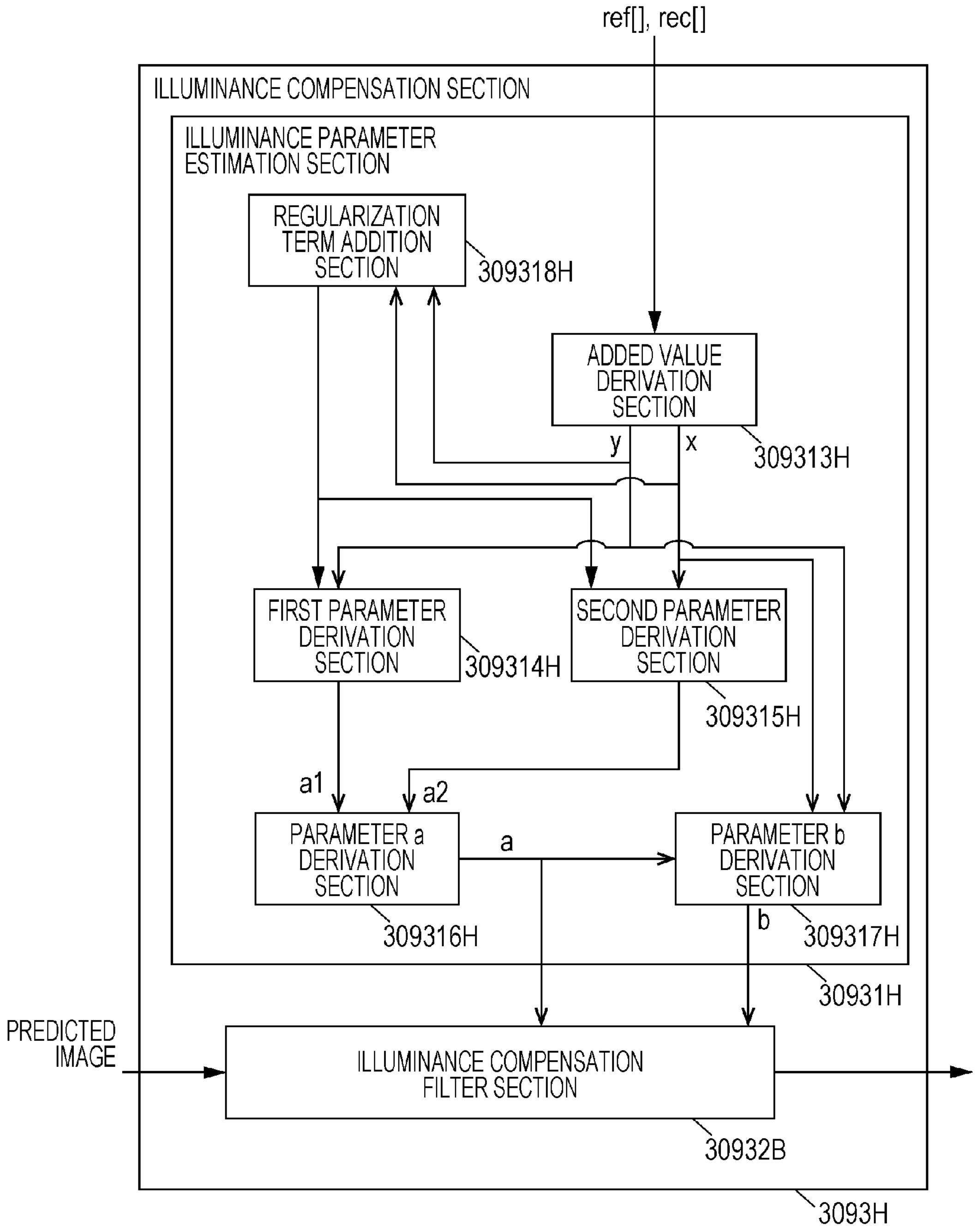
FIG. 85 is a block diagram illustrating the configuration of an illumination compensation section 3093H according to the embodiment.

FIG. 85 is a block diagram illustrating the configuration of the illumination compensation section 3093H according to the embodiment. The illumination compensation section 3093 is configured to include an illumination parameter estimation section 30931H and an illumination compensation filter section 30932B. The illumination parameter estimation section 30931H is configured to include the added value derivation section 309313H, the first parameter derivation section 309314H, the second parameter derivation section 309315H, the parameter a derivation section 309316H, the parameter b derivation section 309317H, and a regularization term addition section 309318H.

The illumination parameter estimation section 30931H denotes the pixels C in the neighbor of the reference block on the reference layer image illustrated in FIG. 13 as pixel values x[ ] of the reference image, denotes the pixels L in the neighbor of the target block as pixel values y[ ] of the decoded image, and derives the parameters a and b which are parameters when the pixel values y[ ] of the decoded image are predicted from the pixel values x of the reference image, based on the pixel values x[ ] of the reference image and the pixel values y[ ] of the decoded image.

The added value derivation section 309313H derives the sum Y of the pixel values y of the decoded image and the sum X of the pixel values x of a reference image by expression (B-2) and expression (B-3) below.

$X = \Sigma x[j]$    expression (B-2)

$Y = \Sigma y[i]$    expression (B-3)

Here, Σ is a sum in regard to the reference region and a sum for an index i specifying a pixel of the reference region is derived. Here, y[i] is a pixel value in the index i of the decoded image and x[i] is a pixel value in the index i of the reference image. The count shift value iCountShift is a logarithm 2 with the size (the number of pixels) of the reference region.

iCountShift=log 2(the number of pixels of reference region)    expression (B-6)

The first parameter derivation section 309314H derives the first parameter a1 from the sum Y of the pixel values y of the decoded image by the following expression.

a1=Y;    expression (B-7')

The second parameter derivation section 309315H derives the second parameter a2 from the sum X of the pixel values x of the reference image by the following expression.

a2=X;    expression (B-8')

The derived first parameter a1 and second parameter a2 are output to the parameter a derivation section 309316H.

The regularization term addition section 309318H derives the regularization term acost from the sum X of the pixel values x of the reference image.

acost=X>>ashift    expression (E-1')

Here, ashift is a predetermined integer and is used to adjust the size of the regularization term acost by right shift.

In a normal image, the sum X of the pixel values x of the reference image is substantially the same as the sum Y of the pixel values y of the decoded image. Therefore, the regularization term acost may be derived from the sum Y of the pixel values y of the decoded image.

$$acost=Y>>ashift \quad \text{expression (E-1'')}$$

The regularization term addition section 309318E adds the regularization term to a parameter (for example, Y) used to derive the first parameter.

$$Y=Y+acost \quad \text{expression (H-2)}$$

In this addition, the regularization term addition section 309318E adds the regularization term to a parameter (for example, X) used to derive the second parameter.

$$X=X+acost \quad \text{expression (H-3)}$$

The regularization term may also be added by the first parameter derivation section 309314B and the second parameter derivation section 309315B. In this case, the first and second parameters are derived by the following expressions instead of expression (B-7') and expression (B-8').

$$a1=Y+acost \quad \text{expression (E-2'')}$$

$$a2=X+acost \quad \text{expression (E-3'')}$$

Figure 86:
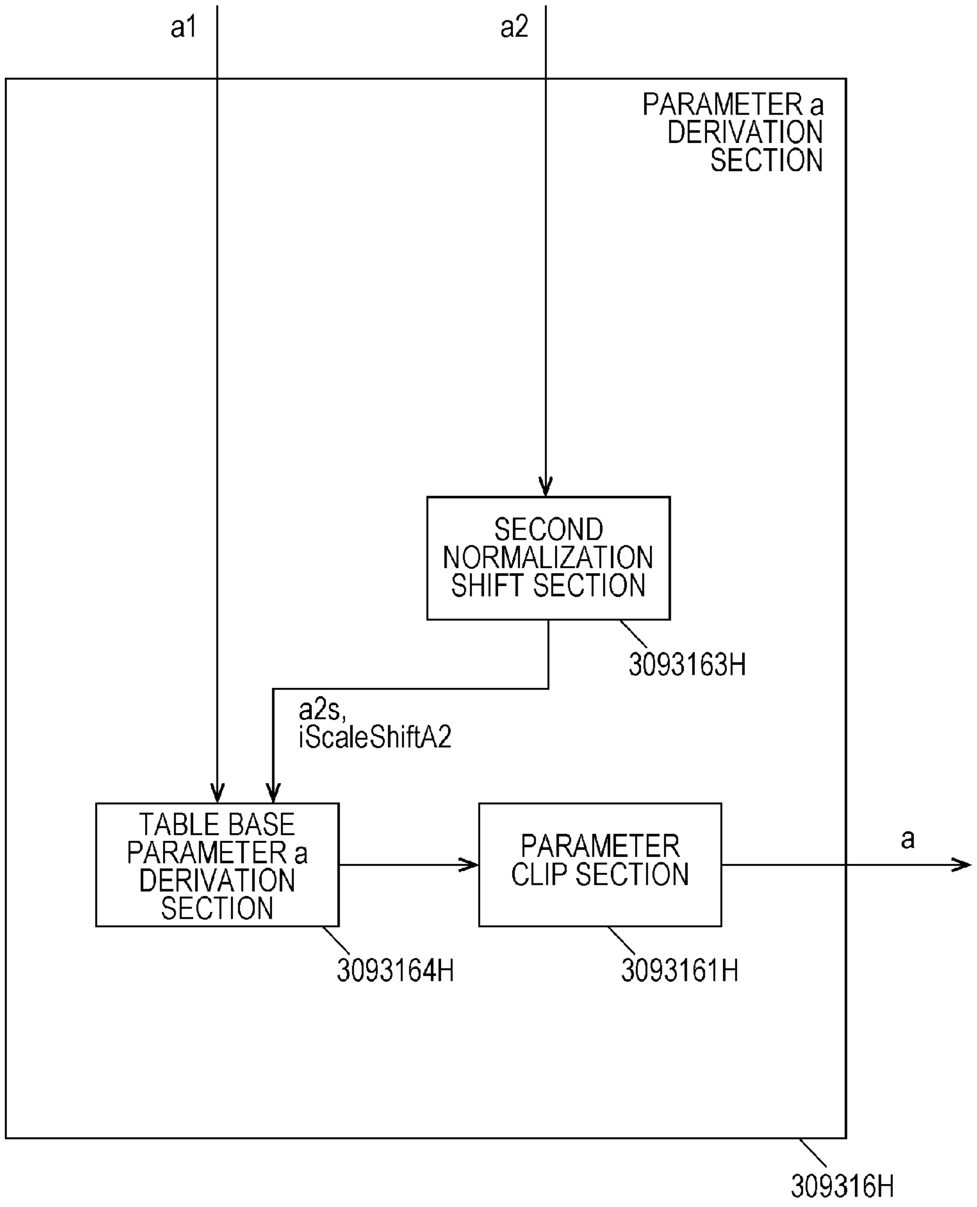
FIG. 86 is a block diagram illustrating the configuration of a parameter a derivation section 309316H according to the embodiment.

FIG. 86 is a block diagram illustrating the configuration of the parameter a derivation section 309316H according to the embodiment. The parameter a derivation section 309316H is configured to include a parameter clip section 3093161H, a second normalization shift section 3093163H, and a table base parameter a derivation section 3093164H.

The second normalization shift section 3093163H derives a second normalized shift value iScaleShiftA2 according the size of the second parameter a2 by the following expression. The derived second normalized shift value iScaleShiftA2 is output to the table base parameter a derivation section 3093164H.

$$iScaleShiftA2=Max(0,GetMSB(abs(a2))-6) \quad \text{expression (B-14)}$$

The second normalization shift section 3093163H derives the normalized second parameter a2$s$ by right shifting the second parameter a2 by the second normalized shift value iScaleShiftA2.

$$a2s=a2>>iScaleShiftA2 \quad \text{expression (B-16)}$$

The table base parameter a derivation section 3093164H derives the parameter a shift value iScaleShiftA by the following expression.

$$ScaleShiftA=iScaleShiftA2+15-iShift \quad \text{expression (B-18')}$$

The table base parameter a derivation section 3093164H derives the parameter a by the following expression by obtaining a product with the first parameter a1 and right shifting the product by the table shift value (ScaleShiftA) with reference to the inverse table value invTable decided according to the normalized second parameter a2$s$.

$$a=(a1*invTable[a2s])>>(ScaleShiftA) \quad \text{expression (B-19)}$$

FIG. 84 is a diagram illustrating the inverse table value invTable[ ] used in the embodiment. As described above, the inverse invTable[x] of FIG. 84 is 0 when the index x is 0. When the index x is a value other than 0, the inverse invTable[x] is derived from a value obtained as an integer by dividing a predetermined integer M (here, 15th power of 2) by x.

The value of the parameter a is a ratio of the first parameter a1 to the second parameter a2 (which corresponds to a value shifted left a1/a2 by iShift).

The parameter clip section 3093161H may clip the range of the parameter a to a value equal to or greater than 0 or equal to or less than 255, which is an 8-bit integer, by the following operation.

$$a=Clip3(0,255,a) \quad \text{expression (B-12')}$$

The parameter b derivation section 309317H derives the parameter b by the following expression by dividing a value, which is obtained by multiplying the sum X of the pixel values of the reference image by the parameter a and subtracting a value shifted right by the fixed shift value iShift from the sum Y of the pixel values of the decoded image, by the number of pixels of the reference region.

$$b=(Y-((a*X)>>iShift)+(1<<(iCountShift-1)))>>iCountShift \quad \text{expression (B-20)}$$

The right shift of iCountShift corresponds to the dividing by the number of pixels of the reference region. It is appropriate to use a value from 4 to 7, for example, 5, as the fixed shift value.

The illumination compensation filter section 30932B derives a predicted image predSamples'[ ] after the illumination compensation from a predicted image predSamples[ ] before the illumination compensation using the estimation parameters derived by the illumination parameter estimation section 30931B. For example, when the parameter b is derived by expression (B-20), the following expression is used.

$$predSamples'[x][y]=((a*predSamples[x][y])>>iShift)+b \quad \text{expression (B-21)}$$

In the configuration of the illumination parameter estimation section 30931H, by adding the same regularization term to the first parameter a1 and the second parameter a2 and calculating the parameter a of the value corresponding to the ratio of the first parameter a1 to the second parameter a2, an estimated parameter becomes robust when there is a deviated value or the like, and thus it is possible to obtain the advantageous effect of improving coding efficiency. The regularization term may be generated from the sum X of the pixel values x of the reference image or may be generated from the sum Y of the pixel values y of the decoded image.

In the configuration of the illumination parameter estimation section 30931H, since only the second parameter derived from the sum X of the pixel values x of the decoded image is regularized and the first parameter derived from the sum Y of the pixel values y of the decoded image is not normalized, the table shift value ScaleShiftA is necessarily equal to or greater than 0. Therefore, depending on whether the table shift value ScaleShiftA is equal to or greater than 0 (whether the table shift value ScaleShiftA is positive), the parameter can be derived with only right shift without switching between expression (B-19) which is the right shift and expression (B-19') which is the left shift.

In the configuration of the illumination parameter estimation section 30931H, as illustrated in FIG. 84, the appropriate parameter a can be obtained even by defining the inverse table invTable[x] so that inverse table invTable[x] is 0 when the index x is 0 and deriving the parameter a based on the value obtained by subtracting the second parameter (the normalized second parameter) derived from the sum Y of the pixel values y of the decoded image from the inverse table invTable[x] defined in this way, even when the operation method is not changed according to whether the second parameter (the normalized second parameter) is 0. Therefore, it is possible to obtain the advantageous effect of reducing a processing amount.

In the configuration of the illumination parameter estimation section 30931H, when the parameter clip section 3093161H clips the parameter a to the range of an 8-bit nonnegative integer and the bit depth of the pixel values is 8 bits, the product of the parameter a and the pixel value can be processed as a product of 8-bit nonnegative integers. Therefore, it is possible to obtain the advantageous effect of easily executing the process by an SIMD operation or the like.

In another configuration of the illumination compensation section 3093H, in the illumination parameter estimation section 30931H of the illumination compensation section 3093, a parameter a derivation section 309316H2 can also be used instead of the parameter a derivation section 309316H.

Figure 87:
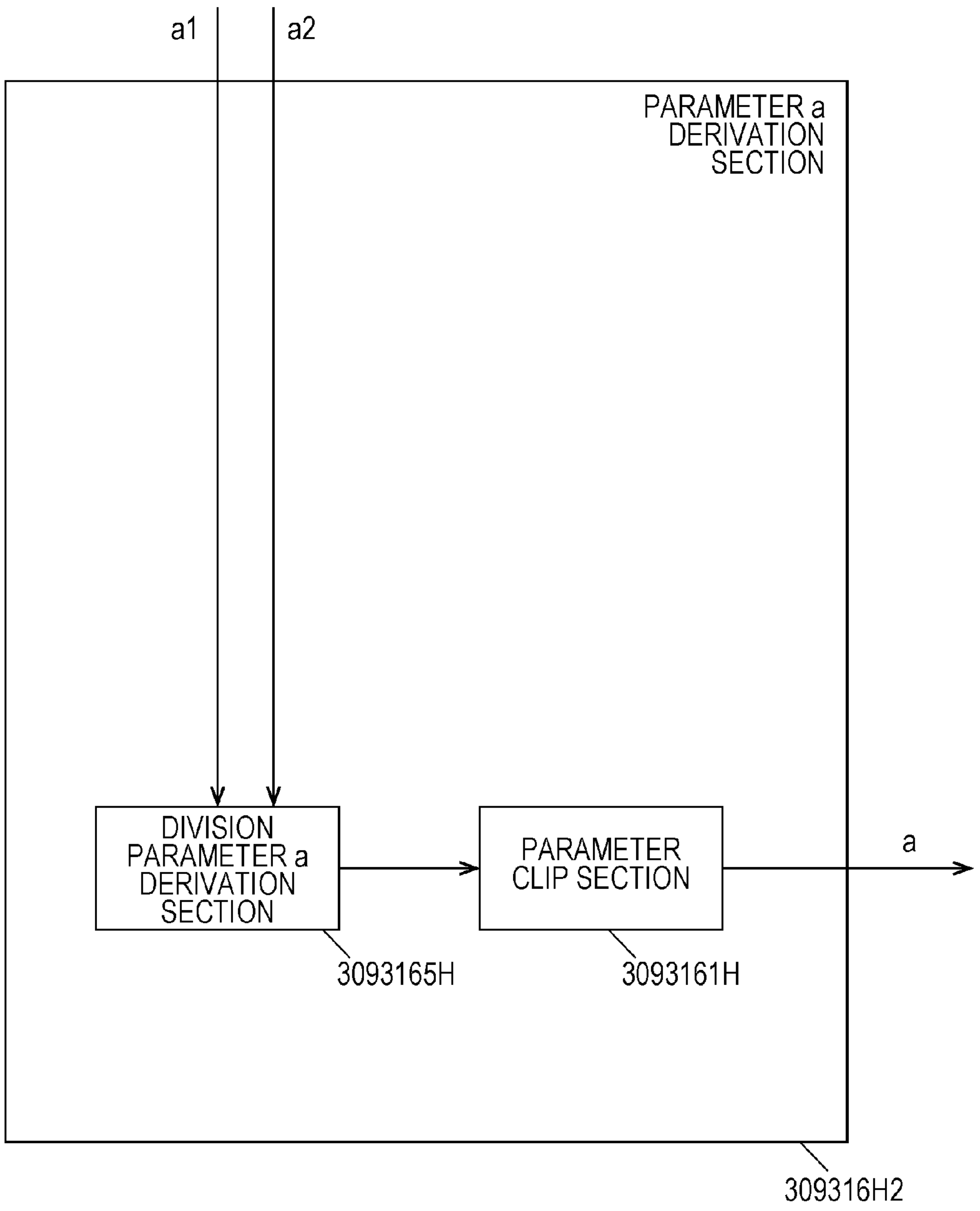
FIG. 87 is a block diagram illustrating the configuration of a parameter a derivation section 309316H2 according to the embodiment.

FIG. 87 is a block diagram illustrating the configuration of the parameter a derivation section 309316H2 according to the embodiment. The parameter a derivation section 309316H2 is configured to include a parameter clip section 3093161H and a division parameter a derivation section 3093165H.

The division parameter a derivation section 3093165H derives the parameter a using a ratio of the first parameter to the second parameter by the following expression.

$$a=(a1+a2/2)/a2 \quad \text{expression (B-19')}$$

The parameter clip section 3093161H clips the range of the parameter a to the range of an 8-bit nonnegative variable, as described above.

In the configuration of the illumination parameter estimation section 30931H2, by adding the same regularization term to the first parameter a1 and the second parameter a2 and calculating the parameter a of the value corresponding to the ratio of the first parameter a1 to the second parameter a2, an estimated parameter becomes robust when there is a deviated value or the like, and thus it is possible to obtain the advantageous effect of improving coding efficiency.

In the configuration of the illumination parameter estimation section 30931H, when the parameter clip section 3093161H clips the parameter a to the range of an 8-bit nonnegative integer and the bit depth of the pixel values is 8 bits, the product of the parameter a and the pixel value can be processed as a product of 8-bit nonnegative integers. Therefore, it is possible to obtain the advantageous effect of easily executing the process by an SIMD operation or the like.

The parameter a derivation section 309316H2 uses division to derive the parameter a, unlike the parameter a derivation section 309316H. The division is an operation of which a process is relatively complex, but accuracy of the parameter a is improved to that extent. Therefore, it is possible to obtain the advantageous effect of improving coding efficiency.

(Weight Prediction)

The weight prediction section 3094 generates a predicted picture block P (predicted image) by multiplying the input motion disparity image predSamplesLX by a weight coefficient. When the residual prediction and the illumination compensation are executed, the input motion disparity image predSamplesLX is an image subjected to the residual prediction and the illumination compensation. When one (predFlagL0 or predFlagL1) of the reference list use flags is 1 (in the case of the uni-prediction) and the weight prediction is not used, a process of the following expression that matches the input motion disparity image predSamplesLX (LX is L0 or L1) to the number of pixel bits is executed.

$$predSamples[x][y]=Clip3(0,(1<<bitDepth)-1,(predSamplesLX[x][y]+offset1)>>shift1)$$

Here, shift1=14−bitDepth and offset1=1<<(shift1−1).

When both (predFlagL0 or predFlagL1) of the reference list use flags are 1 (in the case of the bi-prediction) and the weight prediction is not used, a process of the following expression that averages the input motion disparity images predSamplesL0 and predSamplesL1 to be matched with the number of pixel bits is executed.

$$predSamples[x][y]=Clip3(0,(1-bitDepth)-1,(predSamplesL0[x][y]+predSamplesL1[x][y]+offset2)>>shift2)$$

Here, shift2=15−bitDepth and offset2=1<<(shift2−1).

When the weight prediction is executed as the uni-prediction, the weight prediction section 3094 derives a weight prediction coefficient w0 and an offset o0 and executes a process of the following expression.

$$predSamples[x][y]=Clip3(0,(1<<bitDepth)-1,((predSamplesLX[x][y]*w0+2\log 2WD-1)>>\log 2WD)+o0)$$

Here, log 2WD is a variable that indicates a predetermined shift amount.

When the weight prediction is executed in the case of the bi-prediction, the weight prediction section 3094 derives weight prediction coefficients w0, w1, o0, and o1 and executes a process of the following expression.

$$predSamples[x][y]=Clip3(0,(1<<bitDepth)-1,(predSamplesL0[x][y]*w0+predSamplesL1[x][y]*w1+((o0+o1+1)<<\log 2WD))>>(\log 2WD+1))$$

(Structure of Coded Data Including Additional Prediction Flag)

Figure 14:
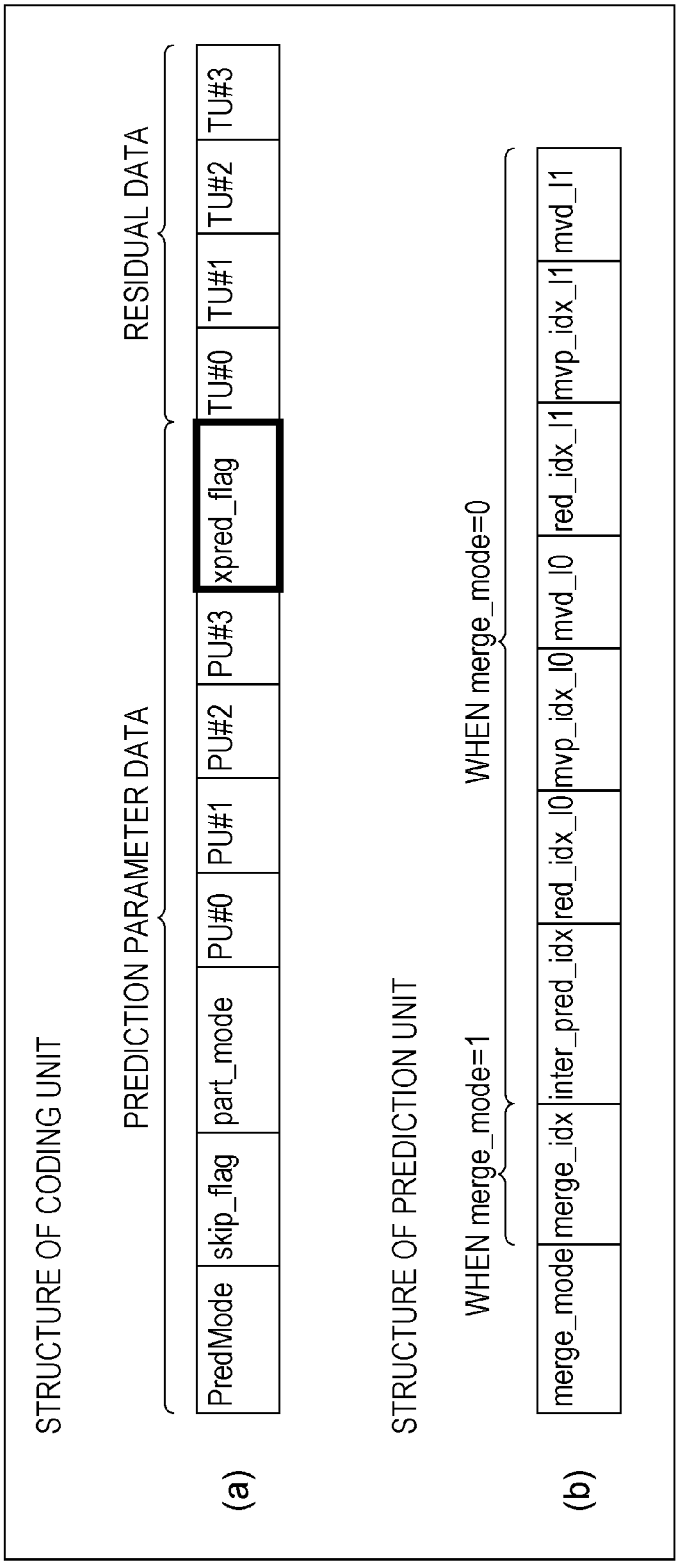
FIG. 14 is a schematic diagram illustrating the structure of coded data (a coding unit or a prediction unit) decoded in an inter-prediction parameter decoding control section according to the embodiment.

FIG. 14(*a*) is a diagram illustrating the structure of coded data (the structure of a coding unit) decoded in the inter-prediction parameter decoding control section 3031. As illustrated in FIG. 14(*a*), the additional prediction flag xpred_flag is coded with the structure of the coding unit (CU) after PredMode and SkipFlag and after the prediction unit PU. The additional prediction flags xpred_flag is present in the coded data when the prediction parameter of each PU designated by the syntax component of the prediction unit located earlier than the additional prediction flags xpred_flag is a predetermined value. In contrast, when the prediction parameter is not the predetermined value, the additional prediction flags xpred_flag is not present.

FIG. 14(*b*) is a diagram illustrating the structure of the coded data of each prediction unit. The PU includes merge_mode. When merge_mode is 1, that is, merge_mode is the merge prediction mode, the PU includes merge_idx. When merge_mode is 0, that is, merge_mode is the AMVP prediction mode, the PU includes inter_pred_idx, ref_idx_l0, mvp_idx_l0, mvd_l0, ref_idx_l1, and mvp_idx_l1, and mvd_l1 instead of merge_idx. Here, inter_pred_idx has a value of one of Pred_L0, Pred_L1, and Pred_Bi, which indicate the L0 prediction, the L1 prediction, and the bi-prediction, respectively. When inter_pred_idx are the L0 prediction and the bi-prediction, the prediction parameters ref_idx_l0, mvp_idx_l0, and mvd_l0 regarding the L0 prediction are included. When inter_pred_idx are the L1 prediction and the bi-prediction, the prediction parameters ref_idx_l0, mvp_idx_l0, and mvd_l0 regarding the L1 prediction are included.

FIG. 15 is a syntax table illustrating the structure of coded data of an additional prediction flag. In the drawing, coding_unit indicates that the syntax table is the coded data of the coding unit. First, skip_flag is present in a CU header CUH except for a case in which slice_type is I_SLICE. Next, when skip_flag is 1, prediction_unit( ) is included as the PU data. The coding parameter of the PU is included in prediction_unit. When skip_flag is 0, pred_mode_flag is included in the CU header CUH except for the case in which slice_type is I_SLICE. Here, pred_mode_flag is a flag that indicates whether the intra-prediction is executed (MODE_INTRA) or the inter prediction is executed (MODE_INTRA) and is set in PredMode after decoding. The detailed description when PredMode is the intra-prediction (MODE_INTRA) will be omitted. When PredMode is the inter-prediction (MODE_INTRA), the split mode part_mode is included in the CU header CUH. The split mode part_mode is set in PartMode after the decoding. The split mode has the value of one of PART_2N×2N, PART_2N×N, PART_2N×nU, PART_2N×nD, PART_N×2N, PART_nL×2N, PART_nR×2N, and PART_N×N and each includes one, two, or four pieces of PU data prediction_unit( ). After prediction_unit( ) res_pred_flag and ic_enable_flag are defined as the CU header CUH (precisely, a CU footer) and the additional prediction flag xpred_flag.

In FIG. 15, depth_flag is a flag that indicates whether a target layer is depth, pred_mode is a flag that indicates the intra prediction MODE_INTRA or the inter prediction MODE_INTER, motion_pred_exists is a flag that indicates whether the motion prediction is used in the PU forming the CU, and disparity_pred_exists is a flag that indicates whether the disparity prediction (disparity compensation) is used in the PU forming the CU. As indicated in SE1501 of FIG. 15, res_pred_flag is included as the additional prediction flag when a target layer is not depth data, the prediction mode is a mode other than the intra-prediction, and the motion prediction is used in one PU so that a determination formula indicating whether res_pred_flag is included is described as depth_flag && pred_mode!=MODE_INTRA && motion_pred_exists. Further, ! is a function taking logical NOT and && is a function taking logical AND. As indicated in SE1502 of FIG. 15, ic_enable_flag is included as the additional prediction flag when a target layer is not depth data, the prediction mode is a mode other than the intra-prediction, and the disparity prediction is used in one PU so that a determination formula indicating whether ic_enable_flag is included is described as depth_flag && pred_mode!=MODE_INTRA && disparity_pred_exists. Whether the additional prediction flags (res_pred_flag and ic_enable_flag) are included is determined by the additional prediction flag determination section 30314 to be described below.

(Additional Prediction Flag Determination Section)

Figure 16:
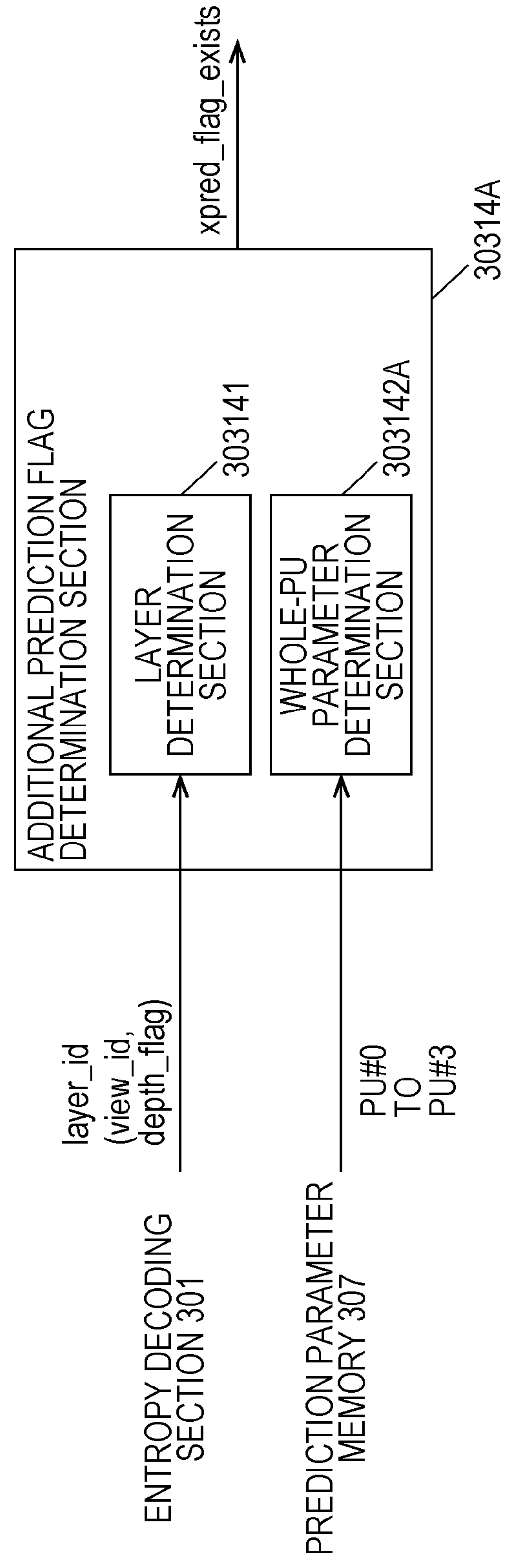
FIG. 16 is a schematic diagram illustrating the configuration of an additional prediction flag determination section according to the embodiment.

FIG. 16 is a schematic diagram illustrating the configuration of the additional prediction flag determination section 30314. The additional prediction flag determination section 30314 is configured to include a layer determination section 303141 and a whole-PU parameter determination section 303142. The layer determination section 303141 determines whether a target layer is the base layer (base view) or is not the base layer (base view) and determines whether the target layer is depth or texture. When the target layer is not the base layer (base view) and is not the depth, the layer determination section 303141 determines validity. Otherwise, invalidity is determined. In the determination of whether the target layer is not the base view, depth_flag && ViewId indicated by SE1501 and SE1502 of the coded data in FIG. 15 are determined, as indicated by depth_flag, when ViewId is not 0 (ViewId) and the target layer is not the depth. The whole-PU parameter determination section 303142 determines whether the target CU including the additional prediction flag is not for the intra-prediction. That is, determination of pred_mode!=MODE_INTRA indicated in SE1501 and SE1502 of FIG. 15 is executed. Next, the whole-PU parameter determination section 303142 inspects the prediction parameters of all of the PUs included in the target CU and determines whether the additional prediction flag is decoded from the coding unit according to the value of the prediction parameter. Specifically, when the additional prediction flag xpred_flag is the residual prediction resi_pred_flag, the whole-PU parameter determination section 303142 determines whether the prediction parameter is the motion prediction (one of the PUs included in the CU is the motion prediction) and sets motion_pred_exists. Whether the PU is the motion prediction, that is, the vector of the PU is the motion vector, is determined by the method in which the determination result is false (not the disparity vector) in the determination method of the reference layer determination section 303111 included the above-described inter-prediction parameter decoding control section 3031 (the same applies below). When the additional prediction flag xpred_flag is the illumination compensation ic_enable_flag, it is determined whether the prediction parameter is the disparity prediction (one of the PUs included in the CU includes the disparity prediction) and disparity_pred_exists is set. Whether the PU is the disparity prediction, that is, the vector of the PU is the disparity vector, is determined by the method in which the determination result is true (the disparity vector) in the determination method of the reference layer determination section 303111 included in the above-described inter-prediction parameter decoding control section 3031 (the same applies below).

FIG. 17 is a diagram illustrating a process of determining the flag motion_pred_exists indicating whether the CU includes the PU by which motion prediction is executed in the whole-PU parameter determination section 303142. As illustrated in FIG. 17, motion_pred_exists is first set to be false. Subsequently, the split mode part_mode of the CU is checked and it is checked whether ref_view_id_lX of the reference layer used to generate the predicted image of the PU is the same as ViewId of the target layer by inter_pred_idc of each PU included in the CU.

When part_mode is PART_2N×2N, the CU includes only one PU and the coordinates thereof are (x0, y0). The whole-PU parameter determination section 303142 checks whether the PU by which the motion compensation is executed is included in the one PU. When the PU is included in the one PU, motion_pred_exists set to be true. Specifically, when inter_pred_idc is not Pred_L1 (predFlagL0 is 1 in the case of the L0 prediction and the bi-prediction), the L0 list is used. Therefore, it is checked whether the view ID (ref_view_id_lX (ref_view_id_l0)) of the reference picture of the L0 list is the same as the view ID (View Id) of the target layer. When the view ID of the reference picture is the same as the view ID of the target layer, the prediction is the motion prediction. Therefore, motion_pred_exists is set to be true. Further, when inter_pred_idc is not Pred_L0 (the L1 prediction and the bi-prediction), the L1 list is used. Therefore, it is checked whether the view ID (ref_view_id_lX (ref_view_id_l1)) of the reference picture of the L1 list is the same as the view ID (ViewId) of the target layer. When the view ID of the reference picture is the same as the view ID of the target layer, the prediction is the motion prediction. Therefore, motion_pred_exists is set to true. The determination of whether the foregoing inter_pred_idc is not Pred_L1 can be substituted with determination of pred- FlagL0=1 and the determination of whether inter_pred_idc is not Pred_L0 can be substituted with determination of predFlagL1=1.

When part_mode is PART_2N×N, the CU includes two PU and the coordinates thereof are (x0, y0) and (x0, y0+nCbS/2). Here, nCbS is the size (=width=height) of a target CU. The whole-PU parameter determination section 303142 checks whether the PU by the motion compensation is executed is included in the one PU. When the PU is included in the one PU, motion_pred_exists set to be true. Specifically, for the reference picture to be used, it is checked whether the view ID (ref_view_id_lX) of the reference picture is the same as the view ID (View Id) of the target layer by inter_pred_idc of the coordinate (x0, y0) and the coordinates (x0, y0+nCbS/2). When the view ID of the reference picture is the same as the view ID of the target layer, motion_pred_exists by which the motion prediction is executed is set to be true. Hereinafter, the other description of part_mode will be omitted.

FIG. 18 is a diagram illustrating a process of determining the flag disparity_pred_exists indicating whether the CU includes the PU by which disparity prediction is executed in the whole-PU parameter determination section 303142. As illustrated in FIG. 18, disparity_pred_exists is first set to be false. Subsequently, the split mode part_mode of the CU is checked and it is checked whether the PU by which the disparity prediction is executed is included in the PUs from inter_pred_idc and ref_view_id_lX of all the PUs included in the CU. When the PU is included, motion_pred_exists is set to be true. For example, when part_mode is PART_2N×2N, the CU includes only one PU and the coordinates thereof are (x0, y0). When the one PU, specifically, inter_pred_idc, is not Pred_L1 (the L0 prediction and the bi-prediction), the L0 list is used, and therefore, the whole-PU parameter determination section 303142 checks whether ref_view_id_lX (ref_view_id_l0) of the L0 list is the same as ViewId of the target layer. When ViewId of the reference layer is not the same, the prediction is the disparity prediction. Therefore, disparity_pred_exists is set to be true. Further, when inter_pred_idc is not Pred_L0 (the L1 prediction and the bi-prediction), the L1 list is used. Therefore, it is checked whether ref_view_id_lX (ref_view_id_l1) of the L1 list is the same as ViewId of the target layer. When ViewId of the reference layer is not the same, the prediction is the disparity prediction. Therefore, disparity_pred_exists is set to true. Since the other operation of part_mode is the same as the determination of motion_pred_exists described in FIG. 39 except for the determination of whether ViewId is the same, the description thereof will be omitted.

As described above, in the additional prediction flag determination section 30314, the layer determination section 303141 determines that the target layer is not the base layer (the base view) and is not the depth. The whole-PU parameter determination section 303142 determines whether the target CU is not for the intra-prediction. Further, the whole-PU parameter determination section 303142 checks all of the PUs included in the CU and determines that the residual prediction flag resi_pred_flag which is the additional prediction flag is included in the coded data when the motion prediction is included in one PU.

In the additional prediction flag determination section 30314, the layer determination section 303141 determines that the target layer is not the base layer (the base view) and is not the depth. The whole-PU parameter determination section 303142 determines whether the target CU is not for the intra-prediction. The whole-PU parameter determination section 303142 checks all of the PUs included in the CU and determines that the illumination compensation flag ic_enable_flag which is the additional prediction flag is included in the coded data when the disparity prediction is included in one PU included in the CU.

(Modification Example A of Inter-Prediction Parameter Decoding Section)

Hereinafter, an inter-prediction parameter decoding section 303A will be described as a modification example of the inter-prediction parameter decoding section 303. In the modification example A, when two prediction methods are used as additional prediction applied to the motion compensation image and a flag indicating first prediction is turned on, a flag indicating second prediction is derived so that this flag is not decoded from the coded data and is turned off. The inter-prediction parameter decoding section 303A includes an additional prediction flag decoding section 30311A, the merge index decoding section 30312, and the vector candidate index decoding section 30313. FIG. 19 is a syntax table illustrating the structure of coded data decoded by the additional prediction flag decoding section 30311A. When two flags are used as the additional prediction flags (here, the residual prediction flag res_pred_flag and the illumination compensation flag ic_enable_flag are used) and the first flag is turned on (here, res_pred_flag is 1), as indicated by SE1901 of FIG. 19, an additional prediction flag determination section 30314A determines that the second flag (here, ic_enable_flag) is not present in the coded data, as indicated by determination of res_pred_flag==0 of SE1902 of FIG. 19. The determination of res_pred_flag==0 is identical to the determination of !res_pred_flag. The additional prediction flag decoding section 30311A derives the second flag ic_enable_flag as 0 indicating that the second flag ic_enable_flag is not decoded in which the additional prediction is not executed. Thus, it is not necessary to derive a flag disparity_pred_exists indicating whether the CU necessary in the inter-prediction parameter decoding section 303A includes the PU including disparity prediction. In FIG. 19, the residual prediction flag res_pred_flag is coded earlier than the illumination compensation flag ic_enable_flag, but this order may be replaced. In this case, when the first additional prediction flag (here, the illumination compensation flag ic_enable_flag) is turned on (here, 1), the additional prediction flag determination section 30314A determines that the second additional prediction flag (here, the residual prediction flag res_pred_flag) is not present and derives the second flag res_pred_flag as 0. That is, only when ic_enable_flag==0, res_pred_flag is decoded from the coded data.

In the configuration of the above-described modification example A, when two additional prediction flags are used (two residual prediction and illumination compensation are used as the additional prediction), whether the second additional prediction flag (for example, ic_enable_flag) is present can be determined based on the value of the first additional prediction flag (for example, res_pred_flag). Further, whether the second additional prediction flag is present can be determined without deriving the prediction parameter of each PU (for example, the determination of disparity_pred_exists of whether the prediction parameter of the PU has the disparity vector). Therefore, it is possible to obtain the advantageous effect of executing the decoding process for the additional prediction flag easily. In a case in which two additional predictions are exclusive (when the residual prediction is turned on, the illumination prediction is turned off, or vice versa), when the value of the first flag is turned on, the second flag is necessarily turned off. Therefore, it is not necessary to decode the second flag. In the foregoing modification example A, redundancy between the two flags is reduced. Therefore, it is possible to obtain the advantageous effect of improving coding efficiency. A method for the residual prediction is not limited to the following description. A method called generalized residual prediction (GRP) or advanced residual prediction (ARP) of estimating a residual from a difference between two motion compensation images in a decoding device may be used. In the foregoing modification example A, instead of the residual prediction flag res_pred_flag, a residual prediction weight res_pred_weight indicating a weight of the residual prediction may be used or a residual prediction mode res_pred_mode indicating a kind of residual prediction may be used.

(Modification Example A2 of Inter-Prediction Parameter Decoding Section)

Hereinafter, an inter-prediction parameter decoding section 303A2 will be described as a modification example of the inter-prediction parameter decoding section. The inter-prediction parameter decoding section 303A2 includes an additional prediction flag decoding section 30311A2, the merge index decoding section 30312, and the vector candidate index decoding section 30313.

FIG. 20 is a syntax table illustrating the structure of coded data decoded by the additional prediction flag decoding section 30311A2. When two flags are used as the additional prediction flags, the additional prediction flag decoding section 30311A2 according to the modification example A2 determines whether a first flag (here, res_pred_flag) indicated by SE2001 of FIG. 20 is present using the fact that the flag motion_pred_exists indicating whether the PU includes the motion prediction is 1 and determines whether a second flag (here, ic_enable_flag) indicated in SE2002 of FIG. 20 is present using the fact that a flag motion_pred_exists indicating whether the PU derived in the determination of the first additional prediction flag (res_pred_flag) includes the motion prediction is 0.

The residual prediction flag res_pred_flag and the illumination compensation flag ic_enable_flag may be reversed. That is, the fact that disparity_pred_exists for the determination of whether the PU includes the disparity prediction is 1 is used to determine whether the first flag (here ic_enable_flag) is present. The fact that disparity_pred_exists for the determination of whether the PU includes the motion prediction is 0 is used to determine whether the second flag (here res_pred_flag) is present.

In the configuration of the foregoing modification example A2, in the foregoing determination, whether the second additional prediction flag is present is determined based on the value used to determine whether the first additional prediction flag is present. Therefore, whether the second additional prediction flag is present can be determined without checking the prediction parameter of each PU. Therefore, it is possible to obtain the advantageous effect of executing the decoding process for the additional prediction flag easily.

(Modification Example B of Inter-Prediction Parameter Decoding Section)

Hereinafter, an inter-prediction parameter decoding section 303B will be described as a modification example of the inter-prediction parameter decoding section. The inter-prediction parameter decoding section 303B includes an additional prediction flag decoding section 30311B, the merge index decoding section 30312, and the vector candidate index decoding section 30313. FIG. 21 is a syntax table illustrating the structure of coded data decoded by the inter-prediction parameter decoding section 303B. A difference from FIG. 15 is that while the flags used to determine whether the additional prediction flag is present are the flags motion_pred_exists and disparity_pred_exists regarding the prediction method for one PU forming the CU in FIG. 15 (SE1501 and SE1502), the flags are changed to flags pu0_is_motion_pred and pu0_is_disparity_pred regarding a prediction method of a first PU (PU0) in FIG. 21 (SE2101 and SE2102).

(Additional Prediction Flag Decoding Section 30311B)

Figure 22:
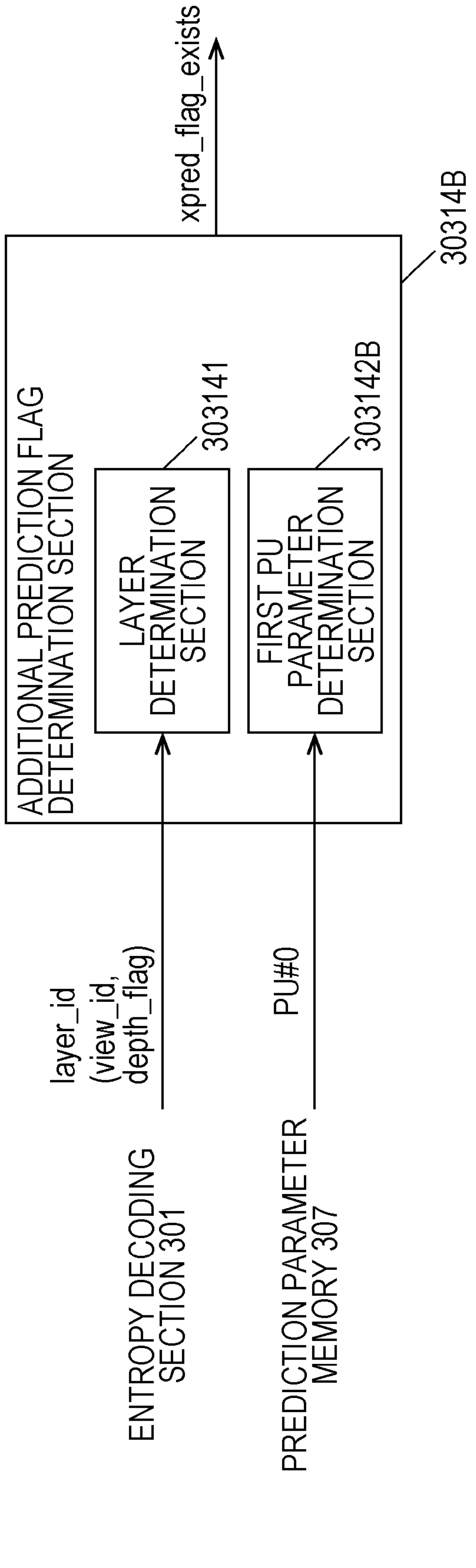
FIG. 22 is a schematic diagram illustrating the configuration of the additional prediction flag determination section included in a modification example B of the inter-prediction parameter decoding section according to the embodiment.

The additional prediction flag decoding section 30311B includes an additional prediction flag determination section 30314B instead of the above-described additional prediction flag determination section 30314. FIG. 22 is a schematic diagram illustrating the configuration of the additional prediction flag determination section 30314B. The additional prediction flag determination section 30314B is configured to include a layer determination section 303141 and a PU0 parameter determination section 303142B. Since the layer determination section 303141 has been described above, the description thereof will be omitted. The PU0 parameter determination section 303142B determines whether a target CU including the additional prediction flag is the intra-prediction. That is, the PU0 parameter determination section 303142B executes determination of pred_mode!=MODE_INTRA. Next, the PU0 parameter determination section 303142B inspects the prediction parameters of the first PU (PU0) included in the target CU. When the additional prediction flag xpred_flag is the residual prediction flag resi_pred_flag, determination of pu0_is_motion_pred indicating whether the PU0 includes the motion prediction is executed. When the additional prediction flag xpred_flag is the illumination compensation flag ic_enable_flag, determination of pu0_is_disparity_pred indicating whether PU0 includes the disparity prediction is executed. FIGS. 23(*a*) and 23(*b*) are diagrams illustrating operations of executing the determination of pu0_is_motion_pred and the determination of pu0_is_disparity_pred in the additional prediction flag determination section 30314B. Unlike FIGS. 17 and 18, only determination of the PU0, that is, the PU with coordinates (x0, y0), is executed without executing determination on all the PUs included in the CU. The determination of pu0_is_motion_pred indicating whether the PU0 includes the motion prediction is determination executed in such a manner that 1 is set when the view ID (ref_viewid_lX) of the reference picture is the same as the view ID (ViewId) of the target layer and 0 is set when the view ID (ref_viewid_lX) is not the same as the view ID (ViewId). The determination of pu0_is_disparity_pred indicating whether the PU0 includes the motion prediction is determination executed in such a manner that 1 is set when ref_viewid_lX is different from ViewId and 0 is set when ref_viewid_lX is not same as ViewId. Since the details are the same as those of FIGS. 17 and 18, the description thereof will be omitted.

In the modification example B of the inter-prediction parameter decoding section with the above-described configuration, the additional prediction flag determination section 30314B may check only the prediction parameters of the beginning PU without checking the prediction parameters of all the PUs included in the target CU. Therefore, it is possible to obtain the advantageous effects of easily executing the process of checking whether the additional prediction flags xpred_flag (here, the residual prediction flag res_pred_flag and the illumination compensation flag ic_enable_flag) are included in the coded data.

(Modification Example C of Inter-Prediction Parameter Decoding Section)

Hereinafter, an inter-prediction parameter decoding section 303C will be described as a modification example of the inter-prediction parameter decoding section. The inter-prediction parameter decoding section 303C includes an additional prediction flag decoding section 30311C, the merge index decoding section 30312, and the vector candidate index decoding section 30313. FIG. 24 is a syntax table illustrating the structure of coded data decoded by the inter-prediction parameter decoding section 303C. In FIG. 15 (SE1501 and SE1502), and FIG. 21 (SE2101 and SE2102), the residual prediction flag res_pred_flag and the illumination compensation flag ic_enable_flag are used as separate flags. In FIG. 24, however, one common flag res_pred_and_ic_enable_flag is used to determine ON and OFF of the residual prediction and the illumination compensation, as indicated by SE2401. In FIGS. 15 and 21, in the determination formula indicating the additional prediction flag is present, the PU uses the determination indicating whether the motion compensation or the disparity prediction is executed, as in motion_pred_exists, disparity_pred_exists, pu0_is_motion_pred, and pu0_is_disparity_pred. In FIG. 24, however, the determination of the prediction parameters of the PU is not used in a determination formula indicating whether the additional prediction flag is present. That is, in SE2401 of FIG. 24, as indicated in !depth_flag && ViewId && PredMode!=MODE_INTRA, depth_flag indicating whether the target layer is the depth, ViewId indicating the view ID, and the prediction mode PredMode of the target CU are used for determination. However, these parameters are components which can be determined without using a prediction parameter (the vector or the reference picture index) of the individual PU and the determination of the prediction parameters of the PU is not used.

(Additional Prediction Flag Decoding Section 30311C)

Figure 25:
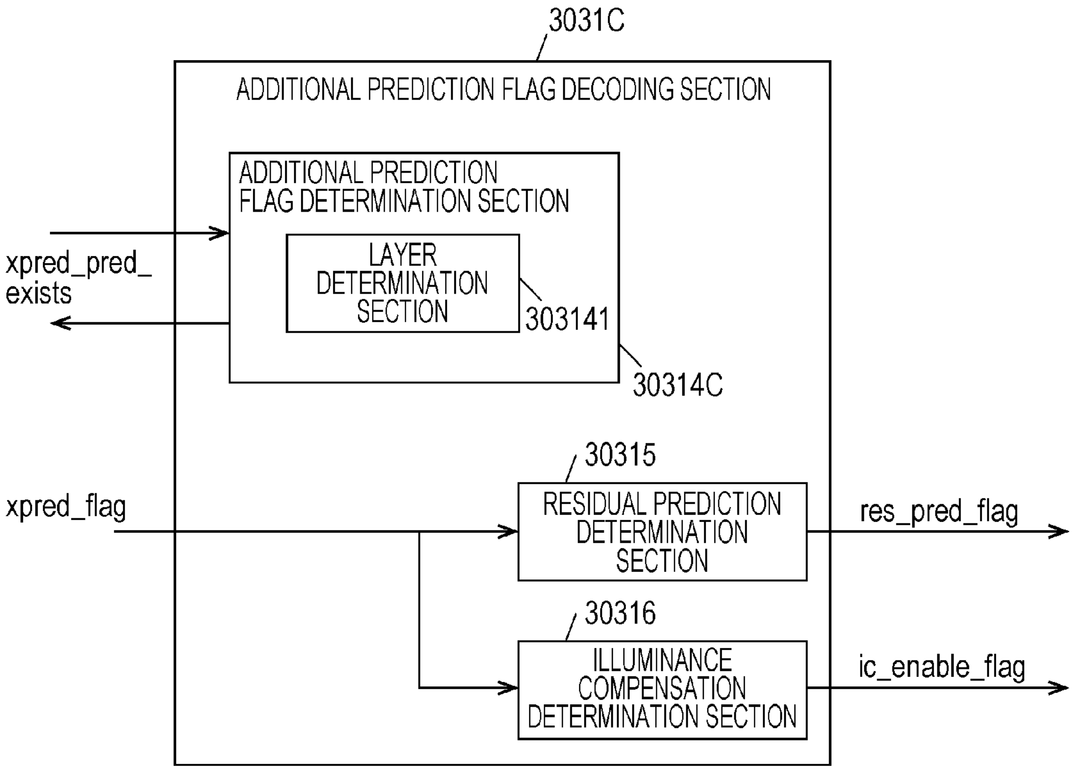
FIG. 25 is a schematic diagram illustrating the configuration of the additional prediction flag determination section included in the modification example C of the inter-prediction parameter decoding section according to the embodiment.

FIG. 25 is a schematic diagram illustrating the configuration of the additional prediction flag decoding section 30311C. The additional prediction flag decoding section 30311C is configured to include an additional prediction flag determination section 30314C, a residual prediction determination section 30315, and an illumination compensation determination section 30316. The additional prediction flag determination section 30314C is configured to include a layer determination section 303141. In the flag determination section 30314C, the layer determination section 303141 determines that the target layer is not the base layer (the base view) and is not the depth. Further, when the target CU is not for the intra-prediction, the additional prediction flag determination section 30314C determines that the common flag res_pred_and_ic_enable_flag which is the additional prediction flag is included in the coded data.

Subsequently, when the additional prediction flag res_pred_and_ic_enable_flag is determined to be included, the additional prediction flag decoding section 30311C extracts (decodes) the additional prediction flag res_pred_and_ic_enable_flag from the coded data. When the additional prediction flag res_pred_and_ic_enable_flag is determined not to be included, the additional prediction flag res_pred_and_ic_enable_flag is set to 0 without decoding the coded data. When the additional prediction flag res_pred_and_ic_enable_flag is 0, none of the additional prediction (the residual prediction and the illumination compensation) is executed. When the additional prediction flag res_pred_and_ic_enable_flag is 1, it is determined by the following determination whether the residual prediction and the illumination compensation are executed.

The residual prediction determination section 30315 determines whether the residual prediction is executed as additional prediction in units of each PU included in the CU. The residual prediction determination section 30315 sets res_pred_flag=1 when the additional prediction flag res_pred_and_ic_enable_flag is 1 and the motion prediction is used in the target PU. In the other cases, res_pred_flag=0 is set.

The illumination compensation determination section 30316 determines whether the illumination compensation is executed as the additional prediction in units of each PU included in the CU. When the additional prediction flag res_pred_and_ic_enable_flag is 1 and the disparity prediction is used in the target PU, the illumination compensation determination section 30316 sets ic_enable_flag=1. In the other cases, ic_enable_flag=0 is set.

In the additional prediction flag decoding section 30311C with the above-described configuration, the additional prediction flag is set as the common flag common to the residual prediction flag and the illumination compensation flag and thus the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. Further, in the coded data, one flag is included as the additional prediction flag instead of two flags (the residual prediction flag and the illumination compensation flag). Therefore, it is possible to obtain the advantageous effect of decreasing a coding amount of the flag.

(Modification Example D of Inter-Prediction Parameter Decoding Section)

Hereinafter, an inter-prediction parameter decoding section 303D with a different configuration of a modification example D will be described as a modification example of the inter-prediction parameter decoding section. The inter-prediction parameter decoding section 303D includes an additional prediction flag decoding section 30311D, the merge index decoding section 30312, and the vector candidate index decoding section 30313.

Figure 26:
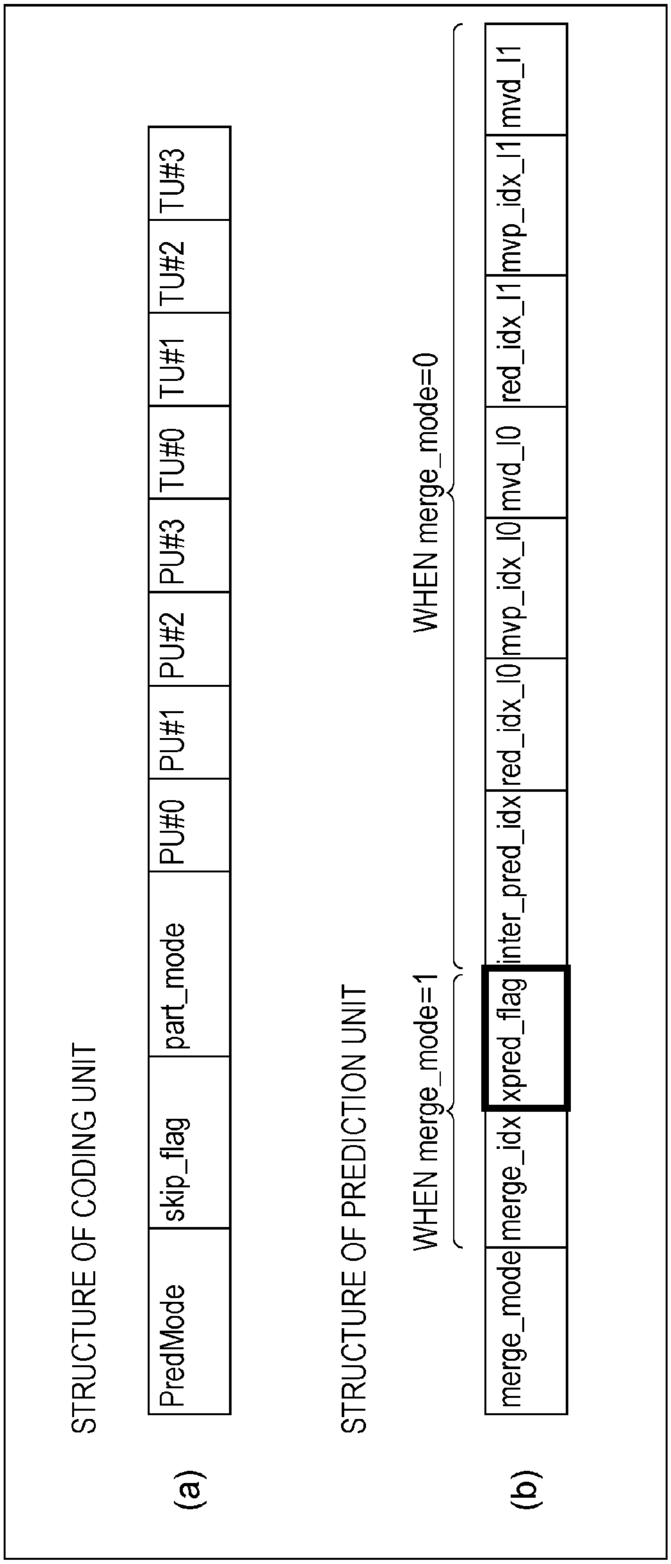
FIG. 26 is a schematic diagram illustrating the structure of coded data (a coding unit or a prediction unit) decoded by a modification example D of the inter-prediction parameter decoding section according to the embodiment.

FIG. 26(*a*) is a diagram illustrating the structure of coded data (the structure of the coding unit) decoded by the inter-prediction parameter decoding control section 3031D. Unlike FIG. 14(*a*), the additional prediction flag is not included in the layer (the CU header CUH or the CU footer CUF) of the coding unit.

FIG. 26(*b*) is a diagram illustrating the structure of coded data (the structure of the prediction unit) decoded by the inter-prediction parameter decoding control section 3031D. The additional prediction flag is included in the layer of the prediction unit. The PU includes merge_mode. When merge_mode is 1, that is, merge_mode is the merge prediction mode, the PU includes merge_idx. The additional prediction flags (here, the residual prediction flag res_pred_flag and the illumination compensation flag ic_enable_flag) are included after merge_idx. When merge_mode is 0, that is, merge_mode is the AMVP prediction mode, the PU is the same as that described in FIG. 14(*b*), and thus the description thereof will be omitted.

FIG. 27 is a syntax table illustrating the structure of coded data of the additional prediction flag. As indicated in SE2701 and SE2703 of FIG. 27, the residual prediction flag res_pred_flag and the illumination compensation flag ic_enable_flag are included after the merge index merge_idx by the determination formula, !depth_flag && ViewId && PredMode!=MODE_INTRA, described above in FIG. 24.

In the additional prediction flag decoding section 30311D with the above-described configuration, by restricting the additional prediction flag to the case of the merge mode, the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. For example, the flag is set in units of the PU in either an additional prediction flag decoding section 30311D2 or an additional prediction flag decoding section 30311D3 to be described below, and thus the same configuration as the additional prediction flag decoding section 30311D is realized.

(Additional Prediction Flag Decoding Section 30311D2)

Figure 28:
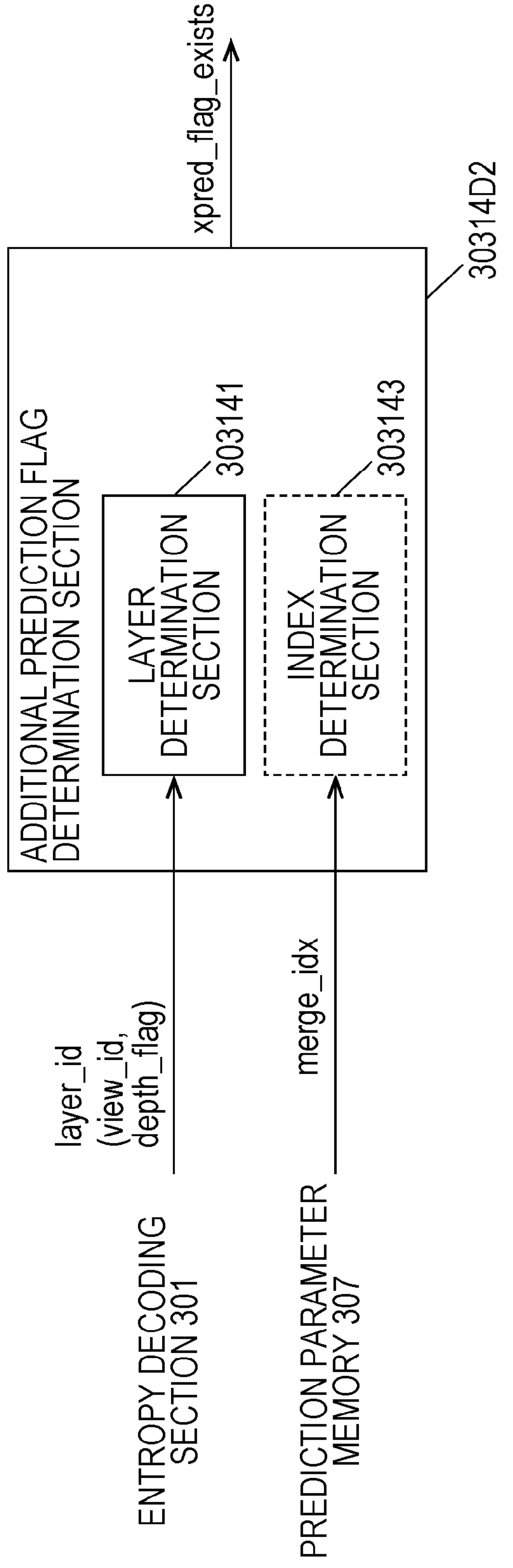
FIG. 28 is a schematic diagram illustrating the configuration of the additional prediction flag determination section included in the modification example D2 of the inter-prediction parameter decoding section according to the embodiment.

FIG. 28 is a schematic diagram illustrating another configuration of the additional prediction flag decoding section 30311D2. The additional prediction flag decoding section 30311D2 includes an additional prediction flag determination section 30314D2 instead of the additional prediction flag determination section 30314. The additional prediction flag determination section 30314D2 is configured to include a layer determination section 303141 and an index determination section 303143. The index determination section 303143 determines whether the merge index merge_idx is a predetermined value. Specifically, the index determination section 303143 determines whether the merge index merge_idx is an index (a merge candidate of the inter-layer prediction) mainly using the prediction parameter obtained in the inter-layer prediction (interview prediction). When the inter-layer prediction (interview prediction) is allocated to merge_idx=0, whether merge_idx=0 is determined. When the merge index merge_idx is the predetermined value, an additional prediction flag (here, res_pred_flag) is determined to be present.

FIG. 29 is a syntax table illustrating the structure of coded data of the additional prediction flag. As indicated in SE2801 and SE2802 of FIG. 29, a determination formula indicating whether the merge index merge_idx is the predetermined value is used in addition to the determination formula, !depth_flag && ViewId && PredMode!=MODE_INTRA, described above in FIG. 24, as indicated by SE2701 and SE2703 of FIG. 27. Here, only when merge_idx==0, the residual prediction flag res_pred_flag which is one of the additional prediction flags is included in the coded data. When the inter-layer merge candidate (motion prediction) described in FIG. 7 corresponds to merge_idx=0 and when the merge candidate is the inter-layer merge candidate (motion prediction) or there is a high possibility of the merge candidate being the inter-layer merge candidate (motion prediction) in the restriction to merge_idx=0, the additional prediction flag indicating whether the residual prediction flag res_pred_flag is used is decoded from the coded data. In the other case (when the merge candidate is not the inter-layer merge candidate (motion prediction)), the residual prediction is not used. The residual prediction flag res_pred_flag is set to zero. The reason why the foregoing possibility is high is that there is a high possibility of merge_idx=0 being another merge candidate when there inter-layer merge candidate (motion prediction) is not present. Since the residual prediction is particularly valid in the case of the motion prediction, in such restriction, it is possible to obtain the advantageous effect of improving the coding efficiency along with the parsing dependency.

A determination formula indicating that merge_idx is within a predetermined range may be used rather than the determination formula merge_idx==0 indicating whether merge_idx is the predetermined value. For example, merge_idx<=1 may be used as a determination formula. In this case, merge_idx=0 in which there is a high possibility of the merge candidate being the inter-layer merge candidate (motion prediction) and merge_mode=1 in which validity is high in other case are merge mode candidates.

In FIG. 29, the description has been made only for the residual prediction flag, but the description may be applied to the illumination compensation flag. In this case, the merge candidate corresponding to the inter-layer merge candidate (disparity prediction) is set as a merge candidate of an index DV. Then, only when merge_idx==DV, an additional prediction flag indicating whether the residual prediction flag res_pred_flag which is one of the additional prediction flags uses ic_enable_flag included in the coded data is decoded from the coded data. In the other case (when the merge candidate is not the inter-layer merge candidate (disparity prediction)), the illumination compensation is not used. The residual prediction flag ic_enable_flag is set to zero.

In the additional prediction flag decoding section 30311D2 with the above-described configuration, the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. Further, the additional prediction flag decoding section 30311D2 decodes the additional prediction flag only when the merge index merge_idx is the predetermined value indicating the inter-layer merge candidate (interview merge candidate) Thus, when the additional prediction is not valid, the additional prediction flag is not included in the coded data. Therefore, it is possible to obtain the advantageous effect of improving coding efficiency.

(Modification Example D3 of Inter-Prediction Parameter Decoding Section)

Hereinafter, an inter-prediction parameter decoding section 303D3 with a different configuration of a modification example D will be described as a modification example of the inter-prediction parameter decoding section.

FIG. 30(*a*) is diagram illustrating the structure of coded data (the structure of the coding unit) decoded by the inter-prediction parameter decoding section 303D3. Like FIG. 26(*a*), the additional prediction flag is not included in the layer (the CU header CUH or the CU footer CUF) of the coding unit.

FIG. 30(*b*) is a diagram illustrating the structure of coded data (the structure of the prediction unit) decoded by the inter-prediction parameter decoding section 303D3. The additional prediction flag is included in the layer of the prediction unit. The PU includes merge_mode. When merge_mode is 1, that is, merge_mode is the merge prediction mode and when the determination formula, !depth_flag && ViewId && PredMode!=MODE_INTRA, described above in FIG. 24 is true, the additional prediction flags (here, the residual prediction flag res_pred_flag and the illumination compensation flag ic_enable_flag) are included. When the additional prediction flag is 0, merge_idx is included in the coded data. When the additional prediction flag is 1, merge_idx is not included in the coded data and is derived in a way to be described below.

FIG. 31 is a syntax table illustrating the structure of coded data when the additional prediction flag is the residual prediction flag (res_pred_flag). As indicated by SE3101 and SE3102 of FIG. 31, the residual prediction flag res_pred_flag is included before the merge index merge_idx by the determination formula, !depth_flag && ViewId &&

PredMode!=MODE_INTRA, described above in FIG. 24. Further, when the residual prediction flag res_pred_flag which is the additional prediction flag is 0, merge_idx is included in the coded data. When res_pred_flag is 1, merge_idx is not included in the coded data.

FIG. 32 is a syntax table illustrating the structure of coded data when the additional prediction flag is an illumination compensation flag (ic_enable_flag). As indicated by SE3201 and SE3202 of FIG. 32, the illumination compensation flag ic_enable_flag is included before the merge index merge_idx when the determination formula, !depth_flag && ViewId && PredMode!=MODE_INTRA, described above in FIG. 24 is true. Further, when the illumination compensation flag ic_enable_flag which is the additional prediction flag is 0, merge_idx is included in the coded data. When res_pred_flag is 1, merge_idx is not included in the coded data.

Figure 33:
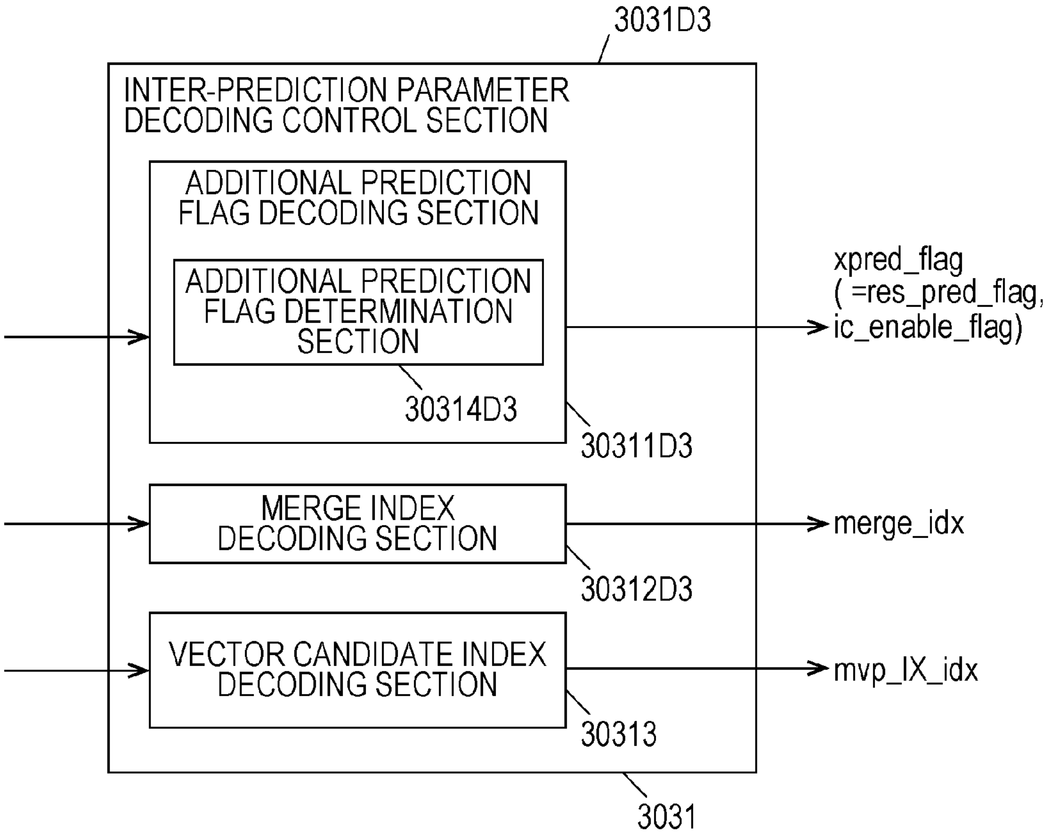
FIG. 33 is a schematic diagram illustrating the configuration of the modification example D3 of the inter-prediction parameter decoding section according to the embodiment.

FIG. 33 is a schematic diagram illustrating another configuration D3 of the modification example D of the inter-prediction parameter decoding control section. An inter-prediction parameter decoding control section 3031D3 includes an additional prediction flag decoding section 30311D3, a merge index decoding section 30312D3, and a vector candidate index decoding section 30313. The additional prediction flag decoding section 30311D3 includes an additional prediction flag determination section 30314D3 therein and determines whether the additional prediction flag is present by determination of !depth_flag && ViewId && PredMode!=MODE_INTRA. In the case of the merge mode, the additional prediction flag decoding section 30311D3 extracts the additional prediction flag from the CU header CUH or the CU footer CUF of the coded data when the additional prediction flag determination section 30314D3 determines that the additional prediction flag is included. The merge index decoding section 30312D3 extracts (decodes) the merge index merge_idx from the coded data when the additional prediction flag (res_pred_flag or ic_enable_flag) is 0. In contrast, when the additional prediction flag is 1, the merge index merge_idx is derived without being decoded from the coded data. Specifically, when the additional prediction flag is the residual prediction flag res_pred_flag, the merge candidate is the inter-layer merge candidate (motion prediction) described in FIG. 7, that is, the inter-layer candidate (interview candidate). In particular, an index in the case of the motion prediction is set as the merge index merge_idx. For example, when the inter-layer merge candidate (motion prediction) is mainly derived as index 0 (excluding a case in which the inter-layer merge candidate (motion prediction) is not present), merge_idx=0 is set. When the additional prediction flag is the illumination compensation flag ic_enable_flag, the inter-layer merge candidate (disparity prediction) described in FIG. 7, that is, the merge candidate, is mainly the inter-layer candidate (interview candidate). In particular, an index in the case of the disparity prediction is set as the merge index merge_idx. For example, when the inter-layer candidate (interview candidate) using the disparity prediction is mainly derived as the index DV (when a candidate is derived from DV+1-th when the beginning candidate is the 0-th candidate), merge_idx=DV is set. When the candidates of the motion prediction are not separated from the candidates of the disparity prediction among the inter-layer candidates (interview candidates), the inter-layer merge candidates (motion prediction) may not be distinguished from the inter-layer merge candidates (disparity prediction) and an inter-layer candidate (interview candidate) may be merely selected. Further, in the case of the index of 0 to 4 when the additional prediction is not executed, other numbers, for example, an index called 5 and an index called 6, may be respectively allocated to the inter-layer merge candidate (motion prediction) and the inter-layer merge candidate (disparity prediction) on which the additional prediction is executed. The merge candidate index in which the motion prediction and the disparity prediction are clearly distinguished from each other may be selected.

In the inter-prediction parameter decoding section 303D3 with the above-described configuration, the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. When the additional prediction flag is decoded before the merge index merge_idx and the additional prediction flag is valid, the merge index which is not valid when the additional prediction is not valid by restricting the range of the merge index merge_idx (for example, the merge index is not included when there is only one candidate as an option) is not decoded. Therefore, it is possible to obtain the advantageous effect of improving the coding efficiency.

(Modification Example D4 of Inter-Prediction Parameter Decoding Section)

Hereinafter, an inter-prediction parameter decoding section 303D4 with a different configuration of a modification example D will be described as a different modification example of the inter-prediction parameter decoding section.

Figure 34:
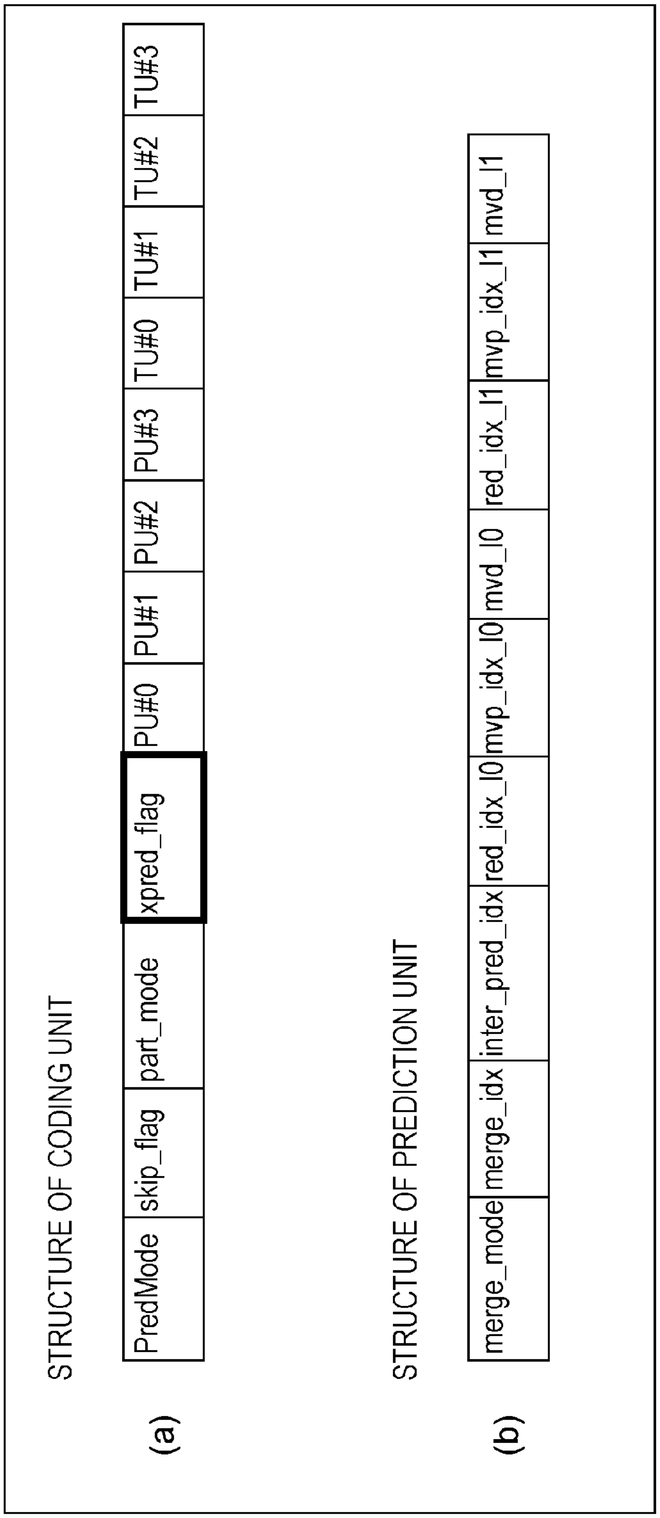
FIG. 34 is a schematic diagram illustrating the structure of coded data (a coding unit or a prediction unit) decoded by a modification example D4 of the inter-prediction parameter decoding section according to the embodiment.

FIG. 34(*a*) is a schematic diagram illustrating the structure of coded data (the structure of a coding unit) decoded by the inter-prediction parameter decoding section 303D4. The additional prediction flag is included in the CU header CUH located before the PU in units of the CU.

FIG. 34(*b*) is a diagram illustrating the structure of coded data (the structure of the prediction unit) decoded by the inter-prediction parameter decoding section 303D4. The additional prediction flag is not included in the coded data in units of the PU.

In the inter-prediction parameter decoding section 303D4 with the above-described configuration, the additional prediction flag is set as the flag in units of the CU, but the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. As in the modification example D3, when the additional prediction flag decoded before the merge index merge_idx is used and the additional prediction flag is 1 (when the additional prediction is used), the merge index which is not valid when the additional prediction is not valid by restricting the range of the merge index merge_idx (for example, the merge index is not included when there is only one candidate) is not decoded. Therefore, it is possible to obtain the advantageous effect of improving the coding efficiency.

(Modification Example E of Image Decoding Device 31)

Hereinafter, a modification example of the image decoding device 31 will be described. In the following modification example, an inter-prediction parameter decoding section 303E is included instead of the inter-prediction parameter decoding section 303, an inter-prediction parameter decoding control section 3031E is included instead of the inter-prediction parameter decoding control section 3031, and a merge prediction parameter derivation section 3036E is included instead of the merge prediction parameter derivation section 3036. Since the other means is the same as the inter-prediction parameter decoding section 303, the description thereof will be omitted.

Figure 35:
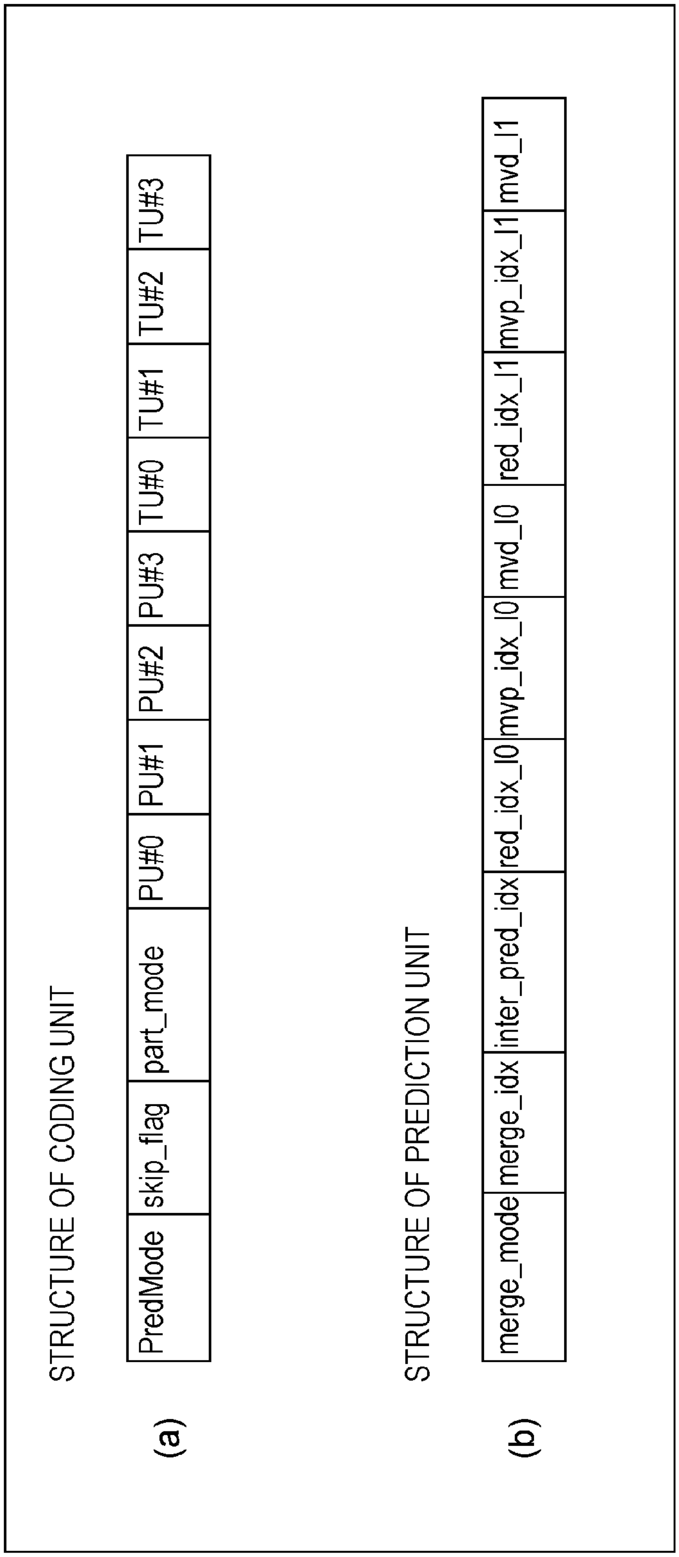
FIG. 35 is a schematic diagram illustrating the structure of coded data (a coding unit or a prediction unit) decoded by a modification example E of the inter-prediction parameter decoding section according to the embodiment.

FIG. 35 is a diagram illustrating the structure of coded data decoded by the inter-prediction parameter decoding section 303E. FIG. 35(*a*) illustrates the structure of the coding unit and FIG. 35(*b*) illustrates the structure of the prediction unit. As illustrated in FIGS. 35(*a*) and 35(*b*), in the embodiment, an additional prediction flag indicating whether the additional prediction is executed is not explicitly included in the coded data.

Figure 36:
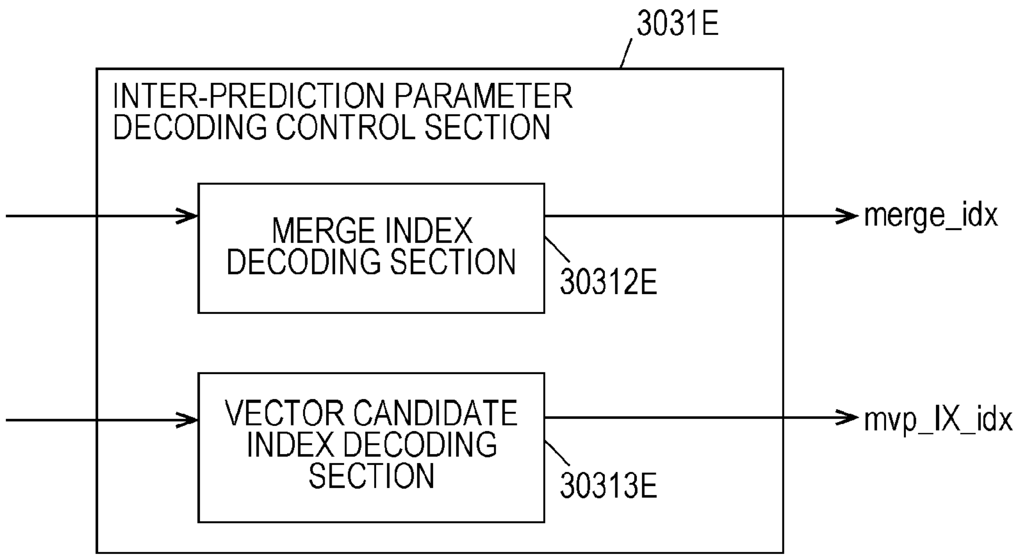
FIG. 36 is a schematic diagram illustrating the configuration of an inter-prediction parameter decoding control section included in the modification example E of the inter-prediction parameter decoding section according to the embodiment.

FIG. 36 is a schematic diagram illustrating the configuration of the inter-prediction parameter decoding control section 3031E. The inter-prediction parameter decoding control section 3031E is configured to include a merge index decoding section 30312E and a vector candidate index decoding section 30313E. Compared to the inter-prediction parameter decoding section 303, the additional prediction flag decoding section 30311 is not included.

The merge prediction parameter derivation section 3036E includes a merge candidate derivation section 30361E and a merge candidate selection section 30362. The merge candidate derivation section 30361E includes not only the vector mvLX and the reference picture index refIdxLX but also additional prediction flags as the prediction parameters, unlike the merge candidate derivation section 30361. The additional prediction flags are the residual prediction flag res_pred_flag and the illumination compensation flag ic_enable_flag.

FIG. 37 is a diagram illustrating merge candidates derived by the merge candidate derivation section 30361E. FIG. 37(*a*) illustrates a case in which the residual prediction is included as the additional prediction, FIG. 37(*b*) illustrates a case in which the illumination compensation is included in the additional prediction, and FIG. 37(*c*) illustrates a case in which the residual prediction and the illumination compensation are included as the additional prediction.

As illustrated in FIG. 37(*a*), the merge candidate derivation section 30361E derives merge candidates for which the residual prediction is executed and merge candidates for which the residual prediction is not executed, as merge candidates when the merge candidate derivation section 30361E is configured to execute the residual prediction as the additional prediction. Specifically, an inter-layer merge candidate (motion prediction), a spatial merge candidate, an inter-layer merge candidate (disparity prediction), a temporal merge candidate, a combined merge candidate, and a zero merge candidate are derived as the merge candidates for which the residual prediction is not executed, and an inter-layer merge candidate (motion prediction) is derived as the candidate for which the residual prediction is executed. The inter-layer merge candidate (motion prediction) in FIG. 37(*a*) is a merge candidate derived by the inter-layer merge candidate derivation section 3036121 described in FIG. 7. The inter-layer merge candidate (disparity prediction) in FIG. 37(*a*) is a merge candidate derived by the inter-layer disparity merge candidate derivation section 3036123 (the same applies below).

As illustrated in FIG. 37(*b*), the merge candidate derivation section 30361E derives merge candidates for which the illumination compensation is executed and merge candidates for which the illumination compensation is not executed, as merge candidates when the merge candidate derivation section 30361E is configured to execute the illumination compensation as the additional prediction. Specifically, an inter-layer merge candidate (motion prediction), a spatial merge candidate, an inter-layer merge candidate (disparity prediction), a temporal merge candidate, a combined merge candidate, and a zero merge candidate are derived as the merge candidates for which the illumination compensation is not executed, and an inter-layer merge candidate (disparity prediction) is derived as the candidate for which the illumination compensation is executed.

As illustrated in FIG. 37(*c*), the merge candidate derivation section 30361E derives merge candidates for which the residual prediction is executed, merge candidates for which the illumination compensation is executed, and merge candidates for which the residual prediction and the illumination compensation are not executed, as merge candidates when the merge candidate derivation section 30361E is configured to execute both of the residual prediction and the illumination compensation as the additional prediction. Specifically, an inter-layer merge candidate (motion prediction), a spatial merge candidate, an inter-layer merge candidate (disparity prediction), a temporal merge candidate, a combined merge candidate, and a zero merge candidate are derived as the merge candidates for which the residual prediction and the illumination compensation are not executed, an inter-layer merge candidate (motion prediction) is derived as a candidate for which the residual prediction is executed, and an inter-layer merge candidate (disparity prediction) is derived as the candidates for which the illumination compensation is executed.

In this case, since the additional prediction flag is not included as the flag in units of the CU or the flag in units of the PU, it is not necessary to determine whether the additional prediction flag is present in the coded data, that is, the prediction parameter of the PU is not referred to for decoding the additional prediction flag. Therefore, the dependency between the prediction parameter and the flag disappears, and thus the problem of the parsing dependency is resolved. Thus, it is possible to obtain the advantageous effect of executing the decoding process for the additional prediction flag easily. Further, the merge candidate derivation section 30361E derives the merge candidate for which the additional prediction is executed and the merge candidate for which the additional prediction is not executed, and thus one of the merge candidates is selected to determine whether to execute the additional prediction. Thus, when the additional prediction is not valid, whether to execute the additional prediction in units of the PU can be selected. Therefore, it is possible to obtain the advantageous effect of improving the coding efficiency. When the prediction parameter is effective for the additional prediction, for example, only the inter-layer merge candidate (motion prediction) is derived as the merge candidate for which the additional prediction is executed. Therefore, when the prediction parameter is not effective for the additional prediction, the candidate for which the additional prediction is executed is not provided. Therefore, it is possible to obtain the advantageous effect of improving the coding efficiency.

(Modification Example F1 of Inter-Prediction Parameter Decoding Section)

Figure 43:
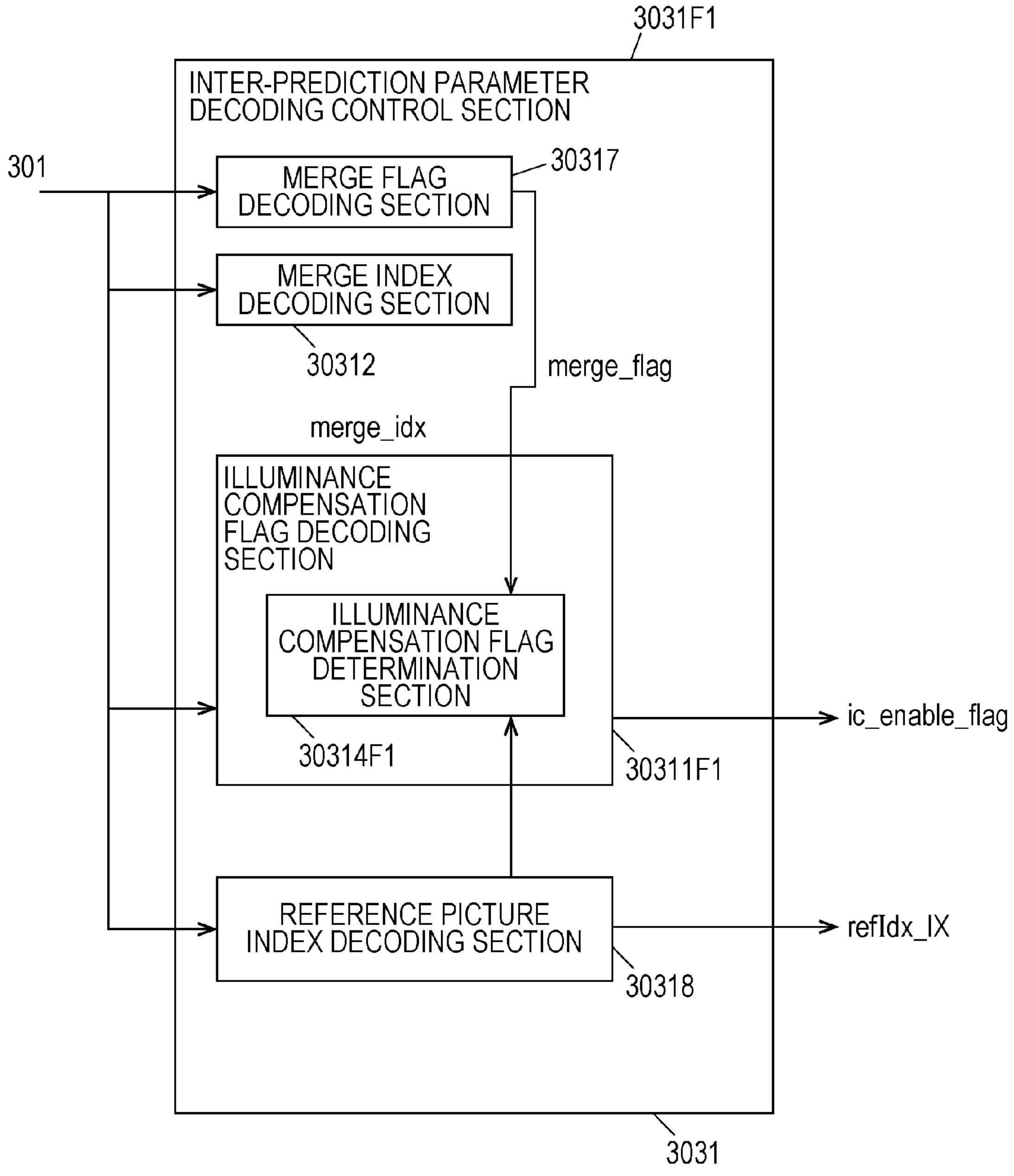
FIG. 43 is a schematic diagram illustrating the configuration of a modification example F1 of the inter-prediction parameter decoding section according to the embodiment.

Hereinafter, an inter-prediction parameter decoding section 303F1 will be described as a modification example of the inter-prediction parameter decoding section. In the modification example F1, a case in which the illumination prediction is executed as the additional prediction will be handled. FIG. 43 is a block diagram illustrating the configuration of the inter-prediction parameter decoding section 303F1. As illustrated in FIG. 43, the inter-prediction parameter decoding section 303F1 is configured to include an illumination compensation flag decoding section 30311F1, a split mode decoding section, a merge flag decoding section 30317, a merge index decoding section 30312, an inter-prediction flag decoding section, a reference picture index decoding section 30318, a vector candidate index decoding section 30313, and a vector difference decoding section.

When an illumination compensation flag determination section 30314F1 determines that the illumination compensation flag ic_enable_flag is included in the coded data, the illumination compensation flag decoding section 30311F1 decodes the illumination compensation flag ic_enable_flag from the coded data. In contrast, when the illumination compensation flag determination section 30314F1 determines that the illumination compensation flag ic_enable_flag is not included in the coded data, the illumination compensation flag decoding section 30311F1 does not decode the coded data and sets 0 (which is a value indicating that the illumination prediction is not executed) in the illumination compensation flag ic_enable_flag.

Figure 44:
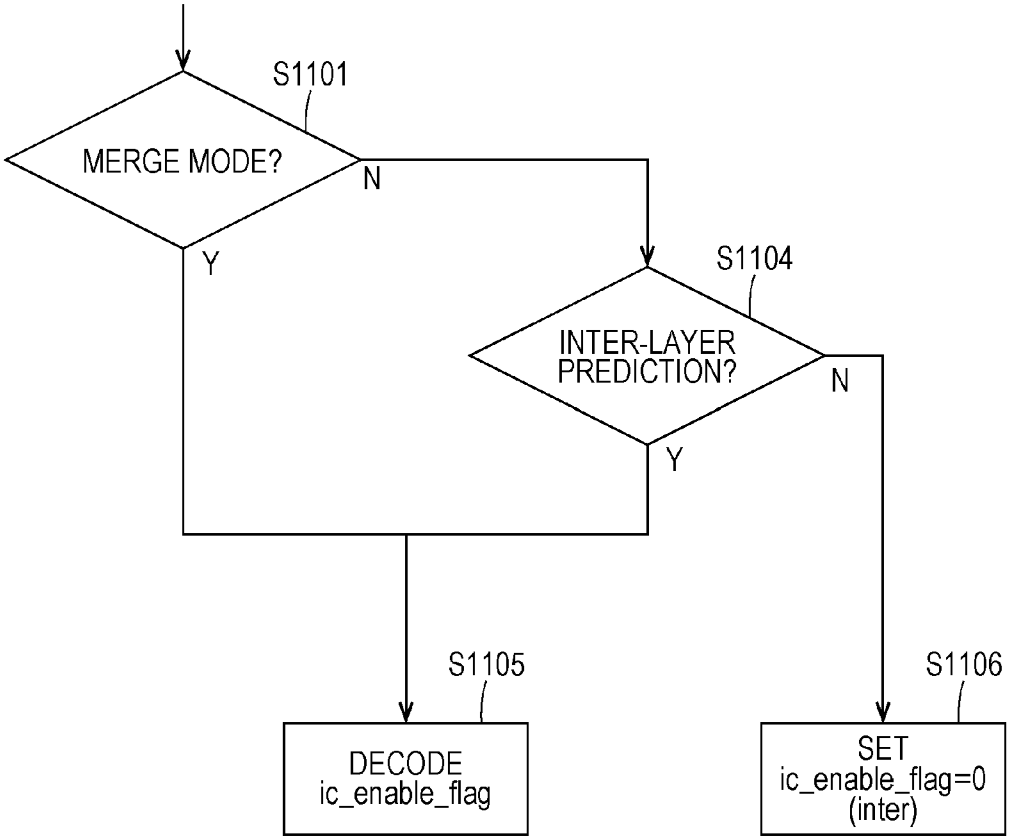
FIG. 44 is a schematic diagram which is a flowchart illustrating an operation of the modification example F1 of the inter-prediction parameter decoding section according to the embodiment.

FIG. 44 is a flowchart illustrating an operation of the illumination compensation flag decoding section 30311F1.

S1101: Referring to the merge flag merge_flag, it is determined whether the target block is in the merge mode (whether merge_flag is 1). When the target block is in the merge mode (merge_flag=1), an illumination compensation flag ic_flag is decoded from the coded data (S1105). When the target block is not in the merge mode (merge_flag=0), the operation transitions to S1104. The illumination compensation flag is decoded by the merge flag decoding section 30317 (the same applies blow).

S1104: Referring to the reference picture index ref_idx_LX, it is determined whether the target block is for the inter-layer prediction (interview prediction). Hereinafter, the interview prediction and the inter-layer prediction are not distinguished from each other and are simply referred to as the interview prediction. When the target block is for the inter-layer prediction, the illumination compensation flag ic_enable_flag is decoded from the coded data (S1105). Otherwise, 00 which is a value indicating that the illumination compensation is not executed is set in ic_enable_flag (S1106). The reference picture index decoding section 30318 decodes ref_idx_LX other than the merge mode from the coded data (the same applies below).

FIG. 46 is a diagram illustrating the structure of the coded data of the illumination compensation flag ic_enable_flag decoded by the inter-prediction parameter decoding section 303F1. As illustrated in FIG. 46, when condition SF1001 && (condition SF1002||condition SF1003) are satisfied, the illumination compensation flag ic_enable_flag is included in the coded data.

Specifically, the condition (SF1001) of the illumination compensation flag slice_ic_enable_flag in units of slices is shown in the following expression.

slice_ic_enable_flag    expression (F-1)

The condition regarding whether the target block is for the merge mode (SF1002) is shown in the following expression.

merge_flag[$x$0][$y$0]    expression (F-2).

The condition (SF1003) indicating that the reference picture index is the inter-layer prediction in a mode (AMVP mode) other than the merge mode is shown in the following expression.

(!merge_flag[$x$0][$y$0]&& anyIvRefPicFlag    expression (F-3)

Further, anyIvRefPicFlag is a flag indicating whether the inter-layer prediction (the interview prediction) is included in the target block (target CU) and is derived by executing the following expression when X=0 or X=1 (where Y=1−X).

anyIvRefPicFlag=anyIvRefPicFlag||(inter_pred_idc[$x$0][$y$0]!=Pred_$LY$ && refViewIdx$LX$[$x$0][$y$0]!=ViewIdx)||(inter_pred_idc[$x$0][$y$1]!=Pred_$LY$&& refViewIdx$LX$[$x$0][$y$1]!=ViewIdx)||(inter_pred_idc[$x$1][$y$0]!=Pred_$LY$&& refViewIdx$LX$[$x$1][$y$0]!=ViewIdx)||(inter_pred_idc[$x$1][$y$1]!=Pred_$LY$&& refViewIdx$LX$[$x$1][$y$1]!=ViewIdx)    expression (F-4)

Here, x1 and y1 indicate the coordinates of the prediction unit when the target CU includes a plurality of prediction units. Specifically, coordinates [x0][x0] correspond to a first prediction unit, coordinates [x0][y1] correspond to a second prediction unit, coordinates [x1][y0] correspond to a third prediction unit, and coordinates [x1][y1] correspond to a third prediction unit. An inter-prediction flag inter_pred_idc[ ][ ] indicates a prediction direction of the prediction unit and is one of the L0 prediction (Pred_L0), the L1 prediction (Pred_L1), and the bi-prediction (Pred_BI). Accordingly, the fact that the inter-prediction flag inter_pred_idc[ ][ ] is not Pred_LY means a case in which the inter-prediction flag inter_pred_idc[ ][ ] is Pred_LX or Pred_BI because of "X=Y−1." Both use the LX prediction.

Here, the expression of refViewIdxLX[ ][ ]!=ViewIdx) is an expression for determining whether the view ID of the reference picture designated by the reference picture index of LX is different from the view ID of the target picture (whether the inter-layer prediction is used). Here, the second determination method using the view ID is used to determine whether the inter-layer prediction is used. In the foregoing expression (F-4), an expression indicating that the inter-layer prediction is executed is assumed to be the following expression (F-5) in the prediction unit designated in the coordinates [x][y] and the LX prediction, this expression is defined as logical OR of the expression (F-5) regarding the prediction unit in the target CU.

inter_pred_idc[$x$][$y$]!=Pred_$LY$&& refViewIdx$LX$[$x$][$y$]!=ViewIdx)    expression (F-5)

Further, refViewIdxLX[x][y] indicates the view ID of the reference picture which the prediction unit of the coordinates [x][y] refers to using the LX list. When the reference picture list of the LX prediction is RefPicListLX and the reference picture index is ref_idx_lX[x][y], refViewIdxLX[x0][y] can be derived by the following expression.

refViewIdx$LX$[$x$][$y$]=ViewIdx of the RefPicListL0[ref_idx_$lX$[$x$][$y$]]    expression (F-6)

Since the inter-prediction flag inter_pred_idc mutually corresponds to the prediction list flag predFlagLX, expression (F-4') can also be used as a determination formula determining whether to use the inter-layer prediction, instead of expression (F-4).

anyIvRefPicFlag=anyIvRefPicFlag||(predFlag$LX$[$x$0][$y$0]==1&& refViewIdx$LX$[$x$0][$y$0]!=ViewIdx)||(predFlag$LX$[$x$0][$y$1]==1&& refViewIdx$LX$[$x$0][$y$1]!=ViewIdx)||(predFlag$LX$[$x$1][$y$0]==1&& refViewIdx$LX$[$x$1][$y$0]!=ViewIdx)||(predFlag$LX$[$x$1][$y$1]==1&& refViewIdx$LX$[$x$1][$y$1]!=ViewIdx)    expression (F-4')

In the foregoing expression (F-4), by obtaining a sum (||) for all of the prediction units included in the target block (the target CU), it is determined whether the inter-layer prediction is used in any of the prediction units included in the target CU.

In the modification example F1 of the foregoing configuration, when the prediction unit is in the merge mode, the illumination compensation flag is decoded from the coded data without dependency on the reference picture index. When the prediction unit is in the AMVP mode and the reference picture index of the prediction unit indicates the inter-layer prediction (the interview prediction), the illumination compensation flag is decoded from the coded data. When the prediction unit is not in either mode, the illumination compensation flag is not decoded from the coded data and the illumination compensation is not executed.

In the modification example F1 of the foregoing configuration, when the prediction unit is in the merge mode, it is determined whether the illumination compensation flag ic_enable_flag is decoded from the coded data without dependency on the reference picture index ref_idx_LX. Thus, it is possible to obtain the advantageous effect of resolving the parsing dependency in which it is necessary to derive the prediction parameter (the reference picture index ref_idx_LX) of the merge mode in parsing of the illumination compensation flag ic_enable_flag (advantageous effect F1). In the case of the merge mode, the reference picture index ref_idx_LX is not coded explicitly to the coded data. Therefore, there is the problem of the parsing dependency in the method of the related art using the ref_idx_LX in the merge mode. In the mode (AMVP mode) other than the merge mode, the reference picture index ref_idx_LX is coded explicitly to the coded data. Therefore, at the time point of the parsing of the illumination compensation flag ic_enable_flag, the value of the reference picture index ref_idx_LX is obvious. Even when ic_enable_flag is decoded with dependency on ref_idx_LX, there is no problem of the parsing dependency.

The case in which the illumination compensation is executed may be configured to be restricted to the case of the merge mode. In this case, the illumination compensation flag decoding section decodes ic_enable_flag only in the case of the merge mode and does not decode ic_enable_flag only in the mode other than the merge mode (the same applies below). In this configuration, since the illumination compensation is not executed in the AMVP mode, it is not necessary to determine whether the prediction is the interview prediction (determine using the reference picture index ref_idx_LX). Therefore, it is possible to obtain the advantageous effect of deriving the illumination compensation flag easily. Since the illumination compensation is not executed in the AMVP mode, it is possible to obtain the advantageous effect of generating the predicted image easily.

Further, the case in which the foregoing illumination compensation flag decoding section 30311F1 decodes the illumination compensation flag from the coded data may be restricted to a case in which the split mode of the coding unit is 2N×2N indicating non-splitting (which is referred to as a modification example F1').

Figure 45:
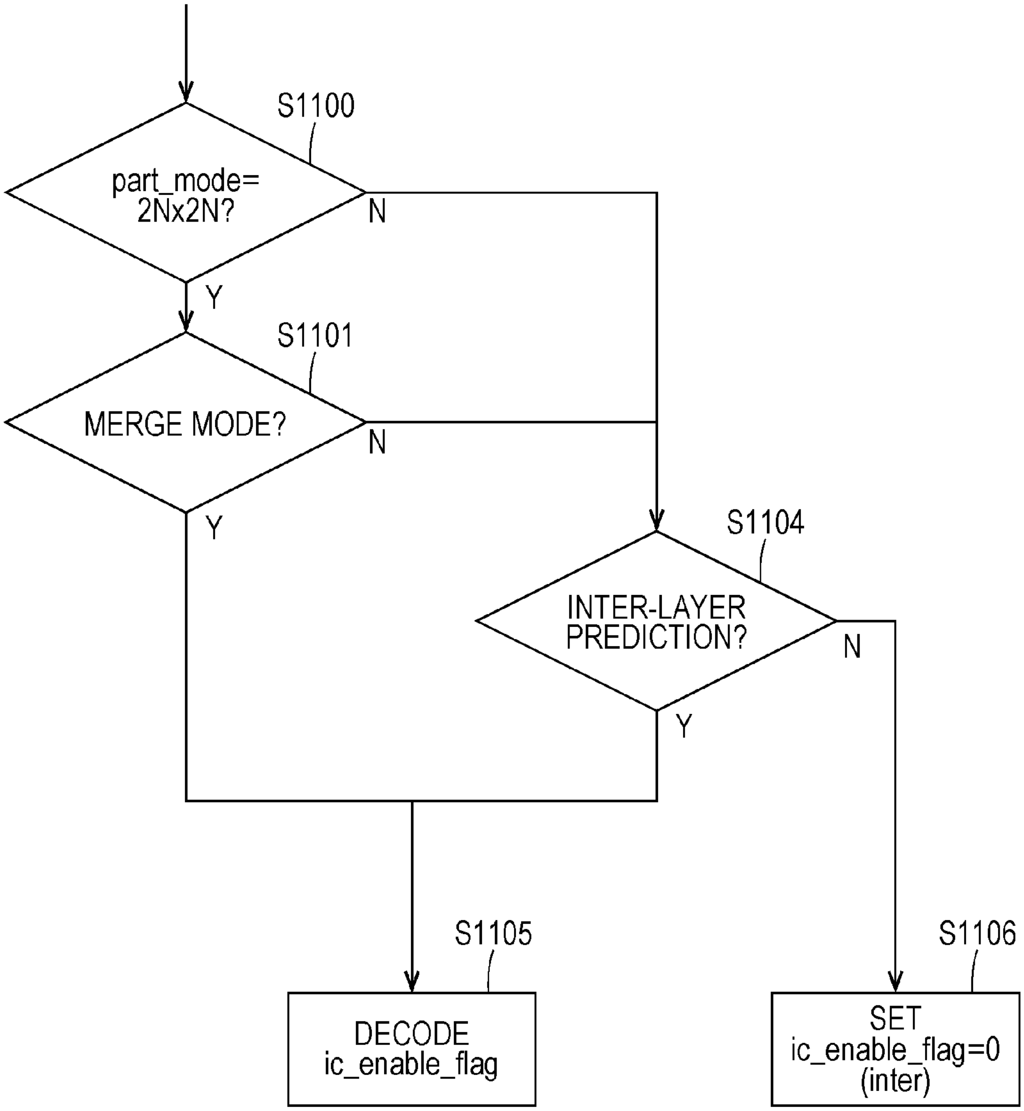
FIG. 45 is a schematic diagram which is a flowchart illustrating an operation of the modification example F1 of the inter-prediction parameter decoding section according to the embodiment.

FIG. 45 is a flowchart illustrating an operation of the illumination compensation flag decoding section 30311F1 when the split mode is restricted to 2N×2N.

S1100: Referring to the split mode part_mode coded in a split mode decoding section, it is determined whether part_mode is 2N×2N indicating that the target coding unit is not split. In cases other than 2N×2N, the illumination compensation flag ic_enable_flag is set to 0 (S1106). When the split mode is 2N×2N, the operation transitions to S1101.

S1101: Referring to the merge flag merge_flag, it is determined whether the target block is in the merge mode (whether merge_flag is 1). When the target block is in the merge mode, the illumination compensation flag ic_flag is decoded from the coded data (S1105). When the target block is not in the merge mode, the operation transitions to S1104.

S1104: Referring to the reference picture index ref_idx_LX, it is determined whether the target block is for the inter-layer prediction. When the target block is for the inter-layer prediction, the illumination compensation flag ic_enable_flag is decoded from the coded data (S1105). Otherwise, 0 is set in the illumination compensation flag ic_enable_flag (S1106).

In this case, the structure of the coded data is similar to the structure of the coded data in FIG. 46, but condition SF1101 is used instead of the condition SF1001. That is, expression (F−1) is substituted with expression (F-1') below.

slice_ic_enable_flag && PartMode==PART_2*N*x2*N* expression (F-1')

The condition SF1002 and the condition SF1003 have been described above, but a derivation expression for anyIvRefPicFlag in the condition SF1003 is simplified. Specifically, in the case of 2N×2N, only one prediction is included in the target CU. Therefore, instead of expression (F-4), anyIvRefPicFlag can be derived by expression (F-7) below.

anyIvRefPicFlag=anyIvRefPicFlag||(inter_pred_idc[*x*0][*y*0]!=Pred_*LY*&& refViewIdx*LX*[*x*0][*y*0]!=ViewIdx expression (F-7)

When the case of the L0 prediction and the L1 prediction are explicitly stated, the expression can be modified as follows.

anyIvRefPicFlag=(inter_pred_idc[*x*0][*y*0]!=Pred_*L*1&& refViewIdxL0[*x*0][*y*0]!=ViewIdx)||(inter_pred_idc[*x*0][*y*0]!=Pred_*L*0&& refViewIdxL1[*x*0][*y*0]!=ViewIdx) expression (F-7')

When the split mode of the coding unit is 2N×2N indicating that the split mode of the coding unit is not split, the illumination compensation flag decoding section of the modification example F1' decodes the illumination compensation flag ic_enable_flag from the coded data. By executing the restriction to the case in which the illumination compensation flag ic_enable_flg is decoded, it is possible to obtain the advantageous effect of reducing the coding amount of the illumination compensation flag ic_enable_flag. Since the number of prediction units included in the target CU is restricted to one, it is possible to obtain the advantageous effect of reducing the processing amount of anyIvRefPicFlag in the determination of whether the inter-layer prediction is included. Since the case in which the illumination compensation is executed is 2N×2N, for example, the cases in which the block sizes corresponding to 2N×N and N×2N in 8×8 CU are 8×4 and 4×8 are excluded. Therefore, it is possible to obtain the advantageous effect of reducing the processing amount which is a problem particularly when the block size is small.

The restriction of the split mode to 2N×2N can also be used together in modification examples after the modification example F2 to be described below.

(Modification Example F2 of Inter-prediction Parameter Decoding Section)

Figure 47:
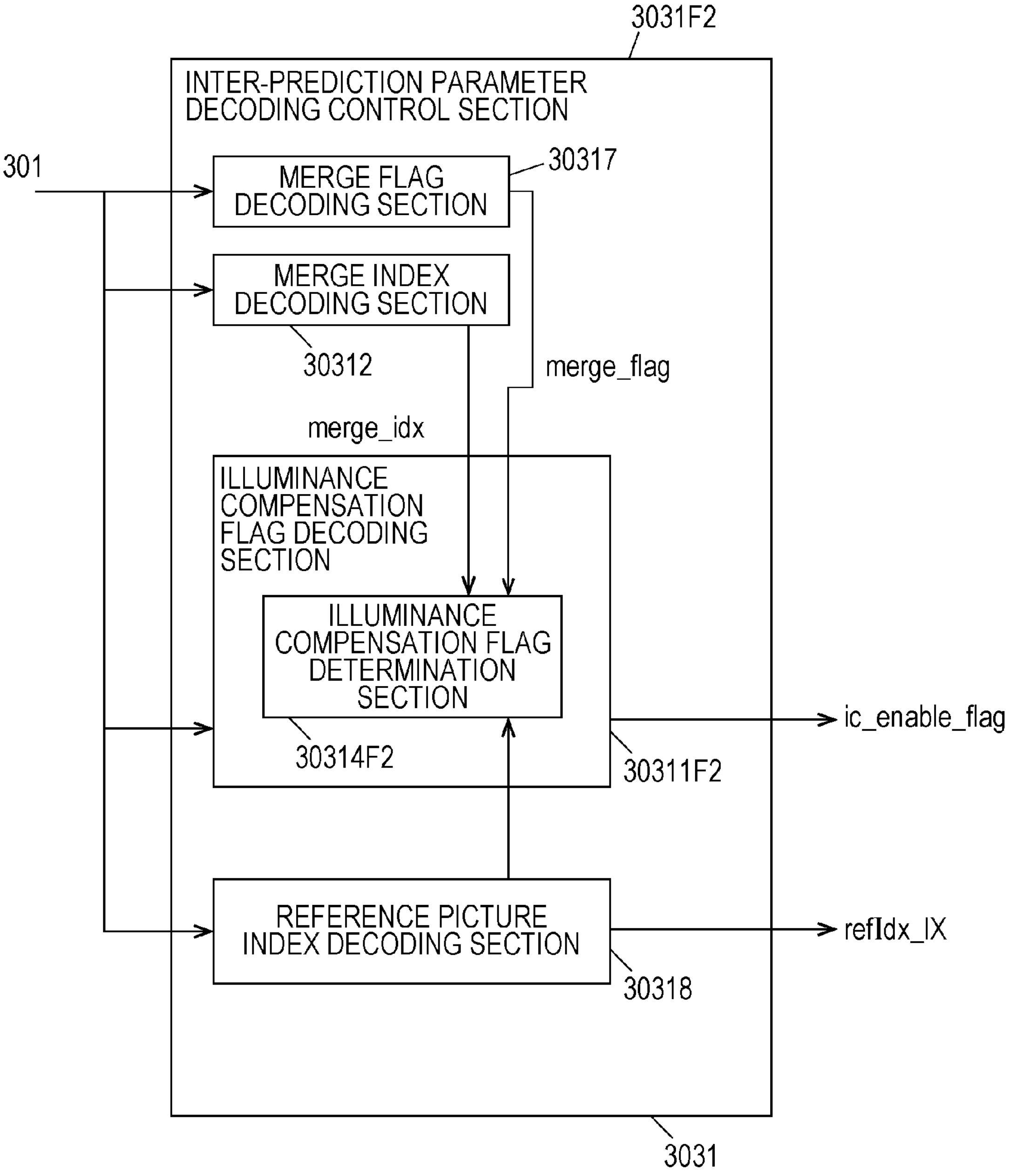
FIG. 47 is a schematic diagram illustrating the configuration of a modification example F2 of the inter-prediction parameter decoding section according to the embodiment.

Hereinafter, an inter-prediction parameter decoding section 303F2 will be described as a modification example of the inter-prediction parameter decoding section. In the modification example F2, a case in which the illumination prediction is executed as the additional prediction will be handled. FIG. 47 is a block diagram illustrating the configuration of the inter-prediction parameter decoding control section 3031F2. As illustrated in FIG. 47, the inter-prediction parameter decoding control section 3031F2 is configured to include an illumination compensation flag decoding section 30311F2, the split mode decoding section, the merge flag decoding section 30317, the merge index decoding section 30312, the inter-prediction flag decoding section, the reference picture index decoding section 30318, the vector candidate index decoding section 30313, and the vector difference decoding section.

When an illumination compensation flag determination section 30314F2 determines that the illumination compensation flag ic_enable_flag is included in the coded data, the illumination compensation flag decoding section 30311F2 decodes the illumination compensation flag ic_enable_flag from the coded data. In contrast, when the illumination compensation flag determination section 30314F2 determines that the illumination compensation flag ic_enable_flag is not included in the coded data, the illumination compensation flag decoding section 30311F2 does not decode the coded data and sets 0 in the illumination compensation flag ic_enable_flag.

Figure 48:
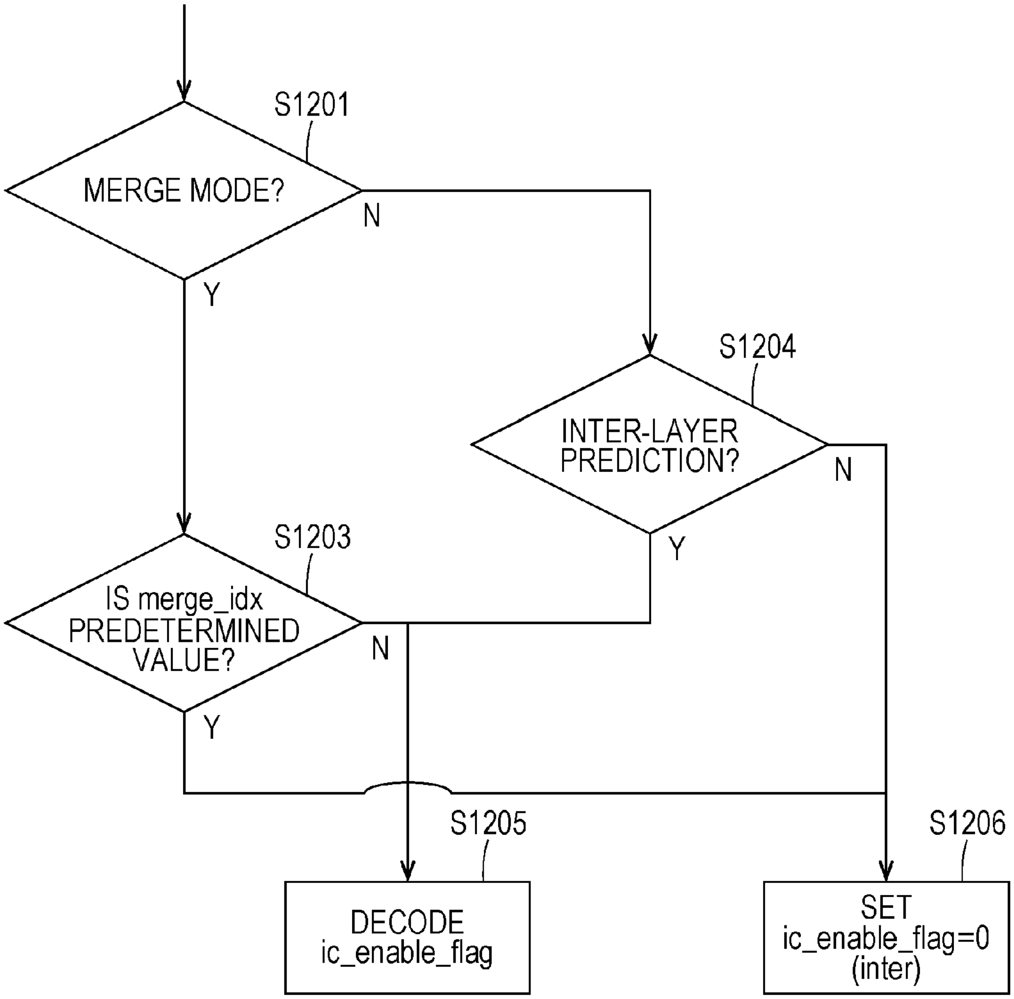
FIG. 48 is a schematic diagram which is a flowchart illustrating an operation of the modification example F2 of the inter-prediction parameter decoding section according to the embodiment.

FIG. 48 is a flowchart illustrating an operation of the illumination compensation flag decoding section 30311F2.

S1201: Referring to the merge flag merge_flag, it is determined whether the target block is in the merge mode (whether merge_flag is 1). When the target block is in the merge mode, an illumination compensation flag ic_flag is decoded (S1203). When the target block is not in the merge mode, the operation transitions to S1204.

S1203: Referring to the merge index merge_idx, it is determined whether merge_idx is a predetermined value. When merge_idx is the predetermined value, the illumination compensation flag ic_enable_flag is set to 0 (S1206). When merge_idx is a value other than the predetermined value, the illumination compensation flag ic_enable_flag is decoded from the coded data (S1205). The merge index decoding section 30312 decodes merge_idx (the same applies below)

S1204: Referring to the reference picture index ref_idx_LX, it is determined whether the target block includes the inter-layer prediction. When the target block includes the inter-layer prediction (anyIvRefPicFlag is 1), the illumination compensation flag ic_enable_flag is decoded from the coded data (S1205). Otherwise (anyIvRefPicFlag is 0), 0 is set in the illumination compensation flag ic_enable_flag (S1206).

FIG. 49 is a diagram illustrating the structure of the coded data of the illumination compensation flag ic_enable_flag decoded by the inter-prediction parameter decoding section 303F2. In the illumination compensation flag decoding section 30311F2, the internal illumination compensation flag determination section 30314F2 determines whether the illumination compensation flag is decoded from the coded data.

Condition SF2001 is denoted in the above-described expression (F-1').

Condition SF2002 is denoted in the following expression.

merge_flag[*x*0][*y*0]&& merge_idx[*x*0][*y*0]!=0 expression (F-2')

Condition SF2003 is denoted in the above-described expression (F-3).

In the modification example F2, when the merge index is a predetermined value even in the case of the merge mode, the illumination compensation flag ic_enable_flag is not decoded from the coded data and is set to 0 by the determination of expression (F-2') executed in s1201 and S1203. When the merge index is the predetermined value (here, 0), the reference picture is the same layer as the target picture (the motion prediction) in many cases (the motion prediction in many cases). When the reference picture is the same layer as the target picture, the illumination compensation is not valid. Therefore, in this case, it is not necessary to decode the illumination compensation flag ic_enable_flag from the coded data. In the modification example F2, such a case can be prevented.

When the prediction unit which is a generation target of the predicted image is in the merge mode and the merge flag index is a value other than the predetermined value, the illumination compensation flag decoding section 30311F2 decodes the illumination compensation flag ic_enable_flag from the coded data. When the prediction mode is the AMVP mode and the reference picture index of the prediction unit indicates the inter-layer prediction, the illumination compensation flag ic_enable_flag is decoded from the coded data. When the prediction unit is not in either mode, the illumination compensation flag ic_enable_flag is not decoded from the coded data and the illumination compensation is not executed.

In the modification example F2, in addition of the advantageous effect F1 of the modification example 1, by decoding (coding) the illumination compensation flag only when the merge flag index is a value other than the predetermined value in the case of the merge mode, it is possible to obtain the advantageous effect of reducing the coding amount of the illumination compensation flag (advantageous effect F2).

(Modification Example F3 of Inter-Prediction Parameter Decoding Section)

Figure 50:
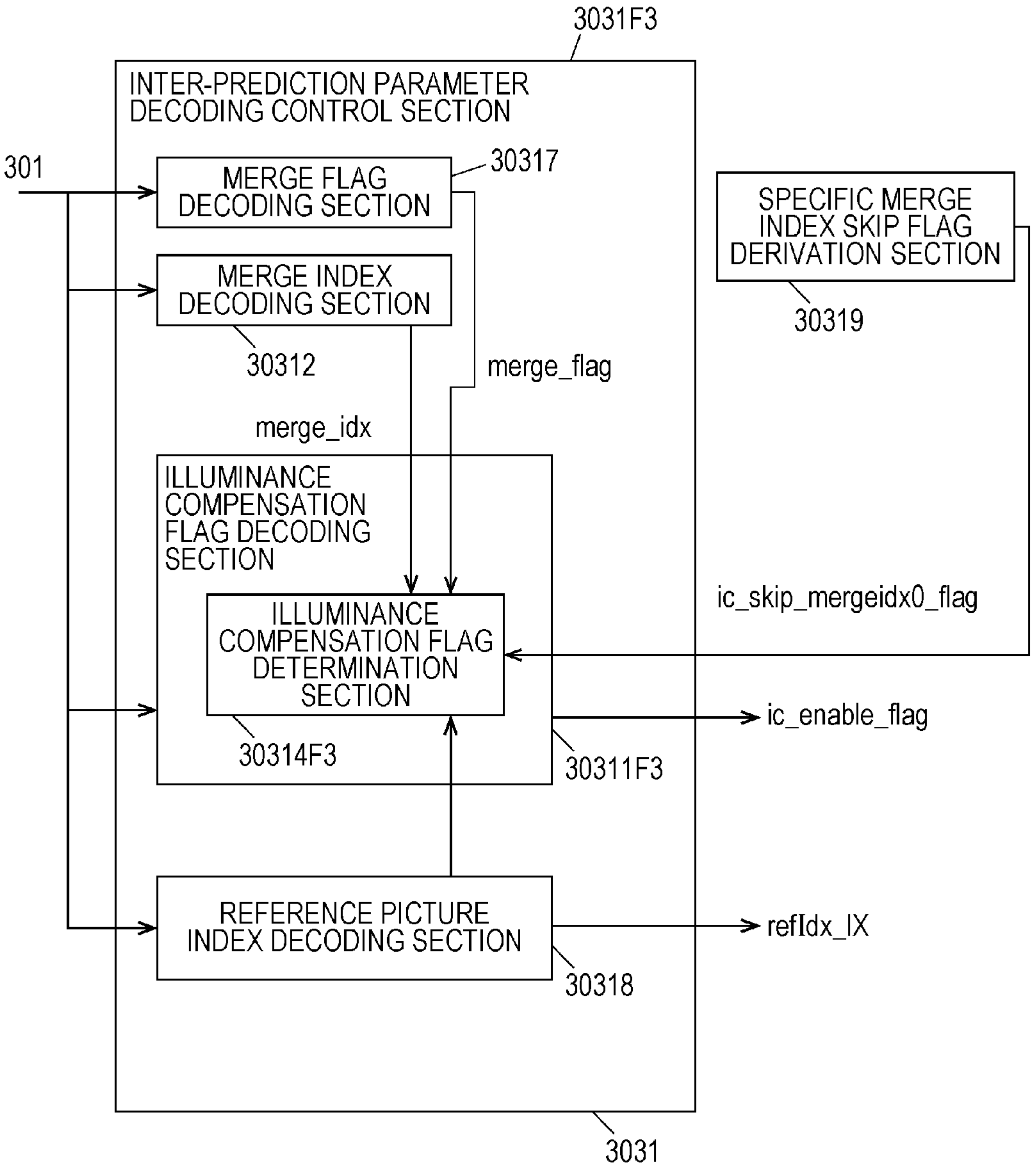
FIG. 50 is a schematic diagram illustrating the configuration of a modification example F3 of the inter-prediction parameter decoding section according to the embodiment.

Hereinafter, an inter-prediction parameter decoding section 303F3 will be described as a modification example of the inter-prediction parameter decoding section. In the modification example F3, a case in which the illumination prediction is executed as the additional prediction will be handled. FIG. 50 is a block diagram illustrating the configuration of the inter-prediction parameter decoding control section 3031F3. As illustrated in FIG. 50, the inter-prediction parameter decoding control section 3031F3 is configured to include an illumination compensation flag decoding section 30311F3, the split mode decoding section, the merge flag decoding section 30317, the merge index decoding section 30312, the inter-prediction flag decoding section, the reference picture index decoding section 30318, the vector candidate index decoding section 30313, the vector difference decoding section, and a specific merge index illumination compensation skip flag derivation section 30319.

When an illumination compensation flag determination section 30314F3 determines that the illumination compensation flag ic_enable_flag is included in the coded data, the illumination compensation flag decoding section 30311F3 decodes the illumination compensation flag ic_enable_flag from the coded data. In contrast, when the illumination compensation flag determination section 30314F3 determines that the illumination compensation flag ic_enable_flag is not included in the coded data, the illumination compensation flag decoding section 30311F3 does not decode the coded data and sets 0 in the illumination compensation flag ic_enable_flag.

The specific merge index illumination compensation skip flag derivation section 30319 derives a specific merge index illumination compensation skip flag ic_skip_mergeidx0_flag from the coded data.

Figures 53, 54:
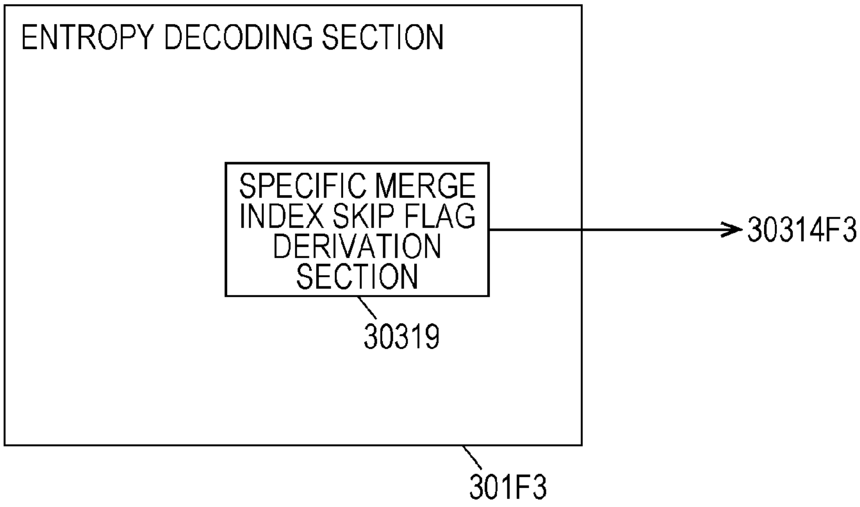
FIG. 53 is a block diagram illustrating the configuration of an entropy decoding section 301F3 used in the inter-prediction parameter decoding section 303F3 according to the embodiment.
FIG. 54 is a diagram illustrating the structure of coded data of a specific merge index illumination compensation skip flag ic_skip_mergeidx0_flag used in the inter-prediction parameter decoding section 303F3 according to the embodiment.

The image decoding device 31 including the inter-prediction parameter decoding section 303F3 may include an entropy decoding section 301F3 as the entropy decoding section 301. FIG. 53 is a block diagram illustrating the configuration of an entropy decoding section 301F3. The entropy decoding section 301F3 includes the specific merge index illumination compensation skip flag derivation section 30319 therein, decodes ic_skip_mergeidx0_flag from the coded data, and notifies the illumination compensation flag determination section 30314F3 of ic_skip_mergeidx0_flag.

Figure 51:
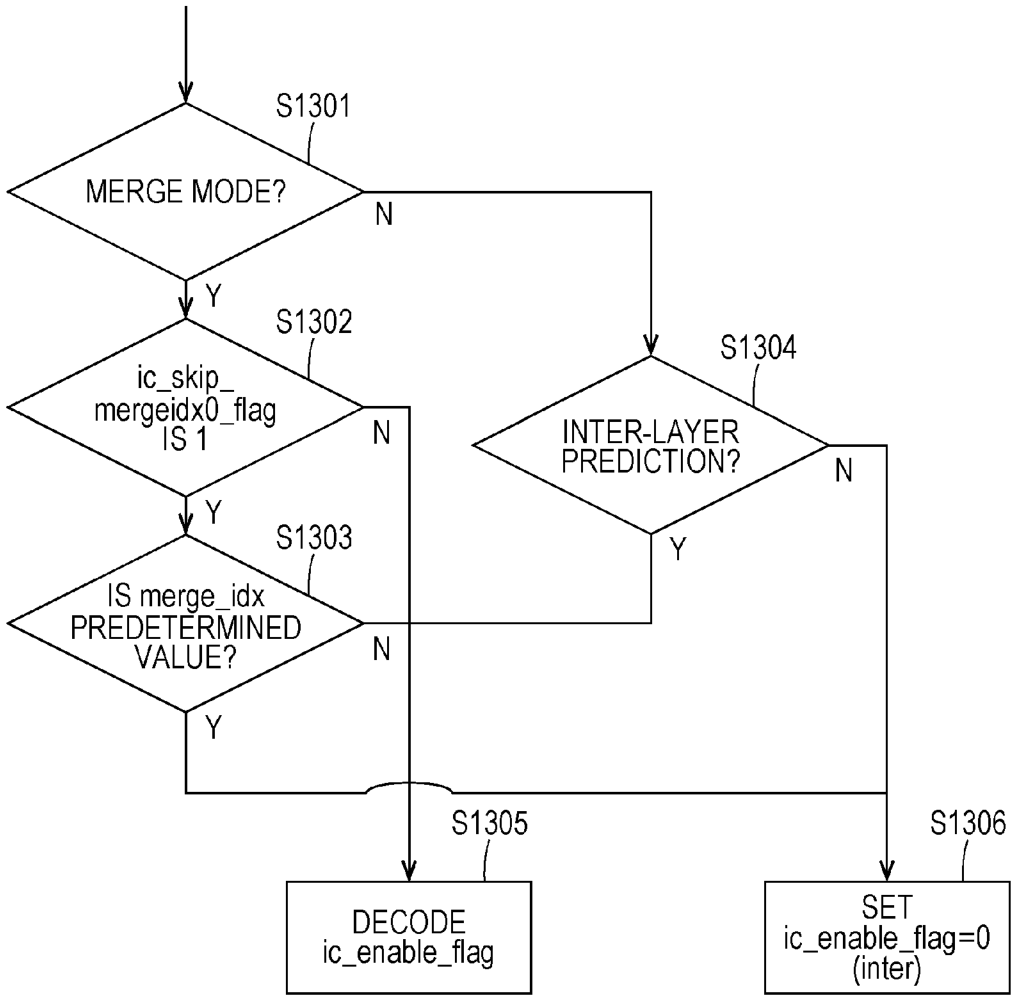
FIG. 51 is a schematic diagram which is a flowchart illustrating an operation of the modification example F3 of the inter-prediction parameter decoding section according to the embodiment.

FIG. 51 is a flowchart illustrating an operation of the illumination compensation flag decoding section 30311F3.

S1301: Referring to the merge flag merge_flag, it is determined whether the target block is in the merge mode (whether merge_flag is 1). When the target block is in the merge mode, the operation transitions to S1302. When the target block is not in the merge mode, the operation transitions to S1304.

S1302: It is determined whether the specific merge index illumination compensation skip flag ic_skip_mergeidx0_flag is valid. When the specific merge index illumination compensation skip flag ic_skip_mergeidx0_flag is valid, the operation transitions to S1303. When the specific merge index illumination compensation skip flag ic_skip_mergeidx0_flag is not valid, the illumination compensation flag is decoded (S1305). The specific merge index illumination compensation skip flag derivation section 30319 decodes ic_skip_mergeidx0_flag (the same applies below).

S1303: Referring to the merge index merge_idx, it is determined whether merge_idx is a predetermined value. When merge_idx is the predetermined value, the illumination compensation flag ic_enable_flag is set to 0 (S1306). When merge_idx is a value other than the predetermined value, the illumination compensation flag ic_enable_flag is decoded from the coded data (S1305).

S1304: Referring to the reference picture index ref_idx_LX, it is determined whether the target block includes the inter-layer prediction. When the target block includes the inter-layer prediction (anyIvRefPicFlag is 1), the illumination compensation flag ic_enable_flag is decoded from the coded data (S1305). Otherwise (anyIvRefPicFlag is 0), 0 is set in the illumination compensation flag ic_enable_flag (S1306).

FIG. 52 is a diagram illustrating the structure of the coded data of the illumination compensation flag ic_enable_flag decoded by the inter-prediction parameter decoding section 303F3.

Condition SF1101 is denoted in the above-described expression (F-1').

Condition SF1202 is denoted in the following expression.

merge_flag[x0][y0]&&(merge_idx[x0][y0] !=0||!ic_skip_mergeidx0_flag) expression (F-2''')

Condition SF1303 is denoted in the above-described expression (F-3).

In the modification example F3, when ic_skip_mergeidx0_flag is 1 and the merge index merge_idx is a predetermined value even in the case of the merge mode, the illumination compensation flag ic_enable_flag is not decoded from the coded data and is set to 0 by the determination of expression (F-2''') executed in s1301 and S1303. Thus, when the merge index merge_idx indicates the merge candidate in which the motion prediction is set in many cases, it is possible to prevent the illumination compensation flag ic_enable_flag from being unnecessarily decoded. In the modification example F3, unlike the modification example F2, only when ic_skip_mergeidx0_flag is 1, the determination (specifying of the merge candidate) by the merge index merge_idx is executed. This is because when the ratio of the inter-layer prediction is high and the merge candidate for which the illumination prediction is not executed is selected despite the fact that the merge index merge_idx is the predetermined value according to the structure of the reference picture and the sequence, the coding efficiency may deteriorate conversely.

FIG. 54 is a diagram illustrating the structure of the coded data of the specific merge index illumination compensation skip flag ic_skip_mergeidx0_flag. As indicated in SF3004 of FIG. 54, when the illumination compensation flag slice_ic_enable_flag in units of slices is valid in the slice header, ic_skip_mergeidx0_flag is coded.

In the modification example F3, in addition of the advantageous effect F1 of the modification example 1 and the advantageous effect F2 of the modification example 2, by restricting the case in which the merge flag index is a value other than the predetermined value to the case in which the specific merge index illumination compensation skip flag is valid, the illumination compensation can be used even when the inter-layer prediction is used considerably even in the case of the specific merge index. When the inter-layer prediction is used considerably with the target picture, for example, when a picture interval is separated between the reference picture and the coding target picture, the inter-layer prediction is used considerably even in the case of the specific merge index. Therefore, it is possible to obtain the advantageous effect of effectively utilizing the illumination compensation (advantageous effect F3).

The specific merge index illumination compensation skip flag derivation section 30319 according to the modification example F3 decodes the specific merge index illumination compensation skip flag ic_skip_mergeidx0_flag from the coded data. By deriving a flag indicating the restriction or non-restriction to the case in which the above-described merge flag index is a value other than the predetermined value from the coded data, the coding device can set whether the merge candidate for which the illumination prediction is not executed is set according to the picture structure, a display order (POC), or the sequence. Therefore, it is possible to obtain the advantageous effect of improving the coding efficiency.

(Specific Merge Index Illumination Compensation Skip Flag Derivation Section 30319B)

As another configuration of the modification example F3, ic_skip_mergeidx0_flag may be derived from the display order (POC) without decoding ic_skip_mergeidx0_flag from the coded data. Hereinafter, a configuration in which a specific merge index illumination compensation skip flag derivation section 30319B is used instead of the specific merge index illumination compensation skip flag derivation section 30319 will be described.

Figure 55:
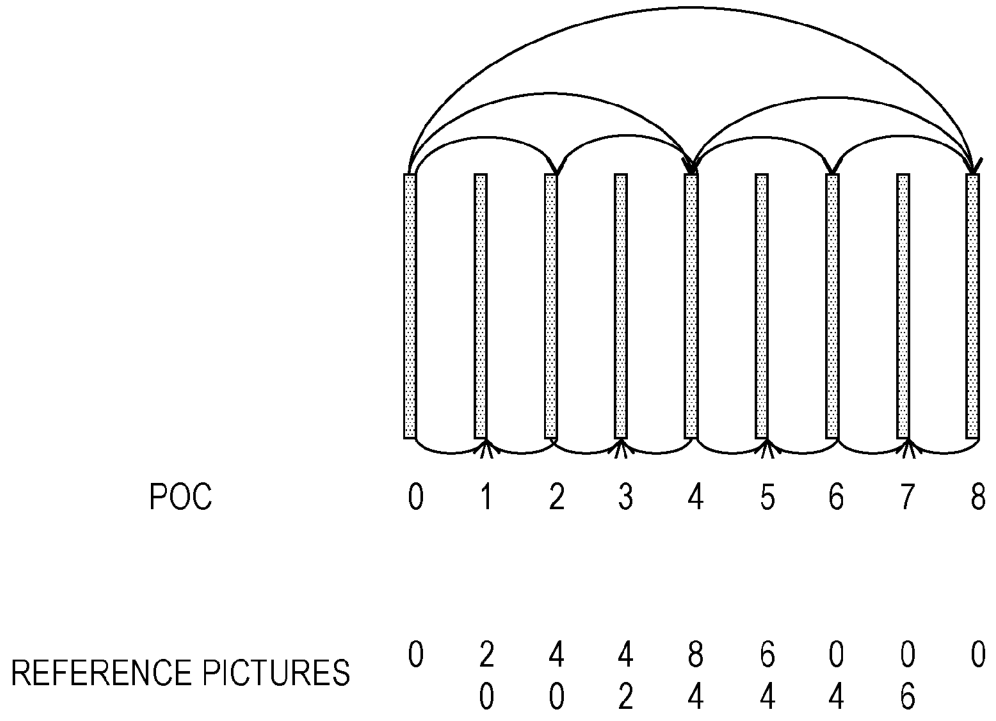
FIG. 55 is a diagram illustrating an example of the reference structure called a hierarchy reference structure.

FIG. 55 is a diagram illustrating an example of the case of the reference structure called a hierarchy reference structure. In this example, a period is 8 and coding is executed in order of 0, 8, 4, 2, 1, 3, 6, 4, and 7 in the POC. In pictures in which the POC is 8, the reference picture is 0. In pictures in which the POC is 4, the reference pictures are 8 and 0. In pictures in which the POC is 2, the reference pictures are 4 and 0. In pictures in which the POC is 1, the reference pictures 2 and 0. In this case, in pictures in which the POC is 8 (POC %8=0), a distance (a difference in the POC) up to a reference picture with the shortest time interval is 8. In pictures in which the POC is 4 (POC %4=0), the distance is 4. In pictures in which the POC is 2 (POC %2=0), the distance is 2. In pictures in which the POC is 1 (POC %2=1), the distance is 1. In this way, the time interval up to the reference picture is different according to the POC. When the time interval up to the reference picture is large, the reference pictures in different layers at the same time are present nearer a target image than the reference pictures in the same layer at different times. Therefore, the reference pictures in the different layers at the same time are easily used as the reference pictures. That is, the inter-layer images are easily used as the reference pictures (the inter-layer prediction is easily used).

Figure 56:
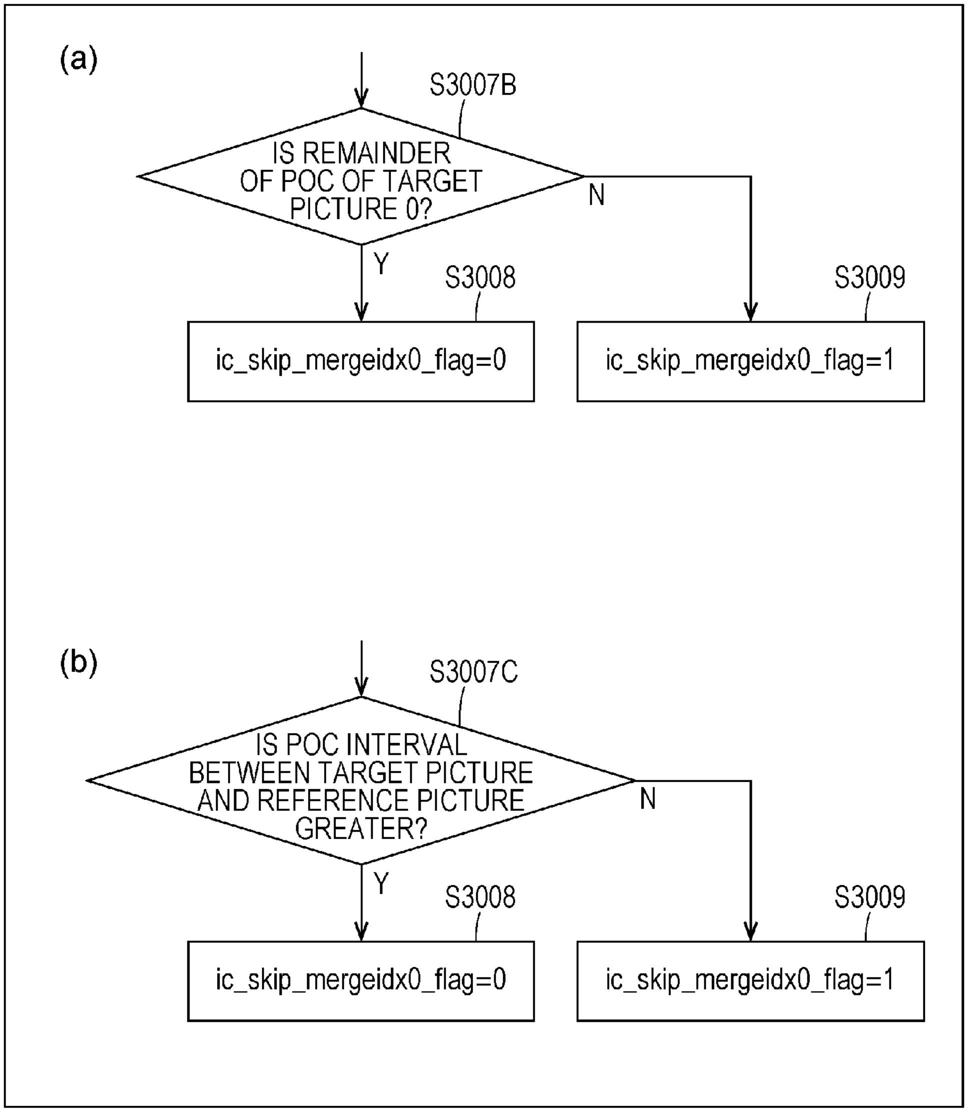
FIG. 56(*a*) is a flowchart illustrating an operation of a specific merge index illumination compensation skip flag derivation section 30319B and FIG. 56(*b*) is a flowchart illustrating an operation of a specific merge index illumination compensation skip flag derivation section 30319C.

FIG. 56(*a*) is a flowchart illustrating an operation of the specific merge index illumination compensation skip flag derivation section 30319B.

S3007B: When a remainder of the reference picture and a predetermined value PERIOD (here, 8) is 0, the time interval between the reference pictures in the same layer is large, the inter-layer prediction is determined to be easily used, ic_skip_mergeidx0_flag is set to 0 (S3008). In the other cases, ic_skip_mergeidx0_flag is set to 1 (S3009).

That is, ic_skip_mergeidx0_flag is derived by the following expression.

Ic_skip_mergeidx0_flag=((pic_order_count % PERIOD)==0)?0:1

Accordingly, at a specific period, ic_skip_mergeidx0_flag is set to 1. In this case, the foregoing illumination compensation flag decoding section 30311F3 sets 0 in the illumination compensation flag without decoding the illumination compensation flag from the coded data when the merge index is a specific value.

(Specific Merge Index Illumination Compensation Skip Flag Derivation Section 30319C)

As still another configuration of the modification example F3, ic_skip_mergeidx0_flag may be derived according to the display order (POC) and a distance from the reference picture included in the reference picture list without decoding ic_skip_mergeidx0_flag from the coded data. Hereinafter, a configuration in which a specific merge index illumination compensation skip flag derivation section 30319C is used instead of the specific merge index illumination compensation skip flag derivation section 30319 will be described.

FIG. 56(*b*) is a flowchart illustrating an operation of a specific merge index illumination compensation skip flag derivation section 30319C.

S3007C: When the POC of the target picture and the POC of the reference picture are large, a time interval between the reference pictures in the same layer is large and the inter-layer prediction is determined to be easily used, and ic_skip_mergeidx0_flag is set to 0 (S3008). In the other cases, ic_skip_mergeidx0_flag is set to 1 (S3009).

The reference pictures included in the reference picture lists L0 and L1 are scanned and a reference picture aPicX of the POC closest to the target picture is specified among the reference pictures in the different layer from the target picture.

Specifically, when the target picture is currPic, aPicX which is a reference picture included in the reference picture lists L0 and L1 and is aPic with the following minimum POC interval is specified in a picture aPic in the same layer as the target picture:

DiffPicOrderCnt(*a*Pic,currPic).

When the POC distance between the specified aPicX and the target picture is greater than a predetermined value TH (the POC interval is determined to be large in step S3007C), the inter-layer prediction is easily used. Therefore, ic_skip_mergeidx0_flag is set to 0.

ic_skip_mergeidx0_flag=DiffPicOrderCnt(*a*Pic,currPic)>*TH*?0:1

The foregoing condition is equivalent to the case in which ic_skip_mergeidx0_flag is set to 1 when the POC distance is less than the predetermined value TH (or equal to or less than the predetermined value TH).

The specific merge index illumination compensation skip flag derivation section derives the specific merge index illumination compensation skip flag using the display order (POC).

(Specific Merge Index Illumination Compensation Skip Flag Derivation Section 30319D)

As still another configuration of the modification example F3, ic_skip_mergeidx0_flag may be derived depending on whether the intra-prediction is used in a reference picture without decoding ic_skip_mergeidx0_flag from the coded data. Hereinafter, a configuration in which a specific merge index illumination compensation skip flag derivation section 30319D is used instead of the specific merge index illumination compensation skip flag derivation section 30319 will be described.

Figure 57:
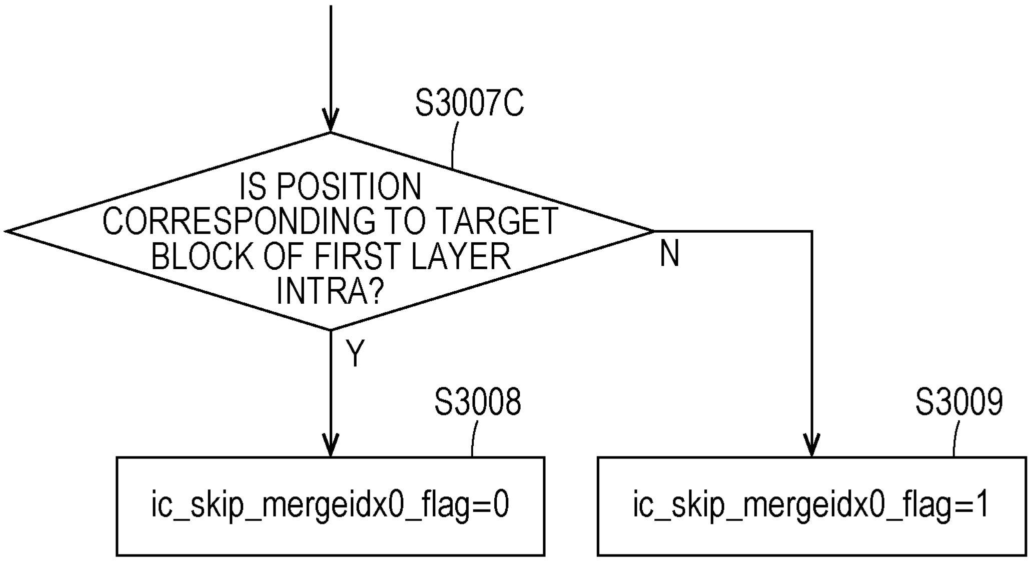
FIG. 57 is a flowchart illustrating an operation of a specific merge index illumination compensation skip flag derivation section 30319D.

FIG. 57 is a flowchart illustrating an operation of the specific merge index illumination compensation skip flag derivation section 30319D.

S3007D: It is determined whether the intra-prediction is used in a block of the reference picture belonging to a position corresponding to the target block. When the intra-prediction is used, the inter-layer prediction is determined to be used easily and ic_skip_mergeidx0_flag is set to 0 (S3008). In the other cases, ic_skip_mergeidx0_flag is set to 1 (S3009).

That is, ic_skip_mergeidx0_flag is derived by the following expression.

Ic_skip_mergeidx0_flag=(PRED_MODE[*x*0][*y*0]of *xxx* is MODE_INTRA)?0:1

The specific merge index illumination compensation skip flag derivation section derives the specific merge index illumination compensation skip flag depending on whether the intra-prediction is used in the block of the first layer image belonging to the position corresponding to the target block.

(Modification Example F4 of Inter-Prediction Parameter Decoding Section)

Figure 58:
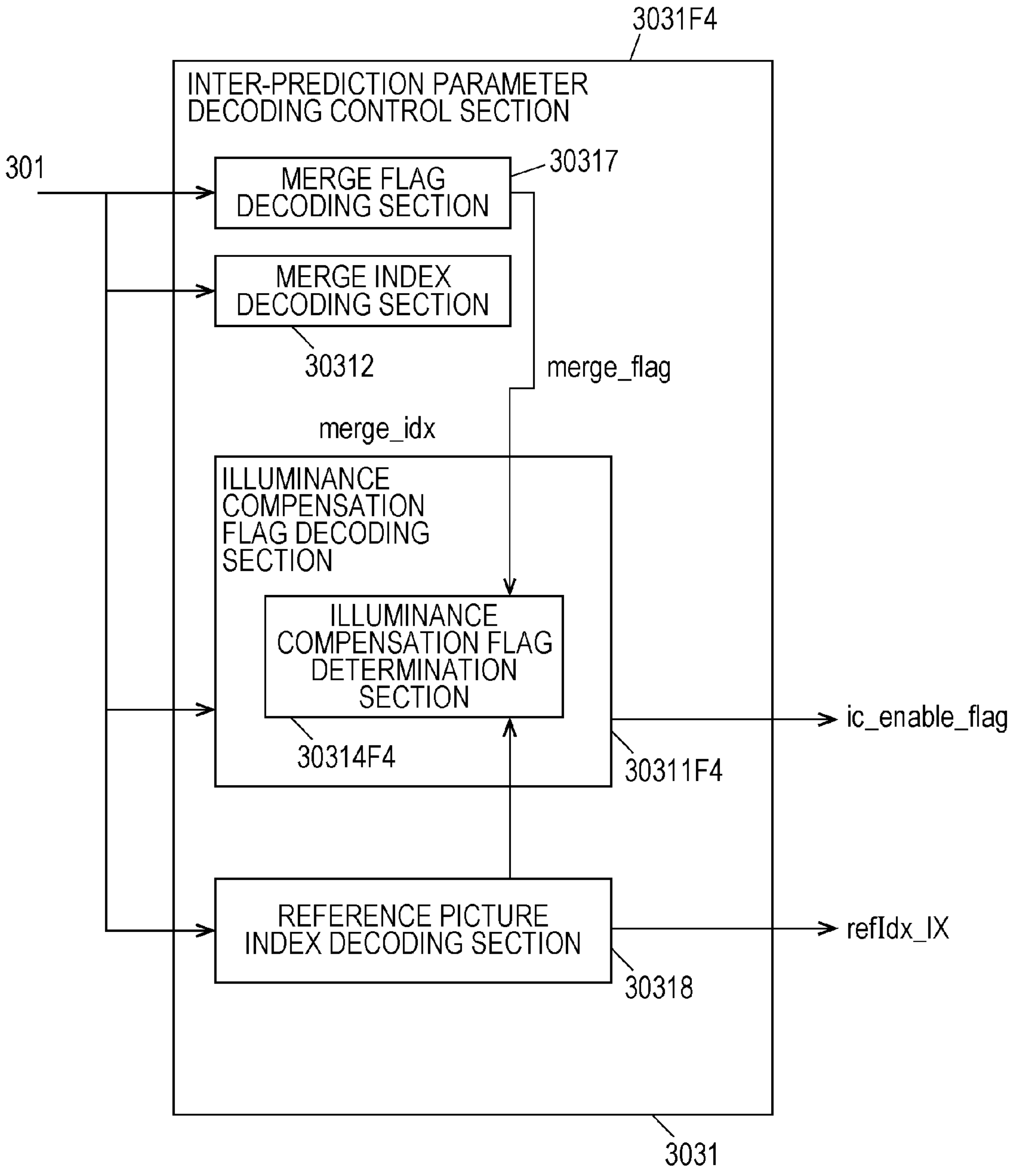
FIG. 58 is a schematic diagram illustrating the configuration of a modification example F4 of the inter-prediction parameter decoding section according to the embodiment.

Hereinafter, an inter-prediction parameter decoding section 303F4 will be described as a modification example of the inter-prediction parameter decoding section. In the modification example F4, a case in which the illumination prediction is executed as the additional prediction will be handled. FIG. 58 is a block diagram illustrating the configuration of the inter-prediction parameter decoding control section 3031F4. As illustrated in FIG. 58, the inter-prediction parameter decoding control section 3031F4 is configured to include an illumination compensation flag decoding section 30311F4, the split mode decoding section, the merge flag decoding section 30317, the merge index decoding section 30312, the inter-prediction flag decoding section, the reference picture index decoding section 30318, the vector candidate index decoding section 30313, the vector difference decoding section, and a specific merge index illumination compensation skip flag derivation section 30319.

When an illumination compensation flag determination section 30314F4 determines that the illumination compensation flag ic_enable_flag is included in the coded data, the illumination compensation flag decoding section 30311F4 decodes the illumination compensation flag ic_enable_flag from the coded data. In contrast, when the illumination compensation flag determination section 30314F4 determines that the illumination compensation flag ic_enable_flag is not included in the coded data, the illumination compensation flag decoding section 30311F4 does not decode the coded data and sets 0 in the illumination compensation flag ic_enable_flag.

Figure 59:
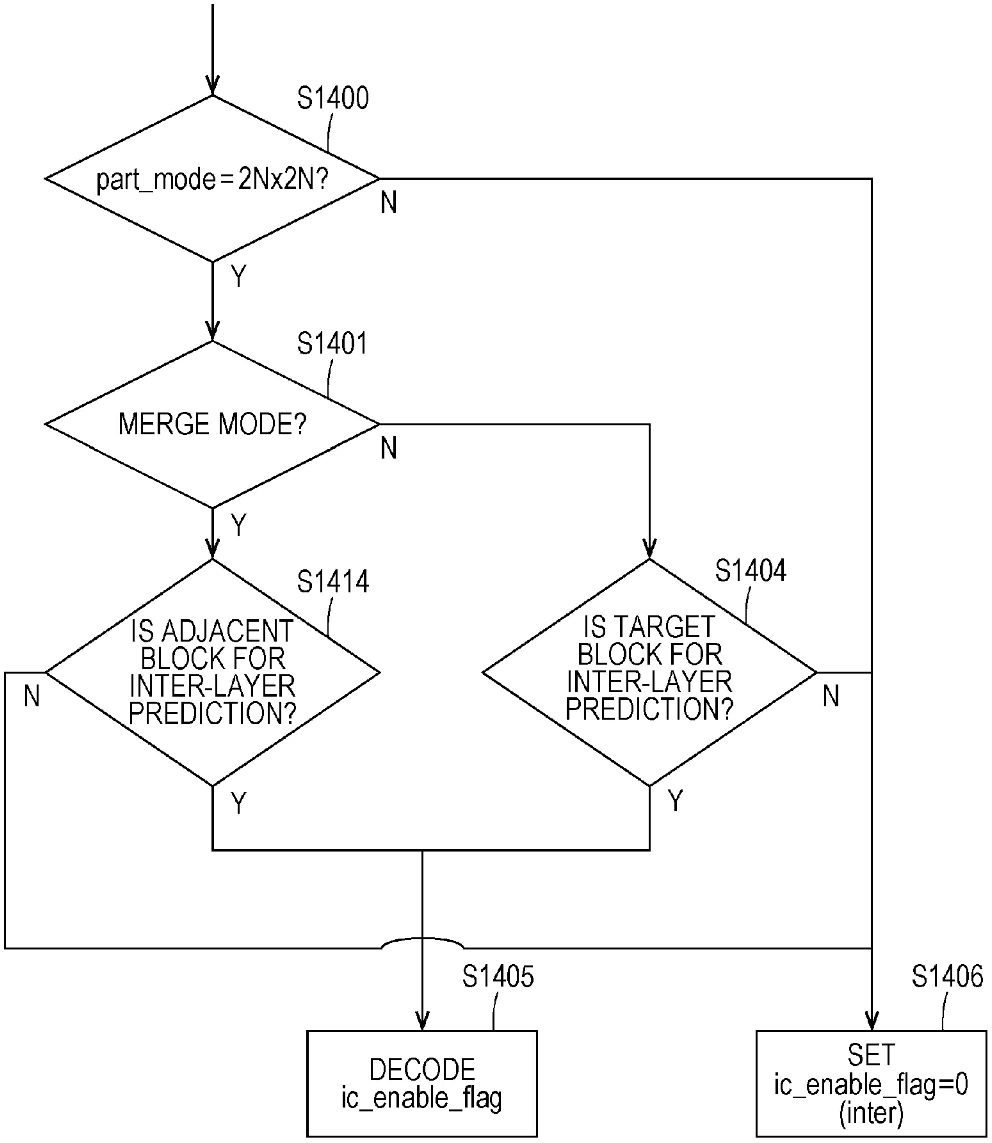
FIG. 59 is a schematic diagram which is a flowchart illustrating an operation of the modification example F4 of the inter-prediction parameter decoding section according to the embodiment.

FIG. 59 is a flowchart illustrating an operation of the illumination compensation flag decoding section 30311F4.

S1400: Referring to the split mode part_mode, it is determined whether part_mode is 2N×2N indicating that the target coding unit is not split. In cases other than 2N×2N, the illumination compensation flag ic_enable_flag is set to 0 (S1406). When the split mode is 2N×2N, the operation transitions to S1401.

S1401: Referring to the merge flag merge_flag, it is determined whether the target block is in the merge mode (whether merge_flag is 1). When the target block is in the merge mode (merge_flag=1), the operation transitions to S1402. When the target block is not in the merge mode (merge_flag=0), the operation transitions to S1404. S1404: Referring to the reference picture index ref_idx_LX of an adjacent block adjacent to the target block, it is determined whether the target block includes the inter-layer prediction. When the adjacent block includes the inter-layer prediction (anyNeighIvRefPicFlag is 1), the illumination compensation flag ic_enable_flag is decoded from the coded data (S1405). Otherwise (anyNeighIvRefPicFlag is 0), 0 is set in the illumination compensation flag ic_enable_flag (S1406).

FIG. 60 is a diagram illustrating the structure of the coded data decoded by the inter-prediction parameter decoding section 303F3.

The condition SF1101 is denoted in the above-described expression (F-1').

The condition SF1202 is denoted in the following expression.

merge_flag[x0][y0]&& anyNeighIvRefPicFlag    expression (F-2'''')

The condition SF1003 is denoted in the above-described expression (F-3).

When the coordinates of the target block are [x0][y0], anyNeighIvRefPicFlag in expression (F-2'''') is derived by executing the following expression for X=0 and X=1 (where Y=1−X). That is, in expression (F-8), whether the inter-layer prediction is used is derived by referring to both of L0 and L1 in the reference list LX.

anyIvRefPicFlag=anyIvRefPicFlag||inter_pred_idc
[x0−1][y0]!=Pred_LY&& refViewIdxLX[x0−1]
[y0]!=ViewIdx)||inter_pred_idc[x0][y0−1]
!=Pred_LY&& refViewIdxLX[x0][y0−1]
!=ViewIdx)    expression (F-8)

Here, coordinates [x0−1][y0] are the coordinates of a block adjacent to the left of the target block and coordinates [x0][y0−1] are the coordinates of a block adjacent to the upper of the target block. By the foregoing expression, it is determined that the inter-layer prediction is used for the adjacent block when the block adjacent to the left of the target block or the block adjacent to the upper of the target block is for the inter-layer prediction (refViewIdxLX and ViewIdx are different).

In the modification example F4, when the prediction unit is in the merge mode, it is determined whether the illumination compensation flag ic_enable_flag is decoded from the coded data without dependency on the reference picture index ref_idx_LX of the target block according to the reference picture index ref_idx_LX of the block adjacent to the target block. Thus, it is possible to obtain the advantageous effect of resolving the parsing dependency in which it is necessary to derive the prediction parameter (the reference picture index ref_idx_LX) of the merge mode of the target block in parsing of the illumination compensation flag ic_enable_flag.

(Modification Example F5 of Inter-Prediction Parameter Decoding Section)

Figure 61:
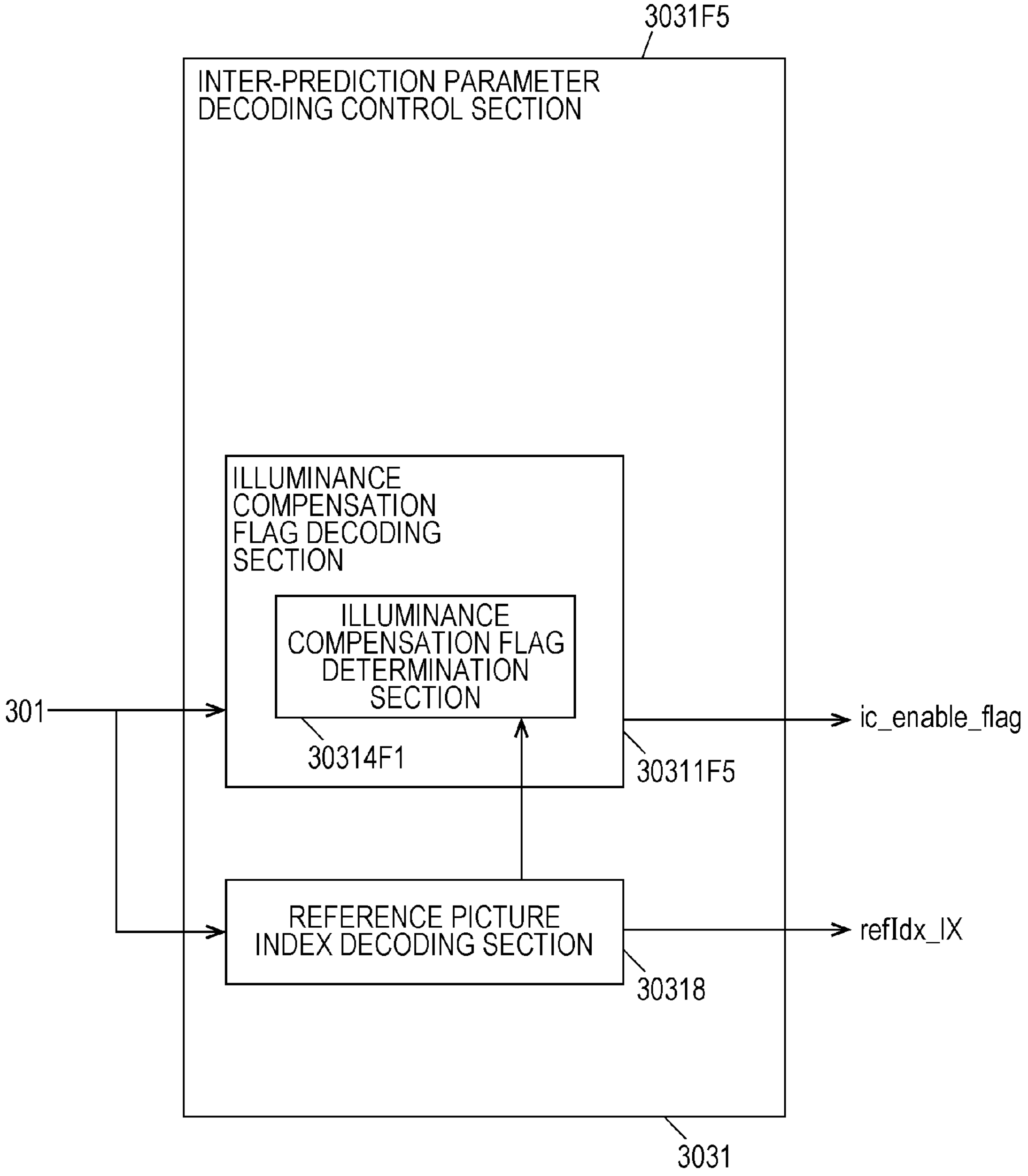
FIG. 61 is a schematic diagram illustrating the configuration of a modification example F5 of the inter-prediction parameter decoding section according to the embodiment.

Hereinafter, an inter-prediction parameter decoding section 303F5 will be described as a modification example of the inter-prediction parameter decoding section. In the modification example F5, a case in which the illumination prediction is executed as the additional prediction will be handled. FIG. 61 is a block diagram illustrating the configuration of the inter-prediction parameter decoding control section 3031F5. As illustrated in FIG. 61, the inter-prediction parameter decoding control section 3031F5 is configured to include an illumination compensation flag decoding section 30311F5 and a reference picture index decoding section 30318.

The illumination compensation flag decoding section 30311F5 decodes the illumination compensation flag ic_enable_flag from the coded data when the inter-layer prediction is executed in the L0 prediction in the prediction unit included in the target CU (anyIvRefPicFlagInL0 to be described is 1). In the other cases, 0 is set in ic_enable_flag.

Figure 62:
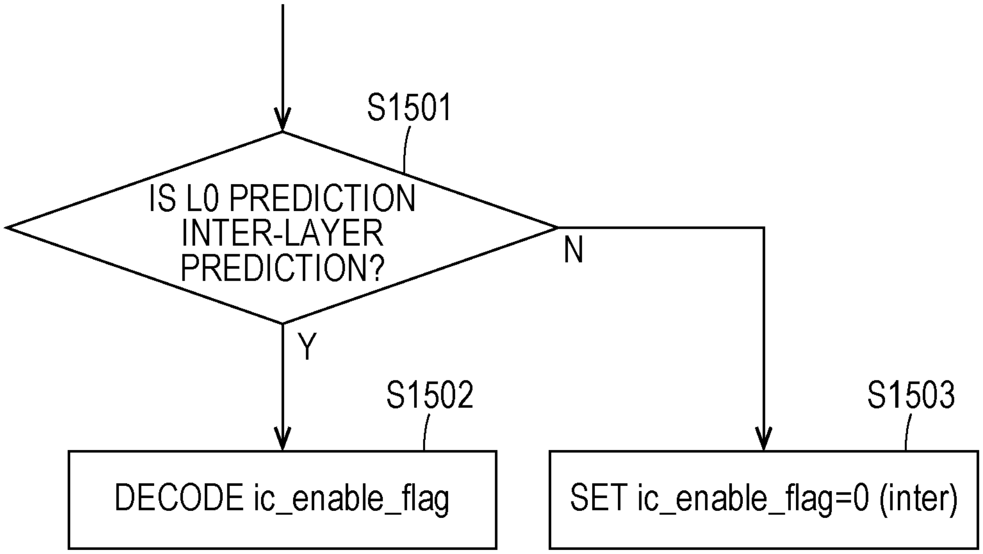
FIG. 62 is a schematic diagram which is a flowchart illustrating an operation of the modification example F5 of the inter-prediction parameter decoding section according to the embodiment.

FIG. 62 is a flowchart illustrating an operation of the illumination compensation flag decoding section 30311F5.

S1501: Referring to the reference picture derived from the L0 list, it is determined whether the prediction unit in which the inter-layer prediction is executed on the target block is included (anyIvRefPicInL0Flag). When the prediction unit in which the inter-layer prediction is executed is included in the prediction using the L0 list (anyIvRefPicInL0Flag is 1), the illumination compensation flag ic_enable_flag is decoded from the coded data (S1505). Otherwise (anyIvRefPicInL0Flag is 0), 0 is set in the illumination compensation flag ic_enable_flag (S1506).

Here, anyIvRefPicInL0Flag is derived by the following expression when the coordinates of the target block (the target CU) are [x0][y0]. Since only the reference list of the L0 different from expression (F-8) is referred to, it is easy to determine whether the prediction unit in which the inter-layer prediction is executed is included.

anyIvRefPicInL0Flag=anyIvRefPicInL0Flag||(inter_
pred_idc[x0][y0]!=Pred_L1&& refViewIdxL0
[x0][y0]!=ViewIdx)||(inter_pred_idc[x0][y1]
!=Pred_L1&& refViewIdxL0[x0][y1]!=ViewIdx)
||(inter_pred_idc[x1][y0]!=Pred_L1&&
refViewIdxL0[x1][y0]!=ViewIdx)||(inter_pre-
d_idc[x1][y1]!=Pred_L1&& refViewIdxL0[x1]
[y1]!=ViewIdx)    expression (F-8')

Since the inter-prediction flag inter_pred_idc mutually corresponds to the prediction list flag predFlagLX, the following expression can also be used as a determination formula to determine whether the inter-layer prediction is used, instead of expression (F-8').

anyIvRefPicInL0Flag=anyIvRefPicInL0Flag||(pref-
FlagL0[x0][y0]=1&& refViewIdxL0[x0][y0]
!=ViewIdx)||(prefFlagL0[x0][y1]=1&&
refViewIdxL0[x0][y1]!=ViewIdx)||(prefFlagL0
[x1][y0]=1&& refViewIdxL0[x1][y0]!=ViewIdx)
||(prefFlagL0[x1][y1]=1&& refViewIdxL0[x1]
[y1]!=ViewIdx)    expression (F-8'')

Here, x1 and y1 indicate the coordinates of the prediction unit when the target CU includes a plurality of prediction units. Specifically, coordinates [x0][x0] correspond to a first prediction unit, coordinates [x0][y1] correspond to a second prediction unit, coordinates [x1][y0] correspond to a third prediction unit, and coordinates [x1][y1] correspond to a third prediction unit. An inter-prediction flag inter_pred_idc[ ][ ] indicates a prediction direction of the prediction unit and is one of the L0 prediction (Pred_L0), the L1 prediction (Pred_L1), and the bi-prediction (Pred_BI). Accordingly, the fact that the inter-prediction flag inter_pred_idc[ ][ ] is not Pred_L1 means a case of the L0 prediction or the bi-prediction. At this time, the reference layer (here, the reference view) of L0 is referred to by refViewIdxL0. When refViewIdxL0 is other than the target layer (the target view) ViewIdx, the inter-layer prediction is used in the L0 prediction. In the foregoing expression, by deriving "inter_pred_idc[x0][y0]!=Pred_L1 && refViewIdxL0[x0][y0]!=ViewIdx" indicating whether the inter-layer prediction is used in all of the prediction units included in the target CU and obtaining the sum (||), whether the prediction of L0 is executed is indicated in one of the prediction units included in the target CU.

Further, refViewIdxL0[x0][y] indicates the view ID of the reference picture referred to using the LX list of the prediction unit with the coordinates [x][y]. Here, refViewIdxL0[x0][y] can be derived by the following expression in which LX of expression (F-6) is restricted to L0.

refViewIdxLX[x][y]=ViewIdx of the RefPicListL0[ref_idx_l0[x][y]]    expression (F-6')

In expression (F-8') and expression (F-8"), only the prediction flag predFlagL0 of L0, the reference picture index ref_idx_l0 of L0, and the L0 reference picture list RefPicListL0 are referred to and the prediction flag predFlagL1 of L1, the reference picture index ref_idx_l1 of L1, and the L1 reference picture list RefPicListL1 are not referred to. Therefore, it is easy to determine whether the prediction unit in which the inter-layer prediction is executed is included.

FIG. 63 is a diagram illustrating the structure of the coded data decoded by the inter-prediction parameter decoding section 303F3.

Condition SF1502 is denoted in the following expression under the condition of anyIvRefPicInL0Flag described above.

anyIvRefPicInL0Flag    expression (F-2)

In the modification example 5, as in the modification example 1', the case may be restricted to the case in which the split mode of the coding unit is 2N×2N indicating non-splitting (which is referred to as a modification example F5'). In the structure of the coded data, the condition SF1101 is used instead of the condition SF1001. In anyIvRefPicInL0Flag, expression (F-9) below is used instead of expression (F-8).

anyIvRefPicInL0Flag=(inter_pred_idc[x0][y0]!=Pred_L1&& refViewIdxL0[x0][y0]!=ViewIdx)    expression (F-9)

Since the inter-prediction flag inter_pred_idc mutually corresponds to the prediction list flag predFlagLX, the following expression can also be used as a determination formula to determine whether the inter-layer prediction is used, instead of expression (F-9).

anyIvRefPicInL0Flag=(prefFlagL0[x0][y0]==1&& refViewIdxL0[x0][y0]!=ViewIdx)    expression (F-9')

As described above, by expression (F-9) or expression (F-9'), whether the inter-layer prediction is executed is determined based on information regarding the reference picture of L1, as in expression (F-8') or expression (F-8"). Therefore, it is easy to determine whether the inter-layer prediction is executed.

The foregoing illumination compensation flag derivation section according to the modification example F5 restricts the case in which the illumination compensation flag is derived to the case in which the L0 prediction is executed. Thus, it is possible to obtain the advantageous effect of reducing the coding amount of the illumination compensation flag (advantageous effect F5a). Further, whether the inter-layer prediction is executed in the prediction unit included in the target CU is determined based on the information regarding the reference picture of L1. Therefore, it is possible to obtain the advantageous effect of easily determining whether inter-layer prediction is executed (advantageous effect F5aa). In the related art, in the case of the bi-prediction, there is a possibility of the illumination compensation being executed on both of a motion compensation image by the reference picture using the L0 list and a motion compensation image by the reference picture using the L1 list. However, by restricting the case in which the illumination compensation flag is derived to the case in which the reference picture using the L0 list is used, it is not necessary to execute the illumination compensation on both of the two motion compensation images. Therefore, it is possible to obtain the advantageous effect of reducing the processing amount (advantageous effect F5b). In the case of the bi-prediction, unlike a case in which the illumination compensation is forbidden, the illumination compensation is executed on the reference picture using the L0 list even in the case of the bi-prediction. Therefore, the fact that performance does not deteriorate due to the restriction can be obtained from an experiment by the inventors.

The modification example F5 in which the illumination compensation is restricted to L0 can be used together with the modification examples 1 to 4 described above. Hereinafter, only a case in which the modification examples 5 and 3 are used together will be described as a modification example F6, but can also be applied to other examples.

(Modification Example F6 of Inter-Prediction Parameter Decoding Section)

Hereinafter, an inter-prediction parameter decoding section 303F6 will be described as a modification example of the inter-prediction parameter decoding section. In the modification example F6, a case in which the illumination prediction is executed as the additional prediction will be handled. The inter-prediction parameter decoding control section 3031F6 is configured to include an illumination compensation flag decoding section 30311F6 and the reference picture index decoding section 30318.

Figure 64:
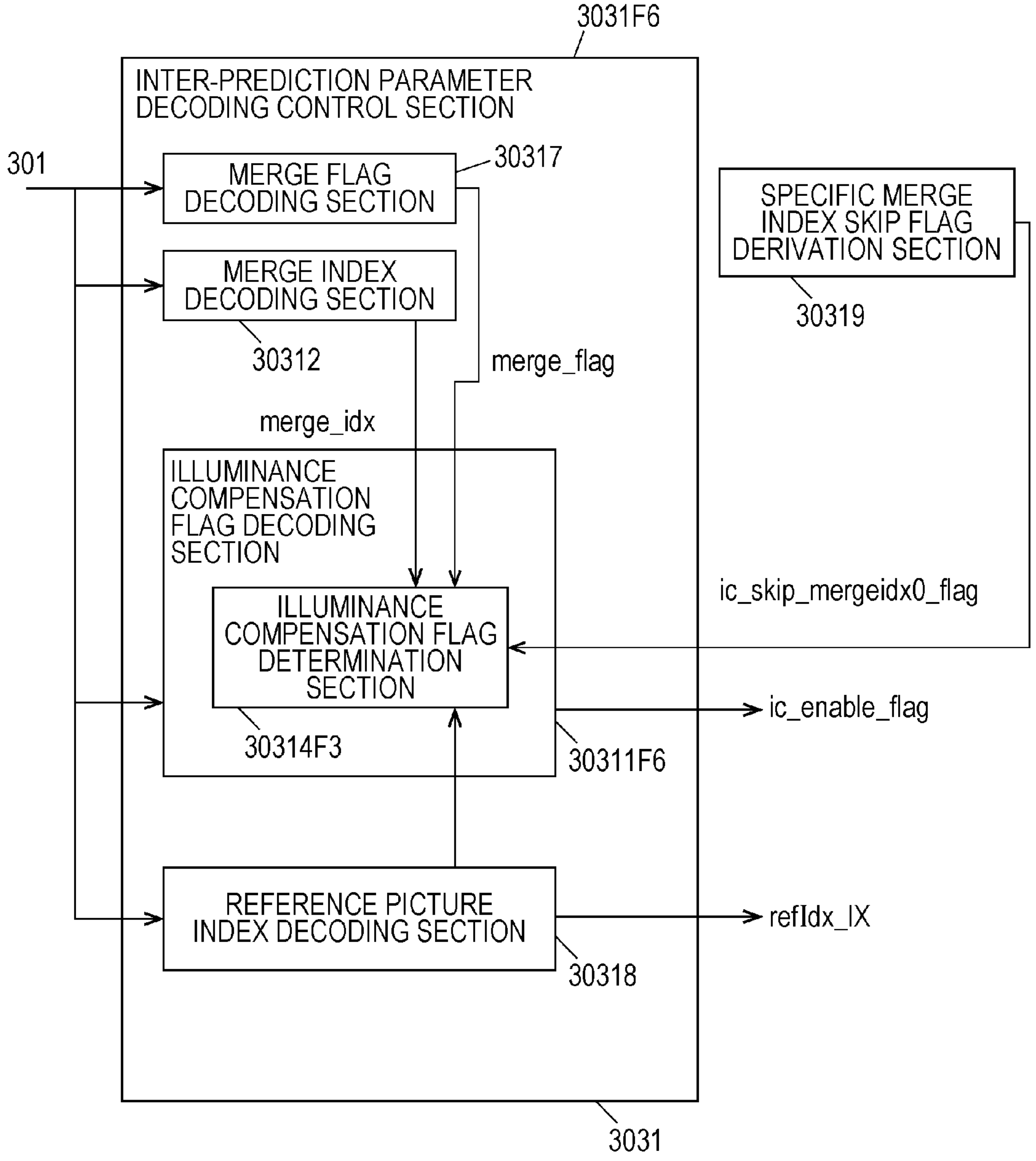
FIG. 64 is a schematic diagram illustrating the configuration of a modification example F6 of the inter-prediction parameter decoding section according to the embodiment.

Hereinafter, the inter-prediction parameter decoding section 303F6 will be described as a modification example of the inter-prediction parameter decoding section. In the modification example F6, a case in which the illumination prediction is executed as the additional prediction will be handled. FIG. 64 is a block diagram illustrating the configuration of the inter-prediction parameter decoding control section 3031F3. As illustrated in FIG. 64, the inter-prediction parameter decoding control section 3031F6 is configured to include an illumination compensation flag decoding section 30311F6, the split mode decoding section, the merge flag decoding section 30317, the merge index decoding section 30312, the inter-prediction flag decoding section, the reference picture index decoding section 30318, the vector candidate index decoding section 30313, the vector difference decoding section, and the specific merge index illumination compensation skip flag derivation section 30319.

Figure 65:
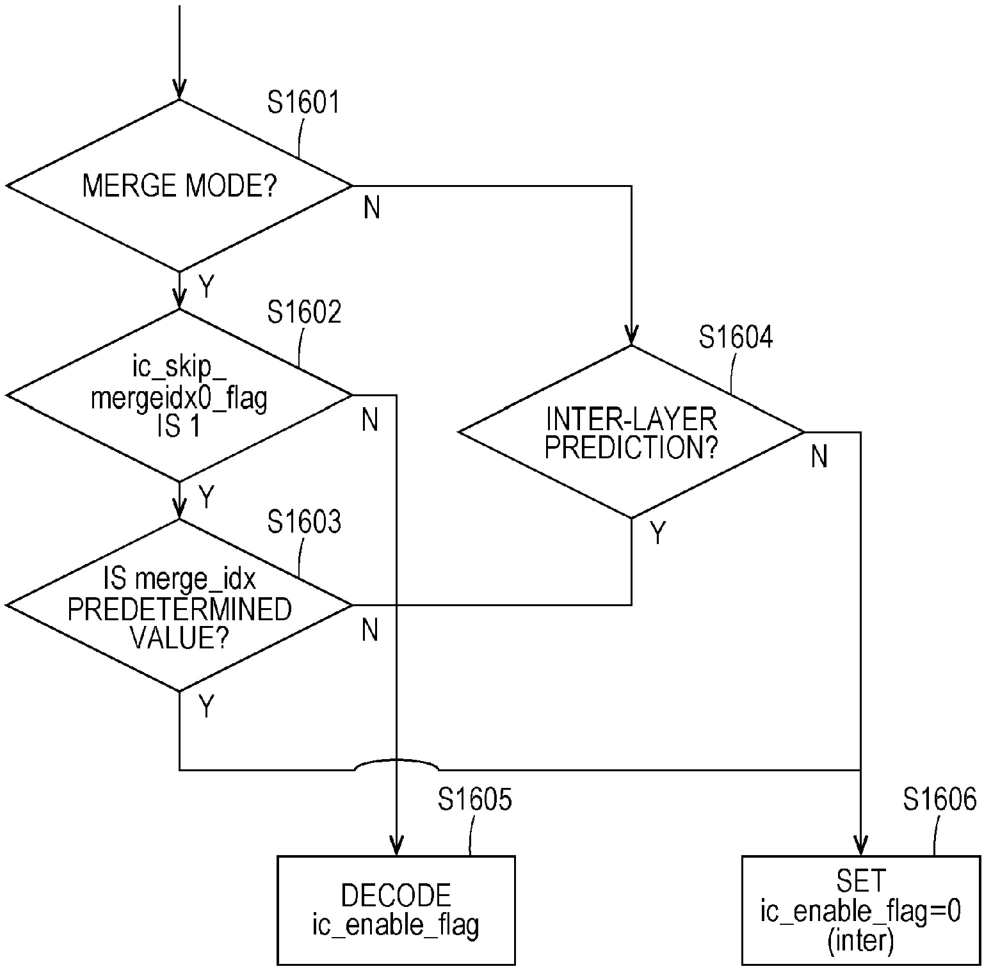
FIG. 65 is a schematic diagram which is a flowchart illustrating an operation of the modification example F6 of the inter-prediction parameter decoding section according to the embodiment.

FIG. 65 is a flowchart illustrating an operation of the illumination compensation flag decoding section 30311F6.

S1601: Referring to the merge flag merge_flag, it is determined whether the target block is in the merge mode (whether merge_flag is 1). When the target block is in the merge mode, the operation transitions to S1602. When the target block is not in the merge mode, the operation transitions to S1604.

S1602: It is determined whether the specific merge index illumination compensation skip flag ic_skip_mergeidx0_flag is valid. When the specific merge index illumination compensation skip flag ic_skip_mergeidx0_flag is valid, the operation transitions to S1603. When the specific merge index illumination compensation skip flag ic_skip_mergeidx0_flag is not valid, the illumination compensation flag is decoded (S1605). The specific merge index illumination compensation skip flag derivation section 30319 decodes ic_skip_mergeidx0_flag (the same applies below).

S1603: Referring to the merge index merge_idx, it is determined whether the merge index merge_idx is a predetermined value. When the merge index merge_idx is the predetermined value, the illumination compensation flag ic_enable_flag is set to 0 (S1606). When the merge index merge_idx is a value other than the predetermined value, the illumination compensation flag ic_enable_flag is decoded from the coded data (S1605).

S1604: Referring to the reference picture derived from the L0 list, it is determined whether the prediction unit in which the inter-layer prediction is executed on the target block is included (anyIvRefPicInL0Flag). When the prediction unit in which the inter-layer prediction is executed is included in the prediction using the L0 list (anyIvRefPicInL0Flag is 1), the illumination compensation flag ic_enable_flag is decoded from the coded data (S1605). Otherwise (anyIvRefPicInL0Flag is 0), 0 is set in the illumination compensation flag ic_enable_flag (S1606).

Here, the method of deriving anyIvRefPicInL0Flag and the method of deriving ic_skip_mergeidx0_flag have been described in the modification example F5.

FIG. 66 is a diagram illustrating the structure of the coded data of the illumination compensation flag ic_enable_flag decoded by the inter-prediction parameter decoding section 303F6.

The condition SF1101 is denoted in the above-described expression (F-1').

The condition SF1202 is denoted in the above-described expression (F-2'').

Condition SF1603 is denoted in the following expression.

!merge_flag && anyIvRefPicInL0Flag    expression (F-2'''''')

In the modification example F6, the advantageous effect F6a of the modification example F6 is obtained in addition to the advantageous effect F1 of the modification example 1, the advantageous effect F2 of the modification example 2, and the advantageous effect F3 of the modification example 3. In the modification example F6, the restriction by the reference picture index is not put when the target block is in the merge mode. Accordingly, when the target block is in the merge mode, the case in which the illumination prediction is used is not necessarily restricted to the case in which the reference picture using the L0 list is used. However, by using an illumination compensation section 3093F or an illumination compensation section 3093G to be described below, it is possible to obtain the advantageous effect of reducing the processing amount by L0 restriction (advantageous effect F5b).

<Residual Storage Section 313>

Figure 38:
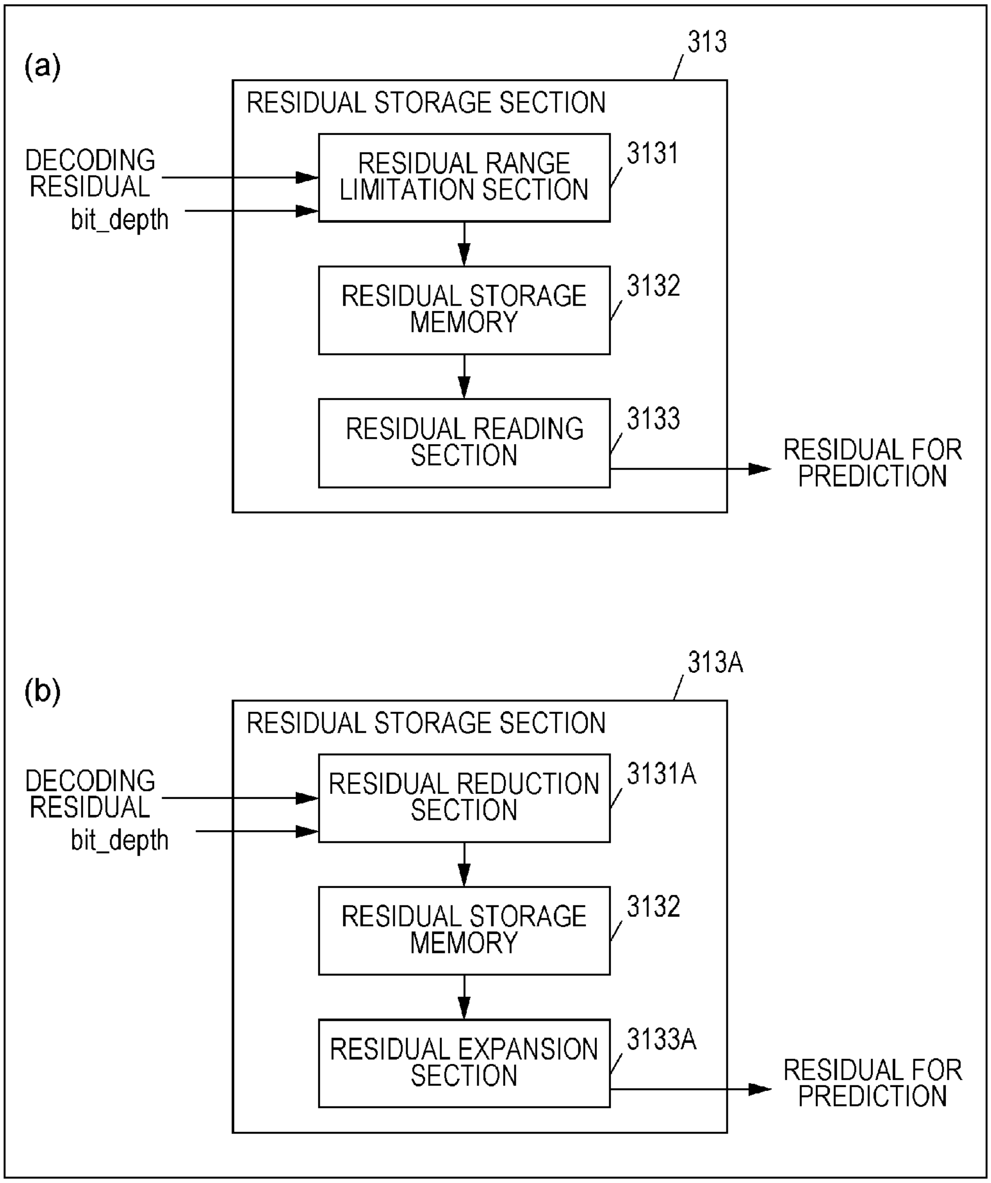
FIG. 38 is a schematic diagram illustrating the configuration of a residual storage section according to the embodiment.

The residual storage section 313 stores a residual signal derived in regard to the first layer image (the base layer and the base view) in the inverse quantization and inverse DCT section 311. FIG. 38 is a schematic diagram illustrating the configuration of the residual storage section 313.

FIG. 38(*a*) illustrates the configuration of the residual storage section 313 corresponding to a case in which the residual prediction section 3092 restricts and reads the range of the value of the residual obtainable in the reference layer. The residual storage section 313 is configured to include a residual range restriction section 3131, a residual storage memory 3132, and a residual reading section 3133. When the bit width of the pixels is bitDepthY, the residual range restriction section 3131 restricts the range of the residual to "−1<<(BitDepthY−1)" to "(1<<(BitDepthY−1))−1" and stores the range of residual in the residual storage memory 3132. The residual reading section 3133 reads the residual stored in the residual storage memory 3132.

Specifically, as in the following expression, a residual resSamples is recorded on a memory resStoreSamples of the residual storage memory 3132.

$$\text{resStoreSamples}[x][y]=\text{clip3}(x\text{min},x\text{max},\text{resSamples}[x][y]$$

Here, xmin=−(1<<(BitDepthY−1)), xmax=(1<<(BitDepthY−1))−1, x, and y are the coordinates of a storage destination. Further, x is an integer equal to or greater than 0 and equal to or less than "width−1," y is an integer equal to or greater than 0 and equal to or less than "height−1)," and width and height are the width and the height of a screen.

The residual storage memory 3132 stores the residual with the bit width of BitDepthY.

The residual reading section 3133 reads the residual recorded on the residual storage memory 3132 in the following manner.

$$\text{refResSamples}_L[x][y]=]=]=\text{resStoreSamples}[x][y]$$

FIG. 38(*b*) is a diagram illustrating a residual storage section 313A which is a modification example of the residual storage section 313. In the residual prediction section 3092A, when the residual of the reference layer is read, a resolution in a horizontal direction or/and a vertical direction corresponds to a case in which the pixels at positions at which 1/N is decimated when a predetermined magnification is N. The residual storage section 313A includes a residual contraction section 3131A, the residual storage memory 3132, and a residual expansion section 3133A.

When the bit width of the pixels is bitDepthY, the residual contraction section 3131A restricts the range of the residual to (1<<(BitDepthY−1)) to (1<<(BitDepthY−1))−1 and then stores the residual of the pixels at the position at which 1/N is decimated in the residual storage memory 3132. Specifically, as in the following expression, a sample at the positions at which 1/N of the residual resSamples is decimated is recorded on the memory resStoreSamples of the residual storage memory 3132. Here, N is an integer satisfying 1<<K.

$$\text{resStoreSamples}[x][y]=\text{clip3}(x\text{min},x\text{max},\text{resSamples}[N{*}x][N{*}y])$$

Here, xmin=−(1<<(BitDepthY−1)), xmax=(1<<(BitDepthY−1))−1, x, and y are the coordinates of a storage destination. Further, x is an integer equal to or greater than 0 and equal to or less than (width+N−1)/N, y is an integer equal to or greater than 0 and equal to or less than (height+N−1)/N and width and height are the width and the height of a screen.

The residual storage memory 3132 stores the residual with the bit width of BitDepthY.

The residual expansion section 3133A reads the residual recorded on the residual storage memory 3132 in the following manner.

$$\text{refResSamples}_L[x][y]=\text{resStoreSamples}[x/N][y/N]$$

Here, x and y are coordinates of a reading destination. Since contraction is executed in the spatial direction in the residual storage memory 3132, the coordinates (x, y) of the reading destination corresponding to (x/N, y/N) on the residual storage memory 3132. At the time of the reading, an interpolation process such as linear interpolation may be executed.

(Configuration of Image Coding Device)

Figure 39:
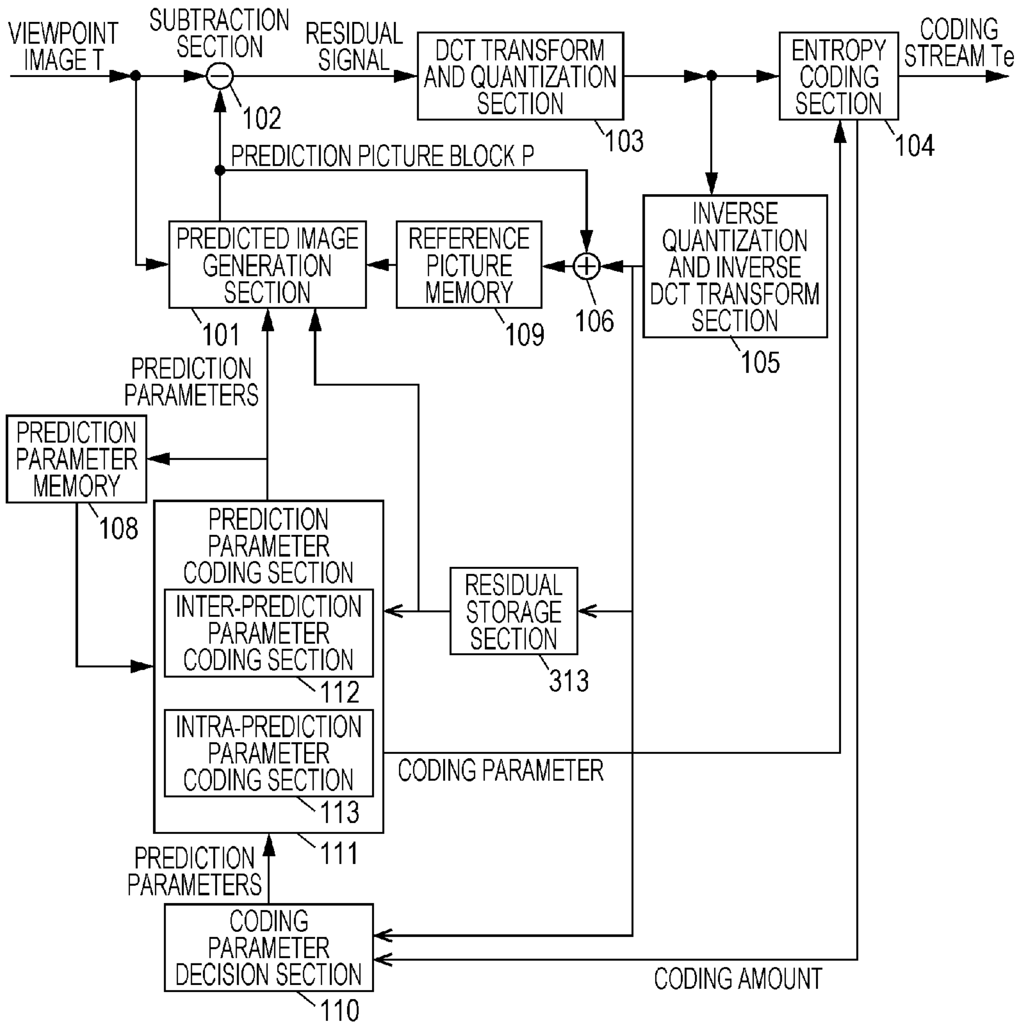
FIG. 39 is a block diagram illustrating the configuration of an image coding device according to the embodiment.

Next, the configuration of the image coding device 11 according to the embodiment will be described. FIG. 39 is a block diagram illustrating the configuration of the image coding device 11 according to the embodiment. The image coding device 11 is configured to include a predicted image generation section 101, a subtraction section 102, a DCT and quantization section 103, an entropy coding section 104, an inverse quantization and inverse DCT section 105, an addition section 106, a prediction parameter memory (a prediction parameter storage section or a frame memory) 108, a reference picture memory (a reference image storage section or a frame memory) 109, a coding parameter decision section 110, a prediction parameter coding section 111, and a residual storage section 313 (residual recording section). The prediction parameter coding section 111 is configured to include an inter-prediction parameter coding section 112 and an intra-prediction parameter coding section 113.

The predicted image generation section 101 generates the predicted picture block P for each block which is a region separated from each picture in regard to the picture at each viewpoint of the layer image T input from the outside. Here, the predicted image generation section 101 reads the reference picture block from the reference picture memory 109 based on the prediction parameter input from the prediction parameter coding section 111. The prediction parameter input from the prediction parameter coding section 111 is, for example, the motion vector or the disparity vector. The predicted image generation section 101 reads the reference picture block of the block located at a position indicated by the motion vector or the disparity vector predicated using a coding target block as a starting point. The predicted image generation section 101 generates the predicted picture block P using one prediction scheme among a plurality of prediction schemes in regard to the read reference picture block. The predicted image generation section 101 outputs the generated predicted picture block P to the subtraction section 102. Since the operation of the predicted image generation section 101 is the same as the operation of the predicted image generation section 308 described above, the details of the generation of the predicted picture block P will be omitted.

To select the prediction scheme, the predicted image generation section 101 selects, for example, a prediction scheme in which an error value based on a difference between a signal value for each pixel of the block included in the layer image and a signal value for each pixel corresponding to the predicted picture block P is the minimum. The method of selecting the prediction scheme is not limited thereto.

When the picture of a coding target is the base view picture, the plurality of prediction schemes are intra-prediction, motion prediction, and merge prediction. The motion prediction is display inter-temporal prediction among the above-described inter-prediction. The merge prediction is prediction in which the same reference picture block as a block, which is an already encoded block and is a block within a pre-decided range from the coding target block, and the prediction parameters are used. When the picture of the coding target is the non-base view picture, the plurality of prediction schemes are intra-prediction, motion prediction, merge prediction, and disparity prediction. The disparity prediction (parallax prediction) is prediction between different layer images (different viewpoint images) in the above-described inter-prediction. Further, the prediction schemes are the motion prediction, the merge prediction, and the disparity prediction. In the disparity prediction (parallax prediction), there are prediction when the additional prediction (the residual prediction and the illumination compensation) is executed and prediction when the additional prediction is not executed.

When the intra-prediction is selected, the predicted image generation section 101 outputs the prediction mode predMode indicating the intra-prediction mode used at the time of the generation of the predicted picture block P to the prediction parameter coding section 111.

When the motion prediction is selected, the predicted image generation section 101 stores the motion vector mvLX used at the time of the generation of the predicted picture block P in the prediction parameter memory 108 and outputs the motion vector mvLX to the inter-prediction parameter coding section 112. The motion vector mvLX indicates a vector from the position of the coding target block to the position of the reference picture block at the time of the generation of the predicted picture block P. Information indicating the motion vector mvLX includes information (for example, the reference picture index refIdxLX or the picture order number POC) indicating the reference picture and may indicate the prediction parameter. The predicted image generation section 101 outputs a prediction mode predMode indicating the inter-prediction mode to the prediction parameter coding section 111.

When the disparity prediction is selected, the predicted image generation section 101 stores the disparity vector used at the time of the generation of the predicted picture block P in the prediction parameter memory 108 and outputs the disparity vector to the inter-prediction parameter coding section 112. The disparity vector dvLX indicates a vector from the position of the coding target block to the position of the reference picture block at the time of the generation of the predicted picture block P. Information indicating the disparity vector dvLX includes information (for example, the reference picture index refIdxLX or the view ID view_id) indicating the reference picture and may indicate the prediction parameter. The predicted image generation section 101 outputs a prediction mode predMode indicating the inter-prediction mode to the prediction parameter coding section 111.

When the merge prediction is selected, the predicted image generation section 101 outputs the merge index merge_idx indicating the selected reference picture block to the inter-prediction parameter coding section 112. Further, the predicted image generation section 101 outputs a prediction mode predMode indicating the merge prediction mode to the prediction parameter coding section 111.

When the predicted image generation section 101 executes the residual prediction as the additional prediction in the motion prediction, the disparity prediction, and the merge prediction described above, the residual prediction section 3092 included in the predicted image generation section 101 executes the residual prediction, as described above. When the predicted image generation section 101 executes the illumination compensation as the additional prediction, the illumination compensation section 3093 included in the predicted image generation section 101 executes the illumination compensation prediction, as described above.

In a moving-image coding device including the residual prediction section 3092 having the foregoing configuration, the range of the value of the residual obtained in the reference layer is restricted and read in the estimation of the residual of the target layer. Thus, since only the value of the range restricted as the residual may be stored in the residual storage section 313, it is possible to obtain the advantageous effect of reducing a memory amount for recording the residual.

The residual prediction section 3092B may be used instead of the residual prediction section 3092. In a moving-image coding device including the residual prediction section 3092B, only the luminance component is subjected to the linear interpolation of the residual and the color difference component is not subjected to the linear interpolation of the residual in the derivation of the predicted residual. Thus, it is possible to obtain the advantageous effect of reducing a processing amount used to derive the predicted residual.

The residual prediction section 3092C may be used instead of the residual prediction section 3092. In a moving-image coding device including the residual prediction section 3092C, the number of bits necessary for the residual of the color difference component can be reduced in the derivation of the predicted residual. Therefore, it is possible to obtain the advantageous effect of reducing a memory size for storing the residual of the color difference component.

The residual prediction section 3092D may be used instead of the residual prediction section 3092. In a moving-image coding device including the residual prediction section 3092D, it is possible to obtain the advantageous effect of omitting a memory size for storing the residual of the color difference component in the derivation of the predicted residual.

The illumination compensation section 3093B may be used instead of the illumination compensation section 3093. In a moving-image coding device including the illumination compensation section 3093B, xy and xx which are the sums of the products are derived using the integrated shift value precShift according to the pixel bit depth, and thus the first and second parameters can be derived within a predetermined range, for example, a 32-bit range. Therefore, it is possible to obtain the advantageous effect of executing the process easily.

The illumination compensation section 3093C may be used instead of the illumination compensation section 3093. In a moving-image coding device including the illumination compensation section 3093C, the common shift section 3093162C normalizes values using the same normalized shift value for both of the first and second parameters. Thus, it is possible to obtain the advantageous effect of executing the process easily.

The illumination compensation section 3093D may be used instead of the illumination compensation section 3093. In a moving-image coding device including the illumination compensation section 3093D, the parameter a is derived by comparing the value derived from the first parameter a1 derived from the sum XY of the products of the pixel values of the decoded image and the pixel values of the reference image and the product of the sum Y of the pixel values of the decoded image and the sum X of the pixel values of the reference image to the value derived from the second parameter a2 derived from the sum XX of the squares of the pixel values of the reference image and the square of the sum X of the pixel values of the reference image. Since it is not necessary to use the table invTable[ ] for subtracting the reciprocal of the second parameter, it is possible to obtain the advantageous effect of executing the process easily.

The illumination compensation section 3093E may be used instead of the illumination compensation section 3093. In a moving-image coding device including the illumination compensation section 3093E, the parameter a is derived from the first parameter a1 and the second parameter a2 to which the regularization term is added. Thus, an estimated parameter becomes robust when there is a deviated value or the like due to the fact that the parameter a is substantially near 1 (actually, the parameter a is near 1<<iShift). When the estimated parameter becomes robust, it is possible to obtain the advantageous effects of improving estimation precision of the illumination compensation and improving coding efficiency.

The illumination compensation section 3093F may be used instead of the illumination compensation section 3093. In a moving-image coding device including the illumination compensation section 3093F, the case in which the illumination prediction is used is restricted to the motion compensation image in which the reference picture using the L0 list is used (L0 restriction). Therefore, it is possible to obtain the advantageous effect of reducing a processing amount (advantageous effect F5b) while maintaining the performance (advantageous effect F5c).

(Another Form of Predicted Image Generation Section 101)

In another form of the predicted image generation section 101, the residual prediction section 3092A is provided instead of the residual prediction section 3092. In the foregoing configuration, only the residual at the referred position may be stored in the residual storage section 313 by restricting and reading the reference position of the residual. Therefore, it is possible to obtain the advantageous effect of reducing a memory amount for recording the residual.

The subtraction section 102 generates a residual signal by subtracting a signal value of the predicted picture block P input from the predicted image generation section 101 for each pixel from a signal value of the block corresponding to the layer image T input from the outside. The subtraction section 102 outputs the generated residual signal to the DCT and quantization section 103 and the coding parameter decision section 110.

The DCT and quantization section 103 executes DCT on the residual signal input from the subtraction section 102 to calculate a DCT coefficient. The DCT and quantization section 103 quantizes the calculated DCT coefficient to obtain a quantization coefficient. The DCT and quantization section 103 outputs the obtained quantization coefficient to the entropy coding section 104 and the inverse quantization and inverse DCT section 105.

The quantization coefficient is input from the DCT and quantization section 103 to the entropy coding section 104 and the coding parameter is input from the coding parameter decision section 110 to the entropy coding section 104. As the input coding parameter, for example, there are codes such as the reference picture index refIdxLX, the vector index mvp_LX_idx, the difference vector mvdLX, the prediction mode predMode, and the merge index merge_idx.

The entropy coding section 104 performs entropy coding on the input quantization coefficient and coding parameter to generate the coded stream Te and outputs the generated coded stream Te to the outside.

The inverse quantization and inverse DCT section 105 executes inverse quantization on the quantization coefficient input from the DCT and quantization section 103 to obtain a DCT coefficient. The inverse quantization and inverse DCT section 105 executes the inverse DCT on the obtained DCT coefficient to calculate a decoding residual signal. The inverse quantization and inverse DCT section 105 outputs the calculated decoding residual signal to the addition section 106.

The addition section 106 adds a signal value of the predicted picture block P input from the predicted image generation section 101 and a signal value of the decoding residual signal input from the inverse quantization and inverse DCT section 105 for each pixel to generate a reference picture block. The addition section 106 stores the generated reference picture block in the reference picture memory 109.

The prediction parameter memory 108 stores the prediction parameter generated by the prediction parameter coding section 111 at a position decided in advance for each picture and block of the coding target.

The reference picture memory 109 stores the reference picture block generated by the addition section 106 at a position decided in advance for each picture and block of the coding target.

The coding parameter decision section 110 selects one set from a plurality of sets of coding parameters. The coding parameters are the above-described prediction parameters or parameters which are coding targets generated in association with the prediction parameters. The predicted image generation section 101 generates the predicted picture block P using each set of coding parameters.

The coding parameter decision section 110 calculates a cost value indicating the size of an information amount or a coding error in each of the plurality of sets. The cost value is, for example, a sum of the coding amount and a value obtained by multiplying a squared error by a coefficient λ. The coding amount is an information amount of the coded stream Te obtained by performing entropy coding on a quantized error and the coding parameter. The squared error is a total sum of squared values of residual values of residual signals calculated in the subtraction section 102 between the pixels. The coefficient λ is a larger real number than preset zero. The coding parameter decision section 110 selects the set of coding parameters for which the calculated cost value is the minimum. In this way, the entropy coding section 104 outputs the selected set of coding parameters as the coded stream Te to the outside and does not output the unselected set of coding parameters.

The prediction parameter coding section 111 derives the prediction parameters used at the time of the generation of the predicted picture based on the parameter input from the predicted image generation section 101 and codes the derived prediction parameter to generate the set of coding parameters. The prediction parameter coding section 111 outputs the generated set of coding parameters to the entropy coding section 104.

The prediction parameter coding section 111 stores the prediction parameter corresponding to the set of coding parameters selected by the coding parameter decision section 110 among the generated sets of coding parameters in the prediction parameter memory 108.

When the prediction mode predMode input from the predicted image generation section 101 is the inter-prediction mode, the prediction parameter coding section 111 operates the inter-prediction parameter coding section 112. When the prediction mode predMode indicates the intra-prediction mode, the prediction parameter coding section 111 operates the intra-prediction parameter coding section 113.

The inter-prediction parameter coding section 112 derives the inter-prediction parameter based on the prediction parameter input from the coding parameter decision section 110. The inter-prediction parameter coding section 112 includes the same configuration as the configuration in which the inter-prediction parameter decoding section 303 (see FIG. 5 or the like) derives the inter-prediction parameter as the configuration in which the inter-prediction parameter is derived. The configuration of the inter-prediction parameter coding section 112 will be described below.

The intra-prediction parameter coding section 113 decides an intra-prediction mode IntraIntraPredMode indicated by the prediction mode predMode input from the coding parameter decision section 110 as the set of inter-prediction parameter.

(Configuration of Inter-Prediction Parameter Coding Section)

Next, the configuration of the inter-prediction parameter coding section 112 will be described. The inter-prediction parameter coding section 112 is means corresponding to the inter-prediction parameter decoding section 303.

Figure 40:
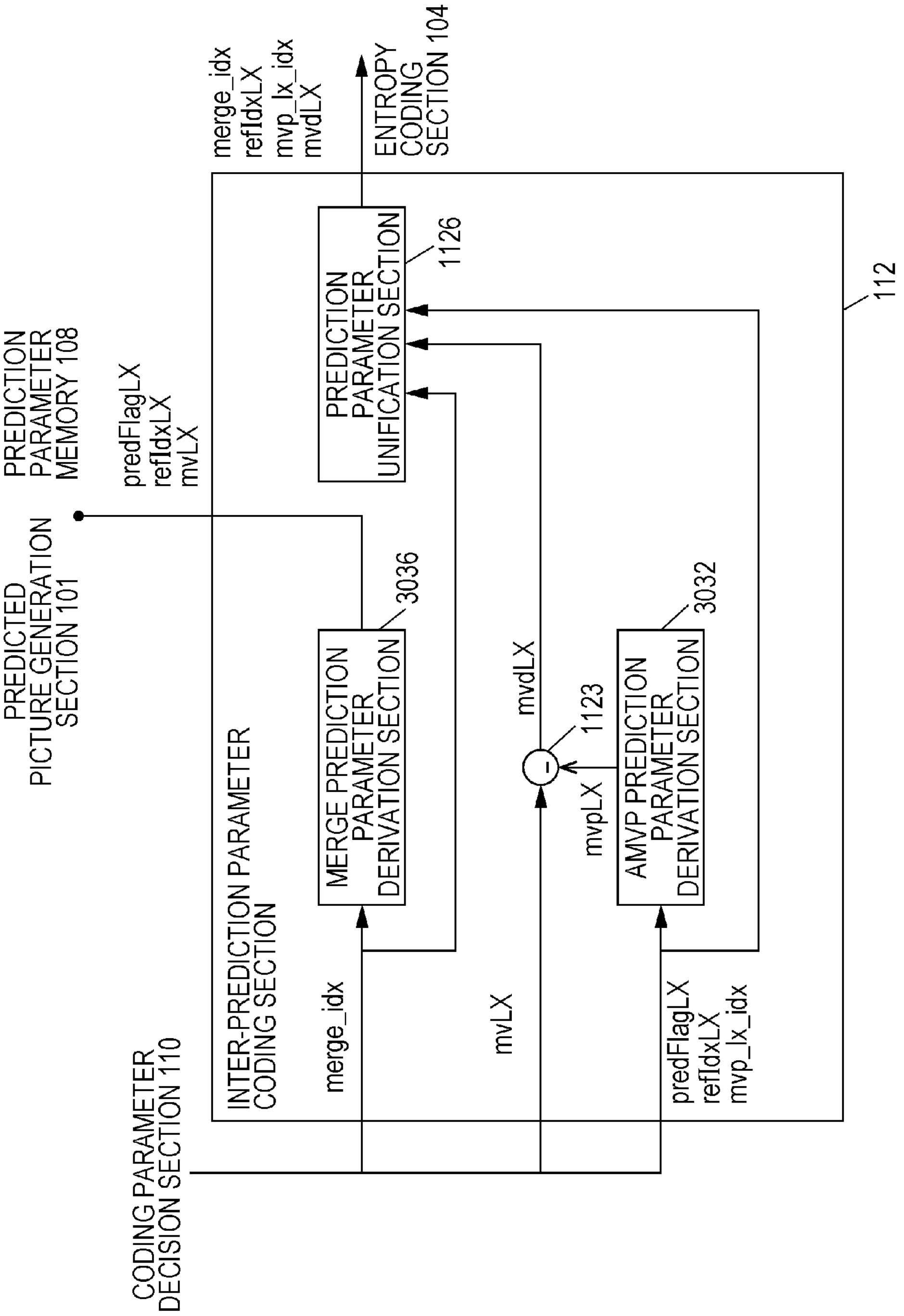
FIG. 40 is a schematic diagram illustrating the configuration of an inter-prediction parameter coding section according to the embodiment.

FIG. 40 is a schematic diagram illustrating the configuration of the inter-prediction parameter coding section 112 according to the embodiment.

The inter-prediction parameter coding section 112 is configured to include an inter-prediction parameter coding control section 1031, a merge prediction parameter derivation section 1121, an AMVP prediction parameter derivation section 1122, a subtraction section 1123, and a prediction parameter unification section 1126.

The merge prediction parameter derivation section 1121 has the same configuration as the above-described merge prediction parameter derivation section 3036 (see FIG. 7).

The inter-prediction parameter coding control section 1031 instructs the entropy coding section 104 to decode the codes (syntax components) related to the inter-prediction. The codes (syntax components) included in the coded data, for example, the split mode part_mode, the merge flag merge_flag, the merge index merge_idx, the inter-prediction flag inter_pred_idx, the reference picture index refIdxLX, the prediction vector index mvp_LX_idx, and the difference vector mvdLX, are coded.

Figure 41:
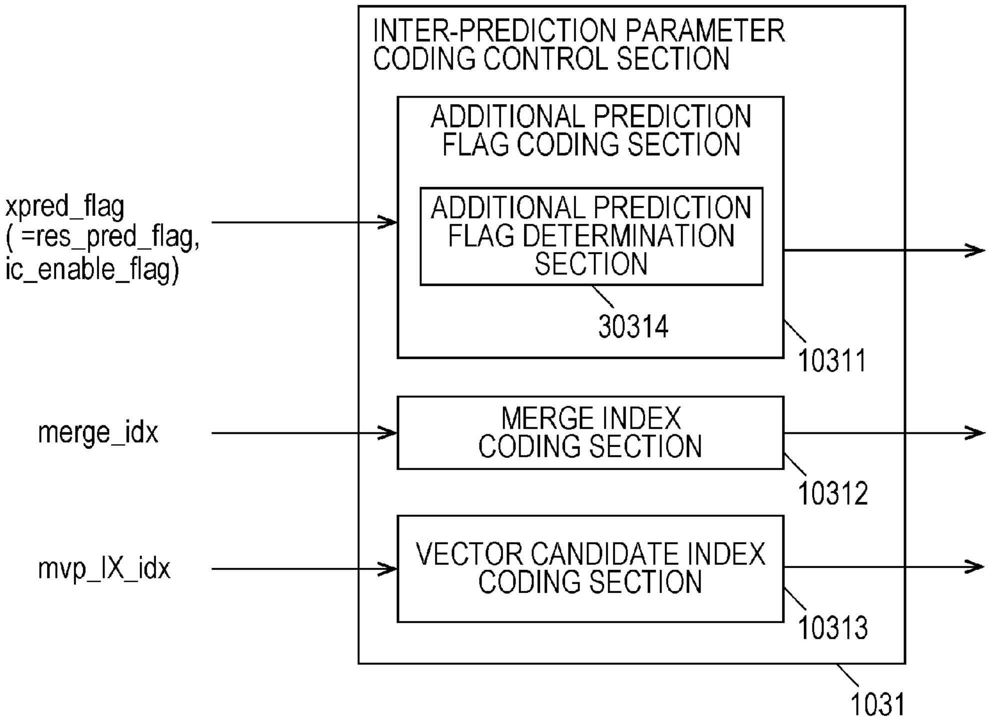
FIG. 41 is a schematic diagram illustrating the configuration of an inter-prediction parameter coding control section according to the embodiment.

As illustrated in FIG. 41, the inter-prediction parameter coding control section 1031 is configured to include an additional prediction flag coding section 10311, a merge index coding section 10312, a vector candidate index coding section 10313 and include a split mode coding section, a merge flag coding section, an inter-prediction flag coding section, a reference picture index coding section, and a vector difference coding section (none of which are illustrated). The split mode coding section, the merge flag coding section, the merge index coding section, the inter-prediction flag coding section, the reference picture index coding section, the vector candidate index coding section 10313, and the vector difference coding section respectively code the split mode part_mode, the merge flag merge_flag, the merge index merge_idx, the inter-prediction flag inter_pred_idx, the reference picture index refIdxLX, the prediction vector index mvp_LX_idx, and the difference vector mvdLX.

The additional prediction flag coding section 10311 codes a flag xpred_flag indicating whether the additional prediction is executed. The additional prediction flag coding section 10311 includes an additional prediction flag determination section 30314 therein. As described above, the additional prediction flag determination section 30314 determines whether the additional prediction flag xpred_flag is included in the coded data. When the additional prediction flag determination section 30314 determines that the additional prediction flag is included in the coded data, the additional prediction flag coding section 10311 notifies the entropy coding section 104 of the decoding or the coding of the additional prediction flag and codes the syntax component corresponding to the additional prediction flag in the coded data via the entropy coding section 104. In contrast, when the additional prediction flag determination section 30314 determines that the additional prediction flag is not included in the coded data, the additional prediction flag coding section 10311 does not code the additional prediction flag corresponding to the corresponding coding unit (CU) in the coded data.

When the prediction mode predMode input from the predicted image generation section 101 indicates the merge prediction mode, the merge index merge_idx is input from the coding parameter decision section 110 to the merge prediction parameter derivation section 1121. The merge index merge_idx is output to the prediction parameter unification section 1126. The merge prediction parameter derivation section 1121 reads the vector mvLX and the reference picture index refIdxLX of the reference block indicated by the merge index merge_idx among the merge candidates from the prediction parameter memory 108. The merge candidate is a reference block which is a reference block (for example, among the reference blocks adjacent to the lower left end, the upper left end, and the upper right end of the coding target block) within a range decided in advance from the coding target block which is the coding target and is the reference block subjected to the coding process.

The AMVP prediction parameter derivation section 1122 has the same configuration as the above-described AMVP prediction parameter derivation section 3032 (see FIG. 8).

When the prediction mode predMode input from the predicted image generation section 101 indicates the inter-prediction mode, the vector mvLX is input from the coding parameter decision section 110 to the AMVP prediction parameter derivation section 1122. The AMVP prediction parameter derivation section 1122 derives the prediction vector mvpLX based on the input vector mvLX. The AMVP prediction parameter derivation section 1122 outputs the derived prediction vector mvpLX to the subtraction section 1123. The reference picture index refIdx and the vector index mvp_LX_idx are output to the prediction parameter unification section 1126.

(Modification Example A of Inter-Prediction Parameter Coding Section)

Hereinafter, an inter-prediction parameter coding section 1031A will be described as a modification example of the inter-prediction parameter coding section. The inter-prediction parameter coding section 1031A includes an additional prediction flag coding section 10311A, the merge index coding section 10312, and the vector candidate index coding section 10313. The additional prediction flag coding section 10311A is configured to include an additional prediction flag determination section 30314A therein.

The inter-prediction parameter coding section 1031A and the additional prediction flag coding section 10311A are means corresponding to the inter-prediction parameter decoding section 303A and the additional prediction flag decoding section 30311A described above. A method of determining whether the additional prediction flag is included in the coded data in the additional prediction flag determination section 30314A is the same. When the additional prediction flag is included in the coded data, the inter-prediction parameter decoding section 303A decodes the additional prediction flag and the inter-prediction parameter coding section 1031A codes the additional prediction flag.

In the configuration of the modification example A described above, when two additional prediction flags are used, whether the second additional prediction flag is present is determined based on the value of the first additional prediction flag (for example, res_pred_flag). Therefore, whether the second additional prediction flag is present is determined without checking the prediction parameter (for example, disparity_pred_exists) of each PU. Therefore, it is possible to obtain the advantageous effect of executing the decoding process for the additional prediction flag easily.

(Modification Example A2 of Inter-Prediction Parameter Coding Section)

Hereinafter, an inter-prediction parameter coding section 1031A2 will be described as a modification example of the inter-prediction parameter coding section. The inter-prediction parameter coding section 1031A2 includes an additional prediction flag coding section 10311A2, the merge index coding section 10312, and the vector candidate index coding section 10313. The additional prediction flag coding section 10311A2 is configured to include an additional prediction flag determination section 30314A2 therein.

The inter-prediction parameter coding section 1031A2 and the additional prediction flag coding section 10311A2 are means corresponding to the inter-prediction parameter decoding section 303A2 and the additional prediction flag decoding section 30311A2 described above. A method of determining whether the additional prediction flag is included in the coded data in the additional prediction flag determination section 30314A2 is the same. When the additional prediction flag is included in the coded data, the inter-prediction parameter decoding section 303A2 decodes the additional prediction flag and the inter-prediction parameter coding section 1031A2 codes the additional prediction flag.

In the configuration of the modification example A2 described above, the fact that disparity_pred_exists for the determination of whether the PU includes the disparity prediction is 1 is used to determine whether the first flag is present. The fact that disparity_pred_exists for the determination of whether the PU includes the motion prediction is 0 is used to determine whether the second flag is present. In the foregoing determination, whether the second additional prediction flag is present is determined based on the value used to determine whether the first additional prediction flag is present. Therefore, whether the second additional prediction flag is present can be determined without checking the prediction parameter of each PU. Therefore, it is possible to obtain the advantageous effect of executing the decoding process for the additional prediction flag easily.

(Modification Example B of Inter-Prediction Parameter Coding Section)

Hereinafter, an inter-prediction parameter coding section 1031B will be described as a modification example of the inter-prediction parameter coding section. The inter-prediction parameter coding section 1031B includes an additional prediction flag coding section 10311B, the merge index coding section 10312, and the vector candidate index coding section 10313. The additional prediction flag coding section 10311B is configured to include an additional prediction flag determination section 30314B therein.

The inter-prediction parameter coding section 1031B and the additional prediction flag coding section 10311B are means corresponding to the inter-prediction parameter decoding section 303B and the additional prediction flag decoding section 30311B described above. A method of determining whether the additional prediction flag is included in the coded data in the additional prediction flag determination section 30314B is the same. When the additional prediction flag is included in the coded data, the inter-prediction parameter decoding section 303B decodes the additional prediction flag and the inter-prediction parameter coding section 1031B codes the additional prediction flag.

In the modification example B described above, the additional prediction flag determination section 30314B may check only the prediction parameters of the beginning PU without checking the prediction parameters of all the PUs included in the target CU. Therefore, it is possible to obtain the advantageous effects of easily executing the process of checking whether the additional prediction flags xpred (here, the residual prediction flag res_pred_flag and the illumination compensation flag ic_enable_flag) are included in the coded data.

(Modification Example C of Inter-Prediction Parameter Coding Section)

Hereinafter, an inter-prediction parameter coding section 1031C will be described as a modification example of the inter-prediction parameter coding section. The inter-prediction parameter coding section 1031C includes an additional prediction flag coding section 10311C, the merge index coding section 10312, and the vector candidate index coding section 10313. The additional prediction flag coding section 10311B is configured to include an additional prediction flag determination section 30314C therein.

The inter-prediction parameter coding section 1031C and the additional prediction flag coding section 10311C are means corresponding to the inter-prediction parameter decoding section 303C and the additional prediction flag decoding section 30311C described above. A method of determining whether the additional prediction flag is included in the coded data in the additional prediction flag determination section 30314C is the same. When the additional prediction flag is included in the coded data, the inter-prediction parameter decoding section 303C decodes the additional prediction flag and the inter-prediction parameter coding section 1031C codes the additional prediction flag.

In the additional prediction flag coding section 10311C with the above-described configuration, the additional prediction flag is set as the common flag common to the residual prediction flag and the illumination compensation flag and thus the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. Further, in the coded data, one flag is included as the additional prediction flag instead of two flags (the residual prediction flag and the illumination compensation flag). Therefore, it is possible to obtain the advantageous effect of decreasing a coding amount of the flag.

(Modification Example D of Inter-Prediction Parameter Coding Section)

Hereinafter, an inter-prediction parameter coding section 1031D will be described as a modification example of the inter-prediction parameter coding section. The inter-prediction parameter coding section 1031D includes an additional prediction flag coding section 10311D, the merge index coding section 10312, and the vector candidate index coding section 10313. The additional prediction flag coding section 10311B is configured to include an additional prediction flag determination section 30314C therein. The additional prediction flag coding section 10311D is configured to include an additional prediction flag determination section 30314D therein.

The inter-prediction parameter coding section 1031D and the additional prediction flag coding section 10311D are means corresponding to the inter-prediction parameter decoding section 303D and the additional prediction flag decoding section 30311D described above. A method of determining whether the additional prediction flag is included in the coded data in the additional prediction flag determination section 30314D is the same. When the additional prediction flag is included in the coded data, the inter-prediction parameter decoding section 303D decodes the additional prediction flag and the inter-prediction parameter coding section 1031D codes the additional prediction flag.

(Modification Example D2 of Inter-Prediction Parameter Decoding Section)

Hereinafter, an inter-prediction parameter coding section 1031D2 will be described as a different modification example of the inter-prediction parameter coding section. The inter-prediction parameter coding section 1031D2 includes an additional prediction flag coding section 10311D2, the merge index coding section 30312, and the vector candidate index coding section 30313. The additional prediction flag coding section 10311D2 is configured to include an additional prediction flag determination section 30314D2 therein. The additional prediction flag coding section 10311D is configured to include an additional prediction flag determination section 30314D2 therein.

The inter-prediction parameter coding section 1031D2 and the additional prediction flag coding section 10311D2 are means corresponding to the inter-prediction parameter decoding section 303D2 and the additional prediction flag decoding section 30311D2 described above. A method of determining whether the additional prediction flag is included in the coded data in the additional prediction flag determination section 30314D2 is the same. When the additional prediction flag is included in the coded data, the inter-prediction parameter decoding section 303D2 decodes the additional prediction flag and the inter-prediction parameter coding section 1031D2 codes the additional prediction flag.

In the additional prediction flag coding section 10311D and the additional prediction flag coding section 10311D2 with the above-described configurations, the flag in units of the PU is set only when the additional prediction flag is in the merge mode. Thus, the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. Further, the additional prediction flag decoding section 30311D2 codes the additional prediction flag only when the merge index merge_idx is the predetermined value indicating the inter-layer merge candidate (interview merge candidate). Thus, when the additional prediction is not valid, the additional prediction flag is not included in the coded data. Therefore, it is possible to obtain the advantageous effect of improving coding efficiency.

(Modification Example D3 of Inter-Prediction Parameter Coding Section)

Hereinafter, an inter-prediction parameter coding section 1031D3 will be described as a different modification example of the inter-prediction parameter coding section. The inter-prediction parameter coding section 1031D3 includes an additional prediction flag coding section 10311D3, a merge index coding section 30312D3, and the vector candidate index coding section 30313. The additional prediction flag coding section 10311D3 is configured to include an additional prediction flag determination section 30314D3 therein. The additional prediction flag coding section 10311D3 is configured to include an additional prediction flag determination section 30314D3 therein.

The inter-prediction parameter coding section 1031D3 and the additional prediction flag coding section 10311D3 are means corresponding to the inter-prediction parameter decoding section 303D3 and the additional prediction flag decoding section 30311D3 described above. A method of determining whether the additional prediction flag is included in the coded data in the additional prediction flag determination section 30314D3 is the same. When the additional prediction flag is included in the coded data, the inter-prediction parameter decoding section 303D3 decodes the additional prediction flag and the inter-prediction parameter coding section 1031D3 codes the additional prediction flag.

In the inter-prediction parameter coding section 1031D3 with the above-described configuration, the flag in units of the PU is set only when the additional prediction flag is in the merge mode. Thus, the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. When the additional prediction flag is coded before the merge index merge_idx and the additional prediction flag is valid, the merge index is not coded which is not valid when the additional prediction is not valid by restricting the range of the merge index merge_idx (for example, the merge index is not included in the case of one candidate). Therefore, it is possible to obtain the advantageous effect of improving the coding efficiency.

(Modification Example D4 of Inter-Prediction Parameter Coding Section)

Hereinafter, an inter-prediction parameter coding section 1031D4 will be described as a different modification example of the inter-prediction parameter coding section. The inter-prediction parameter coding section 1031D4 includes an additional prediction flag coding section 10311D4, the merge index coding section 30312D4, and the vector candidate index coding section 30313. The additional prediction flag coding section 10311D4 is configured to include an additional prediction flag determination section 30314D4 therein. The additional prediction flag coding section 10311D4 is configured to include an additional prediction flag determination section 30314D4 therein.

The inter-prediction parameter coding section 1031D4 and the additional prediction flag coding section 10311D4 are means corresponding to the inter-prediction parameter decoding section 303D4 and the additional prediction flag decoding section 30311D4 described above. A method of determining whether the additional prediction flag is included in the coded data in the additional prediction flag determination section 30314D4 is the same. When the additional prediction flag is included in the coded data, the inter-prediction parameter decoding section 303D4 decodes the additional prediction flag and the inter-prediction parameter coding section 1031D4 codes the additional prediction flag.

In the inter-prediction parameter decoding section 303D4 with the above-described configuration, the additional prediction flag is set to the flag in units of the CU, but the prediction parameter of the PU is not referred to in the determination of whether the additional prediction flag is present in the coded data. Therefore, the dependency between the prediction parameter and the flag disappears, and thus the problem of the parsing dependency is resolved. Thus, it is possible to obtain the advantageous effect of executing the decoding process for the additional prediction flag easily. As in the modification example D3, when the additional prediction flag coded before the merge index merge_idx is used and the additional prediction flag is 1 (when the additional prediction is used), the merge index is not coded which is not valid when the additional prediction is not valid by restricting the range of the merge index merge_idx (for example, the merge index is not included in the case of one candidate). Therefore, it is possible to obtain the advantageous effect of improving the coding efficiency.

(Modification Example E of Image Coding Device 11)

Hereinafter, a modification example of the image coding device 11 will be described. In the following modification example, an inter-prediction parameter coding section 1031E is provided instead of the inter-prediction parameter coding section 112. A merge prediction parameter derivation section 3036E is provided instead of the merge prediction parameter derivation section 3036. Since the other means is the same as the inter-prediction parameter coding section 112, the description thereof will be omitted.

In the image coding device 11 with the foregoing configuration, the additional prediction flag which is a dedicated syntax component is not used and the index (here, the merge index) for selecting the prediction parameter is used to determine whether the additional prediction is executed. In this case, since the additional prediction flag is not included as the flag in units of the CU or the flag in units of the PU, it is not necessary to determine whether the additional prediction flag is present in the coded data, that is, the prediction parameter of the PU is not referred to for coding the additional prediction flag. Therefore, the dependency between the prediction parameter and the flag disappears, and thus the problem of the parsing dependency is resolved. Thus, it is possible to obtain the advantageous effect of executing the decoding process for the additional prediction flag easily. Further, the merge candidate derivation section 30361E derives the merge candidate for which the additional prediction is executed and the merge candidate for which the additional prediction is not executed, and thus one of the merge candidates is selected to determine whether to execute the additional prediction. Thus, when the additional prediction is not valid, whether to execute the additional prediction in units of the PU can be selected. Therefore, the coding efficiency is improved. When the prediction parameter is effective for the additional prediction, for example, only the inter-layer merge candidate (motion prediction) is derived as the merge candidate for which the additional prediction is executed. Therefore, when the prediction parameter is not effective for the additional prediction, the candidate for which the additional prediction is executed is not provided. Therefore, it is possible to obtain the advantageous effect of improving the coding efficiency.

(Modification Example F1 of Inter-Prediction Parameter Coding Section)

An inter-prediction parameter coding section 1031F1 may be used as a different modification example of the inter-prediction parameter coding section. The inter-prediction parameter coding section 1031F1 includes an additional prediction flag coding section 10311F1, the merge index coding section 30312, and the vector candidate index coding section 30313.

(Modification Example F2 of Inter-Prediction Parameter Coding Section)

An inter-prediction parameter coding section 1031F2 may be used as a different modification example of the inter-prediction parameter coding section. The inter-prediction parameter coding section 1031F2 includes an additional prediction flag coding section 10311F2, the merge index coding section 30312, and the vector candidate index coding section 30313. The additional prediction flag coding section 10311F2 includes an additional prediction flag determination section 30314F2.

(Modification Example F3 of Inter-Prediction Parameter Coding Section)

An inter-prediction parameter coding section 1031F3 may be used as a different modification example of the inter-prediction parameter coding section. The inter-prediction parameter coding section 1031F3 includes an additional prediction flag coding section 10311F3, the merge index coding section 30312, and the vector candidate index coding section 30313. The additional prediction flag coding section 10311F3 includes an additional prediction flag determination section 30314F3.

(Modification Example F4 of Inter-Prediction Parameter Coding Section)

An inter-prediction parameter coding section 1031F4 may be used as a different modification example of the inter-prediction parameter coding section. The inter-prediction parameter coding section 1031F4 includes an additional prediction flag coding section 10311F4, the merge index coding section 30312, and the vector candidate index coding section 30313. The additional prediction flag coding section 10311F4 includes an additional prediction flag determination section 30314F4.

(Modification Example F5 of Inter-Prediction Parameter Coding Section)

An inter-prediction parameter coding section 1031F5 may be used as a different modification example of the inter-prediction parameter coding section. The inter-prediction parameter coding section 1031F5 includes an additional prediction flag coding section 10311F5, the merge index coding section 30312, and the vector candidate index coding section 30313. The additional prediction flag coding section 10311F5 includes an additional prediction flag determination section 30314F5.

(Modification Example F6 of Inter-Prediction Parameter Coding Section)

An inter-prediction parameter coding section 1031F5 may be used as a different modification example of the inter-prediction parameter coding section. The inter-prediction parameter coding section 1031F6 includes an additional prediction flag coding section 10311F6, the merge index coding section 30312, and the vector candidate index coding section 30313. The additional prediction flag coding section 10311F6 includes an additional prediction flag determination section 30314F6.

The subtraction section 1123 subtracts the prediction vector mvpLX input from the AMVP prediction parameter derivation section 1122 from the vector mvLX input from the coding parameter decision section 110 to generate a difference vector mvdLX. The difference vector mvdLX is output to the prediction parameter unification section 1126.

When the prediction mode predMode input from the predicted image generation section 101 indicates the merge prediction mode, the prediction parameter unification section 1126 outputs the merge index merge_idx input from the coding parameter decision section 110 to the entropy coding section 104.

When the prediction mode predMode input from the predicted image generation section 101 indicates the inter-prediction mode, the prediction parameter unification section 1126 performs the following process.

The prediction parameter unification section 1126 unifies the reference picture index refIdxLX and the vector index mvp_LX_idx input from the coding parameter decision section 110 and the difference vector mvdLX input from the subtraction section 1123. The prediction parameter unification section 1126 outputs the unified code to the entropy coding section 104.

A computer may be allowed to realize some of the image coding device 11 and the image decoding device 31 according to the above-described embodiment, for example, the entropy decoding section 301, the prediction parameter decoding section 302, the predicted image generation section 101, the DCT and quantization section 103, the entropy coding section 104, the inverse quantization and inverse DCT section 105, the coding parameter decision section 110, the prediction parameter coding section 111, the entropy decoding section 301, the prediction parameter decoding section 302, the predicted image generation section 308, and the inverse quantization and inverse DCT section 311. In this case, a program realizing the control function may be recorded on a computer-readable recording medium and the program recorded on the recording medium may be read to a computer system to be executed so that the functions are realized. The "computer system" mentioned here is a computer system included in one of the image coding devices 11 to 11*h* and the image decoding devices 31 to 31*h* and includes an OS and hardware such as peripheral device. The "computer-readable recording medium" refers to a portable medium such as a flexible disk, a magneto-optical disc, a ROM, or a CD-ROM or a storage device such as a hard disk included in a computer system. The "computer-readable recording medium" may also include a medium retaining a program dynamically for a short time, such as a communication line when a program is transmitted via a network such as the Internet or a communication circuit line such as a telephone circuit and a medium retaining a program for a given time, such as a volatile memory included in a computer system serving as a server or a client in this case. The program may be a program used to realize some of the above-described functions or may be a program combined with a program already stored in a computer system to realize the above-described functions.

Some or all of the image coding device 11 and the image decoding device 31 according to the above-described embodiment may be realized as an integrated circuit such as a large scale integration (LSI). Each of the functional blocks of the image coding device 11 and the image decoding device 31 may be individually formed as a processor or some or all of the functional blocks may be integrated to be formed as a processor. A method for an integrated circuit is not limited to the LSI, but may be realized by a dedicated circuit or a general processor. When an integrated circuit technology substituting the LSI with an advance in semiconductor technologies appears, an integrated circuit may be used by the technology.

The embodiment of the invention has been described above in detail with reference to the drawings, but a specific configuration is not limited to the above-described configuration. The invention can be modified in various forms within the scope of the invention without departing from the gist of the invention.

CONCLUSION

An image decoding device with a first configuration includes: an illumination compensation flag derivation section that derives an illumination compensation flag indicating whether illumination compensation is executed; and an illumination compensation section that generates a predicted image of a target prediction unit using illumination change parameters derived from an image in a neighbor of the target prediction unit on a target image and a reference region image of a reference image corresponding to the target prediction unit when the illumination compensation flag is a value indicating validity. When a prediction unit which is a generation target of the predicted image is in a merge mode, the illumination compensation flag derivation section decodes the illumination compensation flag from coded data. When the prediction unit is in an AMVP mode and the reference picture index of the prediction unit indicates inter-layer prediction, the illumination compensation flag derivation section decodes the illumination compensation flag from the coded data. When the prediction unit is not in both of the merge mode and the AMVP mode, the illumination compensation flag derivation section does not decode the illumination compensation flag from the coded data and does not execute the illumination compensation.

In the foregoing first configuration, by decoding the illumination compensation flag from the coded data without dependency on the reference picture index when the prediction unit is in the merge mode, it is possible to obtain the advantageous effect of resolving the parsing dependency in which it is necessary to derive the reference picture index which is the prediction parameter in the case of the merge mode.

The image decoding device with a second configuration includes: an illumination compensation flag derivation section that derives an illumination compensation flag indicating whether illumination compensation is executed; and an illumination compensation section that generates a predicted image of a target prediction unit using illumination change parameters derived from an image in a neighbor of the target prediction unit on a target image and a reference region image of a reference image corresponding to the target prediction unit when the illumination compensation flag is a value indicating validity. When a split mode of the coding unit is 2N×2N indicating non-splitting, the illumination compensation flag derivation section decodes the illumination compensation flag from coded data. In the other cases, the illumination compensation flag derivation section does not decode the illumination compensation flag from the coded data and does not execute the illumination compensation.

As described above, by restricting the case in which the illumination compensation flag is coded to the case in which the illumination compensation flag is coded, it is possible to obtain the advantageous effect of reducing the coding amount of the illumination compensation flag.

The image decoding device with a third configuration includes: an illumination compensation flag derivation section that derives an illumination compensation flag indicating whether illumination compensation is executed; and an illumination compensation section that generates a predicted image of a target prediction unit using illumination change parameters from an image in a neighbor of the target prediction unit on a target image and a reference region image of a reference image corresponding to the target prediction unit when the illumination compensation flag is a value indicating validity. The illumination compensation section executes the illumination compensation when the reference image is a reference image designated using a reference picture list L0. When the reference image is a reference image designated using a list other than the reference picture list L0, the illumination compensation section does not execute the illumination compensation.

As described above, by executing the restriction to the case in which the illumination compensation is executed, it is possible to obtain the advantageous effect of reducing the processing amount of the illumination compensation.

The image decoding device with a fourth configuration includes: an illumination compensation flag derivation section that derives an illumination compensation flag indicating whether illumination compensation is executed; and an illumination compensation section that generates a predicted image of a target prediction unit using illumination change parameters from an image in a neighbor of the target prediction unit on a target image and a reference region image of a reference image corresponding to the target prediction unit when the illumination compensation flag is a value indicating validity. When a prediction unit which is a generation target of the predicted image is in a merge mode and a merge flag index is a value other than a predetermined value, the illumination compensation flag derivation section decodes the illumination compensation flag from coded data. When the prediction unit is in an AMVP mode and the reference picture index of the prediction unit indicates inter-layer prediction, the illumination compensation flag derivation section decodes the illumination compensation flag from the coded data. When the prediction unit is not in both of the merge mode and the AMVP mode, the illumination compensation flag is derived without decoding the illumination compensation flag from the coded data and executing the illumination compensation.

As described above, by decoding the illumination compensation flag from the coded data without dependency on the reference picture index when the prediction unit is in the merge mode, it is possible to obtain the advantageous effect of resolving the parsing dependency in which it is necessary to derive the reference picture index which is the prediction parameter in the case of the merge mode. By executing the restriction to the case in which the merge flag index is a value other than the predetermined value even in the case of the merge mode and decoding (coding) the illumination compensation flag, it is possible to obtain the advantageous effect of reducing the coding amount of the illumination compensation flag.

The image decoding device with a fifth configuration includes a specific merge index illumination compensation skip flag derivation section that derives a specific merge index skip flag. When the prediction unit which is a generation target of the predicted image is in the merge mode and the merge flag index is a value other than the predetermined value and the specific merge index illumination compensation skip flag is not valid, the illumination compensation flag derivation section decodes the illumination compensation flag from the coded data. When the prediction unit is in an AMVP mode and the reference picture index of the prediction unit indicates inter-layer prediction, the illumination compensation flag derivation section decodes the illumination compensation flag from the coded data. When the prediction unit is not in both of the merge mode and the AMVP mode, the illumination compensation flag is derived without decoding the illumination compensation flag from the coded data and executing the illumination compensation.

In the image decoding device with a sixth configuration, the specific merge index illumination compensation skip flag derivation section decodes the specific merge index illumination compensation skip flag from the coded data.

By deriving a flag indicating the restriction to the case in which the above-described merge flag index is a value other than the predetermined value from the coded data, the coding device can execute setting suitable for the picture structure, the display order (POC), or the sequence. Therefore, it is possible to obtain the advantageous effect of improving the coding efficiency.

The image decoding device with a seventh configuration may include an illumination compensation section that applies illumination compensation to a motion compensation image. The illumination compensation section may include: an illumination parameter estimation section that derives parameters a and b as illumination change parameters from a reference image region on a reference picture and a decoded image region on a decoding target picture; and an illumination compensation filter that executes illumination compensation using the illumination change parameters. The illumination compensation filter executes the illumination compensation by executing right shift to a product of the motion compensation image and the parameter a by a predetermined fixed shift integer or executing right shift to the product of the parameter a by the predetermined fixed shift integer and then adding the parameter b. The illumination parameter estimation section derives the parameter b from a value shifted left by the fixed shift value from the sum of the pixel values of the reference image based on the parameter a and the product of the sum of the pixel value of the decoded image.

In the illumination compensation of the foregoing configuration, the right shift is executed using the predetermined fixed shift integer which is a fixed value. Therefore, it is possible to obtain the advantageous effect of executing a process by the SIMD operation or the like more easily than when the right shift is executed using a variable. Further, by using the parameter b which is an offset component before right shift, an operation can be executed with higher precision than the offset component is added after right shift.

In the image decoding device with an eighth configuration, the illumination parameter estimation section may derive the parameter a from a first parameter derived from a sum of products of pixel values of the reference image and pixel values of the decoded image and a product of a sum of the pixel values of the reference image and a sum of the pixel values of the decoded image and a second parameter derived from a sum of squares of the pixel values of the reference image and a square of sums of the pixel values of the reference image. The illumination parameter estimation section may derive an integrated shift value according to a pixel bit depth and derives the parameter a from the first parameter derived from a sum of values shifted right by the integrated shift value from products of the pixel values of the reference image and the pixel values of the decoded image and a value shifted right by the integrated shift value from a product of a sum of the pixel values of the reference image and a sum of the pixel values of the decoded image and the second parameter derived from a sum of values shifted right by the integrated shift value from squares of the pixel values of the reference image and a value shifted right by the integrated shift value from a square of the sum of the pixel values of the reference image.

In the illumination compensation of the foregoing configuration, when the sum of the products of the pixel values of the reference image and the pixel values of the decoded image and the product of the sum of the pixel values of the reference image and the sum of the pixel values of the decoded image are obtained, the first and second parameters can be derived in the predetermined range, for example, the 32-bit range, by executing the right shift by the integrated shift value decided according to the pixel bit depth before the sum is obtained. Therefore, it is possible to obtain the advantageous effect of executing the process easily.

In the image decoding device with a ninth configuration, the illumination parameter estimation section may execute normalization by right shifting the first and second parameters by the predetermined fixed shift value when a sum of a double of the pixel bit depth and a number corresponding to logarithm 2 of the number of pixels is equal to or greater than a predetermined integer.

In the image decoding device with a tenth configuration, the illumination parameter estimation section may derive the parameter a from a first parameter derived from a sum of products of pixel values of the reference image and pixel values of the decoded image and a product of a sum of the pixel values of the reference image and a sum of the pixel values of the decoded image and a second parameter derived from a sum of squares of the pixel values of the reference image and a square of sums of the pixel values of the reference image. The illumination parameter estimation section may derive the first and second parameters from the reference image and the decoded image, derive a normalized shift value decided according to the magnitude of the second parameter, derive the normalized first parameter and the normalized second parameter by right shifting the first and second parameters by the normalized shift value, and derive the parameter a by right shifting a product of the normalized first parameter or a value obtained by multiplying the normalized first parameter by a predetermined integer and a table value decided with reference to a table from the normalized second parameter by a fixed shift value.

In the illumination compensation of the foregoing configuration, values are normalized using the same normalized shift value for both of the first and second parameters. Therefore, it is possible to obtain the advantageous effect of executing the process more easily than when different normalized parameters are used for the first and second parameters. Further, the table shift value after the multiplication of the table value can be set to be a fixed value using the same normalized parameter for the first and second parameters. Thus, it is possible to obtain the advantageous effect of executing the right shift process easily.

In the image decoding device with an eleventh configuration, the illumination parameter estimation section may derive the parameter a from a first parameter derived from a sum of products of pixel values of the reference image and pixel values of the decoded image and a product of a sum of the pixel values of the reference image and a sum of the pixel values of the decoded image and a second parameter derived from a sum of squares of the pixel values of the reference image and a square of sums of the pixel values of the reference image, and derive the first and second parameters from the reference image and the decoded image. By deriving the normalized first parameter after clipping the normalized first parameter to restrict the upper limit of the first parameter or clipping the normalized first parameter after deriving the normalized first parameter to restrict the upper limit of the first parameter, a range of a target value multiplied by a table value decided with reference to a table from the normalized second parameter is restricted.

In the illumination compensation of the foregoing configuration, the magnitude of the value of a target multiplied by the table value is restricted. Therefore, even when the values are normalized using the same normalized shift value for both of the first and second parameters without normalizing the magnitude of the first parameter using the normalized shift value decided according to the magnitude of the first parameter, the product by the table value is not greater than a predetermined value (for example, a 32-bit range) and the operation can be executed. Thus, the process is executed easily.

In the image decoding device with a twelfth configuration, the illumination parameter estimation section may use a value equal to or greater than 0 and equal to or less than 255 as the parameter a.

In the illumination compensation of the foregoing configuration, the parameter a is within the range of an 8-bit nonnegative integer. Thus, when the bit depth of the pixel values is 8 bits, the product of the parameter a and the pixel value can be processed as a product of 8-bit nonnegative integers. Therefore, it is possible to obtain the advantageous effect of easily executing the process by an SIMD operation or the like.

In the image decoding device with a thirteenth configuration, a value clipped to a value equal to or greater than 0 and equal to or less than a double of a fixed shift constant multiple of 1 may be used as the parameter a.

In the illumination compensation of the foregoing configuration, by restricting the range of the parameter a to a range in which the illumination compensation is effectively executed, it is possible to obtain the advantageous effect of increasing the effect of the illumination prediction. Even when the illumination compensation parameter exceeds the range, the illumination compensation parameter is effective for the target block in some cases. However, a case in which the illumination prediction in which the parameter exceeds the range is necessary for the predicted image means a case in which the predicted image before the illumination prediction is not appropriate. When the prediction is applied forcibly by considerably changing a block in which such prediction is not appropriate, that is, a block in which the prediction parameter of the motion vector, the reference picture, or the like is not appropriate, using the illumination compensation, the inappropriate prediction parameter may be transferred to a subsequent block, and thus the subsequent block may be adversely affect. Thus, the coding efficiency deteriorates.

In the image decoding device with a fourteenth configuration, the illumination parameter estimation section may apply the illumination prediction only when the target prediction unit is square.

In the illumination compensation of the foregoing configuration, by restricting the size of the motion compensation block to a square, a sum of the pixel numbers of the decoded image and the reference image used to derive the illumination parameter, which is a sum of the horizontal and vertical sides of the motion compensation block, is an exponent of 2. Therefore, when the parameter b which is the offset component is obtained by a quotient of the number of pixels, the parameter b can be derived by right shift by logarithm 2 of the double of the size of the motion compensation block. Since the exact offset value can be derived by the right shift, it is possible to obtain the advantageous effect of executing the process easily.

The illumination parameter estimation section may derive the parameter a from a first parameter derived from a sum of products of pixel values of the reference image and pixel values of the decoded image and a product of a sum of the pixel values of the reference image and a sum of the pixel values of the decoded image and a second parameter derived from a sum of squares of the pixel values of the reference image and a square of sums of the pixel values of the reference image, and derive the first and second parameters from the reference image and the decoded image. The parameter a is derived by comparing the value derived from the first parameter derived from the sum of the products of the pixel values of the decoded image and the pixel values of the reference image and the product of the sum of the pixel values of the decoded image and the sum of the pixel values of the reference image to the value derived from the second parameter derived from the sum of the squares of the pixel values of the reference image and the square of the sum of the pixel values of the reference image.

In the illumination compensation of the foregoing configuration, it is not necessary to use a table for subtracting the reciprocal of the second parameter when the parameter a corresponding to the quotient of the second parameter by the first parameter is derived. Therefore, it is possible to obtain the advantageous effect of executing the process easily. In order to subtract the reciprocal with the table with a predetermined size, it is generally necessary to execute a normalization process of suppressing the second parameter to a predetermined range, but the normalization process is not necessary. Since a product of the first parameter and the reciprocal of the second parameter does not exceed a predetermined value, it is not necessary to execute the normalization process of normalizing the first parameter either.

In the image decoding device with a fifteenth configuration, the illumination compensation section may derive the parameter a from the first parameter derived from the sum of the products of the pixel values of the reference image and the pixel values of the decoded image and the product of the sum of the pixel values of the reference image and the sum of the pixel values of the decoded image and the second parameter derived from the sum of the squares of the pixel values of the reference image and the square of the sum of the pixel values of the reference image. The illumination compensation section may include a regularization term addition section that adds the same regularization term to the first and second parameters or adds the same regularization term to a component deriving the first parameter and a component deriving the second parameter.

Thus, by adding the same regularization term so that the parameter a is near a predetermined value, an estimated parameter becomes robust when there is a deviated value. When the estimated parameter becomes robust, it is possible to obtain the advantageous effects of improving estimation precision of the illumination compensation and improving coding efficiency.

The image decoding device with a seventeenth configuration includes a residual recording section that records a residual of a luminance component of a first layer image and a predicted image generation section that generates a predicted image of a second layer image different from the first layer image using the residual of the luminance component recorded in the residual recording section. The predicted image generation section includes means for clipping the residual to a range entering a predetermined bit width decided by a pixel bit width when reading the residual of the luminance component from the residual recording section.

In the image decoding device with an eighteenth configuration, the image decoding device may not record the residual of a chrominance component of the first layer image and may not generate a predicted image using the residual in regard to a chrominance component of the second layer image different from the first layer image.

An image coding device with a nineteenth configuration includes a residual recording section that records a residual of a luminance component of a first layer image and a predicted image generation section that generates a predicted image of a second layer image different from the first layer image using the residual of the luminance component recorded in the residual recording section. The predicted image generation section includes means for clipping the residual to a range entering a predetermined bit width decided by a pixel bit width when reading the residual of the luminance component from the residual recording section.

INDUSTRIAL APPLICABILITY

The invention can be appropriately applied to an image decoding device that decodes coded data obtained by coding image data and an image coding device that generates coded data obtained by coding image data. Further, the invention can be appropriately applied to the data structure of coded data generated by an image coding device and referred to by an image decoding device.

REFERENCE SIGNS LIST

1 IMAGE TRANSMISSION SYSTEM
11 IMAGE CODING DEVICE
101 PREDICTED IMAGE GENERATION SECTION
102 SUBTRACTION SECTION
103 DCT AND QUANTIZATION SECTION
104 ENTROPY CODING SECTION
105 INVERSE QUANTIZATION AND INVERSE DCT SECTION
106 ADDITION SECTION
108 PREDICTION PARAMETER MEMORY (FRAME MEMORY)
109 REFERENCE PICTURE MEMORY (FRAME MEMORY)
110 CODING PARAMETER DECISION SECTION
111 PREDICTION PARAMETER CODING SECTION
112 INTER-PREDICTION PARAMETER CODING SECTION
1031A INTER-PREDICTION PARAMETER CODING SECTION
1031A2 INTER-PREDICTION PARAMETER CODING SECTION
1031B INTER-PREDICTION PARAMETER CODING SECTION
1031C INTER-PREDICTION PARAMETER CODING SECTION
1031D INTER-PREDICTION PARAMETER CODING SECTION
1031D2 INTER-PREDICTION PARAMETER CODING SECTION
1031D3 INTER-PREDICTION PARAMETER CODING SECTION
1031D4 INTER-PREDICTION PARAMETER CODING SECTION
1031E INTER-PREDICTION PARAMETER CODING SECTION
1031F1 INTER-PREDICTION PARAMETER CODING SECTION
1031F2 INTER-PREDICTION PARAMETER CODING SECTION
1031F3 INTER-PREDICTION PARAMETER CODING SECTION
1031F4 INTER-PREDICTION PARAMETER CODING SECTION
1031F5 INTER-PREDICTION PARAMETER CODING SECTION
1031F6 INTER-PREDICTION PARAMETER CODING SECTION
10311 ADDITIONAL PREDICTION FLAG CODING SECTION
10311F1 ADDITIONAL PREDICTION FLAG CODING SECTION
10311F2 ADDITIONAL PREDICTION FLAG CODING SECTION
10311F3 ADDITIONAL PREDICTION FLAG CODING SECTION
10311F4 ADDITIONAL PREDICTION FLAG CODING SECTION
10311F5 ADDITIONAL PREDICTION FLAG CODING SECTION
10311F6 ADDITIONAL PREDICTION FLAG CODING SECTION
1121 MERGE PREDICTION PARAMETER DERIVATION SECTION
1122 AMVP PREDICTION PARAMETER DERIVATION SECTION
1123 SUBTRACTION SECTION
1126 PREDICTION PARAMETER UNIFICATION SECTION
113 INTRA-PREDICTION PARAMETER CODING SECTION
21 NETWORK
31 IMAGE DECODING DEVICE
301 ENTROPY DECODING SECTION
302 PREDICTION PARAMETER DECODING SECTION
303 INTER-PREDICTION PARAMETER DECODING SECTION
303A INTER-PREDICTION PARAMETER DECODING SECTION
303A2 INTER-PREDICTION PARAMETER DECODING SECTION
303B INTER-PREDICTION PARAMETER DECODING SECTION
303C INTER-PREDICTION PARAMETER DECODING SECTION
303D INTER-PREDICTION PARAMETER DECODING SECTION
303D2 INTER-PREDICTION PARAMETER DECODING SECTION
303D3 INTER-PREDICTION PARAMETER DECODING SECTION
303D4 INTER-PREDICTION PARAMETER DECODING SECTION
303E INTER-PREDICTION PARAMETER DECODING SECTION
3031 INTER-PREDICTION PARAMETER DECODING CONTROL SECTION
3031D INTER-PREDICTION PARAMETER DECODING CONTROL SECTION
3031E INTER-PREDICTION PARAMETER DECODING CONTROL SECTION

30311 ADDITIONAL PREDICTION FLAG DECODING SECTION
30311A ADDITIONAL PREDICTION FLAG DECODING SECTION
30311A2 ADDITIONAL PREDICTION FLAG DECODING SECTION
30311B ADDITIONAL PREDICTION FLAG DECODING SECTION
30311C ADDITIONAL PREDICTION FLAG DECODING SECTION
30311D ADDITIONAL PREDICTION FLAG DECODING SECTION
30311D2 ADDITIONAL PREDICTION FLAG DECODING SECTION
30311D3 ADDITIONAL PREDICTION FLAG DECODING SECTION
30311D4 ADDITIONAL PREDICTION FLAG DECODING SECTION
30311F1 ILLUMINATION COMPENSATION FLAG DECODING SECTION
30311F2 ILLUMINATION COMPENSATION FLAG DECODING SECTION
30311F3 ILLUMINATION COMPENSATION FLAG DECODING SECTION
30311F4 ILLUMINATION COMPENSATION FLAG DECODING SECTION
30311F5 ILLUMINATION COMPENSATION FLAG DECODING SECTION
30311F6 ILLUMINATION COMPENSATION FLAG DECODING SECTION
303111 REFERENCE LAYER DETERMINATION SECTION
30312 MERGE INDEX DECODING SECTION
30312D3 MERGE INDEX DECODING SECTION
30312E MERGE INDEX DECODING SECTION
30313 VECTOR CANDIDATE INDEX DECODING SECTION
30313E VECTOR CANDIDATE INDEX DECODING SECTION
30314 ADDITIONAL PREDICTION FLAG DETERMINATION SECTION
30314A ADDITIONAL PREDICTION FLAG DETERMINATION SECTION
30314A2 ADDITIONAL PREDICTION FLAG DETERMINATION SECTION
30314B ADDITIONAL PREDICTION FLAG DETERMINATION SECTION
30314C ADDITIONAL PREDICTION FLAG DETERMINATION SECTION
30314D ADDITIONAL PREDICTION FLAG DETERMINATION SECTION
30314D2 ADDITIONAL PREDICTION FLAG DETERMINATION SECTION
30314D3 ADDITIONAL PREDICTION FLAG DETERMINATION SECTION
30314D4 ADDITIONAL PREDICTION FLAG DETERMINATION SECTION
303141 LAYER DETERMINATION SECTION
303142 WHOLE-PU PARAMETER DETERMINATION SECTION
303142B PU0 PARAMETER DETERMINATION SECTION
303143 INDEX DETERMINATION SECTION
30315 RESIDUAL PREDICTION DETERMINATION SECTION
30316 ILLUMINATION COMPENSATION DETERMINATION SECTION
30319 SPECIFIC MERGE INDEX ILLUMINATION COMPENSATION SKIP FLAG DERIVATION SECTION
30319B SPECIFIC MERGE INDEX ILLUMINATION COMPENSATION SKIP FLAG DERIVATION SECTION
30319C SPECIFIC MERGE INDEX ILLUMINATION COMPENSATION SKIP FLAG DERIVATION SECTION
30319D SPECIFIC MERGE INDEX ILLUMINATION COMPENSATION SKIP FLAG DERIVATION SECTION
3032 AMVP PREDICTION PARAMETER DERIVATION SECTION
3035 ADDITION SECTION
3036 MERGE PREDICTION PARAMETER DERIVATION SECTION
3036E MERGE PREDICTION PARAMETER DERIVATION SECTION
30361 MERGE CANDIDATE DERIVATION SECTION
303611 MERGE CANDIDATE STORAGE SECTION
303612 ENHANCEMENT MERGE CANDIDATE DERIVATION SECTION
3036121 INTER-LAYER MERGE CANDIDATE DERIVATION SECTION
3036122 DISPARITY VECTOR ACQUISITION SECTION
3036123 INTER-LAYER DISPARITY MERGE CANDIDATE DERIVATION SECTION
303613 BASIC MERGE CANDIDATE DERIVATION SECTION
3036131 SPATIAL MERGE CANDIDATE DERIVATION SECTION
3036132 TEMPORAL MERGE CANDIDATE DERIVATION SECTION
3036133 COMBINED MERGE CANDIDATE DERIVATION SECTION
3036134 ZERO MERGE CANDIDATE DERIVATION SECTION
30361E MERGE CANDIDATE DERIVATION SECTION
30362 MERGE CANDIDATE SELECTION SECTION
304 INTRA-PREDICTION PARAMETER DECODING SECTION
306 REFERENCE PICTURE MEMORY (FRAME MEMORY)
307 PREDICTION PARAMETER MEMORY (FRAME MEMORY)
308 PREDICTED IMAGE GENERATION SECTION
309 INTER-PREDICTED IMAGE GENERATION SECTION
3091 DISPARITY COMPENSATION SECTION
3092 RESIDUAL PREDICTION SECTION
3092A RESIDUAL PREDICTION SECTION
3092B RESIDUAL PREDICTION SECTION
3092B RESIDUAL PREDICTION SECTION
3092C RESIDUAL PREDICTION SECTION
3092D RESIDUAL PREDICTION SECTION
30921 RESIDUAL ACQUISITION SECTION
30921A RESIDUAL ACQUISITION SECTION
30922 RESIDUAL FILTER SECTION
3093 ILLUMINATION COMPENSATION SECTION
3093B ILLUMINATION COMPENSATION SECTION
3093C ILLUMINATION COMPENSATION SECTION
3093D ILLUMINATION COMPENSATION SECTION
3093E ILLUMINATION COMPENSATION SECTION
3093F ILLUMINATION COMPENSATION SECTION
3093G ILLUMINATION COMPENSATION SECTION
3093H ILLUMINATION COMPENSATION SECTION

30931 ILLUMINATION PARAMETER ESTIMATION SECTION
30931H ILLUMINATION PARAMETER ESTIMATION SECTION
309311B INTEGRATED SHIFT VALUE DERIVATION SECTION
309312B INTEGRATED VALUE DERIVATION SECTION
309313B ADDED VALUE DERIVATION SECTION
309313H ADDED VALUE DERIVATION SECTION
309314B FIRST PARAMETER DERIVATION SECTION
309314C FIRST PARAMETER DERIVATION SECTION
309314D FIRST PARAMETER DERIVATION SECTION
309314H FIRST PARAMETER DERIVATION SECTION
309315B SECOND PARAMETER DERIVATION SECTION
309315H SECOND PARAMETER DERIVATION SECTION
309316B PARAMETER a DERIVATION SECTION
309316C PARAMETER a DERIVATION SECTION
309316D PARAMETER a DERIVATION SECTION
309316H PARAMETER a DERIVATION SECTION
309316H2 PARAMETER a DERIVATION SECTION
3093161B FIRST PARAMETER CLIP SECTION
3093161H PARAMETER CLIP SECTION
3093162B FIRST PARAMETER SHIFT SECTION
3093163B SECOND PARAMETER SHIFT SECTION
3093163H SECOND NORMALIZATION SHIFT SECTION
3093164B TABLE BASE PARAMETER a DERIVATION SECTION
3093164H TABLE BASE PARAMETER a DERIVATION SECTION
3093165H DIVISION PARAMETER a DERIVATION SECTION
309316C PARAMETER a DERIVATION SECTION
3093161C FIRST PARAMETER CLIP SECTION
3093162C COMMON SHIFT SECTION
3093164C TABLE BASE PARAMETER a DERIVATION SECTION
309317B PARAMETER b DERIVATION SECTION
309317G PARAMETER b DERIVATION SECTION
309317H PARAMETER b DERIVATION SECTION
309318E REGULARIZATION TERM ADDITION SECTION
309318H REGULARIZATION TERM ADDITION SECTION
30932 ILLUMINATION COMPENSATION FILTER
30932B ILLUMINATION COMPENSATION FILTER SECTION
30932B' ILLUMINATION COMPENSATION FILTER SECTION
30932G ILLUMINATION COMPENSATION FILTER SECTION
3094 WEIGHT PREDICTION SECTION
310 INTRA-PREDICTED IMAGE GENERATION SECTION
3104E LM PREDICTION SECTION
3104H LM PREDICTION SECTION
31041 LM PARAMETER ESTIMATION SECTION
31041H LM PARAMETER ESTIMATION SECTION
310411 LM INTEGRATED SHIFT VALUE DERIVATION SECTION
310412 LM INTEGRATED VALUE DERIVATION SECTION
310413 LM ADDED VALUE DERIVATION SECTION
310413H LM ADDED VALUE DERIVATION SECTION
310414 LM FIRST PARAMETER DERIVATION SECTION
310414H LM FIRST PARAMETER DERIVATION SECTION
310415 LM SECOND PARAMETER DERIVATION SECTION
310415H LM SECOND PARAMETER DERIVATION SECTION
310416 LM PARAMETER a DERIVATION SECTION
310416H LM PARAMETER a DERIVATION SECTION
310416H2 LM PARAMETER a DERIVATION SECTION
3104161H LM PARAMETER CLIP SECTION
3104163H LM SECOND NORMALIZATION SHIFT SECTION
3104164H LM TABLE BASE PARAMETER a DERIVATION SECTION
3104165H LM DIVISION PARAMETER a DERIVATION SECTION
310417 LM PARAMETER b DERIVATION SECTION
310417H LM PARAMETER b DERIVATION SECTION
310418E LM REGULARIZATION TERM ADDITION SECTION
3104180E LM REGULARIZATION TERM DERIVATION SECTION
3104180H LM REGULARIZATION TERM DERIVATION SECTION
3104181E LM FIRST PARAMETER REGULARIZATION TERM DERIVATION SECTION
3104182E LM SECOND PARAMETER REGULARIZATION TERM DERIVATION SECTION
31042 LM FILTER SECTION
31042H LM PREDICTION FILTER SECTION
311 INVERSE QUANTIZATION AND INVERSE DCT SECTION
312 ADDITION SECTION
313 RESIDUAL STORAGE SECTION
313A RESIDUAL STORAGE SECTION
3131 RESIDUAL RANGE RESTRICTION SECTION
3131A RESIDUAL CONTRACTION SECTION
3132 RESIDUAL STORAGE MEMORY
3133 RESIDUAL READING SECTION
3133A RESIDUAL EXPANSION SECTION
41 IMAGE DISPLAY DEVICE

The invention claimed is:

1. An image decoding device comprising:

a processor, and a memory associated with the processor; wherein the processor executes instructions stored on the memory to perform:

deriving an illumination compensation flag indicating whether illumination compensation is executed; and generating a predicting image of a target prediction unit using illumination change parameters derived from a target image and a reference image in a case where the illumination compensation flag is a value indicating that illumination compensation is executed;

deriving a specific merge index illumination compensation skip flag;

determining whether or not the target prediction unit which is a generation target of the predicted image is in a merge mode and a merge index is a predetermined value;

determining whether or not the specific merge index illumination compensation skip flag is valid; and decoding the illumination compensation flag from coded data based on results of the determining.

2. The image decoding device according to claim 1, wherein the processor further executes the instructions stored on the memory to decode the specific merge index illumination compensation skip flag from a slice header.

3. The image decoding device according to claim 1, wherein the processor further executes the instructions stored on the memory to decode the illumination compensation flag from the coded data in a case where the prediction unit is not in the merge mode and a reference picture of the prediction unit indicates interview prediction.

* * * * *